(12) United States Patent
Al-Abdulqader et al.

(10) Patent No.: US 7,853,472 B2
(45) Date of Patent: Dec. 14, 2010

(54) SYSTEM, PROGRAM PRODUCT, AND METHODS FOR MANAGING CONTRACT PROCUREMENT

(75) Inventors: Hisham Ali Al-Abdulqader, Dammam (SA); Ammar Ibrahim Al-Mubarak, Dhahran (SA); Udai M. Al-Mulla, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 1189 days.

(21) Appl. No.: 11/485,622

(22) Filed: Jul. 12, 2006

(65) Prior Publication Data

US 2007/0016514 A1    Jan. 18, 2007

Related U.S. Application Data

(60) Provisional application No. 60/699,582, filed on Jul. 15, 2005.

(51) Int. Cl.
  *G06F 9/46* (2006.01)
(52) U.S. Cl. .................... 705/9; 705/26; 705/27
(58) Field of Classification Search ........... 705/26, 705/27, 9
  See application file for complete search history.

(56) References Cited

U.S. PATENT DOCUMENTS 6,850,900 B1    2/2005 Hare et al.
7,689,469 B1*   3/2010 Mesaros .................... 705/26
2002/0099598 A1  7/2002 Eicher, Jr. et al.
2002/0103702 A1  8/2002 Ifflander et al.
2002/0111922 A1  8/2002 Young et al.

(Continued)

OTHER PUBLICATIONS

Ketera1, "Ketera Extends Comprehensive Spend Management Suite with 'On Demand' Contract Management Service; New Service Maximizes Savings With Closed Loop Service For Spend Management" BusinessWire, Sep. 29, 2003.*

(Continued)

*Primary Examiner*—Mark Fadok
(74) *Attorney, Agent, or Firm*—Bracewell & Giuliani LLP

(57) ABSTRACT

A system to facilitate contract procurement and contract management through an online contract procurement and management website over a computer network, program product, and associated methods are provided. The system includes an electronic contracting network server accessible to a computer network, a database accessible to the electronic contracting network server through the computer network, a plurality of plurality of electronic contracting entity member user computers in communication with the electronic contracting network server through the computer network, and a plurality of potential contractor member user computers also in communication with the electronic contracting network server through the computer network. The system also includes an electronic contracting program product stored in the memory of the electronic contracting network server and positioned to perform various contract procurement and contract management functions.

48 Claims, 98 Drawing Sheets

U.S. PATENT DOCUMENTS

| | | | |
|---|---|---|---|
| 2002/0156668 A1* | 10/2002 | Morrow et al. | 705/8 |
| 2002/0165723 A1* | 11/2002 | Kroeger | 705/1 |
| 2003/0033179 A1* | 2/2003 | Katz et al. | 705/7 |
| 2003/0041010 A1 | 2/2003 | Yonao-Cowan | |
| 2003/0212627 A1* | 11/2003 | Burns et al. | 705/37 |
| 2004/0085355 A1 | 5/2004 | Harmes et al. | |
| 2004/0167789 A1 | 8/2004 | Roberts et al. | |
| 2005/0203821 A1* | 9/2005 | Petersen et al. | 705/36 |
| 2005/0204283 A1* | 9/2005 | Kroeger | 715/530 |
| 2006/0259408 A1* | 11/2006 | Levy et al. | 705/37 |
| 2006/0265308 A1* | 11/2006 | Jennings | 705/37 |

OTHER PUBLICATIONS

NextPage, Inc. article titled "Documentum," copyright NextPage Inc., 1999-2005, found at www.nextpage.com/landingpages/documentum.htm.

Nextance, article titled "Procurement Optimization Suite", found at www.nextance.com/solutions_procurement_suite.shtml, 2004.

Upside Software, Inc., article titled "Enterprise Contract Management," found at www.upsidesoft.com, dated Jan. 2005.

* cited by examiner

New Contractor Registration
(Out-Of-Country Contractor)

General Company Information

(Please make sure you complete all required fields indicated with * )

Registration Details
* Company Name:
   (must match the name on the Commercial Registration/License)
   Trading as (Abbreviated Company Name):
   ECN Abbreviation:
   (To be entered by Company X )
* Country of Incorporation:

* When was your Company established? (Year)

Address
   Street:
   Number:
   P.O.Box:
* City:
* Zip Code:
   Province:
* Country:

Communication
(Please include country and city codes)
*Telephone:                  Ext:
   Alt Telephone 1:          Ext:
   Alt Telephone 2:          Ext:
* Fax:                       Ext:
   Alt Fax 1:                Ext:
   Alt Fax 2:                Ext:
* E-mail Address:
   Company Website Address:

Additional Information
   Total Company Employees:
* Working Days:    From: Select  To: Select
                   From:         To:         and
   Office Hours:   From:         To:

[<< Back]  [Exit]  [Next >>]

*FIG. 4B.*

New Contractor Registration
(Out-Of-Country Contractor)

Ref. Key: 0b0c95c8003d7671480
Company Name: OUT OF COUNTRY CONTRACTOR

Authorized Signatories

Please enter the details of the person(s) who are authorized to sign all contracts, amendments, work orders, change orders and other related contractual documents with AOC B.V. on behalf of your establishment/company/organization. The names provided below must match the names provided in the Required Document; Authorized Signatories and Contacts Letter.

| Name | Nationality | Position | Telephone |
|------|-------------|----------|-----------|

No data.

Add

Add/Update Authorized Person

* Name:
* Nationality:
* Position:
* Telephone:

Add/Update   Cancel

<< Back    Exit    Next >>

New Contractor Registration
(Out-Of-Country Contractor)

Ref. Key: 0b00c95d8003d7671480
Company Name: OUT OF COUNTRY CONTRACTOR

Registration Submission

By pressing on the Submit Now button below, you will be requested to sign again the Computer Use Agreement then your request to be registered will be immediately submitted to Contracting Department.

Therefore, please first make sure that:
1. All data you entered in this Registration Form is 100% accurate and up-to-date.
2. The document; "Authorized Signatories and Designated Contacts letter" attached to the required documents screen is signed by an officer in your Company with proper power of attorney empowering him to grant such authorizations.

If you would like to further check the information and documents you are submitting, click Double Check Application to return to the first application screen or click Submit Later to save and come back later using your unique Reference Key.

Confirmation of Accuracy

We hereby confirm that all information we are submitting in this application is accurate and does not include any misrepresentation of our company's qualifications or information. We are aware that any such inaccurate information or misrepresentation, even if inadvertently provided, will have a serious negative impact on our company's chances of doing business with [ Name ] and its subsidiaries and may subject us to legal prosecution.

☒ Yes, we confirm.

[ << Back ]  [ Submit Later ]  [ Double Check ]  [ Submit Now ]

Your Current Registration

| With Contracting Entity | View Registration Information | Update Registration Information |
|---|---|---|

Your Pending Request

| Request Type | Request Status | Requested On | Requested By |
|---|---|---|---|
| Contracting Entity: UPDATE | Processing | 5/15/2005 07:47:35 | dmtest2 |

Contractor Profile Extension

Read More

You are currently registered with the Aramco entity(ies) listed above. However, regardless of the entity with which you are registered, all such entities can access your Contractor Profile and view your information even if you are not registered with them. The above registration only means that your Contractor Profile has been enabled to interact with the business systems belonging to the above company(ies) should there be a decision to enter into a specific business relationship with your Company.

Therefore, you do not need to register with each entity unless your Company is about to do business with that entity. If so, please click on the appropriate link below.

Register with Contracting Entity 1
Register with Contracting Entity 2

[<< Back]

Company Name: New Vendor for Purchase Org
Vendor No.: 0010003893
Initial Registration Type: OUT OF COUNTRY User: dmtest2

Contractor Experience  113

| Contracting Entity Contract Information | | | | | | | | |
|---|---|---|---|---|---|---|---|---|
| Propnent Name | Contract No. | Contract Title | Field of Work | Start Date (M/D/Y) | End Date (M/D/Y) | Contract Type | Updated By | Updated On |
| No Data found. | | | | | | | | |

| Non- Contracting Entity Contract Information | | | | | | | |
|---|---|---|---|---|---|---|---|
| Client Name | Contract Title | Field of Work | Start Date (M/D/Y) | End Date (M/D/Y) | Contractor Role | Updated By | Updated On |
| No Data found. | | | | | | | |

Add Experience

115

Non-        Contract Information

Client Name: _____ *

Contract Title: _____ *

Field of Work: _____ *

Start Date (M/D/Y): _____ *

End Date (M/D/Y): _____ *

Pricing Method: [Select] *

Type of Scope: [Select] *

Contractor Role: [Select] *

Value of Work Performed (in USD): _____ *

Percentage (%) of Work Subcontracted to Contractor's Total Scope: _____ *

Contract Description: _____ *

Client Contact Name: _____ *

Client Contact Position: _____ *

Client Contact Telephone: _____ *

Client Contact Fax: _____ *

Client Contact Email: _____ *

Attached Documents:

*For Contracting Entity Use Only*

Client Feedback Questionaire

Download Client Feedback Questionaire (blank form)

Upload Client Feedback Questionaire

Name        Created By        Creation Date

No documents were found.

Human Resources

None.

Company Organization Chart(s): Upload

Resumes of Key Personnel: Upload

None.

| Category | Number Employed | No. of Citizens | No. of Non-Citizens | Average Years of Experience (w/ Contractor) | Average Years of Experience (in Total) |

Currently, no data available.

Add More Items

Add/Update

Category : *

No. of Citizens : *

No. of Non-Citizens : *

Number Employed : 0

Average Years of Experience (w/ Contractor) : *

Average Years of Experience (in Total) : *

Updated By :

Updated On :

Add   Cancel

<< Back

*FIG. 6E.*

Equipments

| Type | Quantity | Average Age | Main Location of Availability |
|---|---|---|---|
| 1. Pick-up | 4 | 2.0 | City |

Add New Type

Add/Update

Type [____] *

Quantity [__] *

Average Age [__] *

Main Location of Availability [____] *

Updated By : [__]

Updated On : [__]

Add   Cancel

<< Back

Update

Parent Company Information

Does Your Company;, have a Parent Company? [Yes ▼]
Please provide the following information about your parent company.
Is your parent company a Citizen Company? [No ▼]
Parent Company Name: [            ]
Parent Company Name Abbreviation: [            ]
(Must match the name on the Commercial Registration/Ministerial License, if the Parent Company is a Citizen Company.)
    Citizen Vendor Number (if applicabel): [            ]
Telephone: [      ] Ext: [      ]
Alt Telephone: [      ] Ext: [      ]
Fax: [      ] Ext: [      ]
Alt Fax: [      ] Ext: [      ]
Commercial Registration No. (Ministerial License No.): [      ]
Date of Issue (M/D/Y): [      ]
Place of Issue: [      ]
Expiry Date (M/D/Y): [      ]
Address: [            ]
Country: [Select ▼]
Parent Company Website Address:
[            ]
Office Hours: From: [      ] To: [      ] and
From: [      ] To: [      ]

<< Back   Save

*FIG. 6I.*

Affiliates

Enter the requested information for the principal companies in which your parent company (if any) has a 50% or more direct or indirect ownership. If there are none, ignore this section.

| Company Name | Commercial Reg. No | Entity Vendor No. | Fields of Service |

No data.

Add an Affiliate

Add/Update Affiliate

Is this affiliate an Entity related Company ? : [No]

Affiliate Company Name:

Affiliate Company Name Abbreviation:

Commercial Reg./License No.:

Entity Vendor No. (if applicable):

Field of Service: Construction / General Services / Government / IT / Janitorial Telephone: ___ Ext: ___
Fax: ___ Ext: ___

Address:

Country: [Select]
Affiliate Company Website Address:
Updated By :
Updated On :

Add/Update  Cancel

<< Back

Welcome! CD Rep1

Vendor Name: New Vendor for Purchase Org
Vendor No.: 0010003893
Contracting Entity Visits Report New Visit Contracting Entity Visits

This section is intended to document the findings of Representatives who visted this Contractor.

| Visit Title | Visit Date | Author | Approver | Last Approval Date/Time |

Report New Visit
* Visit Title:
* Visit Date :   [Date]
* Visit Objectives:

* Visit Findings:

Number of Contracting Entity Reps.:

| Name | Department | Title |

* Number of main Contractor Representatives:

| Name | Title |

Attachments:
Add Attachment(s)
Select Approver: Doe, John

Submit  Cancel

Pending Visits
| Visit Title | Visit Date | Author | Submission Date/Time |

<< Back

Contractor Advanced Search 135

IMPORTANT: The search SHOULD contain at least one 'Mandatory' field.

Contractor Experience

| | | |
|---|---|---|
| Contracting Entity Name: | [          ] | Preferable |
| Contract Title: | [          ] | Preferable |
| Field of Work: | [          ] | Preferable |
| Contract Type: | Select... | Preferable |
| Pricing Method: | Select... | Preferable |
| Contractor Role: | Select... | Preferable |
| Type of Scope: | Select... | Preferable |
| Start Date: | From: [    ] To: [    ] | Preferable |
| End Date: | From: [    ] To: [    ] | Preferable |
| Min. Value of work performed by the contractor: | [    ] | Preferable |
| Minimum Performance Category (Applicable to Contracting Entity Contracts Only): | [    ] | Preferable |
| Maximum % of work subcontracted to contractor's total scope: | [    ] | Preferable |

[ Add Criteria ] — 143

Contractor Introduction

Search For: [          ] Preferable
[ Add Criteria ]

Contractor Certificates

| | | |
|---|---|---|
| Title: | [          ] | Preferable |
| Description: | [          ] | Preferable |
| Issued By: | [          ] | Preferable |
| Issued Date: | From: [    ] To: [    ] | Preferable |

[ Add Criteria ]

Contractor Equipment

| | | |
|---|---|---|
| Type: | [ ] | |
| Minimum Quantity: | [   ] | Preferable |
| Maximum Average Age: | [   ] | Preferable |
| Main Location of Availability: | [          ] | Preferable |

[ Add Criteria ]

*FIG. 8A.*

Human Resources

Category:

Min. Average Yrs of Exp. w/ Contractor: [ ] Preferable

Min. Average Yrs of Exp. in Total: [ ] Preferable

Min. No. Employed: [ ] Preferable

Min. No. of Saudis: [ ] Preferable

[Add Criteria]

Facilities/Branches

Location: [ ] Preferable

Description: [ ] Preferable

Min. No. of Employees: [ ] Preferable

[Add Criteria]

Facilities/Camps

Location: [ ] Preferable

Description: [ ] Preferable

Min. Manpower Capacity: [ ] Preferable

Min. No. of Current Occupants: [ ] Preferable

[Add Criteria]

Facilities/Equipment Yards

Location: [ ] Preferable

Description: [ ] Preferable

Min. Area (sq. meters): [ ] Preferable

[Add Criteria]

*FIG. 8B.*

| Parent Company | | |
|---|---|---|
| Parent Company Name: | [          ] | Preferable |
| | Add Criteria | |

| Affiliates | | |
|---|---|---|
| Affiliate Company Name: | [          ] | Preferable |
| | Add Criteria | |

| Subsidiaries | | |
|---|---|---|
| Subsidiary Company Name: | [          ] | Preferable |
| | Add Criteria | |

| Bank Information | | |
|---|---|---|
| Bank Name: | [          ] | Preferable |
| Branch Name: | [          ] | Preferable |
| | Add Criteria | |

Search

<< Back

FIG. 8C.

Contractor Search Criteria

By Vendor No.

6282

Contractor Search Results

| No. | Vendor Number | Vendor Name | Preferable Criteria Met | Has "Contracting Entity Name" Experience | Active "Contracting Entity Name" Contracts | | Active Non "Contracting Entity Name" Contracts | Current "Contracting Entity Name" Bid Slates | Warnings | Report |
|---|---|---|---|---|---|---|---|---|---|---|
| | | | | | LFC | SFC | | | | |
| 1 | 0010006282 | Test Company Ltd | 0 out of 0 | Yes | 0 | 0 | 0 | 2 | | ☐ |

<< Back

Welcome! CD Rep1

Requisition Number : 3000060790
*155* → Title : Ecn create room test
Contract Room Main Page

*158*

Back to my ECN Home Page                                              Log Off

*157*

| General Functions | Pre-Bidding Functions | Bidding Period Functions | Post-Bidding Functions |

Pending Tasks

*159*

Displaying 1 to 10 of 17   [1] of 2                                Refresh

📄 02-For Approve BOA 3000060790
Sent by Lawyer1 on Oct 20, 2004 10:31:21 AM with Low priority.

📄 02-For Approve BOA 3000060790
Sent by Proponent assgined Rep1 on Oct 20, 2004 9:52:56 AM with Low priority.

📄 02-For Approve BOA 3000060790
Sent by Proponent assgined Rep1 on Oct 20, 2004 9:03:11 AM with Low priority.

Recent Communications

*161*

Displaying 1 to 12 of 34   [1] of 3

| Date | Contract Room | Type | Subject |
|---|---|---|---|
| 5/16/05 3:52 PM | 3000060790 | CCQ | CCQ |
| 5/16/05 2:31 PM | 3000060790 | TCQ | ± 3000060790-TCQ-0123 |
| 5/15/05 10:28 AM | 3000060790 | CCQ | 3000060790-CCQ-0052 |
| 5/15/05 8:16 AM | 3000060790 | CCQ | ± 3000060790-CCQ-0050 |
| 5/15/05 8:15 AM | 3000060790 | CCQ | ± 3000060790-CCQ-0048 |
| 5/14/05 10:14 AM | 3000060790 | CCQ | ± 3000060790-CCQ-0046 |
| 5/14/05 10:13 AM | 3000060790 | CCQ | ± 3000060790-CCQ-0044 |
| 5/14/05 8:45 AM | 3000060790 | CCQ | ± 3000060790-CCQ-0039 |
| 5/11/05 10:38 AM | 3000060790 | CCQ | ± 3000060790-CCQ-0042 |
| 5/11/05 9:45 AM | 3000060790 | TCQ | TCQ |
| 5/9/05 10:07 AM | 3000060790 | TCQ | 3000060790-TCQ-0127 |
| 5/9/05 9:02 AM | 3000060790 | TCQ | ± 3000060790-TCQ-0121 |

*FIG. 10A.*

Welcome! CD Rep1

Requisition Number : 3000060790
Title : Ecn create room test
Contract Room Main Page
                                                    157
Back to my ECN Home Page                            Log Off

| General Functions | Pre-Bidding Functions | Bidding Period Functions | Post-Bidding Functions |

Set Standard Contract Type
Procurement Status
Lessons Learned
Auto Search                          of 2              Refresh
Participants
Procurement Schedule
Bidders List
Bidder Status Summary Table
Bid Slate Approval
Checklist Menu
Non Network Documents        :21 AM with Low priority.
Part of Master Procurement
Leave Contract Room
Close Room                   Oct 20, 2004 9:52:56 AM with Low priority.
Miscellaneous Inquiries

Welcome! CD Rep1

Requisition Number : 3000060790
Title : Ecn create room test
Contract Room Main Page
                                                    157
Back to my ECN Home Page                            Log Off

| General Functions | Pre-Bidding Functions | Bidding Period Functions | Post-Bidding Functions |

Pending Tasks       Bid Review Program
                    SOI Manager
                    Company Estimate
Displaying 1 to 10  Financial Evaluation                Refresh
                    Functional Review
                    IFP Manager 📄 02-For Approve BQA 3000060790
Sent by Lawyer1 on Oct 20, 2004 10:31:21 AM with Low priority.

📄 02-For Approve BQA 3000060790
Sent by Proponent assgined Rep1 on Oct 20, 2004 9:52:56 AM with Low priority.

*FIG. 10C.*

Contractor Page
Requisition Number: 0000000000
Title: Network Site

| General Functions | Pre-Bidding Functions | Bidding Period Functions | Post-Bidding Functions |
|---|---|---|---|
| Contracting Lessons Learned | | | |
| Procurement Schedule | | | |
| Withdraw | | | |
| Other Communications | | | Refresh |
| Primary Contact | | | |
| Leave Contract Room | | | |

Contractor Page
Requisition Number: 0000000000
Title: Network Site

| General Functions | Pre-Bidding Functions | Bidding Period Functions | Post-Bidding Functions |
|---|---|---|---|
| | Solicitation of Interest | | |

Pending Tasks

Refresh

No items found.

Contractor Page
Requisition Number: 0000000000
Title: Network Site

| General Functions | Pre-Bidding Functions | Bidding Period Functions | Post-Bidding Functions |
|---|---|---|---|
| | | Invitation for Proposal | |
| Pending Tasks | | Bidder Questions & Answers | |
| | | Addenda | |

Refresh

No items found.

Back to my ECN Home Page

Requisition Number : 30000060790
Title : Ecn create room test
Set Standard Contract Type Welcome! CD Rep1

Log Off

General Functions  Pre-Bidding Functions  Bidding Period Functions  Post-Bidding Functions

Select a Standard Contract Type

You have previously selected (Construction Repair) as the Standard Contract Type. If you would like to modify it, select the new schedule type from the dropdown below.

What Standard Schedule do you intend to use for the subject Requisition?

| Building Lease |
| Concession Agreement |
| Construction Management |
| Construction Repair |
| Construction Repair JV |

[select]

[BACK]

| Requisition No. | Contract Title | Contracting Representative | Proponent Organization Code | Proponent Representative | Contract Signatory | Creation Date | Contractor |
|---|---|---|---|---|---|---|---|
| 3000060790 | Widget Purchase | John Smith | 77358 | Joe Smith | Fred Smith | 06-15-05 | Widget Corp. |

Contract Room Profile Search Results

Requisition Number : 3000060790 *253* Welcome! CD Rep1
Title : Ecn create room test
Contracting Entity Participants Back to my ECN Home Page     Back to Contract Room Main Page     Log Off
General Functions     Pre-Bidding Functions     Bidding Period Functions     Post-Bidding Functions

Contracting Entity Participants

| Role | Assignee | Location | Phone | |
|---|---|---|---|---|
| CD Rep | CD Rep1 / CD Rep2 | | | [Modify] |
| CD Supervisor | CD Supervisor | | *255* | [Modify] |
| CD Administrator | CD Admin. | | | [Modify] |
| CD Manager | CD Manager | | | [Modify] |
| Proponent Rep | Proponent assgined Rep1 | | | [Modify] |
| Proponent Rep Supervisor | Proponent Supervisor | | | [Modify] |
| Proponent Estimator | Proponent Estimator | | | [Modify] |
| Work Proponent Rep | Proponent Work user | | | [Modify] |
| Lawyer | Lawyer1 | | | [Modify] |
| CRCCD Rep | CRCCD Rep1 | | | [Modify] |
| Contract Signatory | Proponent Signatory | | | [Modify] |
| Company Estimator | CD Estimator | | | [Modify] |
| TET Members | TET Member1 (other than Prop and / TET Member2 (other than Prop and / CET Member1 (other than Prop and / CET Member2 (other than Prop and | | | [Modify] |
| CET Members | Contractor (owner & Main Contact / Contractor (owner & unassigned R / Contractor Main Contact / Contractor Rep1 / Contractor Rep2 | | | [Modify] |

<< Back

Requisition Number : 3000060790 293
Title : Ecn create room test

Bid Slate

| No. | Vendor No. | Contractor Name | Warnings |
|---|---|---|---|
| 1 | 0010000095 | Khathlan, Mohammed Rashid Est. for | |
| 2 | 0010006282 | Test Company Ltd | |
| 3 | 0010000070 | Yousef Bin Ahmed Kanoo test | |
| 4 | 0900c95d8003ca7d | Mumbai Express | |

Justification

297
☐ Law approval required
☐ Contract Signatory approval required  303

[Save]

Bid Slate Checklist

| Checklist Name | Status | Submitted by Contract Rep On | Approved by Supervisor On |
|---|---|---|---|
| Bid Slate | Submitted | 11/28/04 | |

299 — Approvals

| | Name | Job Title | Action | Date & time | |
|---|---|---|---|---|---|
| Contract Representative | CD Rep1 | | [Approve] | | [Revoke] |
| Proponent Representative | Proponent assgined Rep1 | | [Approve] | | [Revoke] |
| Law | Lawyer1 | | [Approve] | | [Revoke] |
| Signatory | Proponent Signatory | | [Approve] | | [Revoke] |

[Request Signatory Approval]

Reviwers

| No. | Name | Job Title | Action | Date & Time |
|---|---|---|---|---|

No Items found.

[Back to Contract Room]  [Back to Contract Rep. Page]  [<<Back]

Contract Room→Bidders Status Summary Table

Requisition Number : 3000060790
Title : Ecn create room test

*315*

Bidders Status Summary Table

| Bidders Name | SOI Confidentiality Statement | SOI Letter | Included In Approved Bid Slate | IFP Confidentiality Agreement | IFP Letter | Financial Evaluation | Bid | Technical Evaluation | Commercial Evaluation | Withdrew/ Deactivated | Successful Bidder |
|---|---|---|---|---|---|---|---|---|---|---|---|
| Namastha | | | | | | | | | | | |
| Vikatan | | | | | | | | | | | |
| Mumbai Express | | | | | | | | | | | |
| Srinivasa & Co | | | | | | | | | | | |
| Ammar & Co | | | | | | | | | | | |
| google rao | | | | | | | | | | | |
| Good Morning | | | | | | | | | | | |
| Ravi Sundar | | | | | | | | | | | |
| Rathi | | | | | | | | | | | |
| quit | | | | | | | | | | | |
| Ahmad Al Jiyad | | | | | | | | | | | |
| North Park Company Ltd. | | | | | | | | | | | |
| Guru | | | | | | | | | | | |
| Test Company Ltd | | | | | | | | | | | |
| Riyadh & co ltd | | | | | | | | | | | |
| Sea Cargo | | | | | | | | | | | |
| Sevens & Co | | | | | | | | | | | |
| Khathian, Mohammed | | | | accepted | seen | | | | | | |
| Rashid Est. for Yousef Bin Ahmed Kanoo test | | | | | | | | | | withdrawn | |
| Raga | | | | | | | | | | | |

[ Back to Contract Room ]   [ Back to Contract Rep. Page ]   [ <<Back ]

Contract Room # 3000060790
Job X Meeting/Site Visit — 453

Job X Meeting

Date:  Time: 7:30

Location: ukyjhgj

[Important Instructions to Contracting and Contracting Proponent Reps] — 461

JEM Presentation Template(s): Select [Select] — 457

455

Job Explanation Meeting Attendance Sheet: [Save/Print Attendance Sheet] — 459

Upload Scanned Attendance Sheet — 463

File Name
No Job Explanation Meeting Attendance sheet available.

Job Explanation Meeting Recording(s): Upload Recording — 465

File Name    Size
No Job Explanation Recording available.

Please read the following instructions:
1. The file has to be in msv format.
2. To listen to the recording, click on the file name and download it. If it does not work, run the following plug-in for XXX media player XXX

Site Visit

Date: 10/30/04  Time: 8:00

Location: rgsdv

Site Visit Attendance Sheet: [Save/Print Attendance Sheet]

[Request Bidders to Provide Security Permit Information] — 473 / 475

Upload Scanned Attendance Sheet — 477

File Name
No Site Visit Attendance sheet available.

BACK

*FIG. 32.*

Welcomed CD Rep1

Requisition Number : 30000060790
Title : Ecn create room test
Bidder Q & A Manager

Back to my ECN Home Page    Back to Contract Room Main Page    Log Off
General Functions    Pre-Bidding Functions    Bidding Period Functions    Post-Bidding Functions

Pending Bidder Questions — _483_

| Serial Number | Q&A Title | Received Date | Required Review(s) | Review Status | Reviewed By |
|---|---|---|---|---|---|
| 3000060790-035 | Test 5 | 2/12/2005 17:04:36 | | | 🖉 _485_ |
| 3000060790-036 | RT TESTING | 2/21/2005 10:22:03 | | | |
| 3000060790-037 | test | 2/27/2005 10:33:22 | | | 🖉 |

Send to Functional Review    Ask a Question — _487_

BQA Ready to be Issued to Bidders — _489_

| Serial Number | Q&A Title | Received Date | Required Review (s) | Review Status | Reviewed By | Issue Type |
|---|---|---|---|---|---|---|
| 3000060790- CE | Dummy question Monday | 2/14/2005 11:05:13 | | | 🖉 _497_ | Select a response... _491_ |

Issue to Bidders — _493_

BQA Issued to Bidders — _495_

| Serial Number | Q&A Title | Question No. | Issue Type | Issued Date |
|---|---|---|---|---|
| 3000060790-027 | 1st dummy | 015 | PRIVATE | 11/25/04 12:18 PM |
| 3000060790-028 | 2nd dummy qa | 020 | PUBLIC | 11/27/04 10:53 AM |
| 3000060790-029 | 3rd dummy | 017 | PUBLIC | 11/25/04 12:18 PM |
| 3000060790-030 | my new fresh test dummy | 019 | PUBLIC 🖉 | 11/27/04 10:35 AM |
| 3000060790-031 | new fresh test taskmanager | | PRIVATE | 11/28/04 3:39 PM |
| 3000060790-032 | my bqa question | | PRIVATE 🖉 | 11/28/04 3:48 PM |
| 3000060790-035 | 16th February Question | 024 | PUBLIC | 2/16/05 10:29 AM |

<< Back

FIG. 33.

Contract Room # 3000060790
Bid Opening Request

523

Back to my ECN Home Page     Back to Contract Room Main Page     Log Off

General Functions    Pre-Bidding Functions    Bidding Period Functions    Post-Bidding Functions

Details — 525

Please Take Action on [Date]     Bid Closing Date: 11/6/04

Requisition No.: 3000060790    Title:

Procurement Method:

Related Requisitions:
    Requisition No.    [Add more Requisitions]
No requisition found.

Requested Actions — 527

- Forward Estimated Quantities
- Forward Technical Proposal
- Forward Commercial Proposal
  - ● Open Commercial Proposals as listed below
  - ● Open Commercial Proposals as listed and list the 10 lowest bidders for prequalifying (alternative method for Open Bid)

Expected Contract Action Amount is: ◯ $300,000 or less   ◯ Over $300,000

Estimated Hypothetical Quantities — 529

- ◯ Hypothetical Quantities approved
- ◯ Hypothetical Quantities not yet approved
- ◯ Hypothetical Quantities not required

Contract Rep. Remarks — 531

*FIG. 35A.*

| List of Bidders (from approved Bid Slate) | | | | | | | |
|---|---|---|---|---|---|---|---|
| No | Vendor No. | Contractor Name | Commercial Registration No. | Warning (s) | Financial Qualification | Open/Do not open | Remarks |
| 1 | 0010000095 | Test Company 1 | | | | Open Bid | |
| 2 | 0010000070 | Test Company 2 | | | | Open Bid | |
| 3 | 0900c95d8003cac0 | Test Company 3 | | | | Open Bid | |
| 4 | 0900c95d8003ca7d | Test Company 4 | | | | Open Bid | |
| 5 | 0010006282 | Test Company 5 | | | | Open Bid | |

533

Company Estimate
- ○ Not Required
- ○ Required
- ● Waived    Waiver option cannot be selected if there is no waiver uploaded in the waivers folder under non ecn documents.

535

Approvals

| Reviewer | Role | Date Received | Date Finished | Action | Comment(s) |
|---|---|---|---|---|---|

No workflow status were found.

537

BACK    SAVE    SUBMIT

Welcome! CD Rep1

Requisition Number : 3000060790 — *553*
Title : Ecn create room test
Commercial Clarification Questions Manager

Back to my ECN Home Page     Back to Contract Room Main Page     Log Off
General Functions     Pre-Bidding Functions     Bidding Period Functions     Post-Bidding Functions

[ Post new Commercial Clarification Question ]

Technical Clarification Questions

Listed below are all Technical Clarification Questions & Bidder Answers:
Draft Questions (not yet submitted to Contract Rep for Issuance) — *555*

| Bidder | CCQ Title | 🖉 | Date & Time |
|---|---|---|---|
| No items found. | | | |

Pending Question (awaiting Contract Rep action) — *557*

| Bidder | CCQ Title | 🖉 | Date & Time |
|---|---|---|---|
| Test Company 1 | author post | | 5/11/2005 09:45:19 |

Issued Questions — *559*

| Bidder | | CCQ No | CCQ Title | 🖉 | Date & Time |
|---|---|---|---|---|---|
| Test Company | 1 | 3000060790-CCQ-0116 | me poste 1 | | 5/9/2005 07:39:46 |
| Test Company | 2 | 3000060790-CCQ-0117 | me poste 1 | | 5/9/2005 07:49:17 |
| Test Company | 4 | 3000060790-CCQ-0118 | me poste 1 | | 5/9/2005 07:49:23 |
| Test Company | 2 | 3000060790-CCQ-0119 | test by cd only | | 5/9/2005 08:59:37 |
| Test Company | 4 | 3000060790-CCQ-0120 | test by cd only | | 5/9/2005 09:00:10 |
| Test Company | 1 | 3000060790-CCQ-0121 | please approve | | 5/9/2005 09:02:33 |
| Test Company | 4 | 3000060790-CCQ-0122 | please approve | | 5/9/2005 09:04:16 |
| Test Company | 1 | 3000060790-CCQ-0123 | New Question 5-16-05 | | 5/16/2005 14:31:07 |
| Test Company | 2 | 3000060790-CCQ-0124 | New Question 5-16-05 | | 5/16/2005 14:31:07 |
| Test Company | 4 | 3000060790-CCQ-0125 | New Question 5-16-05 | | 5/16/2005 14:31:08 |
| Test Company | 5 | 3000060790-CCQ-0126 | New Question 5-16-05 | | 5/16/2005 14:31:08 |
| Test Company | 1 | 3000060790-CCQ-0127 | my test post | | 5/9/2005 10:07:49 |

Answered Questions — *563*

| Bidder | CCQ No | CCQ Title | 🖉 | Date & Time |
|---|---|---|---|---|
| No items found. | | | | |

Rejected Questions — *561*

| Bidder | CCQ Title | 🖉 | Date & Time |
|---|---|---|---|
| No items found. | | | |

*FIG. 37.*

Welcome! CD Rep1

Requisition Number : 3000060790
Title : Ecn create room test
Final Processing

*573*

Back to my ECN Home Page     Back to Contract Room Main Page     Log Off

General Functions    Pre-Bidding Functions    Bidding Period Functions    Post-Bidding Functions

Contract Release (ME35K) — *575*
Contract No. refrencing the subject Requisition:     Cost Center:
Release Status:    Released by: mullaum    On: 10/12/2004

Upload Signed Contract — *577*
Assigned Contract No.: [ ] ☐ Modify
Upload Signed Contract : Upload    *585*
Name    Created By    *583*    Creation Date    Approval Status

*587*

Notification To Unsuccessful Bidders     ☐ Not Applicable — *579*
Select Successful Bidder(s): [ ]
Vendor No     Vendor Name    *589*
[ Create Notification to Unsuccessful Bidders ]

DZIT     ☐ Not Applicable — *581*
Download DZIT Form — *593*
Upload DZIT Form : Upload
*591*    Name

Final Processing Checklist — *583*
Checklist Name    Status    Submitted by Contract Rep On    Approved by Supervisor On
Final Processing    Not Created Save    *595*
*597*    [ Request Supervisor Final Processing Approval ]

*FIG. 38.*

| Bulletin Boards | General Functions | Statistics | Contractor Profiles |
|---|---|---|---|

Long Form Contract
Short Form Contract - Bidding
Short Form Contract - Prequal
Announcements

| Room | Title | CD Rep | Proponent Rep | Creation Date | Procurement Status |
|---|---|---|---|---|---|
| 000300001200 | Create room test | CD Rep 1 | Proponent Assigned Rep1 | 5/30/2009 11:01:25 | Status |
| 002100001200 | Create room test | CD Rep 1 | | 5/30/2009 01:01:29 | Status |
| 000002201200 | Sample Site | CD Rep 2 | Proponent Assigned Rep1 | 5/30/2009 01:31:25 | Status |
| 000000001200 | Car Rental | Hinn, Abe | | 5/30/2009 12:01:25 | Status |
| 000011001200 | Sample Site | Smith, Andy | | 5/30/2009 08:01:25 | Status |

FIG. 40A.

| Bulletin Boards | General Functions | Statistics | Contractor Profiles |
|---|---|---|---|

603 → (callout to Contractor Profiles tab)
605 → (callout to Search button)

Search

Active Contract Rooms

| Contract Room | Title | CD Rep | Proponent Rep: | Creation Date | Procurement Status |
|---|---|---|---|---|---|
| 000300001200 | Create room test | CD Rep 1 | Proponent Assigned Rep1 | 5/30/2009 11:01:25 | Status |
| 002100001200 | Create room test | CD Rep 1 | | 5/30/2009 01:01:29 | Status |
| 000002201200 | Sample Site | CD Rep 2 | Proponent Assigned Rep1 | 5/30/2009 01:31:25 | Status |
| 000000001200 | Car Rental | Hinn, Abe | | 5/30/2009 12:01:25 | Status |
| 000011001200 | Sample Site | Smith, Andy | | 5/30/2009 08:01:25 | Status |

FIG. 40D.

**Bulletin Board
Short Form Contracts** _653_

Request For Bidding

Post New Listing

Information for Contractors

The "Entity Name" hereby solicits prequalifications for the work described below. (Additional Requirements)

- Requisition No.:
- * Title:
- * Organization:
- * Location of Work:
- * Start Date:
- * Completion Date:
- * Display Date: Date
- * Bid Closing Date: Date

← _655_

Brief Description of Work:

← _657_

- * Job Explanation Meeting Date: Date
- * Job Explanation Time: 7:00
- * Job Explanation Location:

← _659_

In order to upload the Prequalification Questionnaire, please save the request first.

IF you have any questions, please contact the assigned Proponent Representative:

Please enter the user Id of the assigned representative: _663_
- * User Id: [Retrieve Info]
- Proponent Representative:
- Telephone No.:
- Fax No.:
- Email:

← _661_

[SAVE]  [PREVIEW]  [SUBMIT]

(You must save data entered/updated before you can preview these entered.)

Back to Bulletin Board Listing Page

*FIG. 46.*

Signed Contract Search

Contract Number
Requisition Number
Proponent Organization Code
Contract Title
Contractor Vendor Number
Contractor Name

Signed Contract Search Results

Contract Number   Requisition Number   Proponent Org Code   Contract Title   Contractor Vendor No.   Contractor Name

Registration Coordinator ECN Home Page

Welcome! CD Registration Coordinator2

Log Off — 791

Registration by Contracting Dept. — 790

| 785 | 786 | 787 | 789 | 783 |

Rollout Existing Contractors | New Registrations | Update Requests | Extension Requests | All 794 — Pending (8)    Recently Completed (0)    All (8)

Not yet Assigned

| Date Received | Days Pending | Vendor Name | Type | Status | Document Verification | |
|---|---|---|---|---|---|---|
| 5/3/2005 11:56:16 | 15 | ANOTHER FORIGN COMPANY | OK | Not Assigned | | Assign |
| 5/4/2005 15:58:29 | 14 | LOCAL COMPANY | IK | Not Assigned | Not Verified | Assign |
| 5/7/2005 07:15:40 | 11 | OUT OF COUNTRY COMP | OK | Not Assigned | | Assign |
| 5/7/2005 08:35:48 | 11 | OIL COMPANY LTD | OK | Not Assigned | | Assign |
| 5/18/2005 07:08:20 | 0 | FULL DETAILED COMPANY | IK | Not Assigned | Not Verified | Assign |
| 5/18/2005 09:15:30 | 0 | OUT OF COUNTRY CONTRACTOR | OK | Not Assigned | | Assign |

784

795 — Assigned & Pending Registration Coordinator Review

| Date Received | Days Pending | Vendor Name | Type | Status | Last Action By | Last Action Date | Assigned To | Document Verification | |
|---|---|---|---|---|---|---|---|---|---|
| 5/3/2005 10:03:50 | 15 | OK COMPANY | OK | Assigned | CD Registration Coordinator2 | 5/14/2005 07:44:09 | CD Registration Coordinator1 | | Assign |
| 5/7/2005 08:09:37 | 11 | NEW COMPANY TEST | IK | Assigned | CD Registration Coordinator2 | 5/14/2005 07:26:25 | CD Registration Coordinator1 | Verified | Assign |

797

Reviewed by Registration Coordinator & Pending Supervisor Approval

| Date Received | Days Pending | Vendor Name | Type | Status | Last Action By | Last Action Date | Assigned To | Document Verification |
|---|---|---|---|---|---|---|---|---|

799 — Recently Completed Requests (within the past 60 days)

| Date Received | Days Pending | Vendor Name | Type | Status | Last Action By | Last Action Date | Assigned To | Document Verification |
|---|---|---|---|---|---|---|---|---|

*FIG. 53.*

Registration Coordinator ECN Home Page

Welcome! CD Registration Coordinator2

|Log Off|

Back to My ECN Home Page

New Registration by Contracting Dept.

☐ Individual Registration ☑ In Country Organization with No CR ☑ All Registration by Contracting Dept.

Registration Request for Individuals

Not yet Submitted    Pending (8)    Recently Completed (0)    All (8)

| Date Received | Days Pending | Vendor Name | Type | Status | Assigned To | |
|---|---|---|---|---|---|---|
| 5/3/2005 11:56:16 | 15 | ANOTHER FORIGN COMPANY | OK | Assigned | CD Registration Coordinator 1 | Assign |
| 5/4/2005 15:58:29 | 14 | LOCAL COMPANY | IK | Assigned | CD Registration Coordinator 1 | Assign |

Pending Supervisor Approval

| Date Received | Days Pending | Vendor Name | Type Status | Assigned To |

Recently Completed Requests (within the past 60 days)

Registration Request for Organizations with no CR

Not yet Submitted    Pending (8)    Recently Completed (0)    All (8)

| Date Received | Days Pending | Vendor Name | Type | Status | Assigned To | |
|---|---|---|---|---|---|---|
| 5/7/2005 07:15:40 | 11 | OUT OF COUNTRY COMP | OK | Assigned | CD Registration Coordinator 1 | Assign |
| 5/7/2005 08:35:48 | 11 | OIL COMPANY LTD | OK | Assigned | CD Registration Coordinator 1 | Assign |

Pending Supervisor Approval

| Date Received | Days Pending | Vendor Name | Type Status | Assigned To |

Recently Completed Requests (within the past 60 days)

SYSTEM, PROGRAM PRODUCT, AND METHODS FOR MANAGING CONTRACT PROCUREMENT

RELATED APPLICATIONS

This application claims priority to and the benefit of U.S. Provisional Application No. 60/699,582, filed on Jul. 15, 2005, incorporated herein by reference in its entirety.

BACKGROUND OF THE INVENTION

1. Field of the Invention

The present invention relates in general to automated business transaction systems, in particular to contract management systems, and more specifically to a system, program product, and methods of facilitating contract procurement and contract management through an online contract procurement and management website.

2. Description of Related Art

Major corporations and other business entities require establishing various controls and business policies and procedures to preserve the integrity of the business process, the adherence to the entity's way of doing business, and the preservation of the entity's business image and reputation. This, in turn, results in a requirement for a great number of forms and other types of documentation, numerous checks and verifications, and supervision and monitoring of numerous participants, among others. While these requirements are important for the reasons mentioned, implementation of steps necessary to satisfy these various procedures and documentation requirements have resulted in bottlenecks and inefficiencies that collectively prolong and complicate the contract procurement process and distract the key participants, such as the entity's contracting specialist or representative and the contract proponent representative, from focusing on creative thinking and quality improvement. Some entities have reacted to this bottlenecking and stifling of creativity and quality improvement by reducing or relaxing instituted controls and documentation requirements.

In some situations, especially in smaller corporations or other small entities where there is a great deal of transparency and whose business transactions are both small in both value and frequency, such relaxation of controls and documentation may have succeeded with tolerable negative consequences. With major corporations or other large entities, however, where the value and number of contracting activities is much larger, the loosening of controls is much riskier and has resulted in extreme negative consequences. Thus, recognized by the applicants is the need for a system that satisfies such control and documentation requirements without complicating or significantly slowing down the contract procurement and management process or significantly distracting participants from creative thinking and quality improvement. That is, recognized is the need for a system that automates the various functions and transactions and with them, the various controls, forms, and documentation requirements.

Corporations and other business entities with frequent and large value contracting requirements must also continuously attempt to optimize competition in order to manage contracting and contract procurement costs. While in some situations, such contracting corporations or other business entities may partner with a limited number of contractors for various business needs, in many situations involving large corporations or other large entities with a wide variety of contracting requirements, there has remained a requirement or desire to continue to invite and evaluate new contractors as well as revalidate previously qualified contractors.

Relying on industry or trade ratings is not always adequate or even possible in some countries or trades. Searching the Internet or reviewing prospective contractors' websites has also proven inadequate to provide much of the specific details needed for a proper prequalification evaluation. As a result, corporations and other business entities, especially large corporations, must solicit prequalification documents from both current and prospective contractors, which, in turn, can cause considerable delays to the contract procurement process and can cause contractors to express frustration with this repetitive requirement. Thus, recognized is the need for a system that minimizes or eliminates continuous repetitive requests for contractor prequalification information, thereby minimizing delays to the contract procurement process.

Although the benefits of online information and document exchange are well known to business entities, small and large, it nevertheless still remains a globally pursued goal to reduce hardcopy documentation with electronic documentation. Hardcopy documents continue to exist on a large scale in contract procurement and management activities, despite the long usage of computers and various automation solutions. In one example, users were provided a structured electronic folder for contracts and encouraged to upload their documentation and save it in that folder, nevertheless, many of the users did not comply and continued with the hardcopy folder because each upload required them to do a "Save As" and to decide where the document should be saved. Given the large number of documents generated every day, the users felt they would be unable to readily manage such documents when in electronic form. This reluctance to electronically store documentation has resulted in delays in the contract procurement process caused by a lack of ready access of the hardcopy documentation by other contracting members who require such documentation. The contracting member holding the "hardcopy" would have to be individually contacted to fax or otherwise transmit the document. Thus, recognized is the need for a contract procurement and management system that provides a user-friendly automated document storage and retrieval methodology to thereby provide an incentive to reduce hardcopy documentation, and that provides ready access to the document by multiple authorized users.

Managers in corporations and other business entities with frequent and large value contracting requirements must also monitor/control the contract procurement and management process and be updated on the latest status and developments. Such managerial requirement typically entails managers having to frequently call for status meetings, request new status reports, or call other concerned individuals and ask for the latest information. Such control requirements has not only been found to be a significant source of distraction to management, concerned individuals, supervisors, administrators, middle managers, and other contracting entity participants, but has been found to be a significant source of contract procurement delays and frustration. Thus, recognized is the need for a contract procurement and management system that provides ready access to automated status reports organized by functional area and/or contract-under-procurement, to thereby provide management frequent status updates seamless to other contracting participants.

Contractor senior officers, e.g. owners, presidents, and/or general managers, also must, but do not, have the ability to easily monitor their assigned representatives' interactions with the contracting entity. As a result, such contractor management is unable to properly intervene when assigned representatives deviate from contractor policies or procedures. In one example, a contractor project manager authorized to represent the contractor company in a particular contract procurement project was terminated by the contractor company. Prior to leaving employment, the contractor project manager faxed a letter requesting that the contractor company withdrawal from bidding on the project. The withdrawal request was about to be accepted as it came from an authorized contractor representative, however, due to the importance of the project, the contractor CEO was contacted for verification. The surprised CEO confirmed his company's continued interest in the project. Many other similar examples also exist. Recognized, therefore, by the applicant is the need to also enable contractor management to instantly and easily monitor interactions between contractor employees and the contracting entity.

Corporations and other business entities often must suspend contractors from doing business with the entity, limit the contracts available to the contractor, e.g., certain types or maximum values, or require nonstandard monitoring, e.g., a preselected level of additional scrutiny at various preselected phases. Although such decisions are properly communicated to the applicable contracting entity participants and/or these individuals are given the ability and instructions to easily verify the status of each contractor at any point in the procurement process, it remains that frequently such contracting entity participants either forget such requirements exist, or, due to time constraints, make a conscious decision to ignore such requirements. If a contracting entity participant fails to perform such check, and a limitation or restriction exists, it is possible that contracting entity participant will violate such limitations. Thus, recognized by the applicant is also the need for a contract procurement and management system that provides automated warnings that notify contracting entity participants of contracting entity imposed limitations throughout functions involving contractor-related decisions.

SUMMARY OF THE INVENTION

In view of the foregoing, embodiments of the present invention advantageously provide a new, comprehensive, and user-friendly Internet based online contract procurement and contract management system, program product, and related methods that automate business functions and activities that occur during the procurement of contracts, as well as provides various knowledge management functions that support contract procurement. Embodiments of the present invention provide an electronic forum that links all concerned parties and individuals that are participating in contract procurement, including the various departments within the contracting organization as well as all potential contractors under consideration with allowance for multiple contractor member users within each potential contractor, advantageously providing selective information for the multiple users depending upon the classification and/or status of the user. Advantageously, embodiments the present invention provides online access by a plurality of current and prospective contractors to provide and maintain current contractor profile data, thus reducing a requirement for repetitively requesting such data, and correspondingly reducing delays in the contract procurement process.

Advantageously, embodiments of the present invention provide contracting entity management ready access to automated status reports that provide real-time updated contract procurement status, and provide contractor management an ability to instantly and easily monitor interactions between contractor employees and the contracting entity. Advantageously, embodiments of the present invention also provide contracting entity participants, in functions involving contractor-related decisions, automated warnings that notify such contracting entity participants of contracting entity imposed limitations and that do not require active selection by such contracting entity participants in order to view such warnings.

Embodiments of the present invention include a system to facilitate contract procurement and contract management through an online contract procurement and management website over a computer network. For example, a system can include at least one host computer hosting the online contract procurement and management website accessible to the computer network to define an electronic contracting network server. The electronic contracting network server can have a processor and memory coupled to the processor to store operating instructions therein. A database accessible to the processor of the electronic contracting network server can also be provided. The database can include a plurality of data records relating to contracts to define contract data records and a plurality of data records relating to contractor entities to define contractor data records.

The system can also include a plurality of electronic contracting entity member user computers each positioned remote from the electronic contracting network server and accessible to the computer network and having a processor, memory coupled to the processor to store operating instructions therein and to receive data records, a display in communication with the processor to display data records using an associated contracting entity member user web browser, and a user interface in communication with the processor, to provide each of a corresponding plurality of contracting entity member users (representatives) with online Internet-based access to the data records over the computer network to facilitate contract procurement.

The system can also include a plurality of potential contractor member user computers each positioned at a separate potential contractor site remote from the electronic contracting network server and accessible to the computer network and having a processor and memory coupled to the processor to store operating instructions therein and to receive data records, a display in communication with the processor to display data records using an associated potential contractor member user web browser stored in the memory, and a user interface in communication with the processor to provide each of a corresponding plurality of potential contractor member users with online Internet-based access to the contractor data records over the computer network to thereby view and edit contractor data and to provide access to the contract data records over the computer network to thereby view contract data to assess and bid for at least one pending contract.

The system can further include electronic contracting program product stored in the memory of the electronic contracting network server to facilitate contract procurement and contract management over the computer network through online potential contractor registration and online virtual contract room creation and management. The electronic contracting program product includes instructions that when executed by the electronic contracting network server and/or other network/networked computers cause such computers to perform various contract procurement and contract management functions, and which, for illustrative purposes, will be described according to the functional operations they perform.

Accordingly, according to an embodiment of the system, the electronic contracting program product can include a registrar positioned to access the contractor data records in the database, and positioned to provide a registration web page form to each of the plurality of potential contract member user web browsers to separately register and associate each of the plurality of potential contractors with the online contract procurement and management website.

A contractor profile former can be positioned to access the contractor data records and to display to each of the plurality of potential contractor member user web browsers an online contractor profile web page form having a plurality of entry fields adapted to receive user input data indicating potential contractor attributes for each respective one of the plurality of potential contractors to thereby assemble potential contractor prequalification data. A contractor profile searcher can be positioned to display to at least one contracting entity member user web browser a contractor profile search web page form having a plurality of entry fields adapted to receive user input data indicating desired contractor prequalification attributes for a preselected pending contract associated with a contract procurement transaction. The contractor profile searcher can also be positioned to access the contractor data records to display or cause to be displayed to the at least one contracting entity member user web browser a contractor profile search results web page including a table of registered contractors having attributes matching the entered contractor prequalification attributes, to thereby enhance potential contractor selection.

Various other functional elements can be included to form and develop virtual contract rooms. For example, a contract room former can be positioned to form a virtual contract room for the contract procurement transaction and is responsive to approval by the at least one contracting entity member user of the contract procurement transaction for the preselected pending contract, to thereby provide enhanced data procurement and dissemination. A lessons learned manager can be positioned to provide a link to historic lessons learned associated with the preselected pending contract and to provide a link to post lessons learned entered by the at least one contracting entity member user indicating experience gained from the contract procurement transaction and responsive to a contracting entity member user selected contract category. A data location selector can be positioned to receive documents uploaded by the at least one contracting entity member user, to access the contract data records to associate the uploaded documents with associated contract data, and to store the uploaded documents in a system-selected location in the database to thereby enhance document storage and retrieval.

Various other functions advantageously can include those to aid compliance with various timetables and contracting entity procedures. For example, an outstanding task alert manager can be positioned to periodically iteratively alert over redundant channels each of the plurality of potential contractors having an outstanding task of such outstanding task in response to a preselected time attribute, to thereby enhance deadline compliance. A warning manager can be positioned, responsive to at least one preassigned contracting entity-imposed contractor limitation, to link the at least one preassigned limitation to each of a plurality of web pages accessible by the at least one contracting entity member user and having at least one data field providing entry of a decision affecting a respective at least one of the plurality of potential contractors, to warn the at least one contracting entity member user of a contracting entity-imposed contractor limitation. Advantageously, such functionality can help prevent an inadvertent contracting entity policy deviation by the at least one contracting entity member user. Further, a procurement status provider can be positioned to display to the at least one contracting entity member user web browser real-time generated and system summarized statistical data of the contract procurement transaction to thereby enable enhanced monitoring of the contract procurement transaction.

According to another embodiment of the present invention, a system can include at least one computer accessible to the computer network to define an electronic contracting network server having a processor and memory coupled to the processor to store operating instructions therein. A plurality of electronic contracting entity member user computers each can be positioned remote from the electronic contracting network server, accessible to the computer network, and can have a processor, memory coupled to the processor to store operating instructions therein and to receive data records, a display in communication with the processor to display data records using an associated contracting entity member user web browser, and a user interface in communication with the processor, to provide each of a corresponding plurality of contracting entity member users with access over the computer network to the electronic contracting network server to thereby facilitate contract procurement. A plurality of potential contractor member user computers can also each be positioned at a separate potential contractor site remote from the electronic contracting network server, accessible to the computer network, and can have a processor and memory coupled to the processor to store operating instructions therein and to receive data records, a display in communication with the processor to display data records using an associated potential contractor member user web browser stored in the memory, and a user interface in communication with the processor to provide each of a corresponding plurality of potential contractor member users with access over the computer network to the electronic contracting network server to thereby view and edit contractor data and to thereby assess and bid for a plurality of pending contracts.

The system can also include electronic contracting program product stored in the memory of the electronic contracting network server to facilitate contract procurement and contract management over the computer network through online contractor registration and online virtual contract room creation and management. The electronic contracting program product can include instructions that when executed by the electronic contracting network server perform the operation of forming a virtual contract room to provide enhanced contractor data procurement and contract procurement transaction data dissemination for a preselected pending contract associated with a contract procurement transaction responsive to approval by at least one of the plurality of contracting entity member users of the contract procurement transaction.

Embodiments of the present invention also include methods of facilitating contract procurement and contract management through an online contract procurement and management website over a computer network between a contracting entity and a plurality of potential contractors. A method according to an embodiment of the present invention can include presenting a contractor registration form to an unregistered contractor member user web browser over the computer network, registering a potential contractor responsive to receipt of the contractor registration form, and presenting an online contractor profile form to each registered contractor member user web browser over the computer network to receive contractor prequalification data from a corresponding first plurality of registered contractors to thereby reduce repetitive requests for contractor prequalification data and to thereby reduce associated processing delays for each respective one of a plurality of procurement contracts. The contractor profile form can include a company registration data field, a company free-form data field to allow contractor personalized input, a company experience list data field, a company human resource data field, a company equipment data field, a company certificate data field, a company distribution data field, and a company affiliation data field.

The method can also include analyzing the prequalification data collected with the online contractor profile form against at least one attribute of the each of the plurality of procurement transactions to separately determine contractor eligibility of each of the first plurality of registered contractors for each respective one of the plurality of procurement transactions, selecting a second plurality of registered contractors to bid on a first one of the plurality of procurement transactions, and selecting a third plurality of registered contractors to bid on a second one of the plurality of procurement transactions. The second plurality of registered contractors can include at least one registered contractor not included in the second plurality of registered contractors.

A method of facilitating contract procurement and contract management according to an embodiment of the present invention can include providing an online contractor profile form to each of a plurality of contractor member user web browsers over the computer network. The contractor profile form can include a plurality of separate data fields for entry of potential contractor prequalification data. The method can also include updating a contractor profile for each of the plurality of potential contractors responsive to data entered in the online contractor profile form, and providing an online contractor profile search web page form to a contracting entity member user web browser over the computer network. The online contractor profile search web page form can include a plurality of separate prequalification criteria fields to allow a contracting entity member user to search contractor profiles for registered contractors to thereby identify a plurality of contractors meeting preselected criterion. The prequalification criteria fields of the contractor profile search form can be selectable by the contracting entity member user as either mandatory or preferable to allow a contracting entity member user to indicate the importance of the particular field. The method can also include providing an online contractor profile search results web page listing to a contracting entity member user web browser over the computer network. The online contractor profile search results web page listing, responsive to the search criteria, can provide a listing of each of the plurality of registered contractors meeting substantially all criteria indicated as mandatory and can be ordered by number of preferable criteria met by each respective registered contractor.

A method of facilitating contract procurement and contract management according to an embodiment of the present invention can include forming a main contract room web page to define a virtual contract room generally in response to approval of a contract procurement transaction for a pending contract to provide multiple user access to manage a contract procurement transaction, to thereby provide enhanced data procurement and dissemination. The method can also include providing a respective personalized contract room Web page screen for the virtual contract room to each contracting entity member user web browser for a plurality of contracting entity member users and each contractor member user web browser for a plurality of contractor member users. Each personalized contract room web page screen provides access to a plurality of hyperlinks to the respective users pending tasks associated with the virtual contract filtered from those pending tasks of other respective users and provides access to a plurality of hyperlinks to recent communications associated with the virtual contract room. The method can also include providing a personalized home Web page to each contracting entity member user web browser for a plurality of contracting entity member users and each contractor member user web browser for a plurality of contractor member users. Each respective personalized home Web page can provide a consolidated list of pending tasks for the respective user and can provide a consolidated list of recent communications for a plurality of virtual contract rooms associated with the respective user.

A method of facilitating contract procurement and contract management according to an embodiment of the present invention can include forming a main contract room web page to define a virtual contract room, preferably in response to approval of a contract procurement transaction for a pending contract, to provide multiple user access to manage a contract procurement transaction to thereby provide enhanced data procurement and dissemination. The method can also include selecting a contract type from a plurality of contract type templates best approximating attributes of the contract procurement transaction to thereby define each of a plurality of preselected contract room functions. The method can further include providing a contracting entity participant's assignment web page in response to contracting entity member user input to allow assignment and modification of a list of a plurality of contracting entity participant users authorized to access the contract room. Advantageously, such web page can provide a unified location where the contracting entity member user can assign the contract room a plurality of contracting entity participants. The method can still further include assigning contract room access authorization to the plurality of contracting entity participant users also in response to contracting entity member user input to thereby perform the plurality of preselected contract room functions.

A method of facilitating contract procurement and contract management according to an embodiment of the present invention can include forming a database of contractor records including contractor prequalification data for a plurality of contractors, to thereby reduce repetitive requests for contractor prequalification data and reduce associated processing delays for each respective one of a plurality of procurement transactions. The method can also include performing a contractor prequalification criteria field search on the database to form a list of potential contractors having attributes compatible with a selected one of the plurality of procurement transaction to define a bidders list, and adding to the bidders list contractors listed in a general bid slate including a predetermined list of contractors pre-associated with a selected contract category, and/or contractors listed in a pre-approved bidders list associated with another one of the plurality of procurement transactions.

A method of facilitating contract procurement and contract management according to an embodiment of the present invention can include forming a main contract room web page to define a virtual contract room, in response to approval of a contract procurement transaction for a pending contract, to provide multiple user access to manage a contract procurement transaction, to thereby provide enhanced data procurement and dissemination. The method can also include subordinating the contract room to another contract room to form a master procurement contract room to thereby provide simultaneous contract room updating for a plurality of contract rooms, disabling a plurality of functions within the subordinated contract room in response to subordinating the contract room, and providing reference instructions to a user to access the master procurement contract room to perform the disabled functions on the subordinated contract.

A method of facilitating contract procurement and contract management according to an embodiment of the present invention can include forming a main contract room web page to define a virtual contract room to provide multiple user access to manage a contract procurement transaction for a pending contract, to thereby provide enhanced data procurement and dissemination. The method can also include providing a plurality of internal contracting entity checklists through a checklist menu web page having links to each of the plurality of internal contracting entity checklists, executing each of the plurality of internal contracting entity checklists by a contracting entity member user, and submitting each of the plurality of internal contracting entity checklists to a contracting entity member user supervisor by the contracting entity member user for online approval, to thereby enhance checklist processing efficiency.

A method of facilitating contract procurement and contract management according to an embodiment of the present invention can include forming a main contract room web page to define a virtual contract room, in response to a contract procurement transaction for a pending contract, to provide multiple user access to manage a contract procurement transaction, to thereby provide enhanced data procurement and dissemination. The method can also include providing online access to a solicitation of interest letter to each of the plurality of potential contractors to determine contractor interest in the procurement transaction for each of the plurality of potential contractors, and providing online access to an invitation for proposal to each of the plurality of potential contractors responsive to the indication of interest from each respective one of the plurality of contractors, to thereby invite each of the plurality of contractors providing such indication of interest to bid on the pending contract. Advantageously, the solicitation of interest letter can be provided online to enhance the processing of an indication of interest from each respective one of the plurality of contractors. Correspondingly, the invitation for proposal can be provided online to enhance procurement schedule timetable compliance.

A method of facilitating contract procurement and contract management according to an embodiment of the present invention can include providing online access to an invitation for proposal to each of the plurality of potential contractors to thereby invite each of the plurality of contractors to bid on a pending contract. The method can also include forming a bidding question responsive to review of the invitation for proposal by one of the plurality of potential contractors, receiving the bidding question over the network, assigning the received bidding question a unique serial number including identification of the originating contractor, number of questions previously asked, and indicia that the question is a bit in question, and processing the bidding question.

A method of facilitating contract procurement and contract management according to an embodiment of the present invention can include forming a main contract room web page to define a virtual contract room, responsive to approval of a contract procurement transaction for a pending contract, to provide multiple user access to manage a contract procurement transaction, and terminating online access to the contract room responsive to passage of a bid closing date and/or approval by a contracting entity member user supervisor, to thereby prevent initiating additional activities within the contract room. The method can also include providing multiple contracting entity users online access to a digital image of a signed contract associated with the contract procurement transaction responsive to final processing approval by the preselected contracting entity member user supervisor, and providing unsuccessful bid notification over the network to each unsuccessful one of the plurality of potential contractors responsive to final processing approval by the preselected contracting entity member user.

A method of facilitating contract procurement and contract management according to an embodiment of the present invention can include forming a database of contractor records including contractor prequalification data for each of a plurality of contractors to define a contractor profile for each respective contractor, and forming a plurality of bulletin board web pages defining a plurality of bulletin boards to provide enhanced data procurement and dissemination. The plurality of bulletin boards can include a long-form contracts bulletin board structured to request special prequalification contractor data not normally included in each respective contractor profile for a first pending contract having a value exceeding a first preselected value, a short-form contracts bulletin board structured to request prequalification data for a second pending contract having a value less than the first preselected value, and a short form contracts bulletin board structured to provide bidding data for a pro form a contract having a value less than a second preselected value, to provide a request for bids for the pro form a contract, and to provide instructions related thereto. The method can also include soliciting contractor interest from the plurality of potential contractors using the plurality of bulletin boards to prequalify the potential contractors for at least one of the first and second pending contracts and/or to bid for the pro form a contract.

A method of facilitating contract procurement and contract management according to an embodiment of the present invention can include identifying a lesson learned involving a specific new contract procurement transaction or administration of a specific contract defining a proposed lesson learned, categorizing the proposed lessons learned according to a selected attribute of the contract procurement transaction or contract administration, specifying the applicability of the proposed lessons learned, and providing the proposed lessons learned content describing an improved methodology of implementing the specific new contract procurement transaction or the administration of a specific contract, to thereby enhance contract procurement and contract management.

Embodiments of the present invention can also include computer readable medium that is readable by a computer to facilitate contract procurement and contract management over a computer network. For example, a computer readable medium can include a set of instructions that, when executed by the computer, cause the computer to perform the operation of forming a database of contractor records including a plurality of contractor prequalification data fields for a plurality of contractors to thereby reduce repetitive requests for contractor prequalification data and reduce associated processing delays for each respective one of a plurality of procurement transactions, and the operation of providing a contractor profile search web page form having a plurality of prequalification criteria entry fields adapted to receive contracting entity member user input data indicating desired contractor prequalification attributes for the preselected pending contract which can be indicated as mandatory or preferred. The instructions can also include those to perform the operations of receiving a completed contractor profile search web page form including user entered search criteria, and providing a contractor profile search results web page responsive to search criteria entered in the contractor profile search form. The contractor profile search results web page can include a table of registered contractors having attributes matching the entered contractor prequalification attributes to thereby enhance contracting entity member user selection of a potential contractor to perform the preselected pending contract.

The table can include a plurality of registered contractors having all attributes indicated as mandatory and ordered by registered contractor satisfying a preselected attribute preference for attributes indicated as preferred.

A computer readable medium, according to an embodiment of the present invention, can include a set of instructions that, when executed by the computer, cause the computer to perform the operation of assigning a separate main web page to each of a respective plurality of contract procurement transactions to provide multiple user access for requesting and receiving contract bids to define a corresponding plurality of virtual contract rooms. Each virtual contract room is typically managed by a respective at least one of a plurality of contracting entity member users and can include a toolbar to select a plurality of contract procurement functions, a pending tasks section providing access to a separate link to each currently pending task associated with the respective user and associated with the respective contract room filtered from pending tasks of other users, and a recent communications section providing access to a separate link to each of a plurality of inbound and outbound communications for the contract room.

A computer readable medium, according to an embodiment of the present invention, can include a set of instructions that, when executed by the computer, cause the computer to perform the operation of assigning a personalized contracting member user home web page to each of a plurality of contracting entity member users associated with a contracting entity to thereby provide consolidated contract room access and consolidated contract room task and communication review, and the operation of presenting each respective personalized contracting member user home page to each of the plurality of contracting entity member users to thereby provide centralized access to perform contract procurement functions for each of the plurality of contract rooms. Each personalized contracting member user home web page can include a toolbar having a plurality of user selectable contract procurement functions, an active contract room section providing a separate link to each of a plurality of contract rooms associated with the respective contracting entity member user, a pending tasks section providing a separate link to contracting entity member user pending tasks from each of the plurality of contract rooms associated with the respective contracting entity member user, and a recent communications section providing the respective contracting entity member user a separate link to inbound and outbound communications for each of the plurality of contract rooms associated with the respective contracting entity member user.

The instructions can also include those to perform the operation of assigning a personalized contractor member user home web page to each of a plurality of contractor member users associated with a separate one of a plurality of potential contractors to thereby provide consolidated contract room access and consolidated contract room task and communication review, and the operation of presenting each respective personalized contractor member user home page to each of the plurality of the plurality of contractor member users to thereby provide centralized access to perform contract procurement functions for at least one of the plurality of contract rooms associated with the respective potential contractor. Each personalized potential contractor member user home web page can include an active contract room section providing a separate link to the at least one of the plurality of contract rooms associated with the respective potential contractor, a pending tasks section providing a separate link to contractor member user pending tasks from the at least one of the plurality of contract rooms associated with the respective potential contractor, and a recent communications section providing a separate link to contractor member user inbound and outbound communications for the at least one of the plurality of contract rooms associated with the respective potential contractor.

A computer readable medium, according to an embodiment of the present invention, can include a set of instructions that, when executed by the computer, cause the computer to perform the operation of forming a main contract room web page to define a virtual contract room associated with a contract procurement transaction for a pending contract to provide multiple user access to manage a contract procurement transaction, to thereby provide enhanced data procurement and dissemination, and the operation of presenting a selection of contract types from a plurality of contract type templates best approximating attributes of the contract procurement transaction to thereby define each of a plurality of preselected contract room functions. The instructions can also include those to perform the operation of providing a contracting entity participant assignment web page in response to contracting entity member user input to allow assignment and modification of a list of a plurality of contracting entity participant users authorized to access the contract room, to thereby provide a unified location where the contracting entity member user can assign the contract room a plurality of contracting entity participants, and the operation of assigning contract room access authorization to the plurality of contracting entity participant users in response to contracting entity member user input, to thereby perform the plurality of preselected contract room functions.

A computer readable medium, according to an embodiment of the present invention, can include a set of instructions that, when executed by the computer, cause the computer to perform the operation of forming a database of contractor records including contractor prequalification data for a plurality of contractors, to thereby reduce repetitive requests for contractor prequalification data and reduce associated processing delays for each respective one of a plurality of procurement transactions. The instructions can also include those to perform the operations of performing a contractor prequalification criteria field search on the database to form a list of potential contractors having attributes compatible with a selected of one of the plurality of procurement transaction to define a bidders list, and adding to the bidders list contractors listed in a general bid slate including a predetermined list of contractors pre-associated with a selected contract category and/or contractors listed in a pre-approved bidders list associated with another one of the plurality of procurement transactions.

A computer readable medium, according to an embodiment of the present invention, can include a set of instructions that, when executed by the computer, cause the computer to perform the operation of forming a main contract room web page to define a virtual contract room associated with a contract procurement transaction for a pending contract to provide multiple user access to manage a contract procurement transaction to thereby provide enhanced data procurement and dissemination. The instructions can also include those to perform the operation of subordinating the contract room to another contract room to form a master procurement contract room to thereby provide simultaneous contract room updating for a plurality of contract rooms, and disabling a plurality of functions within the subordinated contract room in response to subordinating the contract room, and providing reference instructions to a user to access the master procurement contract room to perform the disabled functions on the subordinated contract.

A computer readable medium according to an embodiment of the present invention can include a set of instructions that, when executed by the computer, cause the computer to perform the operations of providing online access to a solicitation of interest letter to each of the plurality of potential contractors to determine contractor interest in the procurement transaction for each of the plurality of potential contractors, and providing online access to an invitation for proposal to each of the plurality of potential contractors, responsive to the indication of interest from each respective one of the plurality of contractors to thereby invite each of the plurality of contractors providing such indication of interest to bid on the pending contract. Advantageously, the solicitation of interest letter can be provided online to enhance the processing of an indication of interest from each respective one of the plurality of contractors, and the invitation for proposal can be provided online to enhance procurement schedule timetable compliance.

A computer readable medium, according to an embodiment of the present invention, can include a set of instructions that, when executed by the computer, cause the computer to perform the operations of receiving an online bidding question and attached related documents from at least one of the plurality of potential contractors defining a requesting bidder, assigning a unique serial number to the bidding question including indicia identifying the originating contractor, and disseminating an automated notice of receipt of the question to a contracting entity member user in response to receipt of the bidding question from the requesting bidder to thereby allow processing of a corresponding answer. The instructions can also include those to perform the operation of releasing the bidding question and the corresponding answer according to a selected contracting entity member user release methodology in response to approval of the bidding question and the corresponding answer by the contracting entity member user. The release methodology can include either a public release, a private release, or a reject release. The public release can provide each of the plurality of potential contractors access to the question and the corresponding answer without providing data identifying the requesting bidder. The private release can provide access to the question and the corresponding answer by the requesting bidder and not the other of the plurality of potential contractors. The reject release can provide notification to the requesting bidder that the question has been rejected and a corresponding explanation for the rejection.

A computer readable medium, according to an embodiment of the present invention, can include a set of instructions that, when executed by the computer, cause the computer to perform the operations of forming a database of contractor records including contractor prequalification data for each of a plurality of contractors to define a contractor profile for each respective contractor, and providing a personal web page for each of a plurality of contractor member users. The instructions can also include those to perform the operations of forming a plurality of bulletin board listing web pages defining a plurality of bulletin boards to provide enhanced data procurement and dissemination, and providing a link to each of the plurality of bulletin boards in each potential contractor personal web page to thereby request the special prequalification contractor data and/or bids. The plurality of bulletin boards can include a long-form contracts bulletin board structured to request special prequalification contractor data not normally included in the each respective contractor profile for a first pending contract having a value exceeding a first preselected value. The plurality of bulletin boards can also include a short-form contracts bulletin board structured to request prequalification data for a second pending contract having a value less than the first preselected value. The plurality of bulletin boards can further include a short form contracts bulletin board structured to provide bidding data for a pro form a contract having a value less than a second preselected value, a request for bids for the pro form a contract, and instructions related thereto, for relatively low value contracts.

A computer readable medium, according to an embodiment of the present invention, can include a set of instructions that, when executed by the computer, cause the computer to perform the operation of forming a virtual contract room to provide enhanced contractor data procurement and contract procurement transaction data dissemination for a preselected pending contract associated with a contract procurement transaction, responsive to approval by at least one of the plurality of contracting entity member users of the contract procurement transaction, and the operation of associating historic lessons learned with the virtual contract room for the preselected pending contract responsive to a contracting entity member user assigning a contract category to the preselected pending contract. The instructions can also include those to perform the operation of providing in the virtual contract room a first link to historic lessons learned associated with the selected contract type responsive to the selected contract type, providing in the virtual contract room a second link to historic lessons learned associated with other contract types, and providing in the virtual contract room a third link to a new lessons learned web page to associate with the selected contract type new lessons learned resulting from experience with the contract procurement transaction.

Embodiments of the present invention can also include a computer memory element containing a database. For example, according to an embodiment of the present invention, a computer memory element containing, stored in a signal bearing media, a database includes, in a computer readable format, data indicating tasks each associated with one of a plurality of virtual contract rooms and assigned to one of a plurality of contracting entity member users, data indicating communications each associated with one of the plurality of virtual contract rooms and associated with at least one of the plurality of contracting entity member users, data indicating contractor prequalification attributes for a plurality of potential contractors including a contractor-personalized description of the contractor, contractor experience, contractor human resources, contractor equipment, contractor asset distribution, and contractor affiliation, and/or data indicating contract procurement lessons learned each associated with at least one of the plurality of virtual contract rooms, at least one contract type attribute, and a lessons learned originator.

Advantageously, embodiments of the present invention provide a comprehensive contract procurement and management system that covers a wide array of activities that take place in contract procurement and management. Embodiments of the present invention provide a Web/Internet-based application of Documentum®, which can seamlessly integrate with SAP® software products, such as mySAP Business Suite, through various interface points, or can equally function independently without a need to integrate with SAP®. Thus, advantageously, embodiments of the present invention neither force a contracting entity to abandon SAP® nor require such entity to use SAP®. Further, advantageously, embodiments of the present invention can interface with other desired business transaction systems.

Embodiments of the present invention advantageously provide necessary tools to develop well-structured contractor profiles for each potential contractor that includes detailed information necessary or very useful for a contracting entity to make educated decisions about contractor capabilities, reflecting many years of experience in soliciting contractor prequalification information. Advantageously, such contractor profiles can be easily updated online at any time as status changes occur. Such contractor profiles advantageously eliminate the need for the contracting entity to repetitively request potential contractors to provide prequalification documents or at least minimize such requests to only obtain special information not typically provided within the potential contractor's prequalification information.

Embodiments of the present invention provide necessary tools to perform a detailed prequalification criteria search to identify which of the registered potential contractors meet such criteria. Advantageously, the contracting member user can be provided the choice to decide whether such criteria is mandatory or preferable, and can list those potential contractors who meet all mandatory criteria in the order of the number of preferable criteria each one of them meets.

Embodiments of the present invention incorporate a virtual contract room concept that groups all desired functions and transactions related to a particular contract procurement in one area and presents them in a very user-friendly manner. Advantageously, embodiments of the present invention incorporate contracting entity business policies and procedures related to contract management, such as those that set thresholds for specific types of approvals or other requirements, which can be easily modified as policies and procedures change. Embodiments of the present invention advantageously can alert contractors of required tasks by email, fax, and SMS (text) message, in order to account for the possibility of failures in email or fax transmissions. Embodiments of the present invention advantageously can also include follow-up features to automatically follow-up with users, including contractor representatives, on specific tasks until they are completed.

Advantageously, embodiments of the present invention provide automated document storage and retrieval that encourages the reduction in use of non-electronic (hardcopy) documentation and that provides ready access to multiple contracting member users. Further, advantageously, embodiments of the present invention include animated tutorials for the more complex functions posted in a conspicuous location in the same function. Still further, advantageously, embodiments of the system log the name of the contractor member user performing each transaction and the time and date, and thus can provide contract management with the ability to monitor all decisions and communications made on behalf of their company as well as decisions and communications issued by the contracting entity.

Embodiments of the present invention advantageously provide each contracting and contractor member user with a personalized home page that automatically presents the user with links to that user's current and past contracting activities, pending tasks, recent communications, based on each user's role authorizations. Advantageously, this functionality allows contracting entity management to monitor each contract procurement and management process and to be updated on the latest status developments. For example, contracting entity management can, through their personalized home page, be provided an informative status screen for each contract procurement action and the organization's hierarchy including sub-organizational structure having hyperlinks to a complete listing of respective contract procurement actions providing frequently asked information and including hyperlinks to a status screen for the respective procurement actions. The status screen can also advantageously include basic information about the contract procurement, weekly status comments entered by the contracting representative for the contract procurement actions, a Gantt or other chart of the contract procurement schedule, and statistical data summarizing developments in the contract procurement process.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 4A-D is a schematic diagram of an online registration web page form used to facilitate contract procurement and contract management over a computer network according to an embodiment of the present invention;

FIG. 4E is a schematic diagram of a final registration confirmation web page to facilitate contract procurement and contract management over a computer network according to an embodiment of the present invention;

FIG. 5 is a schematic diagram of a registration status web page to facilitate contract procurement and contract management over a computer network according to an embodiment of the present invention;

Figure 6C:
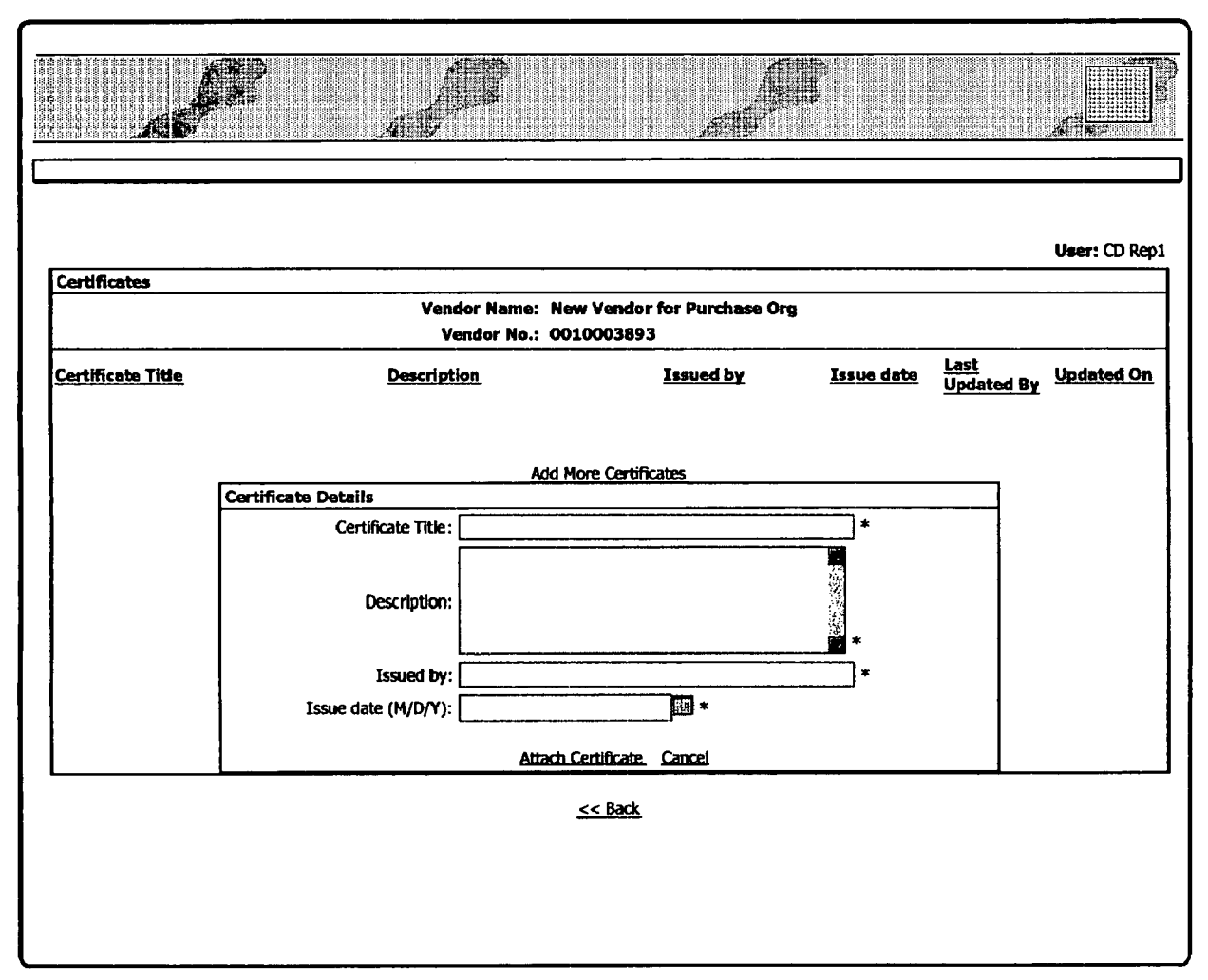
Figure 6G:
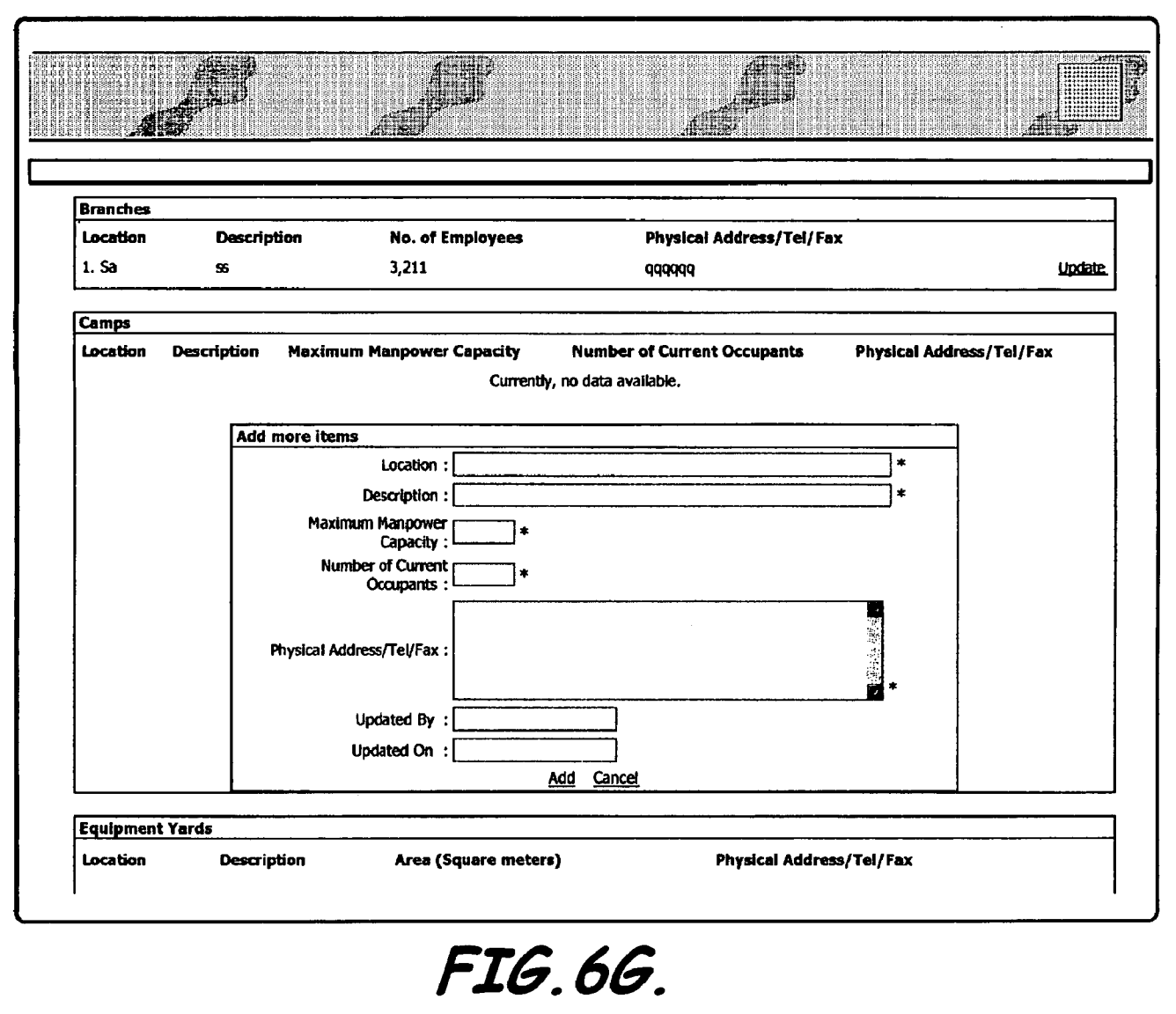
Figure 6H:
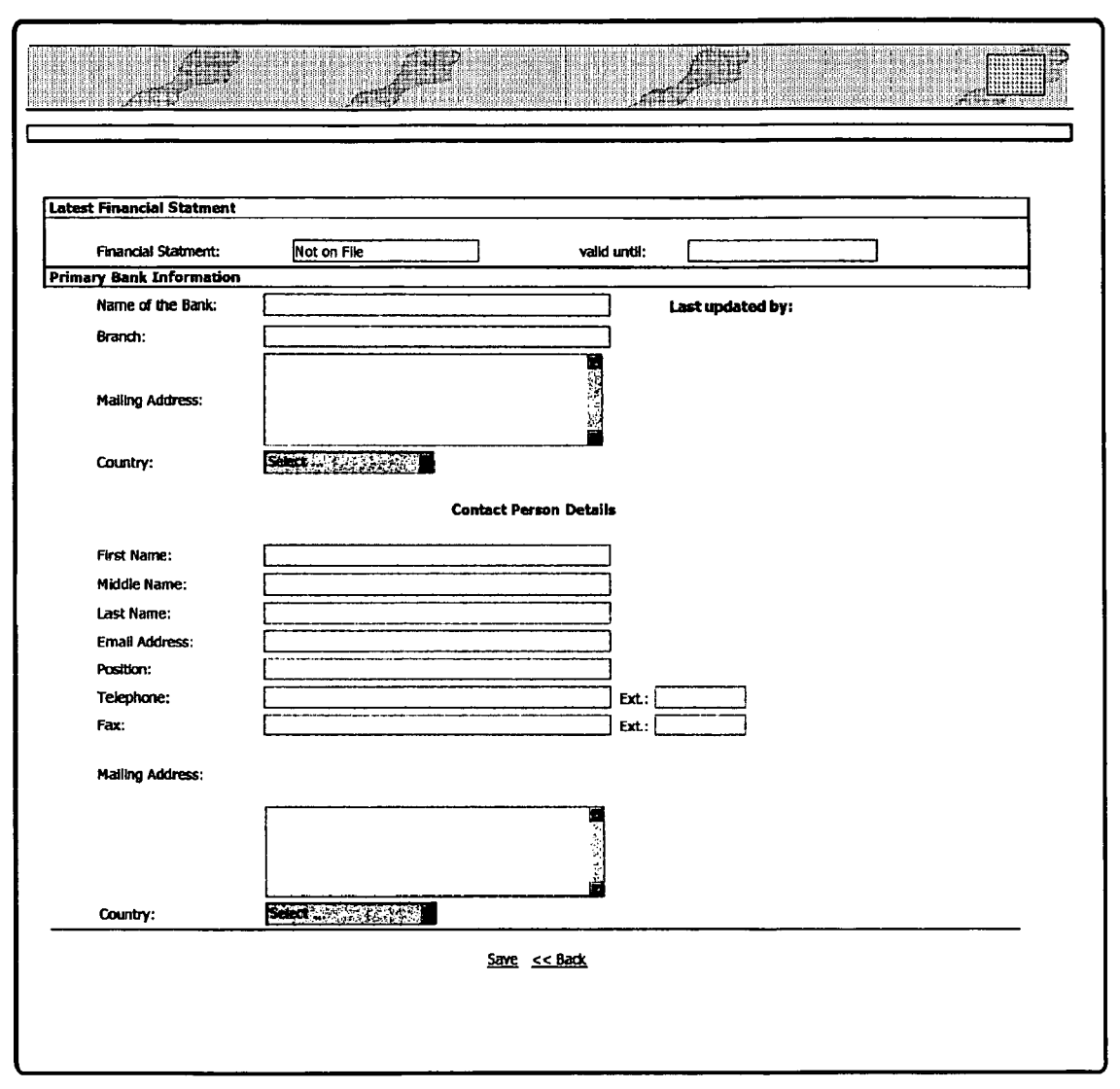

FIGS. 6A-L is a schematic diagram of an online contractor profile web page form used to facilitate contract procurement and contract management over a computer network according to an embodiment of the present invention;

FIGS. 8A-C is a schematic diagram of a contractor profile search web page used to facilitate contract procurement and contract management over a computer network according to an embodiment of the present invention;

FIG. 9 is a schematic diagram of a contractor profile search results web page used to facilitate contract procurement and contract management over a computer network according to an embodiment of the present invention;

FIGS. 10A-E is a schematic diagram of a virtual contract room main web page as viewed by a contracting entity member user used to facilitate contract procurement and contract management over a computer network according to an embodiment of the present invention;

FIGS. 10F-H is a schematic diagram of a virtual contract room main web page as viewed by a contractor member user used to facilitate contract procurement and contract management over a computer network according to an embodiment of the present invention;

FIG. 11 is a schematic diagram of a contract type assignment web page used to facilitate contract procurement and contract management over a computer network according to an embodiment of the present invention;

FIG. 16 is a schematic diagram of a contract room profile search results web page used to facilitate contract procurement and contract management over a computer network according to an embodiment of the present invention;

FIG. 17 is a schematic diagram of a contracting entity participants web page used to facilitate contract procurement and contract management over a computer network according to an embodiment of the present invention;

FIG. 18 is a schematic diagram of a procurement schedule web page used to facilitate contract procurement and contract management over a computer network according to an embodiment of the present invention;

FIG. 20 is a schematic diagram of a bid slate web page form used to facilitate contract procurement and contract management over a computer network according to an embodiment of the present invention;

FIG. 21 is a schematic diagram of a bidder status web page used to facilitate contract procurement and contract management over a computer network according to an embodiment of the present invention;

FIG. 26 is a schematic diagram of a solicitation interest web page used to facilitate contract procurement and contract management over a computer network according to an embodiment of the present invention;

FIG. 29 is a schematic diagram of a financial capabilities evaluation web page form used to facilitate contract procurement and contract management over a computer network according to an embodiment of the present invention;

FIG. 30 is a schematic diagram of a financial evaluation results web page used to facilitate contract procurement and contract management over a computer network according to an embodiment of the present invention;

FIG. 31 is a schematic diagram of an invitation for proposal web page used to facilitate contract procurement and contract management over a computer network according to an embodiment of the present invention;

FIG. 32 is a schematic diagram of a job explanation meeting/site visit web page used to facilitate contract procurement and contract management over a computer network according to an embodiment of the present invention;

FIG. 33 is a schematic diagram of a bidder question and answer web page used to facilitate contract procurement and contract management over a computer network according to an embodiment of the present invention;

FIGS. 35A-B is a schematic diagram of a bid opening request web page used to facilitate contract procurement and contract management over a computer network according to an embodiment of the present invention;

FIG. 37 is a schematic diagram of a commercial clarification questions web page used to facilitate contract procurement and contract management over a computer network according to an embodiment of the present invention;

FIG. 38 is a schematic diagram of a final processing web page used to facilitate contract procurement and contract management over a computer network according to an embodiment of the present invention;

FIGS. 40A-D is a schematic diagram of a contracting entity member home web page used to facilitate contract procurement and contract management over a computer network according to an embodiment of the present invention;

FIG. 46 is a schematic diagram of a short form contracts listing for bidding web page form used to facilitate contract procurement and contract management over a computer network according to an embodiment of the present invention;

FIG. 48 is a schematic diagram of a signed contracts search web page form used to facilitate contract procurement and contract management over a computer network according to an embodiment of the present invention;

FIG. 49 is a schematic diagram of a signed contracts search results web page used to facilitate contract procurement and contract management over a computer network according to an embodiment of the present invention;

FIG. 53 is a schematic diagram of a registration coordinator home web page used to facilitate contract procurement and contract management over a computer network according to an embodiment of the present invention;

FIG. 54 is a schematic diagram of a registration by contracting entity web page used to facilitate contract procurement and contract management over a computer network according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. The prime notation, if used, indicates similar elements in alternative embodiments.

Figure 1:
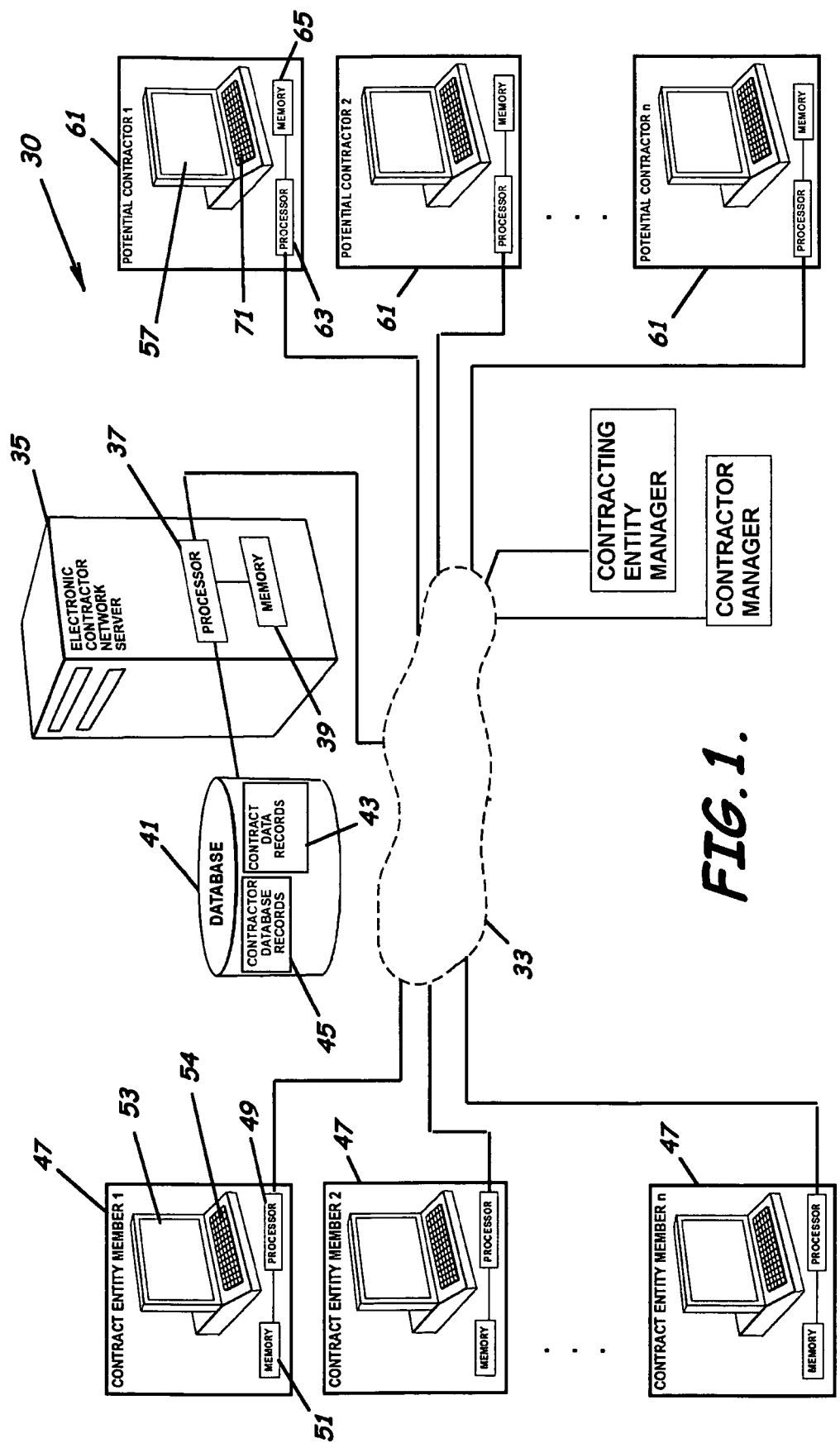
FIG. 1 is a schematic block diagram of a system to facilitate contract procurement and contract management over a computer network according to an embodiment of the present invention.
Figure 75:
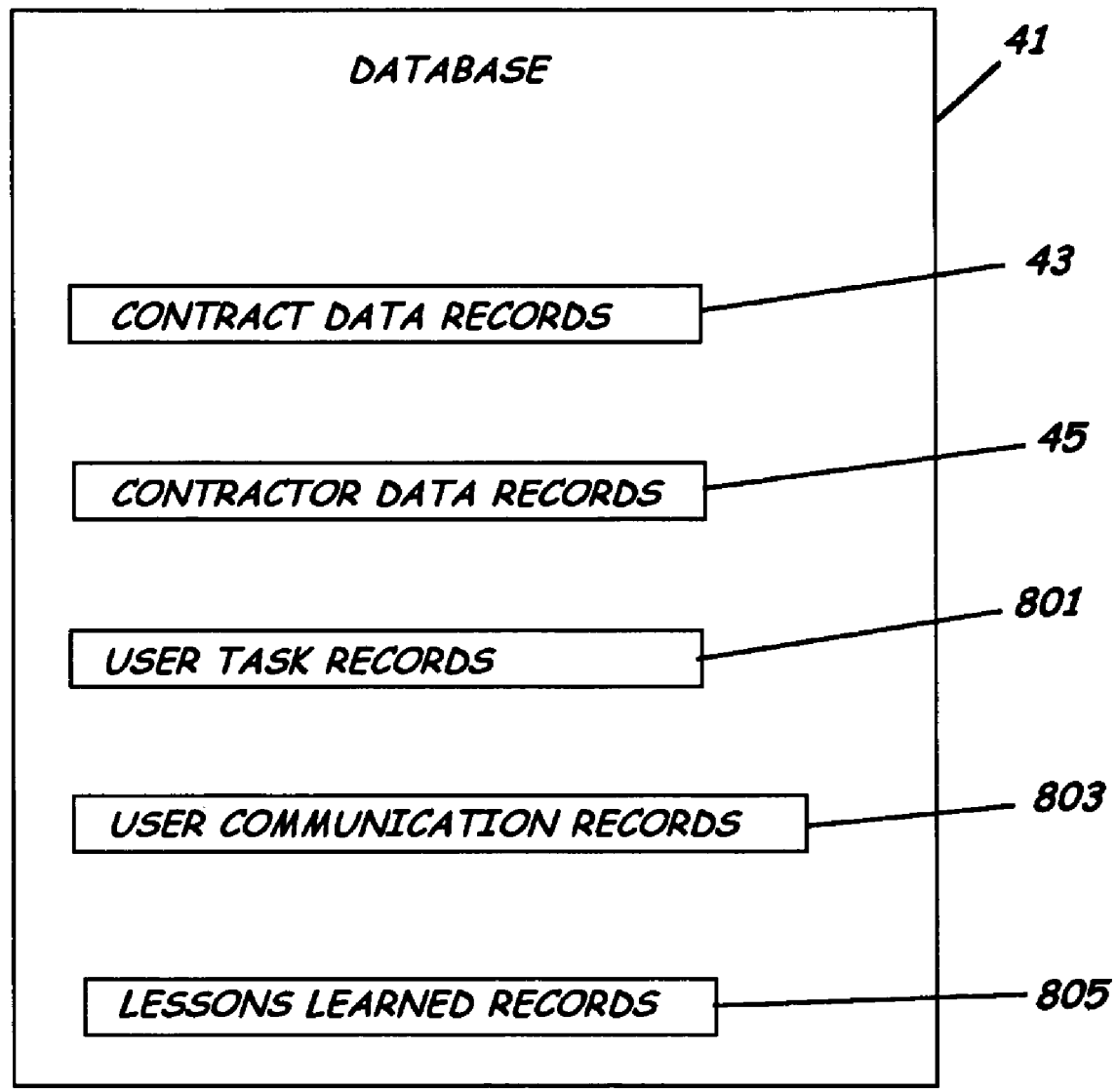
FIG. 75 is a block diagram of a database containing information related to contract procurement and contract management according to an embodiment of the present invention.

As illustrated in FIGS. 1-75, embodiments of the present invention advantageously provide a new, comprehensive, and user-friendly web/Internet-based system, program product, and methods that automate business functions and activities that occur during the procurement of contracts, as well as provide various knowledge management functions that support contract procurement. Embodiments of the system 30 can provide an electronic forum that links concerned parties and individuals that are participating in a contract procurement transaction or process, including the various departments within the contracting entity as well as all contractors under consideration with allowance for multiple users within each contractor. Advantageously, such system 30 facilitates contract procurement and contract management through an online contract procurement and management website.

For example, as perhaps best shown in FIG. 1, an embodiment of the system 30 to facilitate contract procurement and contract management can include a host computer hosting the online contract procurement and management website accessible to the computer network 33 to define an electronic contracting network server 35 having a processor 37 and memory 39 coupled to the processor 37. Note, the computer/server 35 represents a server or server cluster or server farm in the architecture and is not limited to any individual physical server. The server site may be deployed as a server farm or server cluster managed by a serving hosting provider. The number of servers and their architecture and configuration may be increased based on usage, demand and capacity requirements for the system 30.

A database 41 having a plurality of contract data records 43 relating to contracts and a plurality of contractor data records 45 relating to contractor entities is positioned accessible to the processor 37 of the electronic contracting network server 35. A plurality of electronic contracting entity member user computers 47, generally positioned remote from the electronic contracting network server 35 and accessible to the computer network 33. Each electronic contracting entity member user computer 47 has a processor 49, memory 51 coupled to the processor 49, a display 53 to display data records, e.g., data records 43, 45, using an associated contracting entity member user web browser, and a user interface 54 to provide a corresponding electronic contracting entity member user with online web-based access to such data over the computer network 33.

The system 30 can also include a plurality of potential contractor computers 61. Each such computer 61 has a processor 63, memory 65 coupled to the processor 63, a display 67 to display data using an associated potential contractor member user web browser, and a user interface 68 to provide an associated potential contract member user with online web/Internet-based access to the contractor data records 45, to thereby view and edit contractor data and to provide access to the contract data records 43, to thereby view contract data to bid for one or more pending contracts on behalf of an associated potential contractor. One or more such potential contractor computers 61 can be associated with a separate one of a plurality of potential contractors located remote from the electronic contracting network server 35 at a respective potential contractor site.

Figure 2:
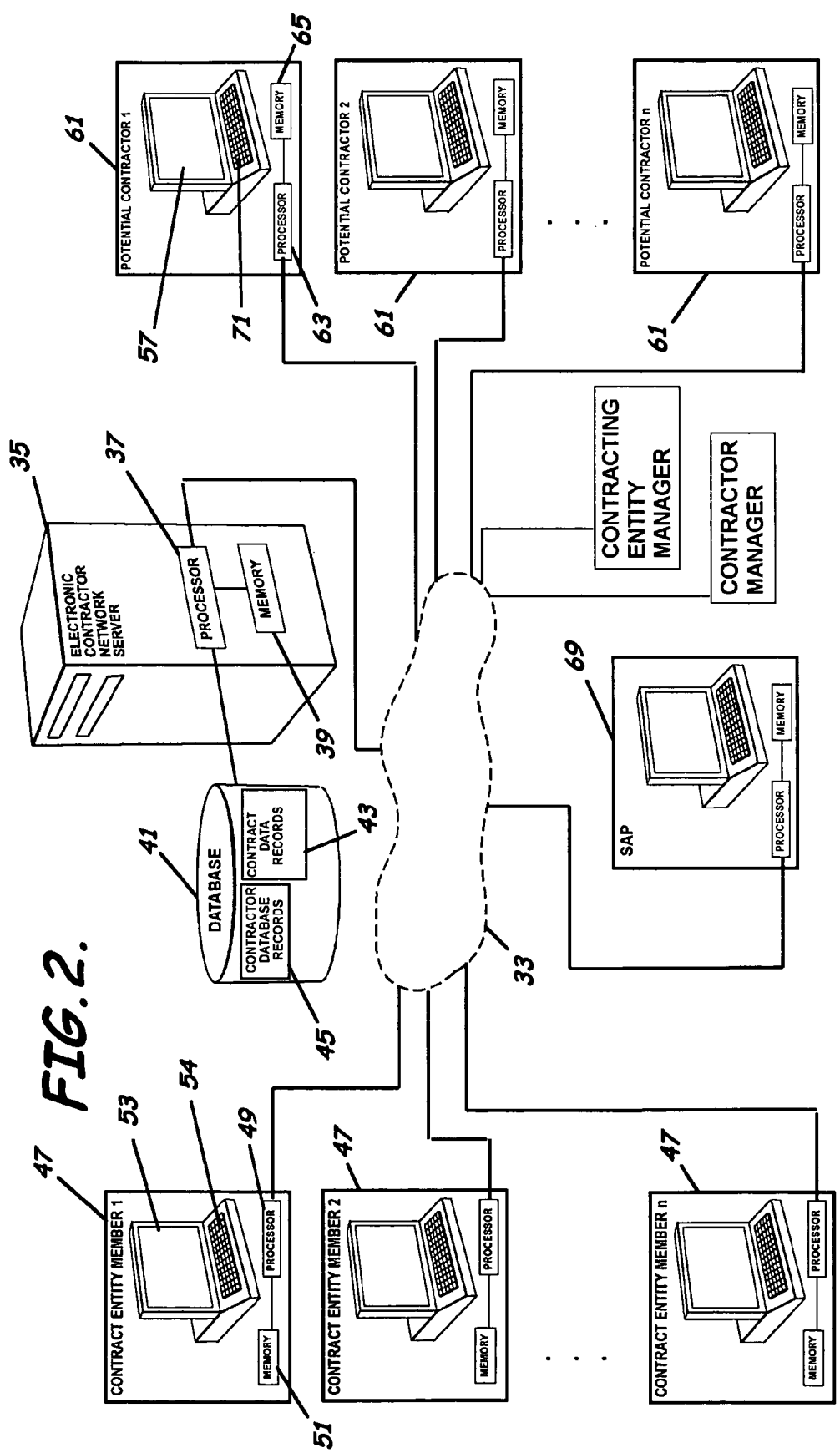
FIG. 2 is a schematic block diagram of a system to facilitate contract procurement and contract management over a computer network according to another embodiment of the present invention.

As perhaps best shown in FIG. 2, the system 30 can include a computer 69 including third party human resource and finance-logistics software such as, for example, SAPS® business software provided by the SAP Aktiengesellschaft Corp. and partners T-Systems®, Austria, which includes both a SAP Finance and Logistics Module and a SAP Human Resources Module. Interface with these modules will be described later.

Figure 3A:
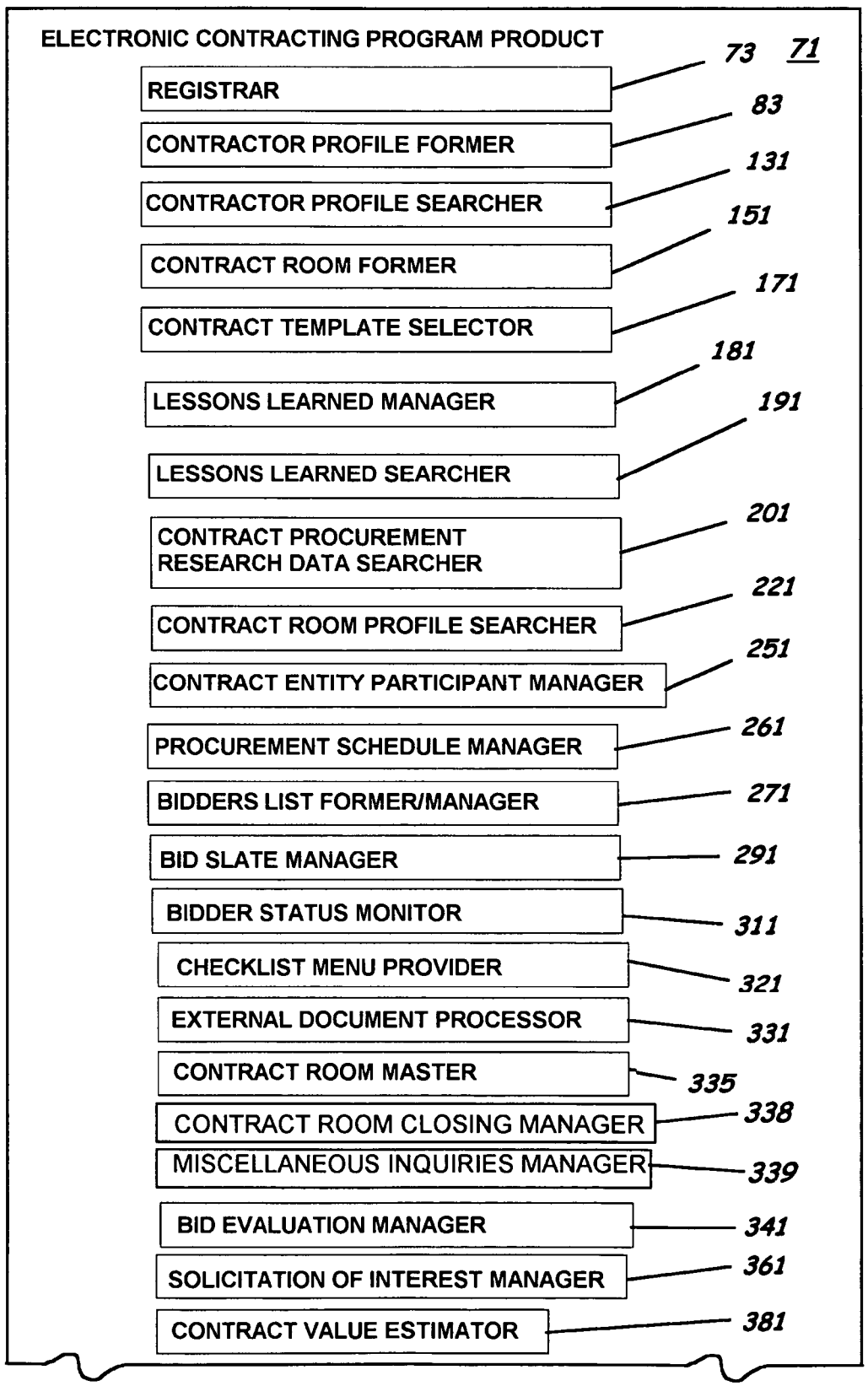
FIGS. 3A-C are a schematic block diagrams of major functions of an electronic contracting network program product to facilitate contract procurement and contract management over a computer network according to an embodiment of the present invention.
Figure 3B:
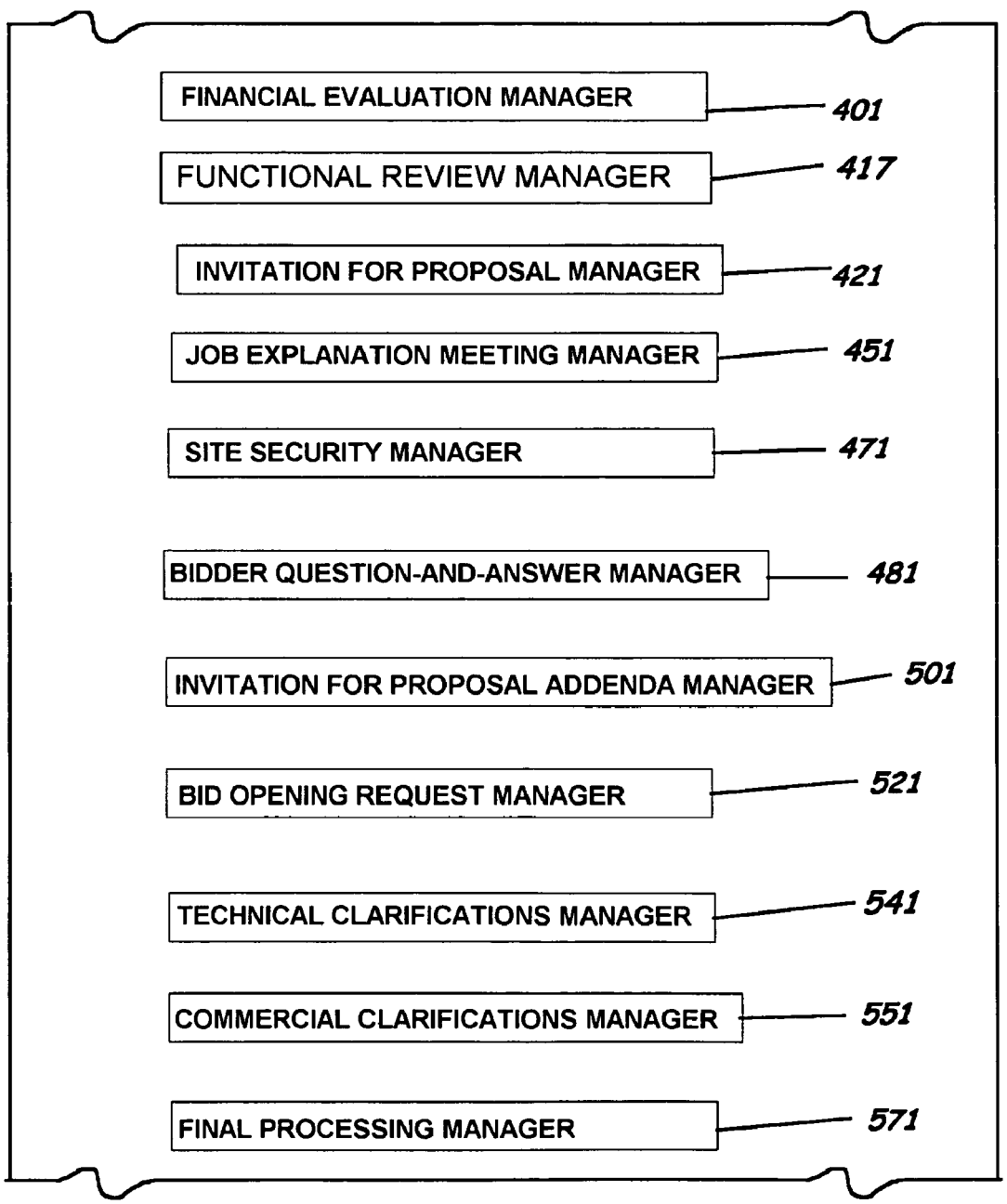
Figure 3C:
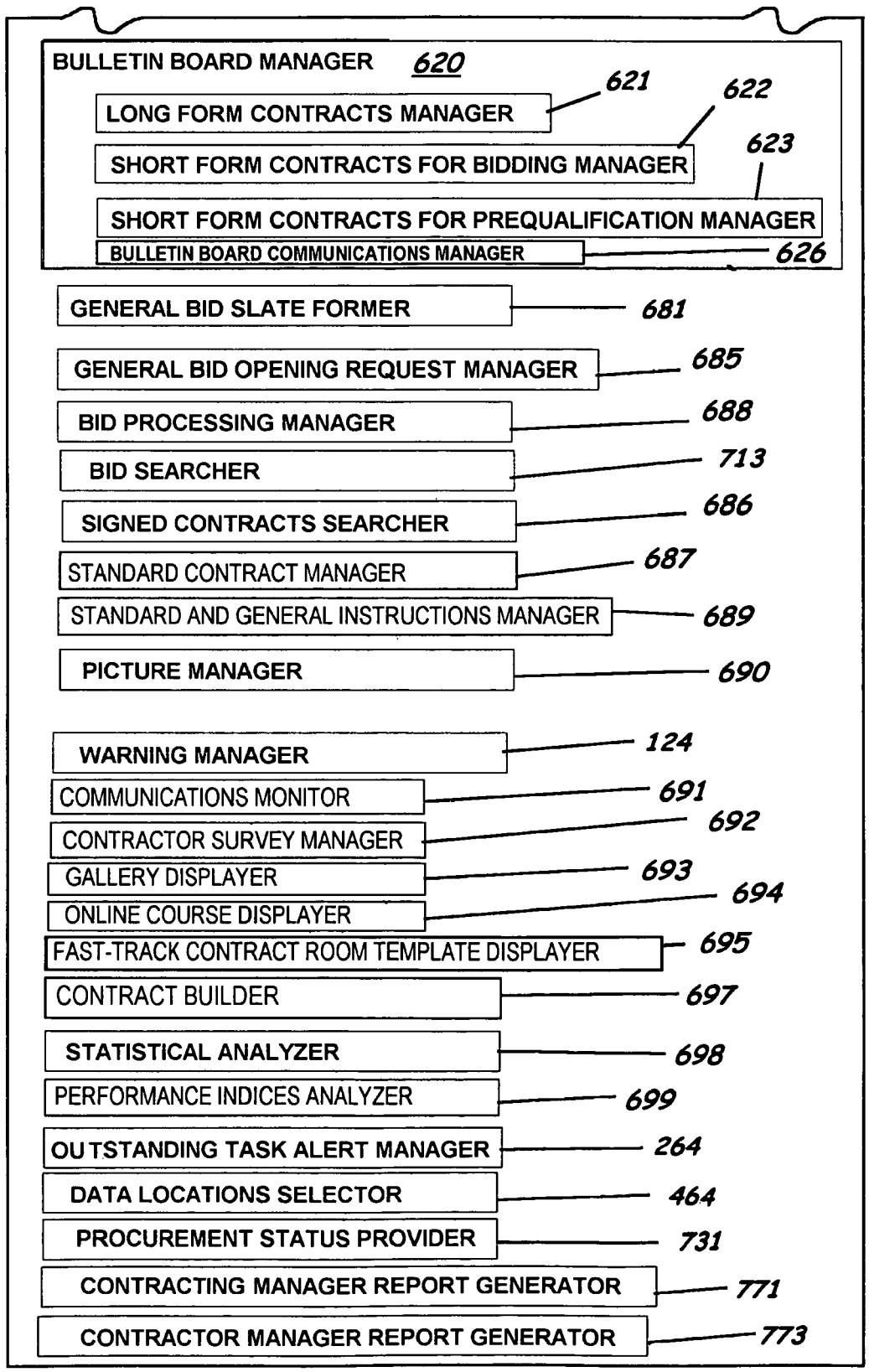

As shown in FIGS. 3A-C, the system 30 can also include an electronic contracting program product 71 stored in the memory 39 of the electronic contracting network server 35 to facilitate such contract procurement and contract management over the computer network 33 through online contractor registration and online virtual contract room creation and management. The electronic contracting program product 71 can be in the form of microcode, programs, routines, and symbolic languages that provide a specific set for sets of ordered operations that control the functioning of the hardware and direct its operation, as known and understood by those skilled in the art. The electronic contracting program product 71 includes instructions that when executed by the electronic contracting network server 35 and/or other network/networked computers cause such computers to perform various contract procurement and contract management functions, and which, for illustrative purposes, will be described according to the functional operations they perform.

For example, as shown in FIG. 3A, the electronic contracting program product 71 can include a registrar 73, which allows unregistered contractors to register online to access the contract data records and contractor data records in the database. The registrar 73 can provide the online registration web page form 75 (see FIGS. 4A-D) to each of a plurality of potential contract member user web browsers to register a plurality of potential contractors with the online contract procurement and management website. The online registration web page form 75, as with other web page forms, described later, can be embodied within a single web page or extend over a plurality of web pages, as illustrated. Note, unless stated otherwise the web pages described will generally be illustrated with respect to the view as presented to the contracting representative.

The online registration web page form 75 can include entry fields for general company information 77 (FIG. 4B), designated contacts 79 (FIG. 4C), authorized signatories 81 (FIG. 4D), and a listing of required documents (not shown), some of which are preferably downloadable by selecting a hyperlink within the listing, and which can be completed by the registering contractor and preferably scanned and uploaded as part of the registration process. As shown in FIG. 4B, the general company information section 77 can include various company/registering entity demographic data such as, for example, company name, country incorporation, origination date, address, communication data, e.g., telephone, fax, e-mail address, website address, and additional information such as, for example, the total number of employees, normal business days, and normal business hours.

Figure 4A:
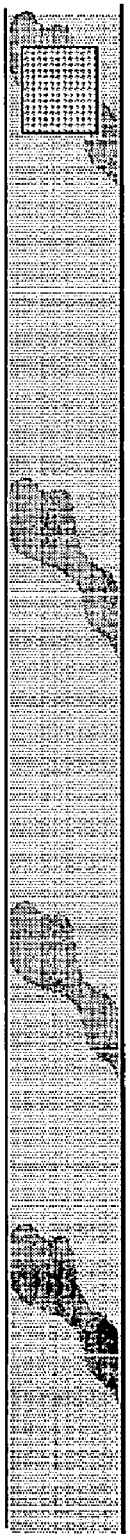
Figure 4C:
Figure 6A:
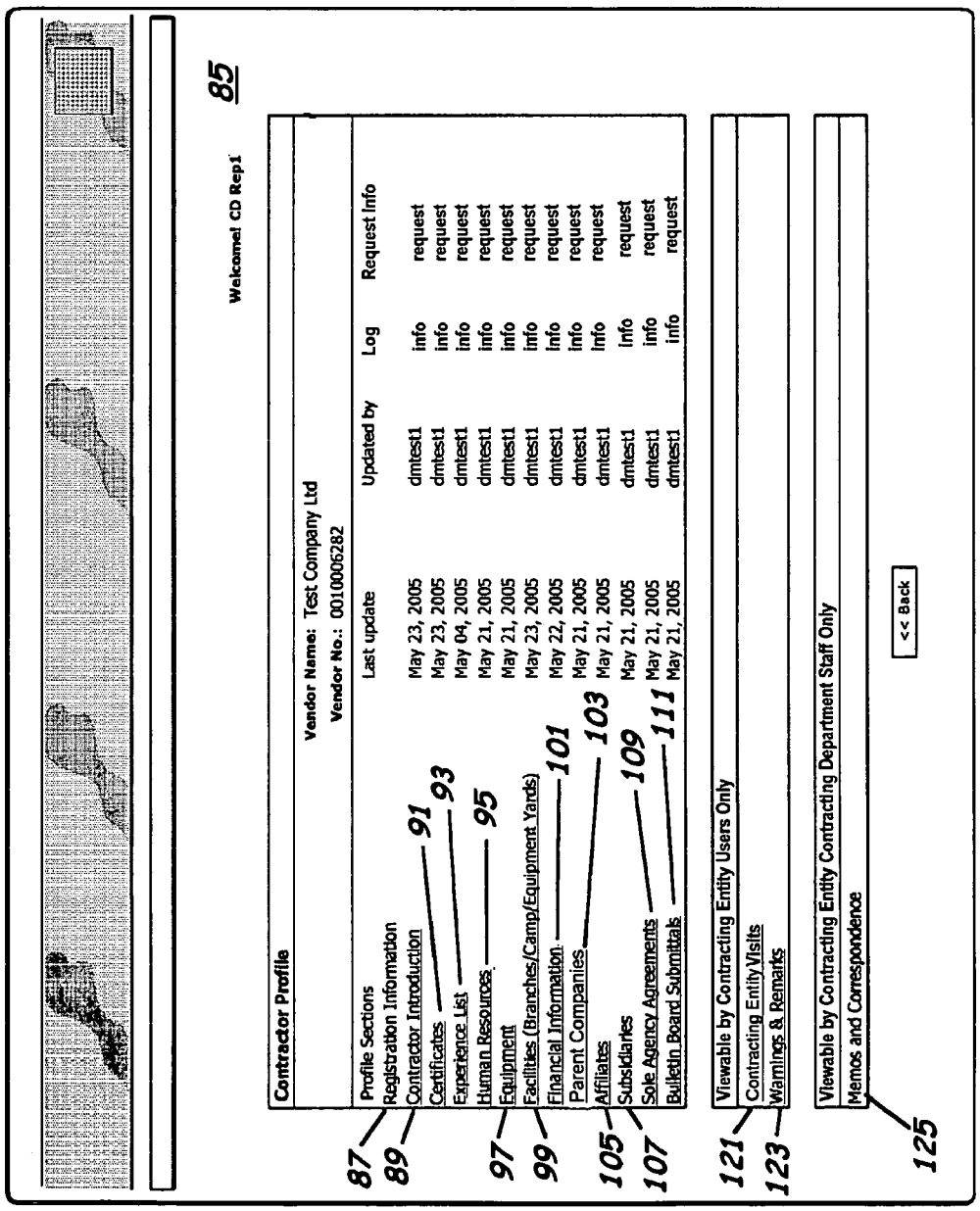
Figure 6B:
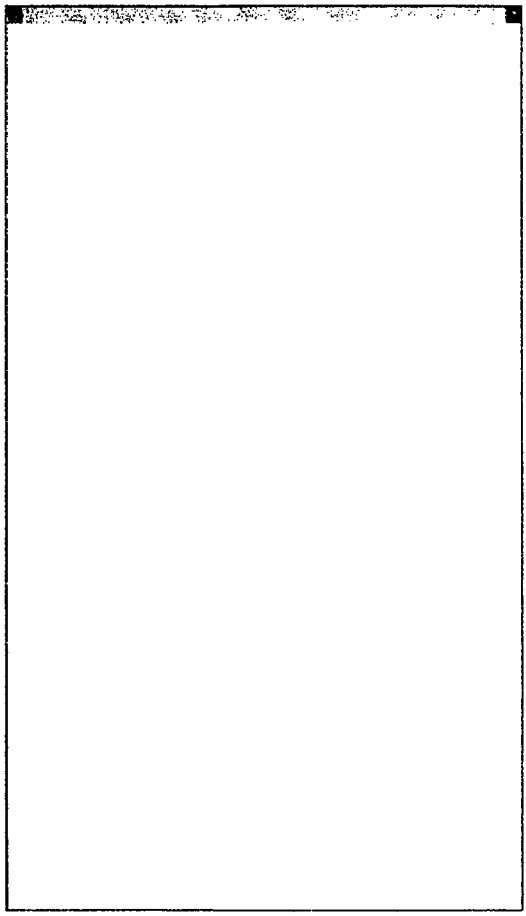
Figure 6L:

As shown in FIG. 4C, the designated contacts section 79 can include subfields for entering demographic and contact attributes for the senior officer, e.g. owner, chief executive officer (CEO), or other authorized officer, of the registering company, along with a designated main contact person and/or additional designated contacts. According to the preferred embodiment of the system 30, the contractor senior officer is provided authorization to update their company's contractor profile including registration information, assign a primary contact for any contract room, view all contract rooms applicable to the senior officer's company, and act as a primary contact for any specific contract room, if so assigned. The main contact can be authorized to perform the same functions as the owner. New contracting entity initiated inquiries can be addressed to the main contract preferably via email, fax, and SMS message, until the contractor designates a primary contact to handle such new inquiries. The contractor can assign the senior officer to also be the main contact. According to an embodiment of the system 30, the designated contacts are provided: authorization to update their respective company's contractor profile excluding registration information; authorization to act as a primary contact for any specific contract room whenever so selected by the senior officer or main contact; and authorization to view all contract rooms for which the respective contact is assigned as primary contact.

As shown in FIG. 4D, the authorized signatories section 81 can include provisions for providing the name, nationality, position, and contact information for at least one person authorized to sign contractual documents on behalf of the registering company. As perhaps best shown in FIG. 5, once completing the online registration web page form 75, the registering company can further review and/or update the registration information and can view the status of the pending registration request. Note, details of the actual registration process as viewed by both the contracting entity and the contractor will be described later.

As shown in FIG. 3A, the electronic contracting program product 71 can include a contractor profile former 83 which allows registered potential contractors to present prequalification-type information and to update such information online real-time. The contractor profile former 83 is positioned to access the contractor data records to provide an online contractor profile web page form 85 (see FIGS. 4A-D and 6A-L) for each registered company/entity to be viewed by designated contracting entity member users and the designated contacts associated with their respective registered or registering company (potential contractor). Note, the term company is used for illustrative purposes. The contractor entity can include sole proprietorships, partnerships, and other forms of entity known to those skilled in the art.

The online contractor profile web page form 85 can include a plurality of entry fields or sections adapted to receive user input data indicating potential contractor attributes to thereby assemble the potential contractor pre-qualification data. Such fields or sections, illustrated as hyperlinks (see FIG. 6A) to individual web pages/profile sections, can, for example, include the registration information 87, described above, a contractor introduction 89, certificates 91, an experience list 93, human resources 95, equipment 97, facilities 99, financial information 101, parent companies 103, affiliates 105, subsidiaries 107, sole agency agreements 109, and bulletin board submittals 111. According to the preferred configuration, the potential contractor can directly update each section, real-time, without routing the updates to the contracting entity for approval, except for the registration information section 87, which according to the described embodiment requires approval through an approval process, described later, to change or update such entries.

As stated, the registration information section (see FIGS. 4A-D) includes the information and documents the potential contractor provided during online registration. The contractor introduction section (see FIG. 6B) includes free space for the contractor to summarize main areas of expertise and latest developments. Additionally, the contractor can upload documents such as brochures or other documents which describe various capabilities of the contractor.

The certificates section (see FIG. 6C) allows the contractor to present and update their certificates of achievement, quality, endorsements, or other achievement documents by uploading a scanned copy of that certificate and completing certificate attribute information such as certificate title, description, issuer, and date of issue in specific related data fields. According to one configuration, the contractor attaches one certificate per listing, which the contractor can scan and upload. The name of the certificate in a listings table or an associated "view" button can act as a link to the certificate, itself.

The experience list section (see FIG. 6D) allows the contractor to list and update data relating to contracts the contractor has completed or are currently performing. The experience list section can include separate subsections 113, 115, for entering data related to contracts with the hosting contracting entity and for entering data related to contracts with other contracting entities, respectively. To ensure the accuracy of data displayed under the subsection 113, contracts with the hosting contracting entity, the system 30 can reference the database 41 and, if so equipped, can import from SAP data related to contracts the contractor has performed with the host contracting entity or is currently performing with the host contracting entity. Advantageously, this feature negates any need to wait for the contractor to provide data that the hosting contracting entity already has access too. This subsection can be further divided into two subcategories; long form contracts, i.e., contracts exceeding a certain value and time duration; and short form contracts, i.e., contract within a certain small value and short duration.

With respect to the subsection 115, contracts with other contracting entities, for each contract listing under that section, the contractor can be required to complete preselected fields that the host contracting entity determines to be necessary. The preselected fields can include the contracting entity name, contracts title, field of work, start and end dates, pricing method, type of scope, contractor role, value of work performed, percentage of work subcontracted, contract description, contracting entity contact name, positioned, telephone number, fax, and/or e-mail, and any desired documents. Advantageously, such features, including those described below, enable the host contracting entity to more efficiently evaluate such potential contractors. Similarly, the bulletin board submittals section 111 can display and allow update of generally non-standard information previously provided by the contractor.

The human resources section (see FIG. 6E) allows the contractor to present and update various human resource/manpower related data including the contractor's organization chart, resumes for key personnel, and a list of manpower categorized by manpower discipline. Each manpower listing preferably includes data fields such as, for example, number of personnel, average experience with company, average experience overall, and/or country of residence.

The equipment section (see FIG. 6F) allows the contractor to present and update a list of main equipment. Each listing preferably includes various data fields such as, for example, equipment type, quantity, average age, and main location of availability. Similarly, the facilities section (see FIG. 6G)

allows the contractor to present and update a list of company branches, camps, and equipment yards along with a description thereof by completing the preselected data fields for each listing.

The financial information section (see FIG. 6H) allows the contractor to present both public and private financial data including bank affiliations, which can also be used to determine the stability of the contractor and/or credit worthiness.

The parent companies section (see FIG. 6I), affiliates section (see FIG. 6J), and the subsidiaries section (not shown), allows the contractor to present and update data identifying and describing affiliated and related companies, which can be used to ascertain any potential conflicting interests and to provide a better view of the financial viability of the contractor. The sections each can also allow for uploading documents relative to each specific parent company, affiliate, or subsidiary, respectively.

The sole agency agreements section (not shown) allows the contractor to present information regarding services or products for which their company is a sole agent of the companies who are the manufacturers or owners of these products/services. For each entry, the contractor can upload a copy of a document that confirms this sole agency relationship. Such information regarding sole agency relationships and related documentation can be important to contracting entity members as justification where such contracting entity member wishes to contract with such agent contractor on a single source basis.

Advantageously, such prequalification data substantially eliminates the need for the contracting entity to repetitively request potential contractors to provide prequalification documents or minimize such requests generally to only special information not typically provided within such prequalification information. Also, advantageously, according to an embodiment of the present invention, for each of the above described sections, the system 30 can display at the top of the viewed web page as well as at the bottom of a details box for each listing, the name of the contractor designated contact who made an update and the date and time of such update. Also, next to each contractor profile section item in, e.g., the contractor profile web page form 85, the system 30 can display: date last updated, updated by "user," and a separate or combined link to a functional activity log that displays brief information relative to each modification instance. This can help ensure transparency and provide accountability within the contractor organization.

Further, according to an embodiment of the present invention, except for the registration information section 87, each contractor profile section can include a request for information link which allows contracting entity users to request additional information, entity specific or generic, relative to the specific section, from which the user can get more clarification. When a user initiates a request, the contractor's main contact, for example, can be sent a task relative to the request via e-mail, fax, and/or SMS message. The contracting entity user is then notified once the requested modification is completed by a contractor representative.

The online contractor profile web page form 85 (see FIG. 6A) can also include sections that are viewable by the designated contracting entity member users but not by designated contractor contacts. For example, the online contractor profile web page form 85 can include a contracting entity visits link 121 to a contracting entity visits section (see FIG. 6K) and a warnings and remarks link 123 to a warnings and remarks section (see FIG. 6L) viewable by designated contracting entity member users, but according to an embodiment of the system 30, not viewable by the respective contractor designated contacts. Further, the online contractor profile web page form 85 can include a memo and correspondence link 125 to a memo and correspondence section viewable only by designated contracting entity contract department member users.

The contracting entity visits section (see FIG. 6K) allows contracting entity staff to report the objectives and outcome of visits made to the respective contractor's facilities. Under this section, a contracting entity member user assigned primary responsibility for a pre-awarded contract (contracting entity representative) can list the names of the main contractor representatives who were present during the visit and the names of the contracting entity members who participated in the visit. The names of the contracting entity members can be easily inputted/retrieved by entering each contracting entity member's respective user id. The system 30 correspondingly retrieves and displays their respective full names and job titles. The contracting entity representative can also enter data about the visit including its date, objectives, findings, and can upload attachments, if needed. The entry of this data can be initiated by the contracting entity representative selecting a "report the visit" input field (not shown), followed by entry of the data, described above. The contracting entity visit report can invoke an online workflow for collecting online signatures from concerned contracting entity member participants before allowing this report to be uploaded for viewing by other contracting entity member users in the respective contractor's profile with other contractor profile data, such as, for example, that shown in FIG. 6A.

The warnings and remarks section (see FIG. 6L) allows the contracting entity staff to highlight to other contracting entity member users any special positive or negative remarks or warnings about the respective contractor. The warnings and remarks section can be linked automatically to other web pages/forms supported by the systems 30 that the contracting entity members uses, such as, for example, the various SAP Modules, to import recent contractor performance reports from such systems and highlight them in this section, as appropriate. This automated warning can include warnings such as: recent poor performance, e.g., if the contractor was assigned a below average performance on a contract with the contracting entity within say the past two years; conflict of interest, e.g., if the contractor is fully or partly owned by an individual who is also an employee of the contracting entity; blocked contractor, e.g., if the contractor is blocked by the contracting entity; noncompliance with regulatory rules; cautionary remarks; and/or special remarks, such as, for example, instructions by the contracting entity management to restrict a certain contractor to certain types of contracts or locations due to reasons such as limitations in contractor capacity or recent experiences with that contractor.

Advantageously, this warnings and remarks section also can allow the contracting entity staff to manually enter other remarks or to adjust the above-described remarks, to meet the needs of the individual contracting entity. Further, advantageously, the remarks and warnings can be linked to other system web pages/forms so that they are automatically highlighted and brought to a contracting entity member users' attention without the need for a contracting entity member user to search for such information in order to ensure that important information about a prospective contractor is flagged and taken into consideration before making any related decision.

The warnings, provided by a warning (alert) manager 124, can be automatically displayed in, for example, the following functions within each virtual contract room (described later): a bidders list function where a contracting entity representative builds a long list of potential bidders, to thereby allow the contracting entity representative an opportunity to eliminate contractors with warnings from consideration early on in the process; a bid slate function where a final short list of bidders is specified and routed for approval via a workflow to ensure designated bid slate approvers are aware of the warnings while they decide the bid slate; and a bid opening request function to ensure the contracting entity representative and an associated designated supervisor are aware of any new warnings that may have just been entered since last reviewing the contractor profile or the continued existence of a previously reviewed warning or warnings, prior to deciding to request an opening of such contractor's bids. The warnings can also be displayed in a contractor search table generated by a contractor profile searcher 131, described below. The memos and correspondence section can allow, for example, only authorized contracting entity department users to upload in the contractor profile copies of important memos and special correspondence made with the contractor outside the system 30 and typically unrelated to any specific virtual contract room or other general functions.

Figure 7:
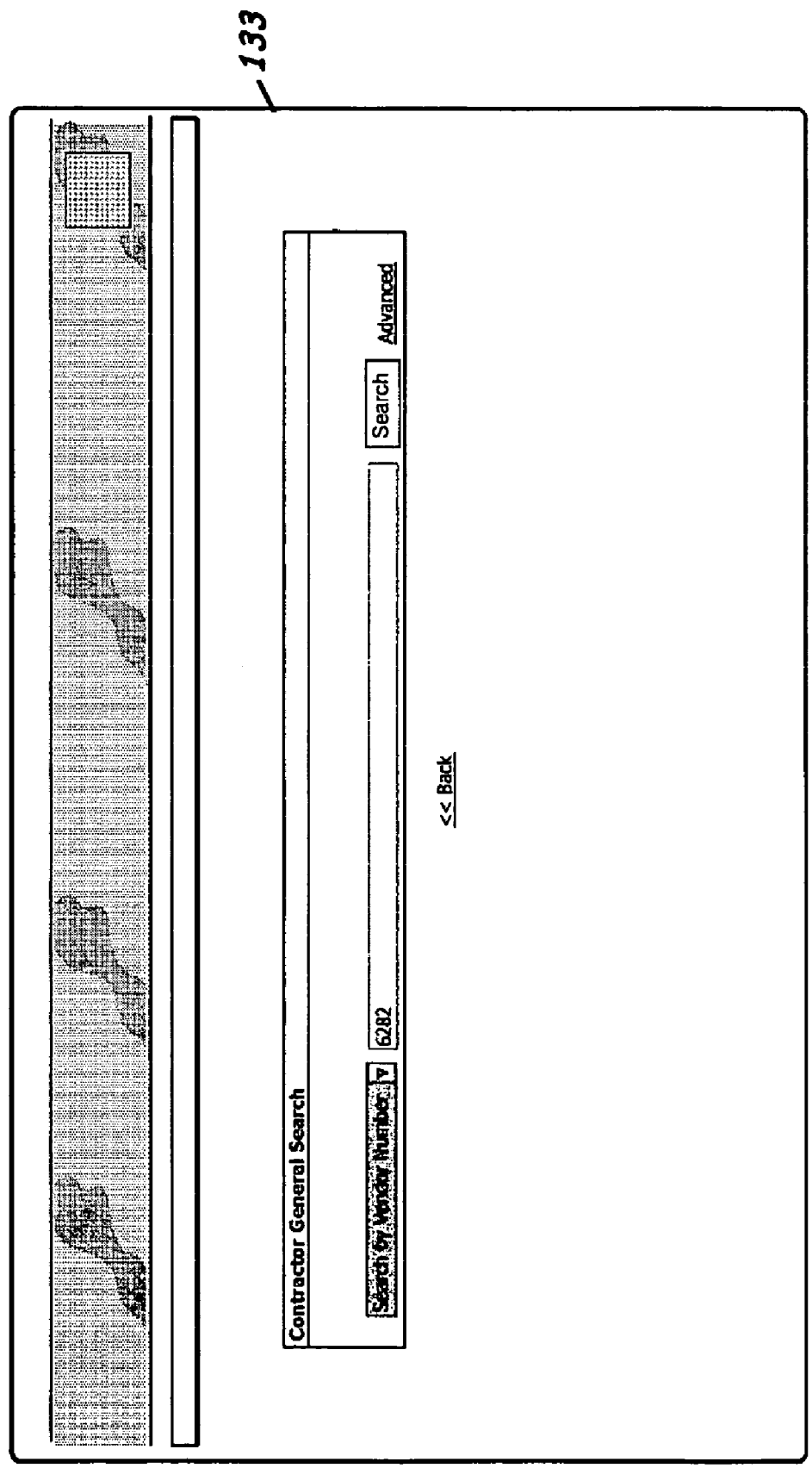
FIG. 7 is a schematic diagram of a contractor profile search web page used to facilitate contract procurement and contract management over a computer network according to an embodiment of the present invention.

As shown in FIG. 3A, the electronic contracting program product 71 can include a contractor profile searcher 131 which preferably provides both basic search and advance search functions to search for and to display a list of contractors meeting preselected criteria. That is, in general, according to the preferred embodiment of the system 30, a contracting entity member user can either perform a simple online contractor search using a single attribute such as, for example, an assigned vendor number, entered in a contractor profile search web page 133 (see FIG. 7), or can perform an advanced online search by entering criteria for a plurality of attributes displayed in a contractor profile search web page 135 (see FIGS. 8A-C) having entry fields adapted to receive user input data and preferably coinciding with those categories and attributes associated with the various contractor profiles, e.g., contractor introduction, human resources, warnings and remarks, and others, and the specific attributes therein.

As a result of receiving the search criteria, the contractor profile searcher 131 can access the contractor data records 45 to provide to the contracting entity member user web browser a contractor profile search results web page 137 (see FIG. 9) preferably displaying the search criteria 139 with a table 141 of registered contractors having attributes matching the entered contractor prequalification attributes (search criteria). For one or more of the entry fields matching those in the contractor profiles, the user can set specific search criteria, and according to the preferred configuration, can select if such criteria is either mandatory or preferable. When the search is performed, the contractor profile searcher 131 can provide in the contractor profile search results web page 137 a list of those contractors who meet, for example, all "mandatory" criteria and can list such contractors in the order of the highest number of "preferable" criteria met by each contractor. The results table 141 can provide other basic information and allow the user to access the profile of each contractor appearing on the results table by clicking on that contractor's name.

According to the preferred configuration, the results table 141 includes the columns listed below: sequence number; vendor/contractor numbers preferably as issued to the respective contractors through SAP interface, if so configured; vendor/contractor names; and the number of preferable criteria met, i.e., number of attributes indicated as "preferable" in the entry fields of the contractor profile search web page 135 and matched with the respective contractor. By default, the contractors listed in the results table are ordered such that the contractors meeting the highest number of "preferable" criteria are shown at the top of the list and those with the lowest number or meeting none of the "preferable" criteria are shown at the bottom of the list. The user can then re-sort the table 141 by "clicking," e.g., on the header of the desired column.

The results table 141 can also include contracting entity experience preferably indicated as either "yes" or "no," depending upon whether a particular contractor has performed or is currently performing work with the contracting entity. The results table 141 can also include the number of active contracts currently being performed by the contractor and meeting a certain minimum value (long form contracts); the number of active contracts currently being performed by the contractor and not meeting such certain minimum value; and the number of pending contracts/requisitions under procurement for which the contractor is currently included in an approved bid slate (described later). The table 141 can further include remarks and warnings as appearing in the respective contractor's contractor profile. The contractor profile search web page 135 can include one or more entry fields, e.g., add criteria button 143, preferably associated with each separate category or section of the contractor profile search web page 135, to allow selection and entry of the multiple and different search criteria to apply to the same search attribute field in the same search.

Figure 10D:
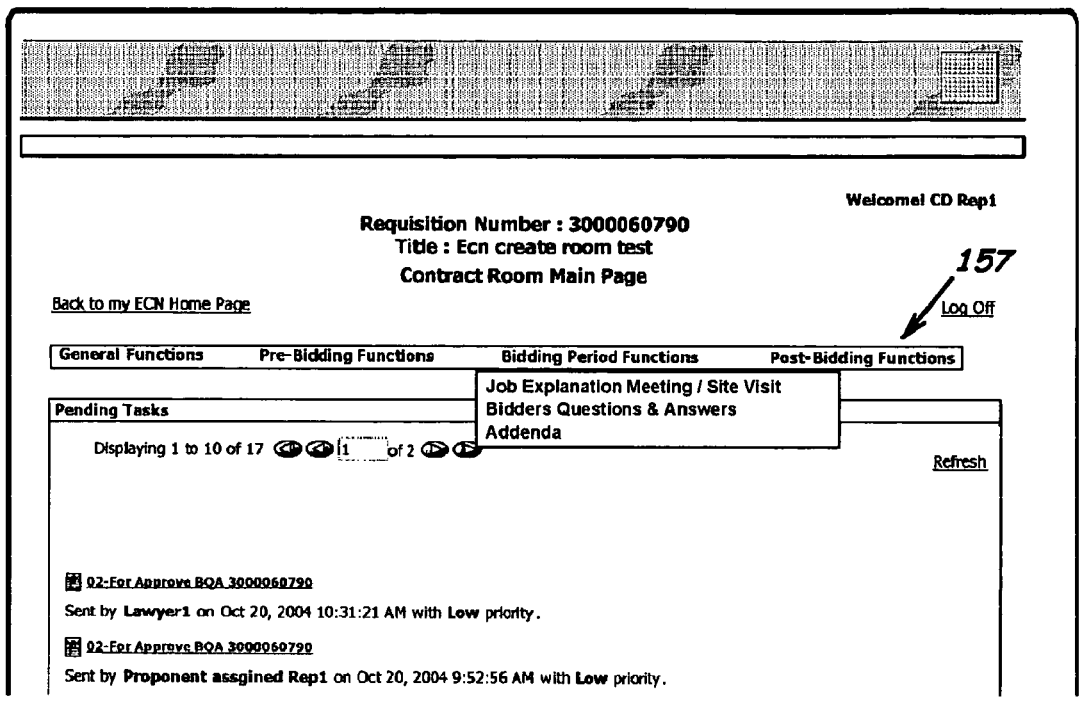

As shown in FIG. 3A, the electronic contracting program product 71 can also include a contract room former 151, which can form a virtual contract room (web page) 153 for the contract procurement transaction which provides a virtual workplace where substantially all contract procurement transactions can be accomplished (see FIG. 10A). The virtual contract room 153 can be created automatically in response to approval of a contract procurement transaction for the preselected pending contract by, e.g., both a contracting entity contract room representative and a contracting entity contract proponent representative. The proponent representative is typically a representative of the contracting entity department or section that is a proponent of the contract. The contract room representative or contracting entity representative is typically a contracting department member for the contracting entity who oversees procurement of the proposed contract. Advantageously, if the system 30 is interfaced with SAP, such automatic creation can be triggered in response to approval of a "purchase requisition supplemental transaction" in SAP. Otherwise, the contract room former 151, according to another embodiment of the system 30, can initiate a workflow to obtain approvals customized to fit the respective contracting entity's established approval procedures.

According to the preferred embodiment of the system 30, the virtual contract room (see FIG. 10A) is configured to include a main contract room page 153 having, for example, an introduction section 155, a main toolbar 157, a secondary toolbar 158, a pending tasks section or table 159, and a recent communications section or table 161. The introduction section 155 preferably includes the pending contract requisition number and title, and a name of the displayed web page, e.g., "main page." The toolbar 157 can be provided at the top of most contract room-related web pages/screens within or accessible through the contract room to enable the user to navigate between functions without having to go back to the main contract room page. The toolbar 157 includes functions that are preferably categorized according to the main contract procurement phases, e.g., general functions, pre-bidding functions, bidding period functions, and post bidding functions. The functions within the categories viewable by the user can vary depending upon the user's respective role authorization, with the contracting entity representative generally given access to the highest number of functions (FIG. 10B-E). The secondary toolbar 158 can include links to the individual viewing user's electronic contracting network homepage (described later), the main contract room page except when viewing the main page, an auto search tool (described later), and a user log off.

The pending tasks table 159 provides links to currently pending tasks within the respective contract room. Advantageously, such tasks provided in the pending tasks section 159 can be configured to display only those tasks applicable to the user currently viewing the contract room.

The recent communications table 161 provides links to inbound and outbound communications that have taken place in the respective contract room. The recent communications table 161 is the same table appearing in the respective user's electronic contracting network home page (described later), except that it is preferably filtered to show only those recent communications related to the respective contract room. According to the preferred configuration, the table 161 includes the following columns: "date" of the communication message; "contract room" requisition number to which the communication is related; "type" of communication; and "subject" of the communication, which can act as a link to the respective communication message/web page. Note, if filtered to display only those communications related to the respective contract room, the requisition number for the communication listings will be the same as the requisition number for the contract room. The type of communication indicates which contract room function the communication listing is related. For example, "CCQ" means that this communication is related to "Commercial Clarification Questions," and "BQA" means "Bidder Questions & Answers." The subject of the communication provides the title of the communication or, alternatively, its serial number, if applicable, such as when the communication relates to bidder questions & answers, technical clarifications, commercial clarification, described later, which typically are not provided a title other than a serial number or other form of identification number.

Functions related to the virtual contract room can be categorized as general functions, pre-bidding functions, bidding period functions, and post-bidding functions. The functions available/displayed vary dependent upon the classification and/or permission level of the user attempting access. The contracting representative, custodian of the virtual contract room 153, is generally provided the greatest number of functions (see FIGS. 10B-E), described below, with prospective and approved bidders (potential contractors) having fewer functions including: reviewing and accepting/rejecting confidentiality statements associated with solicitation of interest letters and invitations for proposal letters; reviewing and accepting/declining the solicitations of interest and the invitations for proposal; submitting bidding questions and reviewing answers; reviewing and downloading invitations for proposal addenda; receiving and responding to technical and commercial clarification questions; and receiving notifications of award (see FIGS. 10F-H). Note, unless stated otherwise, the functions described below will generally be illustrated with respect to the view as presented to the contracting representative.

The contracting representative has access to numerous general functions accessible through the toolbar 157 (see FIG. 10B-10E), which are those not necessarily linked to a specific phase in the contract procurement. For example, as also shown in FIG. 3A, the electronic contracting program product 71 can also include a contract template selector 171 which can be classified as general functions and which can function to display to a contracting representative's web browser a plurality of contract templates, to thereby allow the contracting entity representative for each respective contract room to select a contract template best approximating attributes of the contract procurement transaction to assign the contract a standard contract type (see FIG. 11). The contracting representative can access the contract template selector 171 through, for example, a "set standard contract type" field of the general functions drop-down menu in the main toolbar 157 (see FIG. 10B). Advantageously, specifying a standard contract type enhances automated linking of such contract room to other contract type-dependent functions such as, for example, lessons learned functions, described below.

Figure 52:
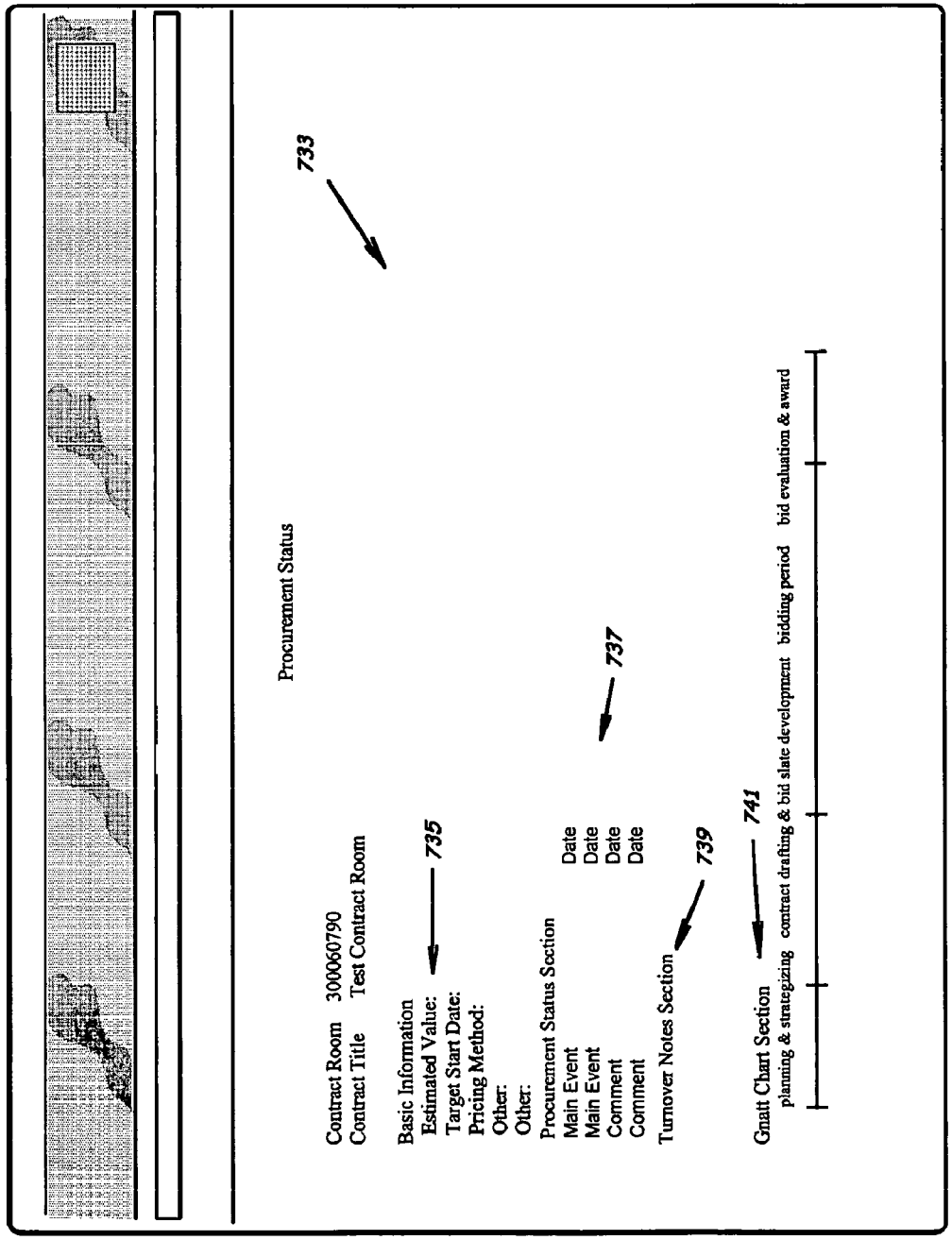
FIG. 52 is a schematic diagram of a procurement states web page form to facilitate contract procurement and contract management over a computer network according to an embodiment of the present invention.

As shown in FIG. 3C, the electronic contracting program product 71 can also include a procurement status provider 731, which can provide real-time summary data about the contract procurement status in the form of a procurement status web page 733 (FIG. 52) having: a basic information section 735; procurement status section 737; turnover notes section 739; and Gantt chart section 741. The procurement status web page 733 can be viewable from inside the contract room 153 and/or from a status link 743 provided in the users' home page (see, e.g., FIG. 39) as part of the procurement status column listing of active contract rooms. The link 743 in the home page is intended to enable users, especially managers and owners, to quickly and conveniently view the procurement status of each action without having to first access the related contract room 153 and then select procurement status through the general functions drop-down menu in the main toolbar 157 (see FIG. 10B). Typically, information regarding procurement status is one of the most frequently requested information by contracting entity management members.

The basic information section 735 can include basic data about the contract procurement such as, for example, estimated value, target start date, pricing method, and others. This data is generally the same data provided in the SAP Purchase Requisition and Purchase Requisition Supplement, if so configured.

The procurement status section 737 provides comments entered by the contracting representative. According to an embodiment of the system 30, the procurement status displayer 731 allows the contracting representative to periodically, e.g., on a weekly basis, add/update comments about the status of the procurement. In an alternative embodiment, the procurement status displayer 731 can be linked to a SAP transaction called "procurement tracking system" (PTS), or other similar function, which provides entry fields for the contracting representative to enter procurement status comments. In the illustrated embodiment of the system 30, the last three status comments added/updated by the contracting representative can be displayed in the procurement status section 737 to help show a reviewer whether or not progress is being made in the procurement action. Additionally, this section 737 can include a listing of main events which can be linked to a procurement schedule, described below.

The turnover notes section 739, preferably only viewable by designated contracting entity contracting department representatives/members, can allow an incumbent contracting representative to leave notes for a successor representative. For example, if an incumbent contracting representative were to go on vacation or needed to temporarily or permanently discontinue involvement in a contract room, the incumbent contracting representative can leave turnover notes to that representative's successor, which are saved by the procurement status provider 731 for later access by the successor contracting representative. According to an embodiment of the system 30, only the author of the turnover notes can edit such notes. The system can save all turnover notes created in the respective contract room.

The Gantt chart section 741 provides a graphical display of how the procurement time is expended, e.g., up to the date that the chart is accessed. According to an embodiment of the system, the chart divides the procurement activities into four main groups: planning and strategizing; contract drafting and bid slate development; bidding period; and bid evaluation and award. The procurement status provider 731 preferably interfaces and is automatically linked to related transactions, and thus, the chart is systematically created and updated.

As shown in FIG. 3C, the electronic contracting program product 71 can also include a lessons learned manager 181 having access to the database 41, which can function to provide or otherwise allow contract room users to view and post lessons learned applicable to the respective contract room. The lessons learned function is provided to capture the various experiences gained during the contract procurement or contract administration process. A user can access the lessons learned manager 181 through, for example, the general functions drop-down menu in the main toolbar 157 (see FIG. 10B). When this function is accessed by a user, the lessons learned manager 181 can provide the user the option to either post new lessons learned, view lessons learned previously posted by the user, view lessons learned specifically related to the respective contract room or view lessons learned specifically related to the requisition (procurement), and search the lessons learned database (see FIG. 12).

Upon selecting the "post new lessons learned," the lessons learned manager 181 provides the user entry fields to define and categorized the lessons learned. Such fields can include a basis field, a proposed category field, a proposed applicability field, and a lessons learned content field. The basis field for the proposed lessons learned allows the user to identify whether the lesson learned was generated from working on a specific new contract procurement or from administering a specific contract. The proposed category field allows the user to define the general category under which the proposed lessons learned is best related, i.e., whether it relates to, for example, contract language, technical specifications, or bid slate development. The proposed applicability field allows the user to specify the attributes of new contract procurement to which the proposed lesson learned would be applicable. For example, the user can propose the applicability to be only to the rebidding of the contract from which the lesson learned was generated, or to contracts that have specific attributes in terms of contract types, proponents, locations, or other factors. If the user's proposed lessons learned applicability is approved, the lessons learned manager 181 can automatically cause the lesson learned to appear in each contract room that has the same attributes set in the approved lessons learned applicability. The lessons learned content field allows the user to enter the specific details of the proposed lessons learned and allows the user to attach any supporting documents.

Once the user submits the proposed lesson learned, the lessons learned manager 181 can forward a task to a designated reviewer, e.g., contracting department person for the contracting entity, for review and approval. If the designated reviewer rejects the proposed lesson learned, the lessons learned manager 181 can automatically generate a request for the designated reviewer to enter a reason. Upon submission, the lessons learned manager 181 send a message to the lessons learned author advising the author of the reviewer's position and the reasons for rejection. If the designated reviewer approves the lesson learned, the lessons learned manager 181 will save the lesson learned, assign it an identification number, and proactively present the lesson learned to contract procurements that share similar attributes as those of the approved lesson learned.

Upon selecting one of the non-editable categories such as the "lessons learned posted by the user," the user is presented the lessons learned the user previously posted, preferably categorized into pending lessons learned, i.e., those submitted by the user but not yet approved by the authorized reviewer in the contracting department; and approved lessons learned, i.e., those submitted and approved.

Figure 13:
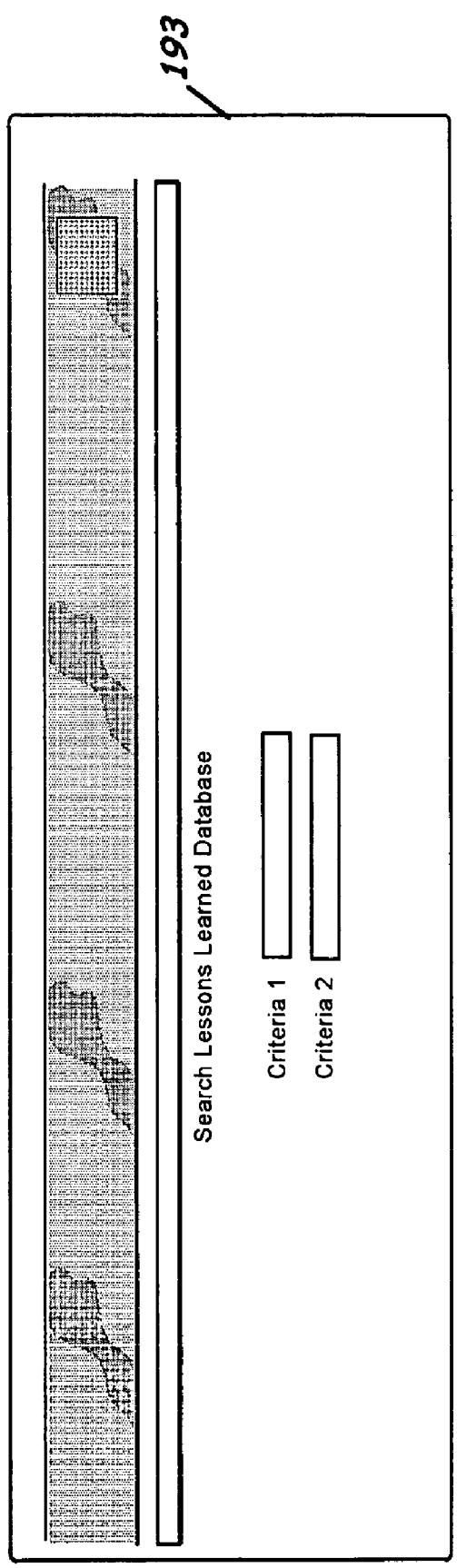
FIG. 13 is a schematic diagram of a lessons learned profile search web page form used to facilitate contract procurement and contract management over a computer network according to an embodiment of the present invention.

Upon selecting the "search lessons learned database," a lessons learned searcher 191 (see FIG. 3A) provides the user's web browser a lessons learned profile search web page form 193 (see FIG. 13) having a plurality of entry fields adapted to receive user input data indicating selected lessons learned attributes for the historic lessons learned, preferably also stored in database 41, to display to the user's web browser a listing of lessons learned having attributes matching one or more entered lessons learned attributes. Advantageously, this function enhances contract procurement management by allowing the user to search for lessons learned using search criteria entered by the user to gain insight into previously documented potential pitfalls and/or improved procedures.

As shown in FIG. 3A, the electronic contracting program product 71 can also include a contract procurement research data searcher 201, which includes an advanced search tool that performs automated multiple searches for information related to developing the pending contract without the need for a contracting entity member user to request such search. According to the preferred embodiment of the system 30, when a contract room is automatically created, e.g., upon the contracting and proponent representatives approving the Purchase Requisition Supplement in SAP, the contract title, e.g., as defined in the SAP Purchase Requisition and Purchase Requisition Supplement, can be systematically entered into a word search field in the contract procurement research data searcher 201, which then can use the contract title as the default search criteria to perform multiple searches for on-demand display. A main objective of this function is to proactively instill in the user the idea of researching information related to the respective contract procurement from as many sources as possible.

Figure 14:
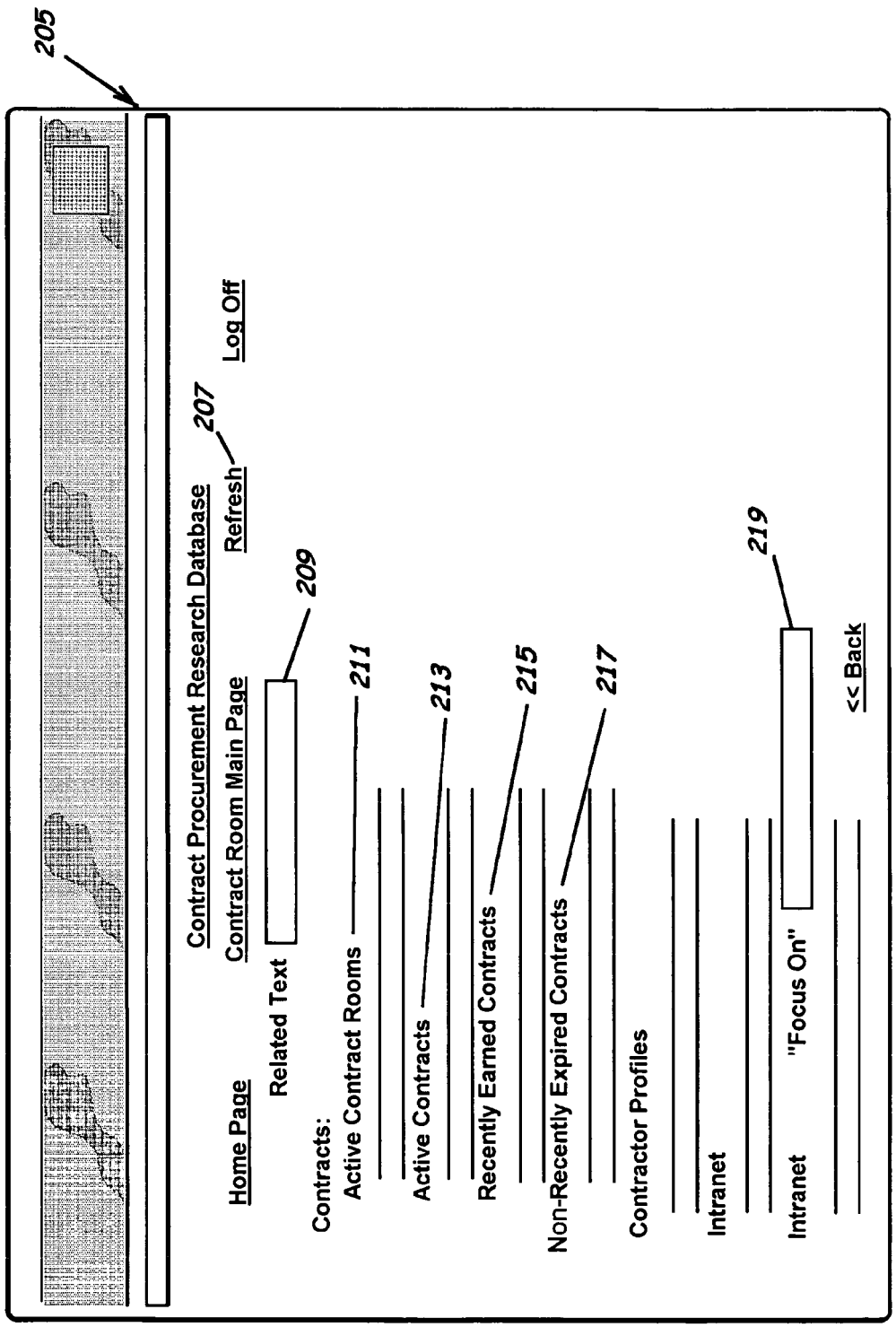
FIG. 14 is a schematic diagram of a contract procurement research data web page used to facilitate contract procurement and contract management over a computer network according to an embodiment of the present invention.

The contracting representative can access the contract procurement research data searcher 201 through, for example, an "auto search" field of the general functions drop-down menu in the main toolbar 157 (see FIG. 10B) to allow the user to display in a search results contract procurement research data search display (results) web page 205 (see FIG. 14) providing the search results formed using the default search criteria. The contract procurement research data searcher 201 can automatically perform updates, e.g., nightly, to provide the respective user with information, updated daily. In addition, the users can at any time, for example, click "Fresh Search" entry field 207, to receive the latest search results without having to wait for the auto refresh to take place. The default words used in the multiple searches are the words contained in the contract title of the respective contract room. The user can, however, adjust the search criteria, e.g., words or phrases, used in the search by editing the words displayed in the related text field 209 of the contract procurement research data search display web page 205.

The multiple searches that contract procurement research data searcher 201 can perform include, for example, a contracts search, a contractor profile search, an intranet search, an intranet search, and a contract room search. Under the contracts search, the contract procurement research data searcher 201 can perform an automated search for contracts within the system 30 having attributes, e.g., titles, that include all or some of the words contained in the title of the respective contract room or other words or phrases specified by the viewing user. The contract procurement research data search display web page 205 can display the contract search results in the following groups: active contract rooms 211; active contracts 213; recently expired contracts 215; and non-recently expired contracts 217. The active contracts room group 211 can list contract procurements not yet concluded. The active contracts group 213 can list signed contracts that have not yet expired. The recently expired contracts group 215 can list contracts that expired within a preselected number of years, e.g., the past five years. The non-recently expired contracts group 217 can correspondingly list those contracts expired beyond the preselected number of years, e.g., five years.

Under the contractor profile search, the contract procurement research data searcher 201 can perform an automated search for contractor profiles that include in the profile all or some of the words contained in the title of the respective contract room or other words or phrases specified by the viewing user.

Similarly, under the intranet search, the contract procurement research data searcher 201 can perform an automated search for web pages on the contracting entity's intranet that include in the profile all or some of the words contained in the title of the respective contract room or other words or phrases specified by the viewing user. Note, the electronic contracting program product 71 also includes a contract room profile searcher 221, described later.

Under the Internet search, the contract procurement research data searcher 201 can perform an automated search over Internet using a contracting entity specified search engine Client (as a default). Due to the potential for retrieving a huge number of web pages or documents having matching terms, the viewing user is provided an entry field 219 labeled "Focus On" under which the user can specify certain websites to limit the search within. The result of both the Internet and intranet searches can include a link to any documents/subsections within these websites that fully or partially match the search words. Note, as an additional feature, the contract procurement research data searcher 201 can also include links to famous contracting-related and industry websites (not shown).

Under the contract room search, the contract procurement research data searcher 201 can call, for example, a contract room profile searcher 221 or other module having a similar function, to perform a search for selected words in all functions and documents within the same contract room.

Figure 15:
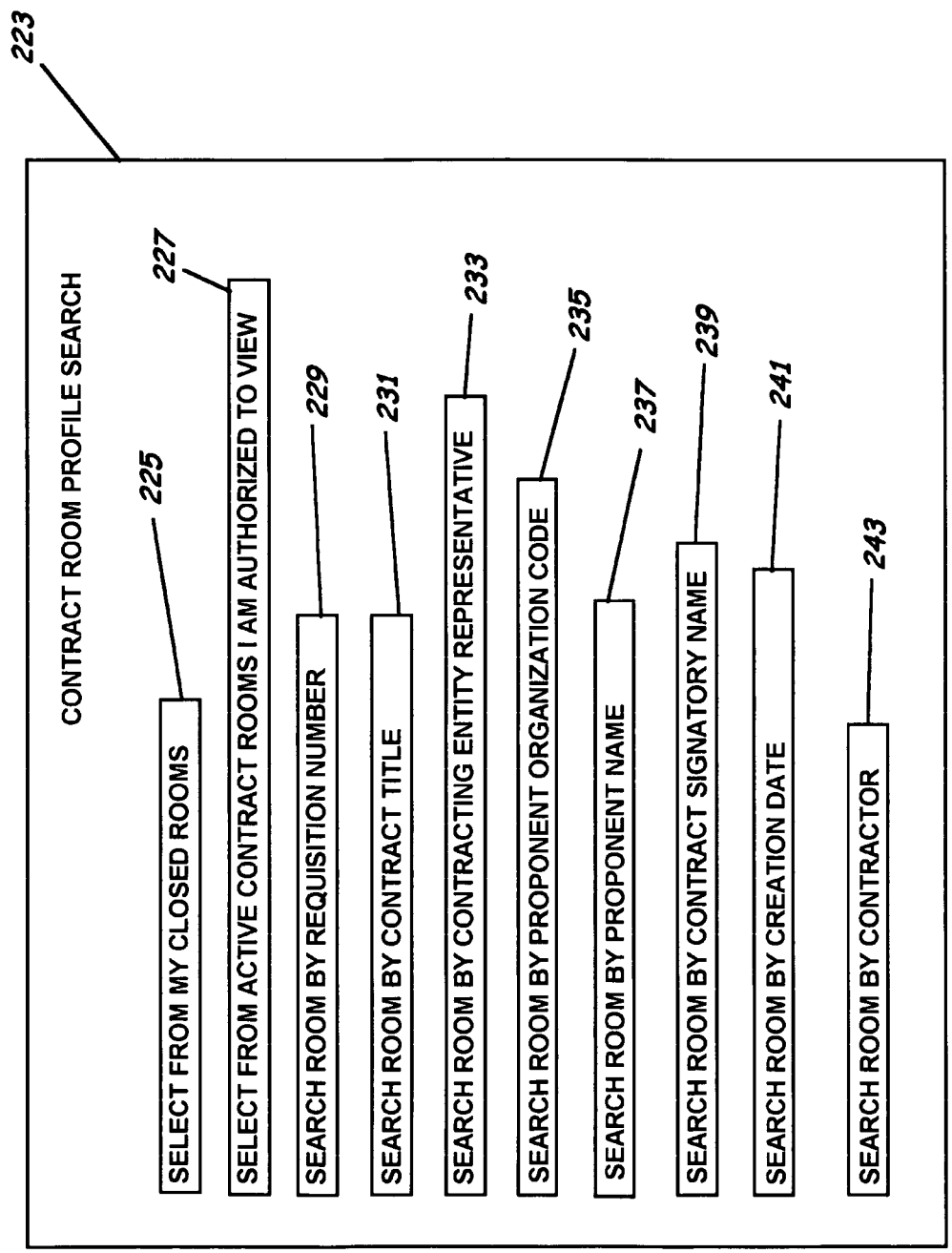
FIG. 15 is a schematic diagram of a contract room profile search web page form used to facilitate contract procurement and contract management over a computer network according to an embodiment of the present invention.

In its global form, the contract room profile searcher 221 allows the user to perform a more detailed search for active or closed contract rooms. The various contract rooms can be searched using a contract room profile search web page form 223 (see FIG. 15) providing links to search various contract room categories including, for example, closed rooms associated with the viewing user, any contract rooms the user is authorized to view, requisition number, contract room title, assigned contracting representative name, proponent organization code, proponent representative name, contract signatory name, contract room creation date, and contractor name.

The "select from my closed rooms" link 225 limits the search to the user's closed contract rooms. The "select from active contract rooms I am authorized to view" link 227 can provide the user a link to those contract rooms that belong to other contracting representatives in which the user was granted permission by the responsible contracting representative to enter and view. The "search room by requisition number" link 229 enables the user to search for a contract room using the requisition number, which is preferably the same as the contract room number or a part of such number. The "search room by contract title" link 231 enables the user to search by part or all of a contract room title. The "search room by contracting entity representative" link 233 enables the user to search for contract rooms that are or were handled by a specific contracting representative.

The "search room by proponent organization code" link 235 enables the user to search for contract rooms that handle contracts belonging to a specific proponent organization within the contracting entity using that proponent's organization code or part of the code. The "search room by proponent name" link 237 enables the user to search for contract rooms that handle contracts belonging to a specific proponent organization within the contracting entity using that proponent's organization name or part of the name. The "search room by contract signatory name" link 239 enables the user to search for contract rooms for which a specific officer in the either the contracting entity or an awarded contractor entity is or was the contract signatory. The "search room by creation date" link 241 enables the user to search for contract rooms created on a specific date or within a specific period of time. The "search room by contractor" link 243 enables the user to search for contract rooms in which a specific contractor or contractors are or were included as approved or potential bidders.

Once the user conducts a search, the contract room profile searcher 221 can display a contract room profile search results web page 245 (see FIG. 16) including a table that lists the contract rooms which the user is authorized to view based on the user's permissions and that meet the user's search criteria, and provides a link to each such contract room, preferably along with some basic information about each listed contract room.

As shown in FIG. 3A, the electronic contracting program product 71 can also include a contracting entity participant manager 251 which can provide a contracting entity participant web page 253 (FIG. 17) that lists contracting entity personnel (participants) who will be authorized to access and/or perform functions within the respective contract room. The contracting entity participant manager 251, in response to establishing a connection to related functions in, for example, SAP Finance and SAP Human Resource Modules, or in response to interfacing with a contracting entity developed list of contracting entity personnel having preselected permissions, can automatically set most of the names of the participants, providing a default contracting entity participant proposed list. By accessing this web page 253, the viewer can readily determine the names of each contracting entity participant and their affiliated organizations, along with their assigned roles for the respective contract room.

The main participant of the each contract room 153 is a preselected contracting representative who is the custodian of the respective contract room and chairman of the associated procurement process. The contracting representative can modify the other users as necessary to account for availability issues, i.e., one or more may be unavailable for a short or long period of time. For example, if the contracting representative's supervisor is unavailable for one or two days and no change was made to reflect this absence in the respective human resource management program, e.g., the SAP Human Resource Module, the contracting representative can access the contracting entity participant manager 251 through, e.g., the general functions drop-down menu in the main toolbar 157 (see FIG. 10B); and, through use of a selection field, such as button 255, can change the contracting representative's supervisor to another available supervisor or administrator in the contracting representative's department who is assigned to handle this position in the incumbent's absence. Advantageously, this function, which can feed, e.g., all other functions in the contract room, and can unify various locations where the contracting representative would need access to define the other contracting entity participants into a single readily accessible location. Similarly, the contracting representative's supervisor can access the contracting entity participant manager 251 and modify the contracting representative assigned to the respective contract room.

Figure 18:
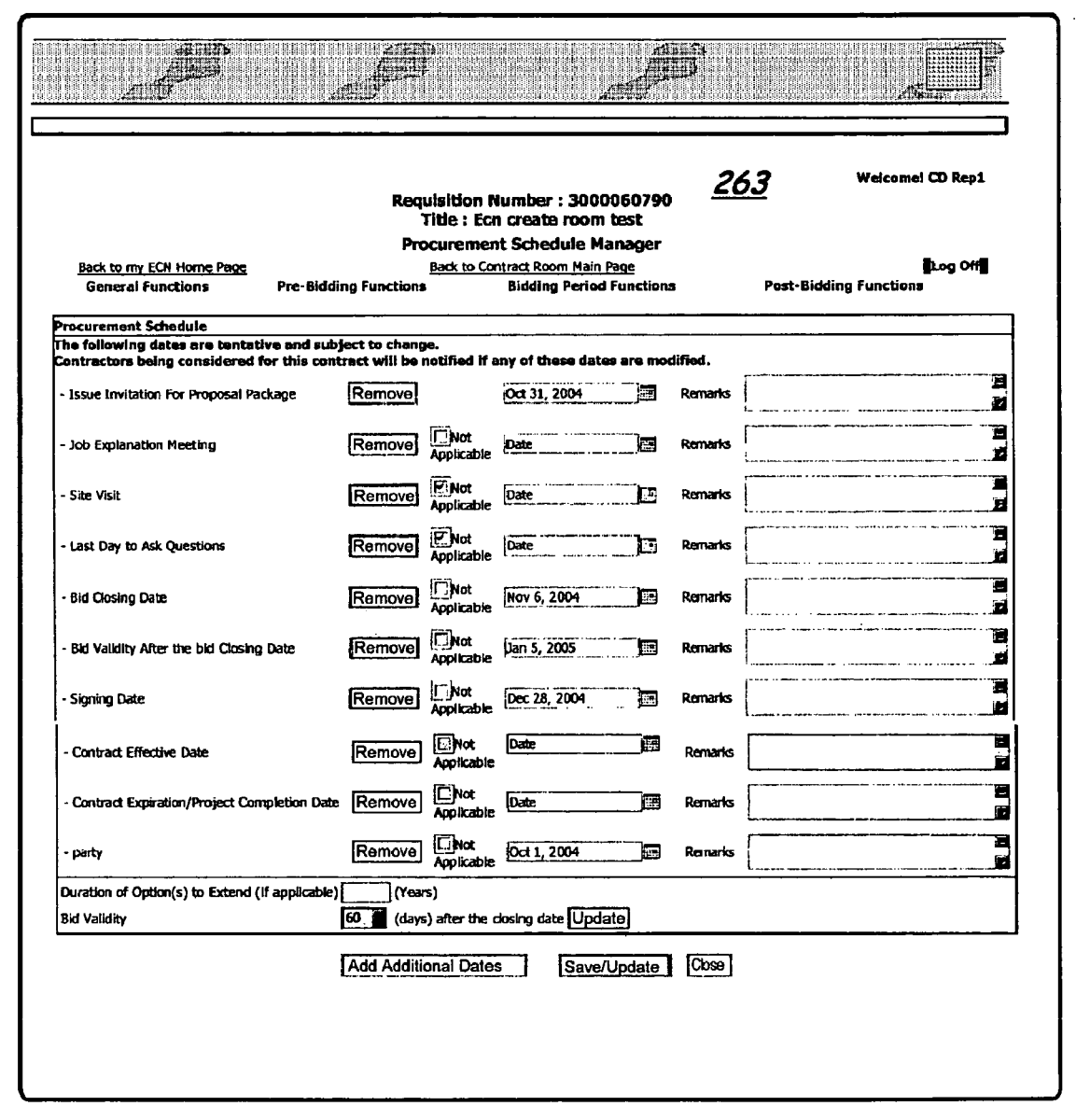

As shown in FIG. 3A, the electronic contracting program product 71 can also include a procurement schedule manager 261, which enables the contracting entity to display online to each contractor under consideration for the contract procurement transaction a procurement schedule web page 263 (FIG. 18) including a schedule of procurement activities such as, for example, the invitation for proposal date, bid closing date, and others, providing a single consolidated location to receive schedule information. The contracting representative can access the procurement schedule manager 261 through, e.g., the general functions drop-down menu in the main toolbar 157 (see FIG. 10B). Further, in response to modification or updating of the schedule of any one of the procurement activities by the contracting representative, the procurement schedule manager 261 can provide or call an outstanding task alert manager 264 to provide automated notification preferably over redundant media, e.g., fax, e-mail and/or SMS messaging, to all contractors under consideration, of a requirement to review the schedule changes. As the procurement schedule feeds into other functions within the contract room, advantageously, providing such centralized dissemination helps ensure that only one consistent schedule is posted and consistently viewed by all contractors under consideration and bidders, preventing inadvertent dissemination and/or viewing of an outdated schedule.

As shown in FIG. 3A, the electronic contracting program product 71 can also include a bidders list former/manager 271, which functions to allow the contracting representative to form a bidders list web page 273 (see FIG. 19) including: an extended list of potential bidders from various sources such as, for example, the search results list of contractors resulting from a prequalification search utilizing the advanced search function of the contractor profile searcher 131; general bid slates, e.g., pre-formed lists of contractors pre-approved by the contracting entity to perform a specific type of work or for certain types/categories of contracts; a previously created bidders list from another contract room; a previously approved final bid slate; or other such list of potential contractors. The contractor profile searcher 131 can be actuated to populate the bidders list table 275 through use of an input field such as, for example, the "search contractor profiles" button 277. The general bid slates and/or previously created bidders lists can be imported through use of the "use existing bidders list" button 279. The contracting representative can add additional individual bidders to the list through use of the "add bidders" button 281. The bidders list feeds a number of other functions in the contract room and enables those listed to access the contract room to perform certain functions according to the phase of the contract procurement. The contracting representative can access the bidder list former/manager 271 preferably through the general functions drop-down menu in the main toolbar 157 (see FIG. 10B).

The bidders list web page 273 can include the list of the potential contractors preferably presented in a tabular form. The table 275 can include attributes such as, for example, number (No.), vendor number, contractor name, contact name, contact number, warnings, states, remarks, included in bid slate, and date fields. According to an embodiment of the system 30, the number column is the list number of the contractor row in the table. The vendor number is the identification number of the contract, e.g., as provided by SAP if the system 30 is so configured. The contractor name is the name assigned the contractor and is also preferably provided as a link to the full contractor profile, described previously, although other contractor attributes can be provided as such a link. The contact name is the name of a designated name for the contract and can provide a link to the contact's e-mail address. According to the illustrated configuration, clicking the contact name can open a blank email addressed to this person's email address. The contact number is preferably a phone number as provided in the contractor profile. The warnings can include those warnings automatically displayed throughout selected web pages to ensure the users are aware of such important information. The status can indicate the latest status of each contractor with respect to the respective contract room. The remarks can include any remarks the assigned contracting representative wishes to include regarding each listed contractor relative to the respective contract room. The "include in bid slate" provides a check box that can be used by the contracting representative to indicate which contractors appearing in the bidders list table 275 are to be included in a short list of potential contractors known as "the Bid Slate," described later.

Once the long bidders list displayed in the bidders list table 275 is scrutinized and the designated contracting entity users are ready to reduce the list to a short/manageable list of bidders, the contracting representative can export the selected short list of bidders from the bidders list former/manager 271 function to another function identified as the bid slate manager 291 (see FIG. 3A). An approval workflow is provided for processing this "short list" by through use of an input field such as, for example, the "save in bid slate" button 283. Note, for audit trail purposes, according to the preferred configuration, the contracting representative is provided permissions to remove a contractor from the bidders list table 275, e.g., as long as the respective contractor has not been contacted regarding the pending contract. The bidders list former/manager 271 provides the contracting representative an input field such as, for example, the "activate/deactivate/remove bidders" button 285, to remove the respective contractor. After the contact has been made, i.e., usually beginning with the issuance of a solicitation of interest letter (described below), according to an embodiment of the system 30, the contracting representative is not provided permissions within the bidders list former/manager 271 to remove the respective contractor from the bidders list table 275. Instead, engaging the "activate/deactivate/remove bidders" button 285 allows the contracting representative to deactivate the respective contractor to remove or drop the respective contractor from further consideration. The name of the deactivated contractor will continue to appear in the list; however, their status will appear as "deactivated" in the status column of the bidders list table 275. The contracting representative can reactivate the respective contractor through again engaging button 285 while highlighting or otherwise indicating the respective contractor to be activated.

As shown in FIG. 3A, the electronic contracting program product 71 can also include a bid slate manager 291, which can provide a bid slate web page form 293 (see FIG. 20), which can include: a bid slate section 295 having a short list of bidders identified for inclusion in the bid slate; a bid slate checklist section 297 having a link to a bid slate checklist; an approval section 299, which has a list of designated approvers; and a reviewer section 301, which has a list of one or more designated reviewers. The contracting representative can access the bid slate manager 291 through, for example, a "bid slate approval" field of the general functions drop-down menu in the main toolbar 157 (see FIG. 10B). The bid slate manager 291 can provide for routing the final short list of bidders shown in the bid slate section 295 for finalization through a predetermined entity-specific approval workflow (not shown). The bid slate manager 291 can also include a section (not shown) for entering the justification for the proposed list, selectable through an input field such as, for example, a "justification" button 303.

Figure 19:
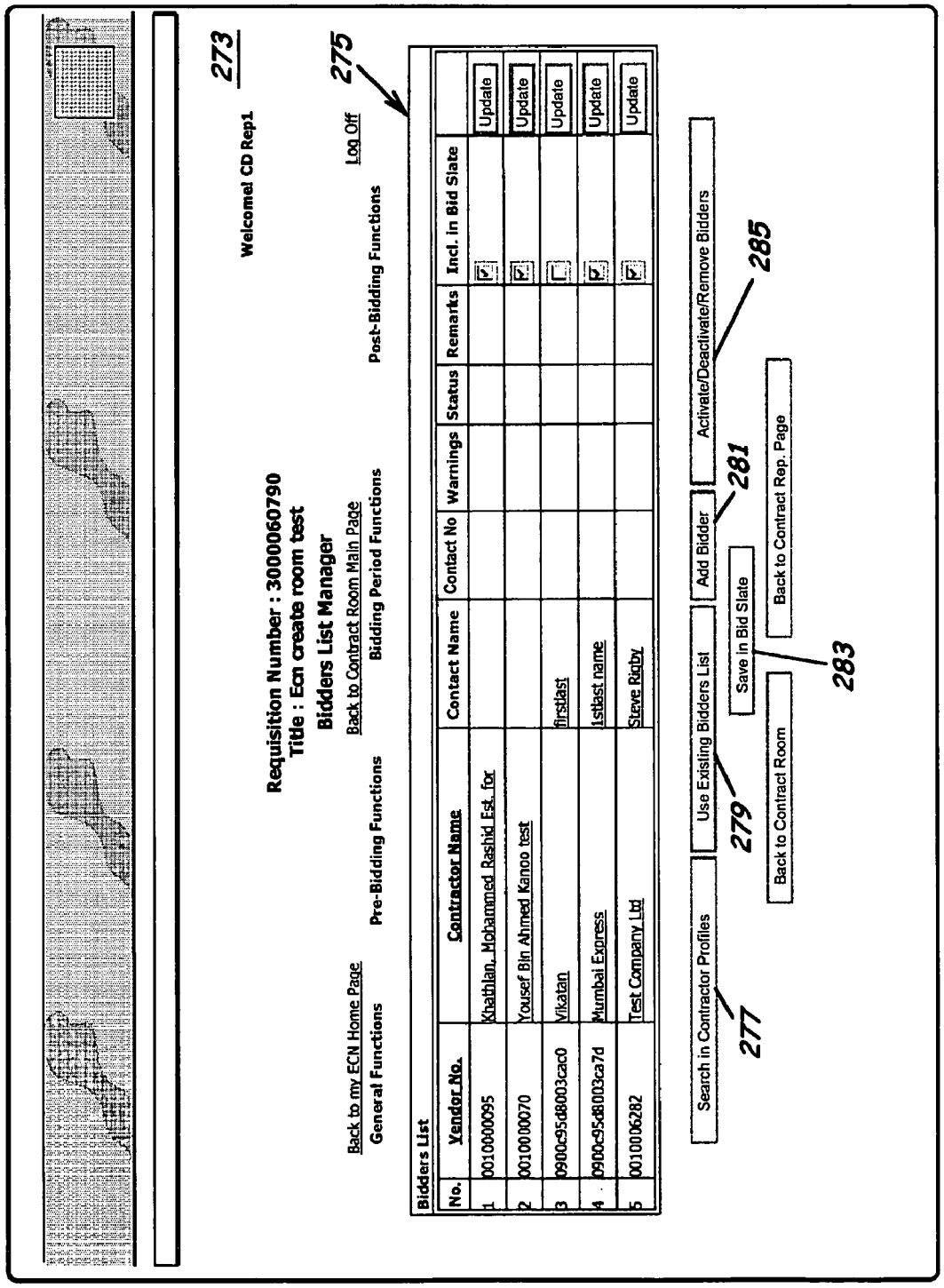
FIG. 19 is a schematic diagram of a bidders list web page used to facilitate contract procurement and contract management over a computer network according to an embodiment of the present invention.

As stated above, the approval workflow can be initiated through selecting the "save in bid slate" button 283 (FIG. 19). Each bidder name in the bid slate section 295 can be in the form of a link to the respective bidder's contractor profile, allowing each reviewer and approver to easily access the entire contractor profile for each respective contractor (proposed bidder). In addition, any warnings applicable to each proposed bidder can automatically appear in the list. As a result, the reviewers and approvers can be able to make a more educated and accurate decision about each proposed bidder. According to an embodiment of the system 30, once the proposed bidders in the bid slate are approved or rejected by each reviewer, signatory approval has been requested through e.g., "request signatory approval" button 305, and a list has been approved the by the signatory, the system 30, through, e.g., the bid slate manager 291, can lock the bidders list to the approved bidders, and thus, only those approved can be enabled to access the respective contract room 153 and perform the related contract room functions from that point onward.

As shown in FIG. 3A, the electronic contracting program product 71 can also include a bidder status monitor 311 positioned to monitor contractor transactions within each respective contract room 153 and to provide a bidder status web page 313 (FIG. 21) including a bidder status summary table 315. The table 315 is automatically updated by the system 30 to provide the contracting representative real-time contractor activity status updates for the contractors under consideration assigned to the bidders list with regard to each specific phase and activity in the contract procurement cycle. The bidder status web page 313 and corresponding table 315 can preferably be accessed through selection of the "bidders status summary table" field of the general functions drop-down menu in the main toolbar 157 (see FIG. 10B).

Figure 22:
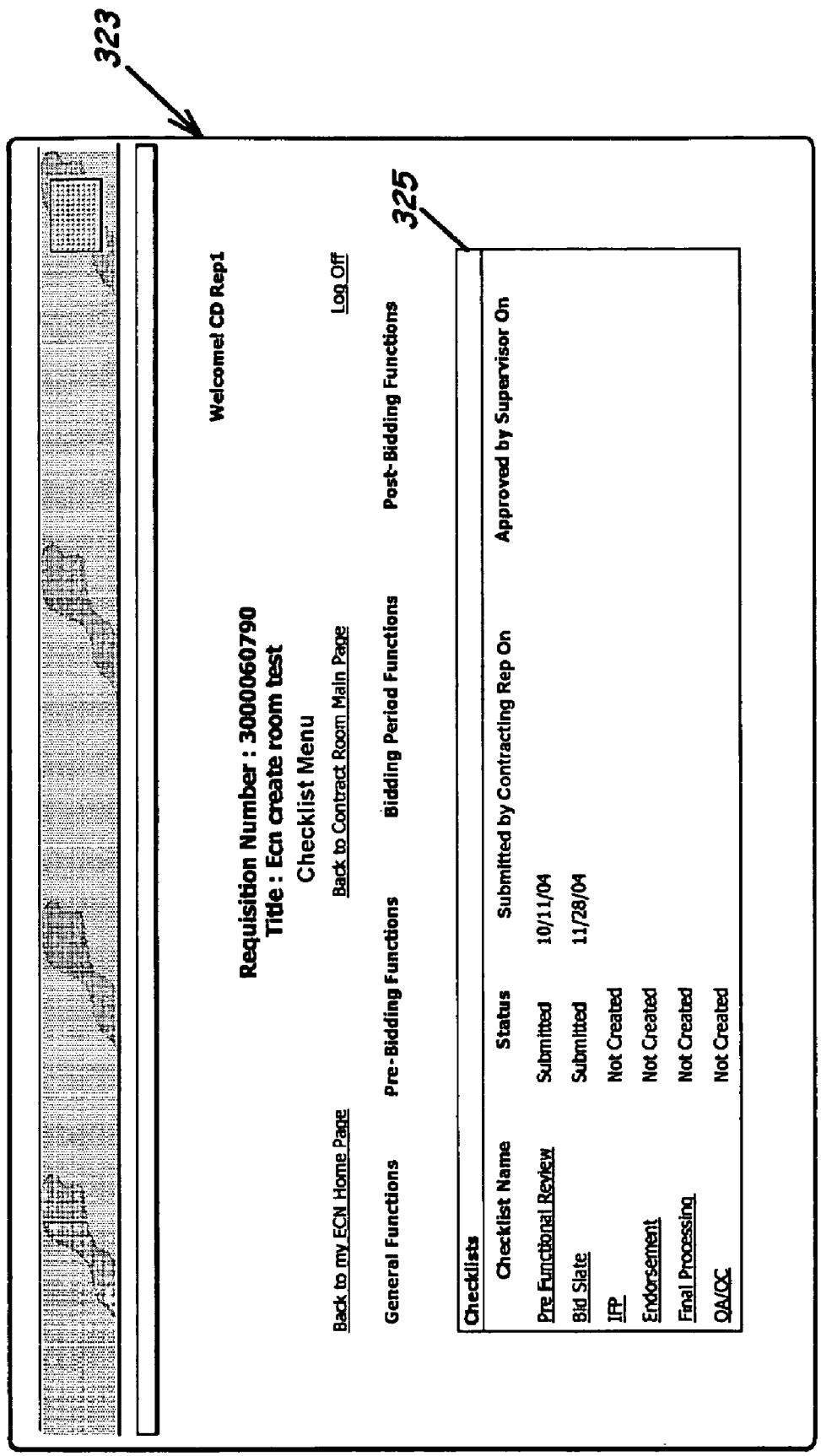
FIG. 22 is a schematic diagram of a checklist menu web page form used to facilitate contract procurement and contract management over a computer network according to an embodiment of the present invention.

As shown in FIG. 3A, the electronic contracting program product 71 can also include a checklist menu provider 321, which provides a checklist menu web page form 323 (FIG. 22) that includes a table of checklists 325 for each of the main contract room functions organized to support preselected contracting entity procedures for the respective contracting entity. The table 325 preferably includes the checklist name, status, date submitted by the contracting representative, and date approved by the contracting representative's supervisor. The name of the checklist can be enabled to function as a link to the respective internal checklist. According to the preferred implementation, the contracting representative is responsible for completing each checklist then submitting it to his/her supervisor online for approval. The date of such approval corresponding can be shown in the table 325. The checklist menu web page form 323 and corresponding table 325 can preferably be accessed by the contracting representative through selection of the "checklist menu" field of the general functions drop-down menu in the main toolbar 157 (see FIG. 10B). Note, advantageously, links to the same checklists can be within the related functions in the contract room.

Figure 23:
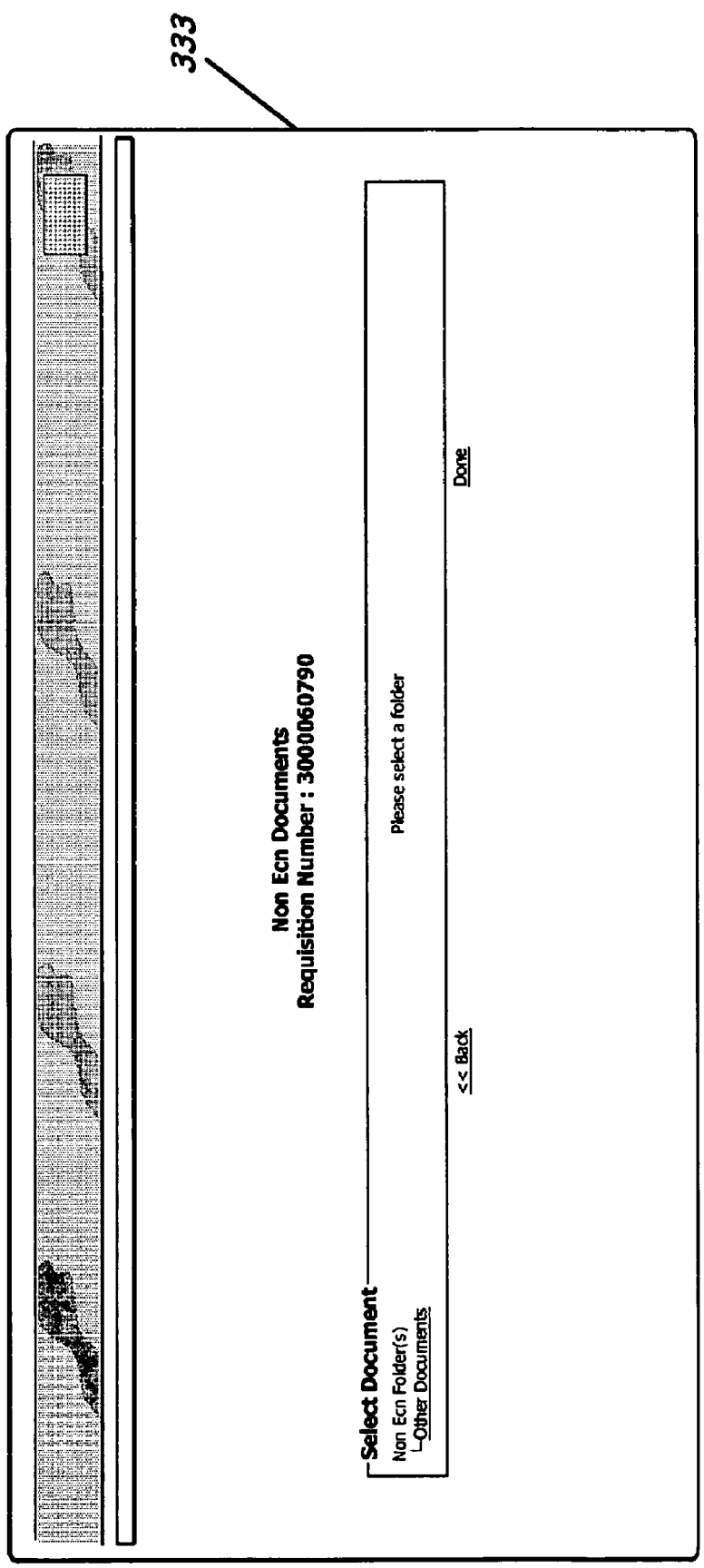
FIG. 23 is a schematic diagram of an external document processor web page used to facilitate contract procurement and contract management over a computer network according to an embodiment of the present invention.

As shown in FIG. 3A, the electronic contracting program product 71 can also include an external document processor 331 which provides an external document processor web page 333 (FIG. 23) including a user selectable link which enables the contracting representative to upload and file electronic (digital) copies of documents generated external for storage in the database 41, to allow discarding the hardcopies and maintaining online access from the respective contract room to documents relevant to such contract room. The contracting representative can access the external document processor 331 through, for example, a "non ECN documents" field of the general functions drop-down menu in the main toolbar 157 (see FIG. 10B).

Figure 24:
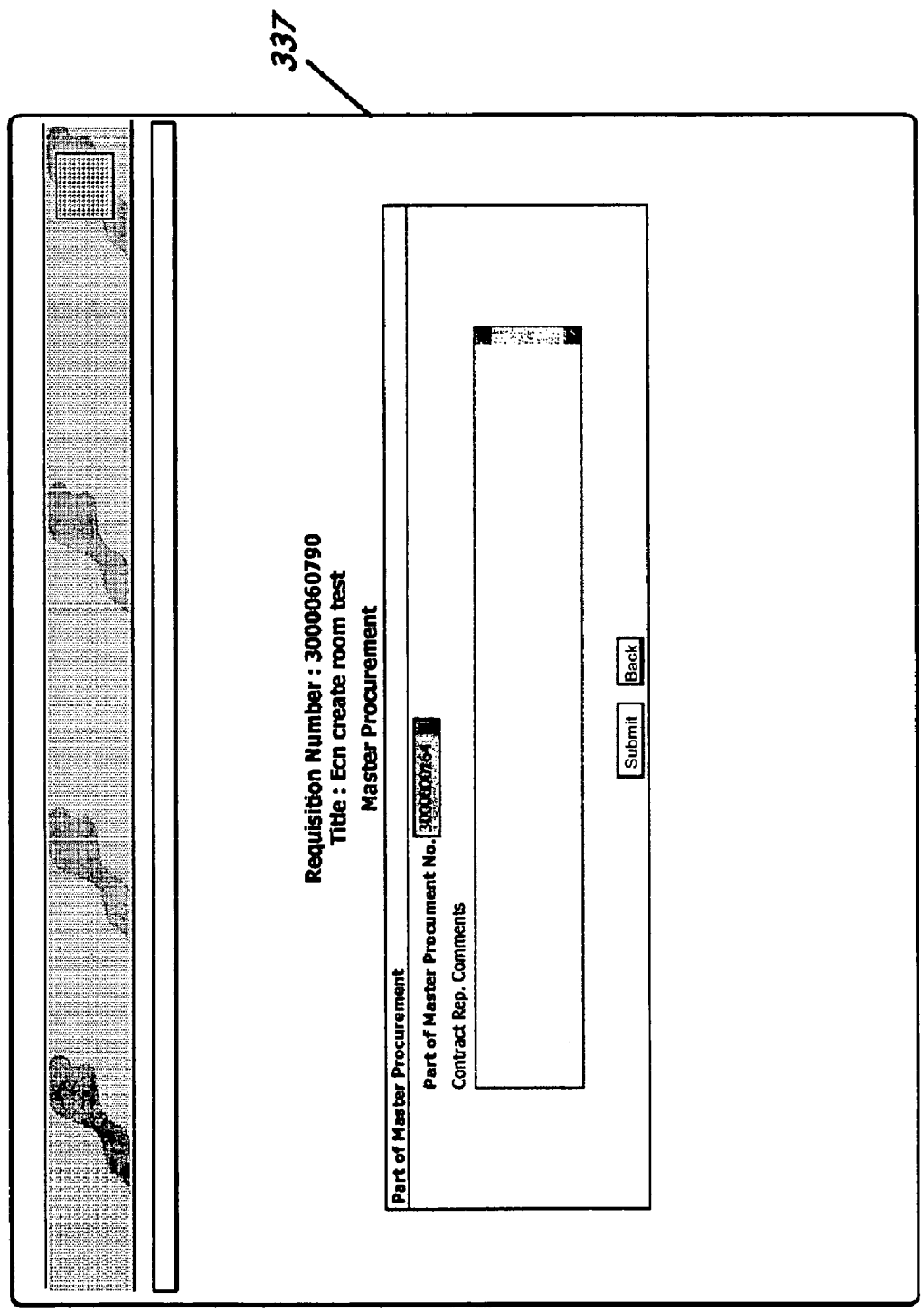
FIG. 24 is a schematic diagram of a master procurement web page used to facilitate contract procurement and contract management over a computer network according to an embodiment of the present invention.

As shown in FIG. 3A, the electronic contracting program product 71 can also include a contract room master 335, which can provide a master procurement web page 337 (FIG. 24), which can be accessed by the contracting representative through, e.g., selection of the "part of master procurement" field of the general functions drop-down menu in the main toolbar 157 (see FIG. 10B). This function is typically utilized in situations where multiple similar contracts are being procured at the same time through one procurement process. Instead of repeating the same contract room activities for each of these similar and simultaneously procured contracts, the contract room master 335 can allow the contracting representative to subordinate the respective contract room to another contract room designated as a master contract room. In response to the subordination of the respective contract room, the contract room master 335 disables a plurality of functions within the subordinated contract room and can display reference instructions for accessing the master procurement contract room to perform the disabled functions.

As shown in FIG. 3A, the electronic contracting program product 71 can also include a contract room closing manager 338, which can allow the contracting representative to close a contract room 153 due to conditions other than normal completion, such as, for example, cancellation of the work requirement, change in contracting strategy, insufficient approved funding, deferral of funding, or other reasons. The contract room closing manager 338 can be accessed by the contracting representative through, e.g., selection of the "close room" field of the general functions drop-down menu in the main toolbar 157 (see FIG. 10B). In response to closure of the contract room 153, an email, fax, and/or SMS message notification is sent to all contractors in the bid slate. According to an embodiment of the system 30, once the contract room 153 has been closed, only authorized contracting department members can re-open the closed contract room. This feature prevents potential confusion regarding the open or closed status of the contract room 153 between the various departments.

The electronic contracting program product 71 can also include a miscellaneous inquiries manager 339, which can allow the contracting representative to send miscellaneous questions relative to the subject contract room 153 to a recipient via a predetermined workflow. The miscellaneous inquiries manager 339 can be accessed by the contracting representative through, e.g., selection of the "miscellaneous inquiries" field of the general functions drop-down menu in the main toolbar 157 (see FIG. 10B).

Figure 25:
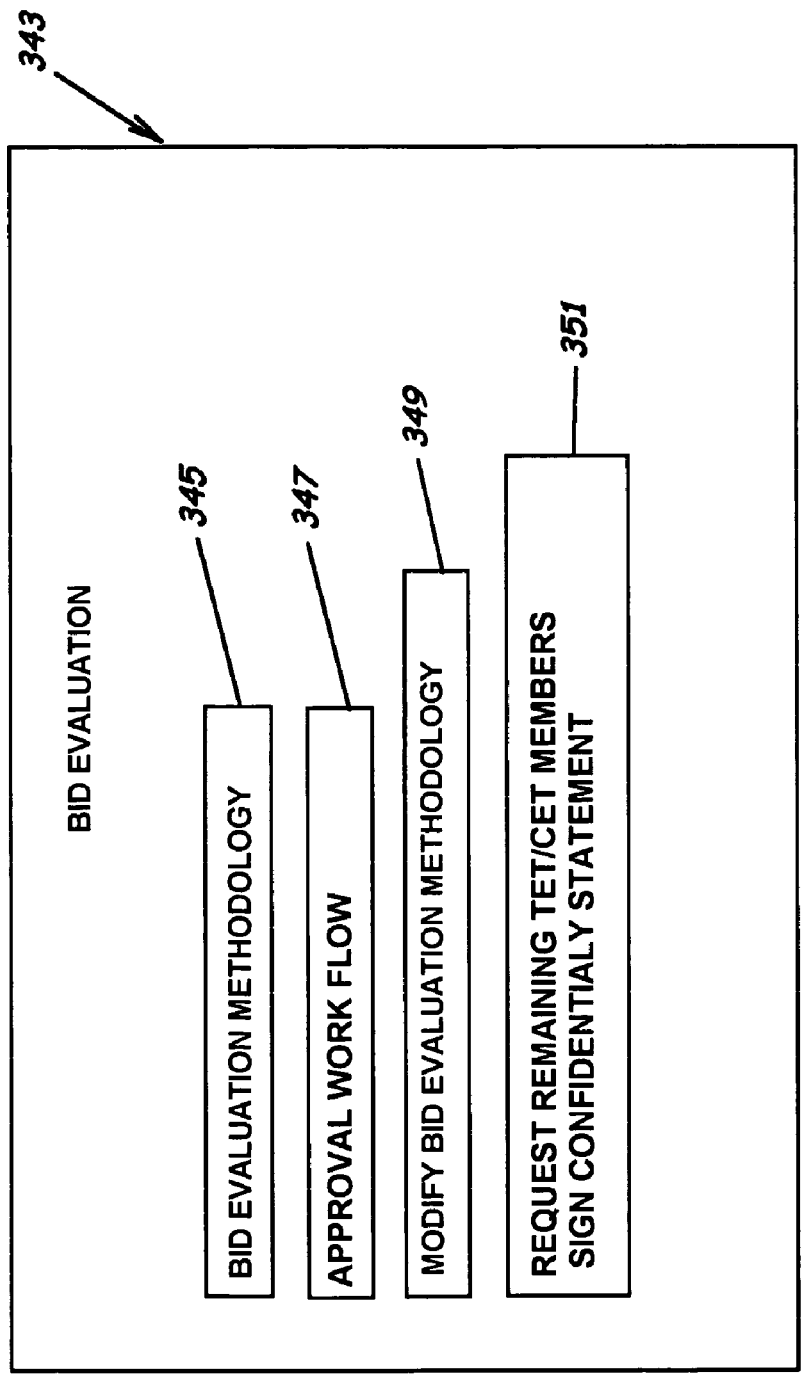
FIG. 25 is a schematic diagram of a bid evaluation web page used to facilitate contract procurement and contract management over a computer network according to an embodiment of the present invention.

Embodiments of the system 30 can also include various functions related to particular phases of the bidding process, i.e., pre-bidding, bidding, and post-bidding. As shown in FIG. 3A, with respect to pre-bidding functions, the electronic contracting program product 71 can also include a bid evaluation manager 341 which provides a bid evaluation web page 343 (FIG. 25). The bid evaluation manager 341 can preferably be accessed by the contracting representative through selection of the "bid review program" field of the pre-bidding functions drop-down menu in the main toolbar 157 (see FIG. 10C). The bid evaluation manager 341 can include input fields in the form of, for example, a "bid evaluation methodology" button 345 and "approval workflow" button 347, which allows the contracting representative to specify and upload the bid evaluation methodology/protocol and to program and route the evaluation methodology/protocol for approval by designated contracting entity bid evaluators who will be involved in the bid evaluation. The bid evaluation manager 341 can allow tailoring the approval workflow to include specific additional approval requirements for special cases in accordance with the contracting entity's business procedures.

The bid evaluation web page 343 can also include or otherwise display a "modify bid evaluation methodology" button 349, which accesses the bid evaluation manager 341 to update the bid evaluation methodology in response to lessons learned during the other pre-bidding phases. The bid evaluation web page 343 can further include a "request remaining TET/CET members to sign confidentiality statement" button 351, which can access the bid evaluation manager 341 to send automated alerts to those designated technical evaluation team members and commercial evaluation team members having not yet signed a confidentiality statement with respect to the contract procurement action associated with the respective contract room.

According to an embodiment of the system 30, satisfying the requirements of this function is a prerequisite for other functions such as, for example, submission of bid opening requests, and thus, incorporates built-in checks and controls. According to an embodiment of the system 30, if there is an attempt after the bid closing date to modify the bid evaluation methodology and/or approval workflow, collectively termed the "bid review program," the bid evaluation manager 341 will automatically require a different higher level of approval. Modifying the bid review program after the bid closing date can be considered highly sensitive as it may be construed as an attempt to skew the bid evaluation in favor of a particular bidder. Note, the bid closing date is generally the deadline for all bidders to drop their bids in the contracting entity's bid box.

Figure 26:
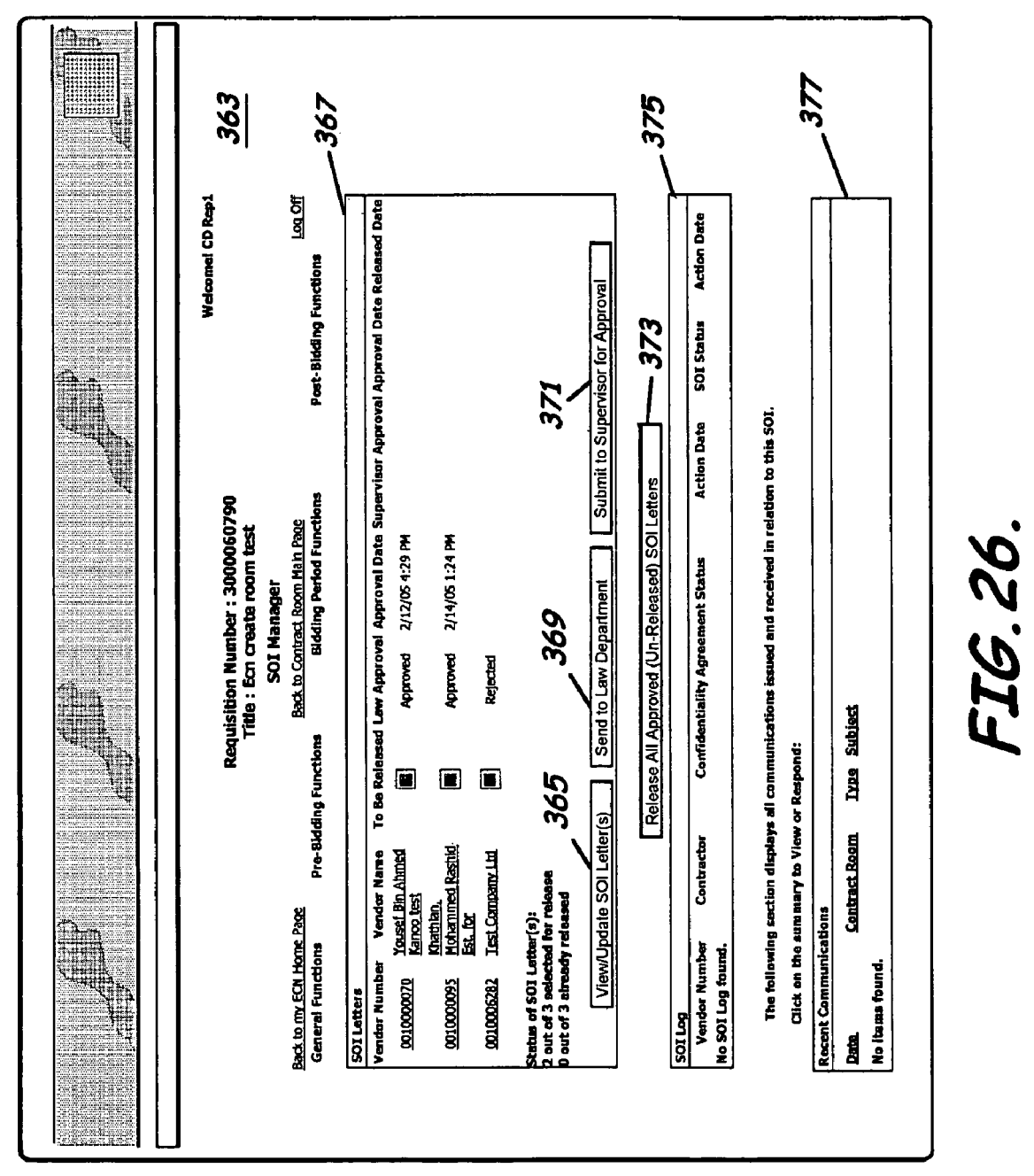

As shown in FIG. 3A, the electronic contracting program product 71 can also include a solicitation of interest manager 361 which manages the process of creating, approving, and issuing solicitation of interest letters to contractors under consideration, as well as the process of receiving contractor replies in response to the solicitation. The solicitation of interest manager 361 can preferably be accessed by the contracting representative through selection of the "SOI manager" field of the pre-bidding functions drop-down menu in the main toolbar 157 (see FIG. 10C). A solicitation of interest letter is, in general, an inquiry issued by the contracting entity to prospective bidders to determine their initial interest in a specific contract procurement action and/or to request specific information not provided in the contractor profiles. The solicitation of interest manager 361 can provide a solicitation of interest web page 363 (FIG. 26) including an input field such as, for example, a "view/update SOI letter(s)" button 365 which can provide the contracting representative access to select a solicitation of interests letter version from more than one standard template and can provide the ability to modify such template as appropriate. The solicitation of interest manager 361 can also provide the contracting representative an ability to apply such modification to either a single solicitation of interest letter destined for a particular contractor, a plurality of solicitation of interest letters, or all solicitation of interest letters that will be issued to all bidders. That is, the contracting representative can customize different solicitation of interest letters to the different prospective contractors by making the necessary changes in the main drafting text box then selecting an "apply" button (not shown) or other such input field preferably located next to the respective contractor for which that specific editing is applicable, or can provide identical solicitation of interest letters to the perspective contractors by selecting an "apply to all" button (not shown) or other such input field.

The solicitation of interest web page 363 can include the list of the potential contractors under consideration, preferably presented in a tabular form, e.g., a solicitation of interest table 367 that can include attributes such as: vendor number; contractor/vendor name; "to be released"; law approval; approval date; supervisor approval; approval date; and release date. The vendor number is an identification number of the contract as, e.g., provided by SAP, if the system 30 is so configured. The contractor name is the name assigned the contractor and is also preferably provided as a link to the full contractor profile, described previously, although other contractor attributes can be provided as such a link. The "to be released" column provides checkboxes which indicate the contracting representative's selection of the contractor to receive an assigned solicitation of interest letter. The "law approval" column can indicate whether a department within the contracting entity such as, for example, the entity legal department has reviewed and approved the solicitation of interest letter to the respective contractor under consideration. Such indication can be provided as either a blank indicating it has not yet been reviewed, or an "approved," or "rejected," to indicate the respective rating.

An input field such as, for example, the "send to law department" button 369, can initiate such approval process with the legal department. The adjacent "approval date" column can indicate the date of approval by the legal department. The "supervisor approval" column can indicate whether a supervisor has reviewed and approved the solicitation of interest letter for the respective contractor under consideration. Such indication is also provided as either a blank indicating it has not yet been reviewed, or, e.g., an "approved," or "rejected," to indicate the respective rating. An input field such as, for example, the "submit to supervisor for approval" button 371, can initiate such approval process. The adjacent "approval date" column correspondingly can indicate the date of approval by the supervisor. The "date released" column can indicate the date of release of the recitation of interest letter to the respective approved contractor under consideration.

When the contracting representative submits approval to the supervisor, the solicitation of interest manager 361 sends a task to the contracting representative's supervisor for approval. According to an embodiment of the present invention, if the supervisor approves the solicitation of interest letter, the solicitation of interest manager 361 can provide or call an outstanding task alert manager 264 (see FIG. 3A) to provide an automated alert preferably across at least two channels, e.g., both by email, by fax, and/or by SMS message to each contractor under consideration. According to another embodiment of the present invention, such supervisory approval results in an alert being sent to the contracting representative who then can select an input field such as, for example, "release all approved (un-released) SOI letters" button 373 to positively release the solicitation of interest letters, as desired.

Regardless of the release methodology, according to the illustrated embodiment of the system 30, when each contractor attempts to access their respective solicitation of interest letter, if not previously completed, the solicitation of interest manager 361 presents the respective contractor with an online confidentiality agreement web page form (not shown) they must accept online. Once accepted, the contractor can view and/or download the respective solicitation of interest letter. Each respective contractor can either decide to accept, decline, or respond later. The decision by the contractor can be reported automatically to the contracting representative preferably through a solicitation of interest log table 375.

The solicitation of interest log table 375 can include attributes such as, for example, vendor number, contractor name, confidentiality agreement status and associated action date, and SOI status and associated action date. If the contractor chooses to respond later, the solicitation of interest manager 361 can begin sending that contractor automated reminders as the deadline approaches until the contractor either accepts or declines, or the deadline passes. As with the solicitation of interest table 367, the vendor number can be the identification number of the contract as provided by SAP, if the system 30 is so configured. The contractor name can be the name assigned the contractor, e.g., that listed in the contractor's contractor profile. The confidentiality agreement status can indicate whether the agreement has been accepted, declined, or selected to respond later, along with the date of such action. The SOI status can indicate whether the solicitation of interest letter has been viewed, and the associated action date can indicate the date of such viewing.

According to the preferred configuration, the solicitation of interest web page 363 includes a recent communications table 377, which can provide recent communications in a tabular form having attributes including, for example, date of the communication; contract room, type of communication, and subject of the communication which can act as a link to the respective communication message/web page. Note, if accessed directly from a contract room 153, the communications are preferably filtered to display only those communications related to the respective contract room.

As shown in FIG. 3A, the electronic contracting program product 71 can also include a contract value estimator 381 positioned to process a pending contract valuation request web page 383 (FIG. 27) when the bid slate includes less than a preselected number of potential contractors, to thereby provide to an estimate of the contract valuation to compare with bids submitted by the potential contractors included in the bid slate. The contract value estimator 381 can preferably be accessed by the contracting representative through, e.g., selection of the "company estimate" field of the pre-bidding functions drop-down menu in the main toolbar 157 (see FIG. 10C).

According to an embodiment of the present invention, the contracting entity has internal procedures, which require that an estimate be developed whenever there are less than, for example, three bidders. The logic behind such a requirement is that there requires a minimum number of bidders to provide a sufficiently competitive bid. When such minimum requirement is not met, an estimate should be developed for comparative purposes to compare with the proposed bids from the bidders on the bid slate. The estimates are preferably developed by two organizations who are designated by the contracting entity has authorized to develop estimates used to assess the reasonableness of bidder rates. This function is intended to automate the creation and processing of the forms that request the development of the contracting entity's contract valuation (company estimate) from the designated contracting entity affiliated organization. According to an embodiment of the system 30, a contract valuation request can be initiated through an input field such as, for example, the "request company estimate" button 385 or other such input field.

Figure 27:
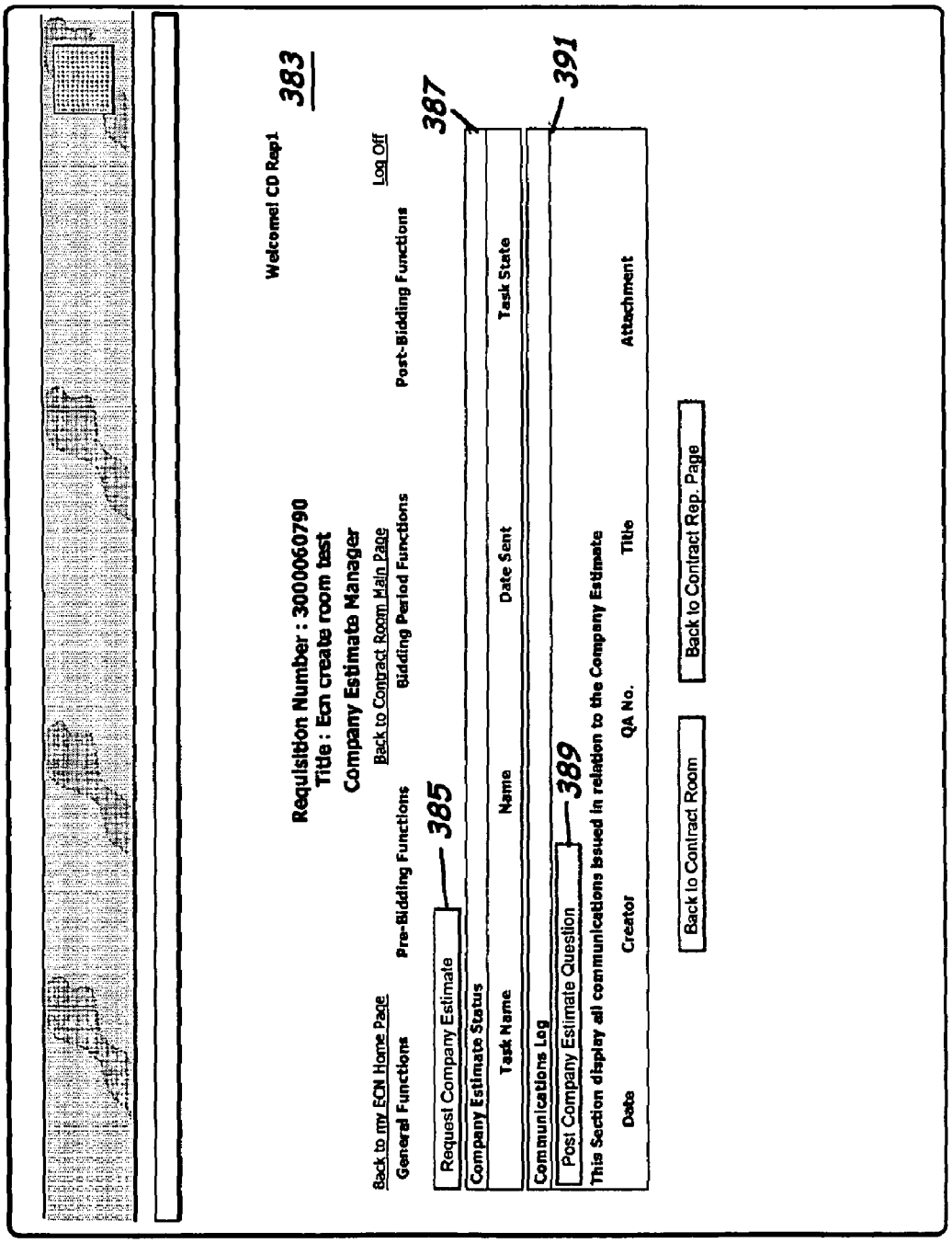
FIG. 27 is a schematic diagram of a pending contract valuation request web page used to facilitate contract procurement and contract management over a computer network according to an embodiment of the present invention.

The contract value estimator 381 also can include a follow-up feature with the estimators as well as with the contracting proponent representative. As such, the contract valuation request web page 383 can include a company estimate status table 387, which can display a task name, the name of the requestor or requestee, date sent, and task state or status. The contract valuation request web page 383 can also include a section that enables an assigned estimator to post questions to the contracting entity technical staff, e.g., via "post company estimate question" button 389, and receive their respective replies, and can save such dialogues for future reference and/or for audit trail requirements. As such, as shown in FIG. 27, the contract valuation request web page 383 can include a communications log table 391 which can include attributes such as, for example, date, question creator, question number, question title, and a link to any attachments.

Figure 28:
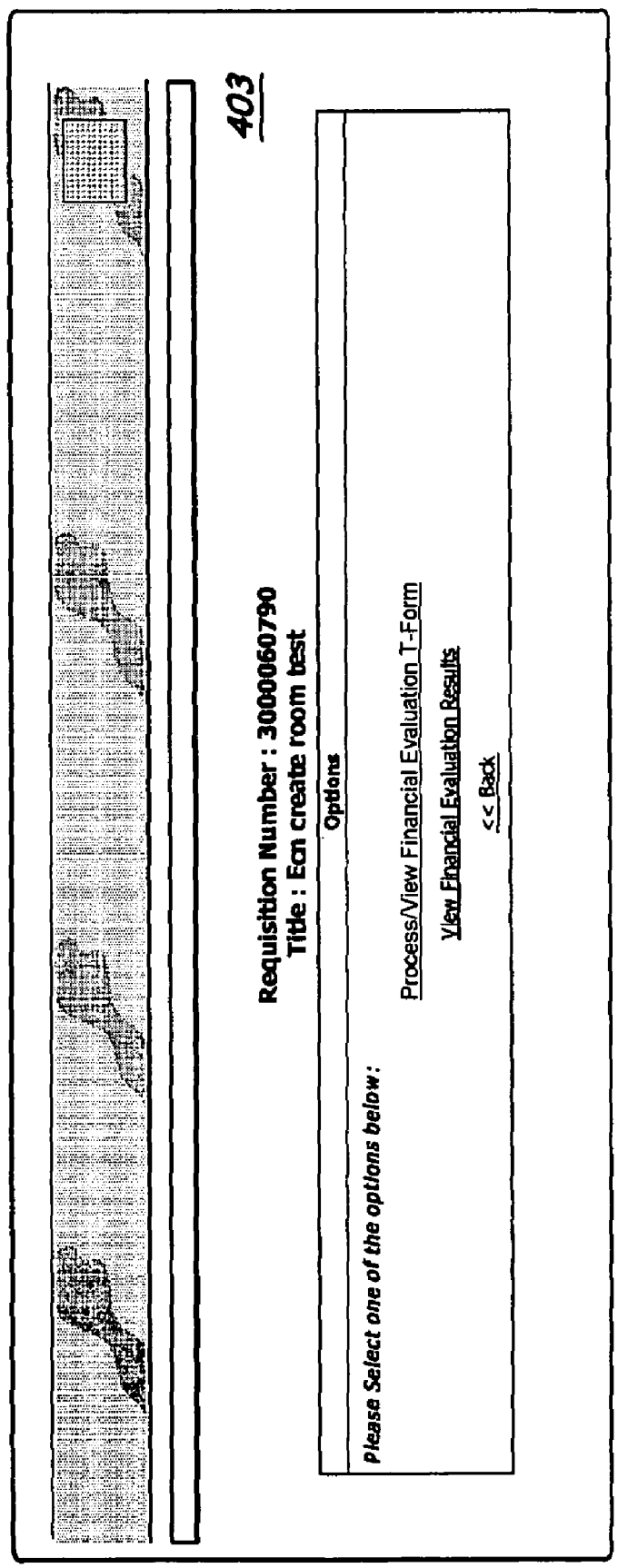
FIG. 28 is a schematic diagram of a viewing options web page used to facilitate contract procurement and contract management over a computer network according to an embodiment of the present invention.
Figures 29, 30:
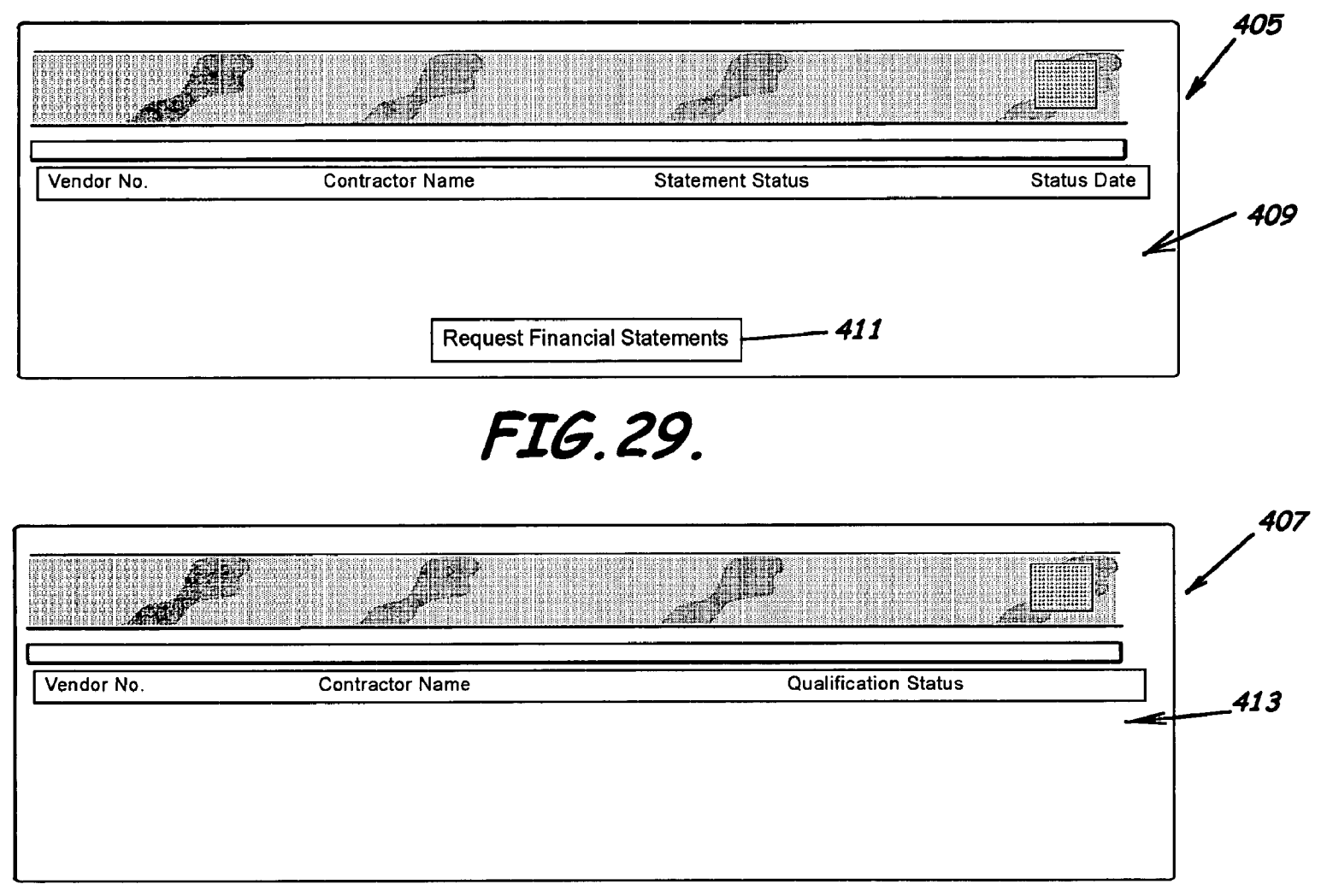

As shown in FIG. 3B, the electronic contracting program product 71 can also include a financial evaluation manager 401 which can manage processing a financial evaluation through a financial capabilities evaluation web page form 405 (FIG. 29) and which can display the financial evaluation results on a financial evaluation results web page 407 (FIG. 30). The financial evaluation manager 401 can preferably be accessed by the contracting representative through selection of, e.g., the "financial evaluation" field of the pre-bidding functions drop-down menu in the main toolbar 157 (see FIG. 10C) to display an options web page 403 (FIG. 28) which can further provide access to both the financial evaluation web page form 405 and the financial evaluation results web page 407.

Specifically, the financial evaluation manager 401 can allow the contracting representative to request the contracting entity's financial (treasurer) department or organization to evaluate the financial capabilities of contractors under consideration (potential bidders) by processing an online financial capabilities evaluation form 405, which advantageously can have most fields automatically pre-filled in. The financial capabilities evaluation web page form 405 can include a table 409 providing for each of the potential bidders a vendor number, contractor name, financial statement status, and status date. Upon receiving a contractor's latest financial statements, the financial statement status is preferably updated by the financial department directly into the financial information section of each respective contractor profile (see FIG. 6H). According to an embodiment of the system 30, the financial statements status indication includes either: not on file; on file; or expired. The "not on file" indication is preferably the default status until the financial statements are received by the financial department. The "on file" indication indicates if the financial department has current financial statements that have not reached their validity end date. The "expired" indication indicates that any financial statements received have reached their validity end date as defined by the contracting entity financial department.

The financial evaluation manager 401 can allow the contracting representative to view real-time the financial statement status displayed on the financial capabilities evaluation web page form 405 (FIG. 29) for each potential contractor, and can allow the contracting representative to initiate or otherwise trigger an automated request for updated financial statements for those contractors who do not have recent financial statements on file with the contracting entity's financial department. The financial capabilities evaluation web page form 405 can include an input field such as, for example, "request financial statements" button 411 selectable by the contracting representative. Such preferably "single-click" selection can initiate an automated request and follow-up preferably over redundant channels, e.g., e-mail, fax, and SMS message to such contractors, requesting they expedite the submittal of their latest financial statements to the contracting entity's financial department. Such automated follow-up alerts can be set within the financial evaluation manager 401 and/or through the outstanding task alert manager 264 to continue until the financial department receives the requested financial statements and indicates such in the respective contractor's profiles.

The financial evaluation manager 401 can, when the financial department is ready to submit the results of the respective contractor financial evaluation of the potential contractors back to the contracting representative, present the financial evaluators with a workflow to route the results for internal financial department approval, and once approved, post or otherwise display the results. The contracting department evaluators can access the financial capabilities evaluation form provided through the financial capabilities evaluation web page 405, and using, for example, a drop-down menu (not shown) or other input field selector, can assign each listed contractor an evaluation qualification for display in the respective contractors financial information section of the contractor profile (see FIG. 6H) and in a results table 413 in the financial evaluation results web page 407 (see FIG. 30).

According to an embodiment of the present invention, the qualification indicia can include one of the following: unconditionally qualified; conditionally qualified; not qualified due to contractor's current financial position; not qualified due to contractor's current financial capacity; and not evaluated. If the evaluator selected "conditionally qualified," the evaluator is provided the text entry field or drop-down menu selection to specify a reason for the conditional qualification such as, for example, that the contractor has indicated the existence of a bank guarantee or a parent company guarantee. If indicating a bank guarantee, the evaluator can be required to specify the amount of the bank guarantee required. If indicating a parent company guarantee, the evaluator can be required to specify the name of the contractor's parent company from which the guarantee is to be provided. The conditional qualification can also be based on limiting the number of requisitions to any one contractor. That is, if listed as "if not awarded requisition(s)," the evaluator can specify the number of other requisitions for the same contracting entity on which the contractor has been invited to bid and which requisitions, if awarded to such contractor, should result in the contractor not being awarded the contract related to the pending procurement action due to contractor limitations such as, for example, limitations in the contractor's financial capacity. The requirement to provide such data can be through a workflow tasking by the system 30 to the contracting representative in response to selection of such field.

As shown in FIG. 3B, the electronic contracting program product 71 can also include a functional review manager 417, which can manage the process of sending contract documents for review by different contracting entity departments such as, for example, the Law or Finance departments. All comments made by the reviewers can be tracked and all modifications can be automatically incorporated in a new document version. Moreover, the functional review manager 417 can provide a workflow progress report that allows the contract room participants to track the current status and document review of the contract document. The final contract documents can be used in an Invitation for Proposal (IFP), described next. The functional review manager 417 can, for example, be accessed by the contracting representative through selection of the "functional review" field of the pre-bidding functions drop-down menu in the main toolbar 157 (see FIG. 10C).

As shown in FIG. 3B, the electronic contracting program product 71 can also include an invitation for proposal manager 421 which manages the process of creating, approving, and issuing invitation for proposal letters and associated documents to potential contractors on, e.g., the approved bid slate, as well as the process of receiving contractor replies in response to the invitation. The invitation for proposal manager 421 can be accessed by the contracting representative through selection of the "IFP manager" field of the pre-bidding functions drop-down menu in the main toolbar 157 (see FIG. 10C). An invitation for proposal letter is typically a formal invitation issued by the contracting entity to each prospective bidder on the approved bid slate to request a bid proposal for the specific contract procurement action.

Figure 31:
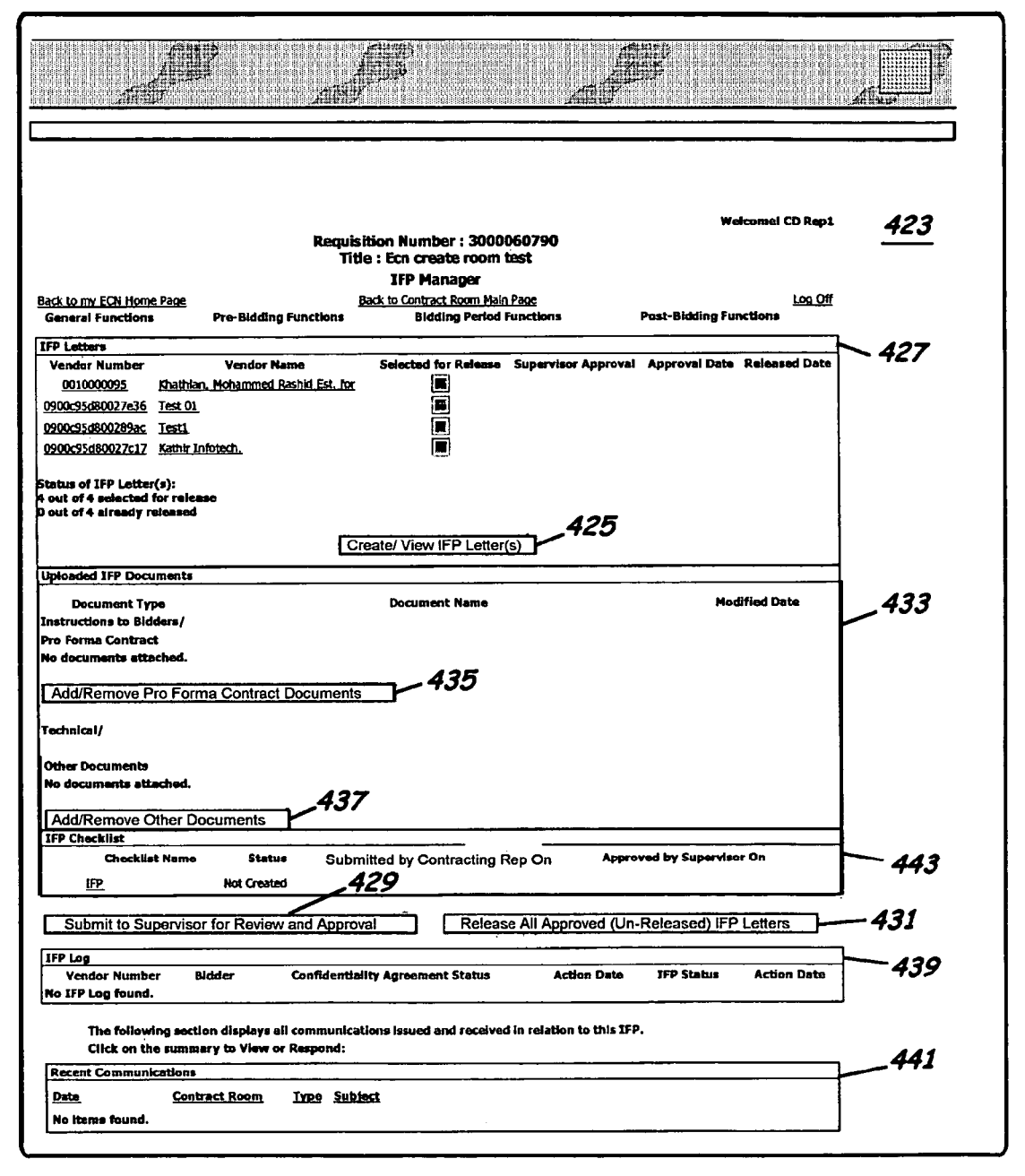

The invitation for proposal manager 421 can provide an invitation for proposal web page 423 (FIG. 31) including an input field such as, for example, a "create/view IFP letter(s)" button 425, which can provide the contracting representative access to a default invitation for proposal letter template and which can provide the ability to modify such template, as appropriate. The invitation for proposal manager 421 also can provide the contracting representative an ability to apply such modification to either a single invitation for proposal letter destined for a particular contractor, a plurality of invitation for proposal letters, or all invitation for proposal letters that will be issued to all bidders. That is, the contracting representative can customize different invitation for proposal letters to be provided to the different prospective bidders by making the necessary changes in the main drafting text box then selecting an "apply" button (not shown) or other such input field located, e.g., next to or otherwise adjacent the respective contractor for which that specific editing is applicable. The contracting representative can alternatively provide the identical invitation for proposal letters to the perspective bidders by selecting an "apply to all" button (not shown) or other such input field.

The invitation for proposal web page 423 can include the list of the potential bidders preferably presented in a tabular form such as, for example, a invitation for proposal IFP letters table 427 that includes attributes such as, for example: vendor number; contractor/vendor name; selected for release; supervisor approval; supervisor approval date; and release date. The vendor number is preferably the identification number of the contract, e.g., as that provided by SAP, if the system 30 is so configured. The contractor name is the name assigned the contractor and can be provided as a link to the full contractor profile, described previously. The "selected for release" column can provide checkboxes which indicate the contracting representative's selection of the contractor to receive an assigned invitation for proposal letter. The "supervisor approval" column can indicate whether a supervisor has reviewed and approved the invitation for proposal letter to the respective contractor under consideration. Such indication can also be provided as either a blank indicating it has not yet been reviewed, or an "approved," or "rejected," or such other indication thereof. An input field such as, for example, the "submit to supervisor for approval" button 429 can initiate such approval process. The adjacent "approval date" column correspondingly indicates the date of approval by the supervisor. The "date released" column indicates the date of release of the invitation for proposal letter to the respective prospective bidder.

When the contracting representative submits approval to the supervisor, the invitation for proposal manager 421 sends a task to the contracting representative's supervisor for approval. According to an embodiment of the present invention, if the supervisor approves the invitation for proposal letter, the invitation for proposal manager 421 can send or provide an automated alert across preferably at least two media, e.g., email, fax, and/or SMS messaging, to each prospective bidder. This alert can be generated through, for example, the outstanding task alert manager 264. According to another embodiment of the system 30, such supervisory approval results in an alert being sent to the contracting representative who then can select an input field such as, for example, "release all approved (un-released) IFP letters" button 431 to positively release the invitation for proposal letters, as desired.

Regardless of the release methodology, according to an embodiment of the system 30, when each contractor attempts to access their respective invitation for proposal letter, the invitation for proposal manager 421 can present the respective contractor, or otherwise cause to be presented, an online confidentiality agreement web page form (not shown) they must accept to proceed. Once accepted, the contractor can then be enabled to view the respective invitation for proposal letter along with invitation for proposal documents retrieved from the functional review manager, which can include: instructions to bidders; a pro form a contract; a pricing form; and other documents listed in, e.g., an uploaded IFP documents table 433, which preferably lists such documents by document type, document name, and date modified. Note, additional pro form a contract documents can be uploaded or removed through an input field such as, for example, the "add/remove pro form a contract documents" button 435. Additional other documents can be uploaded or removed through an input field such as, for example, the "add/remove other documents" button 437.

Each respective contractor can either decide to accept, decline, or respond later. The decision by the contractor can be reported automatically to the contracting representative through, e.g., an invitation for proposal log table 439. The invitation for proposal log table 439 can include attributes such as, for example: vendor number; bidder name; confidentiality agreement status and associated action date; and IFP status and associated action date. If the contractor chooses to respond later, the invitation for proposal manager 421 can directly or indirectly through other functions, begin sending that contractor automated reminders as the deadline approaches until the contractor either accepts or declines, or the deadline passes. As with the invitation for proposal table 427, the vendor number is preferably the identification number of the contract, e.g., as provided by SAP, if the system 30 is so configured; and the bidder name is preferably the name assigned the contractor. The confidentiality agreement status can indicate whether the agreement has been accepted, declined, or selected to respond later, along with the date of such action. The IFP status can indicate whether the invitation for proposal letter has been viewed and the associated action date can indicate the date of such viewing.

According to the preferred configuration, the invitation for proposal web page 423 includes a recent communications table 441 which can provide recent communications in a tabular form preferably having attributes such as, for example: date of the communication; contract room; type of communication; and subject of the communication, which can act as a link to the respective communication message/web page. Note, if accessed directly from a contract room, the communications are preferably filtered to display only those communications related to the respective contract room. The invitation for proposal web page 423 can also include an IFP checklist table 443, which includes, for example, the checklist name, status, date submitted by contracting representative, and date approved by supervisor.

Embodiments of the system 30 can also include various functions related to bidding period functions. Bidding period functions are generally those that occur after the invitation for proposal documents are released and those that occur up to the bid closing date. As shown in FIG. 3B, the electronic contracting program product 71 can include a job explanation meeting manager 451, which can provide a job explanation meeting/site visit web page 453 (FIG. 32). The web page 453 can include various fields including user selectable date, time, and meeting location entry fields; along with input fields to access, save and print job explanation meeting attendance sheets, save completed attendance sheets, upload attendance documentation, and manage site visit security documentation, described below. The job explanation meeting manager 451 can be accessed, for example, by the contracting representative through selection of the "job explanation meeting/site visit" field of the bidding period functions drop-down menu in the main toolbar 157 (see FIG. 10D).

According to an embodiment of the system 30, responsive to input from the contracting representative, the job explanation meeting manager 451 can automatically generate attendance sheets for the job explanation meeting (JEM) and site visit to be attended by the approved bidders. The job explanation meeting/site visit web page 453 can include an input field such as, for example, a "JEM presentation template(s)" drop-down menu 455 and selection button 457 which can provide the contracting representative access to default job explanation meeting templates; and can provide the ability to modify and save such template, as appropriate, via an input field such as, for example, the "save/print attendance sheet" button 459. The job explanation meeting manager 451 can also interface with either the bidders list former/manager 271 and/or the bid slate manager 291 to thereby automatically list the names of the companies included in the approved bid slate in the job explanation meeting and site visit attendance sheets (not shown).

The job explanation meeting/site visit web page 453 can also include an input field such as, for example, the "important instructions to contracting and contracting proponent representatives" button 461, which can access the job explanation meeting manager 451 to display important instructions and standard templates for job explanation meeting presentations/briefings. At the beginning of the bidding period, in what can be described as a job explanation meeting, the contracting and proponent representatives can provide the approved bidders a presentation about the contract services required under the procurement action along with bidding instructions and other information. In order to improve the quality of the job explanation meeting, as well as to ensure that certain standard information that is important to the contracting entity is effectively communicated, templates for job explanation meeting presentations in, e.g., power point or other formats, can be made available through the job explanation meeting manager 451. After reviewing the instructions, and depending upon the type of contract being procured, as described above, the contracting representative can select an appropriate template from the drop down menu 455.

The job explanation meeting/site visit web page 453 can include an "upload scanned attendance sheet" link 463 to allow the contracting representative to upload completed attendance sheets. That is, after conducting the job explanation meeting and site visit and obtaining the signatures of the contractor representatives in attendance, the contracting representative can save or otherwise store the attendance sheets in the database 41 and associate such attendance sheets with the respective contract room by uploading scanned copies of them in a system designated location which can be proscribed within the job explanation meeting manager 451. Note, rather than require the contracting representative or other user to select a file location to store various documents associated with the contract room and/or contractor profiles, the system 30 can include a data location selector 464 (see FIG. 3C) separately or as part of the various described functions, which can store or otherwise cause the uploaded documents to be stored in a system-selected location in the database 41.

According to an embodiment of the system 30, the contracting entity may assign responsibility to the contracting representative to record the job explanation meeting for documentary purposes. Thus, advantageously, the job explanation meeting/site visit web page 453 can include an "upload recording" link 465 to allow the contracting representative to upload a job explanation meeting audio recording or for other type of recording preferably made using a digital recorder. That is, after conducting the job explanation meeting and site visit and recording the meeting, the contracting representative can save or otherwise store the recording in the database 41 and can associate such recording with the respective contract room by uploading the recording in a system designated location which also can be proscribed within the job explanation meeting manager 451. Note, the job explanation meeting/site visit web page can display preferably in list form the filename and file size for each recording.

Typically, in conjunction with the job explanation meeting, a site visit is arranged by the contracting and proponent representatives to enable the bidders at the beginning of the bidding period to physically see the contracting entity site where the required work is to be performed. Some of these sites are within a restricted area that requires a specific security pass permit to be requested and approved. Various non-automated approaches have included requiring each of the approved bidders to fax the names and identification information for the representatives who will attend the site visit along with any other required identification documents. After receiving these separate faxes from all the bidders, the contracting entity proponent representative would complete a specific form to provide the required information and attach to that form the identification document copies. The form, in hardcopy, would then be routed for approval within the contracting entity proponent's department and within the contracting entity security department.

According to an embodiment of the system 30, advantageously as shown in FIG. 3B, the electronic contracting program product 71 can include a site security manager 471 which can interface with the job explanation meeting/site visit web page 453. The job explanation meeting/site visit web page 453 can include a site visit section 473 which can include user selectable date, time, and site location entry fields along with input fields to save and print site visit attendance sheets and save scanned completed attendance sheets, described below.

If a site visit for the respective contract procurement action is required to a site that requires a security permit, the contracting representative can "click" an input field such as, for example, the "request bidders to provide security permit information" button 475. Upon selecting the button 475, the site security manager 471 can cause an alert to be sent and each bidder will receive an alert, e.g., by email, fax, and SMS message, that requests them to provide the required information by completing the applicable section or sections before a selected due date. Each bidder can then access the site security manager 471 through the "Job Explanation Meeting/Site Visit" field of the bidding period functions drop-down menu in the main toolbar 157 (see FIG. 10D) in their respective view of the respective contract room. The site security manager 471 can provide a table for the respective bidder to provide online the names and requested data regarding for each designated representative and attach scanned copies of identification documents, as required. Those bidders who do not complete this requirement can periodically receive automated reminders as the due date approaches.

The proponent representative can open this function through the "Job Explanation Meeting/Site Visit" field of the bidding period functions drop-down menu in the main toolbar 157 (see FIG. 10D) in the representative's respective view of the respective contract room to view each required bidders' information accumulated, preferably in a single table (not shown), with the copy of the associated identification document or documents, e.g., government identification, attached to the corresponding listing. According to an embodiment of the system 30, after the due date, depending upon the location of the site visit, the proponent representative can select the appropriate security office to which the form should be sent. This can be accomplished through use of an input field such as, for example, a "sent for approval" button (not shown). This can result in sending the request for link thereto to the person with the approval authority and to the appropriate security department members who issue the temporary security passes, for example. Similar to the job explanation meeting manager function, the job explanation meeting/site visit web page 453 can also include an "upload scanned attendance sheet" link 477 to allow the contracting representative and/or contracting proponent representative to upload completed site visit attendance sheets.

As shown in FIG. 3B, the electronic contracting program product 71 can also include a bidder question and answer manager 481, which can manage the submission and processing of questions and any necessary attached documents submitted online by the bidders to the contracting entity. The bidder question and answer manager 481 can provide or present a bidder question and answer web page form (not shown) to each bidder to allow each respective bidder to submit bidding questions, as desired. The bidder question and answer manager 481 and associated web page form viewable by bidders can be accessed by each respective designated bidder through selection of the "bidders question and answers" field of the bidding period functions drop-down menu in the main toolbar 157 (see FIG. 10H).

In response to submission by a bidder, the bidder question and answer manager 481 can provide online notification of receipt of the question to the contracting representative and any other designated contracting entity members (participants), along with a link to such question via, e.g., a bidder question and answer web page 483 (see FIG. 33). The bidder question and answer web page 483 can provide the contracting representative an ability to review and monitor the status of pending bidder questions, issue the questions to the respective bidder or bidders, and access/review previously issued questions, described below. The bidder question and answer web page 483 can be accessed by the contracting representative through selection of the "bidders question and answers" field of the bidding period functions drop-down menu in the main toolbar 157 (see FIG. 10D).

According to an embodiment of the system 30, the bidder question and answer web page 483 can include a pending bidder questions section 485, which can include various attributes such as, for example: assigned question serial number; question and answer title; received date; required reviewer(s); review status; reviewer name; and an indication of whether an attachment exists, each preferably organized in tabular form. Each submitted question can advantageously be initially listed in the pending bidder questions section 485 as a convenient method of indicating the existence of each recently received question.

Note, according to the preferred embodiment of the system 30, once received, the bidder question and answer manager 481 assigns: a unique serial number in the form of a combination of the pre-assigned n-digit contract requisition number; "BQA" optionally to indicate the question is a bidder question and answer; contractor name abbreviation preferably as indicated in the respective contractor profile; and sequence number of the newly received question from the respective contractor. For example, 3000012345-BQA-TMN-006 indicates that the question is the $6^{th}$ question received from TMN regarding requisition 3000012345 through the bidder question and answer function. This can be an important feature as it can be used (displayed) to the requesting bidder to allow such bidder to conveniently manage information retrieval from the contracting entity and to allow convenient follow-up on their respective questions. This feature also allows the designated contracting entity participants to easily determine which bidder (contractor) is presenting such questions and, by noting the number of questions presented, allows the contracting entity participants to readily ascertain a potential lack of understanding by a specific bidder. Note, such unique serial number need not be presented to other bidders as it may disclose information about the requesting bidder that might cause apprehension in such bidder setting forth such question, inhibiting the free flow of communication between the bidders and the contracting entity. Rather, when presented to others, a new identification/serial number can be assigned, as described below.

Any of the designated contracting entity members can draft the answer to the question and attached documents. The contracting representative, who is preferably the chairman of the process, can release the questions to the requesting bidder or other bidders. The contracting representative also can be provided an ability to request review by other contracting entity departments such as, for example, the finance or the law departments. Correspondingly, the bidder question and answer web page 483 can include an input field such as, for example, the "send to functional review" button 487 to initiate such review. Additionally, as stated above, the pending bidder questions section 485 can display an indication of such required review or reviews along with the status of the review and identification of the reviewer. If one or more reviews are requested, the contracting representative can delay issue to the bidder or bidders of the answered question until such reviews are completed, as indicated, e.g., in the pending bidder questions section 485.

Those bidder questions and associated answers ready to be issued can be listed in, e.g., a "BQA ready to be issued to bidders" section 489 of the bidder question and answer web page 483. According to the preferred embodiment of the system 30, such questions are listed in tabular form and include the attributes of: the serial number; the question and answer title; received date; required reviewer(s); review status; reviewer name; and an indication of whether an attachment exists, as illustrated in the pending bidder questions section 485, preferably along with an "issue type" drop-down menu selection 491. That is, the bidder question and answer manager 481 can provide the contracting representative with a plurality of choices regarding the type of issue/release of the bidder questions and accompanying answers.

According to the preferred embodiment of the system 30, provided are three issue/release choices. The first is "public release" which, if selected, results in all approved bidders receiving the question and answer equally without the other bidders knowing the bidder who asked the question. When a question and answer is released as a public release, the bidder question and answer manager 487 can assign a new serial number to the question and answer which will be viewed by all bidders and which can be selected so that it does not provide an indication of the requesting bidder. For example, the serial number can be in a simple digit format (e.g. 121), indicating that the respective question and answer is the $121^{st}$ question and answer publicly responded to by the contracting entity, i.e., provided by the contracting entity to all designated bidders. The second choice is "private release," which, if selected, results in only the requesting bidder receiving the answer. The private release issue is useful in cases such as when the bidder asks a question that is specific to the respective bidder's unique circumstances. The third choice is "reject," which, if selected, results in the bidder asking the question receiving a notification that the contracting entity has rejected this question generally with a brief reason for the rejection, such as, for example, that the contracting entity believes the question to be unrelated to the current perspective contracting action being bid upon, or for other reasons, as desired.

Regardless of the issue type selected, the contracting representative can select an input field such as, for example, the "issue to bidders" button 493 to issue such bidder questions and answers. As shown in FIG. 33, the issued questions and answers can be displayed in tabular form in a "BQA issue to bidders" section 495 of the bidder question and answer web page 483, which can display, for example, the originally assigned question serial number, the question number, the question and answer title, the issue type, and issue date.

According to an embodiment of the system 30, the bidder question and answer web page 483 can also include an input field such as, for example, the "ask a question" button 497, which allows others, e.g., the designated contracting participants, to initiate a question and post such question, along with its answer, to the bidders. The bidders can find the contracting participants initiated questions and answers in the same form as the other bidder initiated questions and answers, preferably without any indication that such questions are initiated by the contracting entity rather than one of the bidders. Advantageously, this feature allows the contracting entity to clarify or draw the bidders' attention to certain information or requirements using a question and answer format, rather than requiring the contracting entity to supplement or addend the invitation for proposal.

Figure 34:
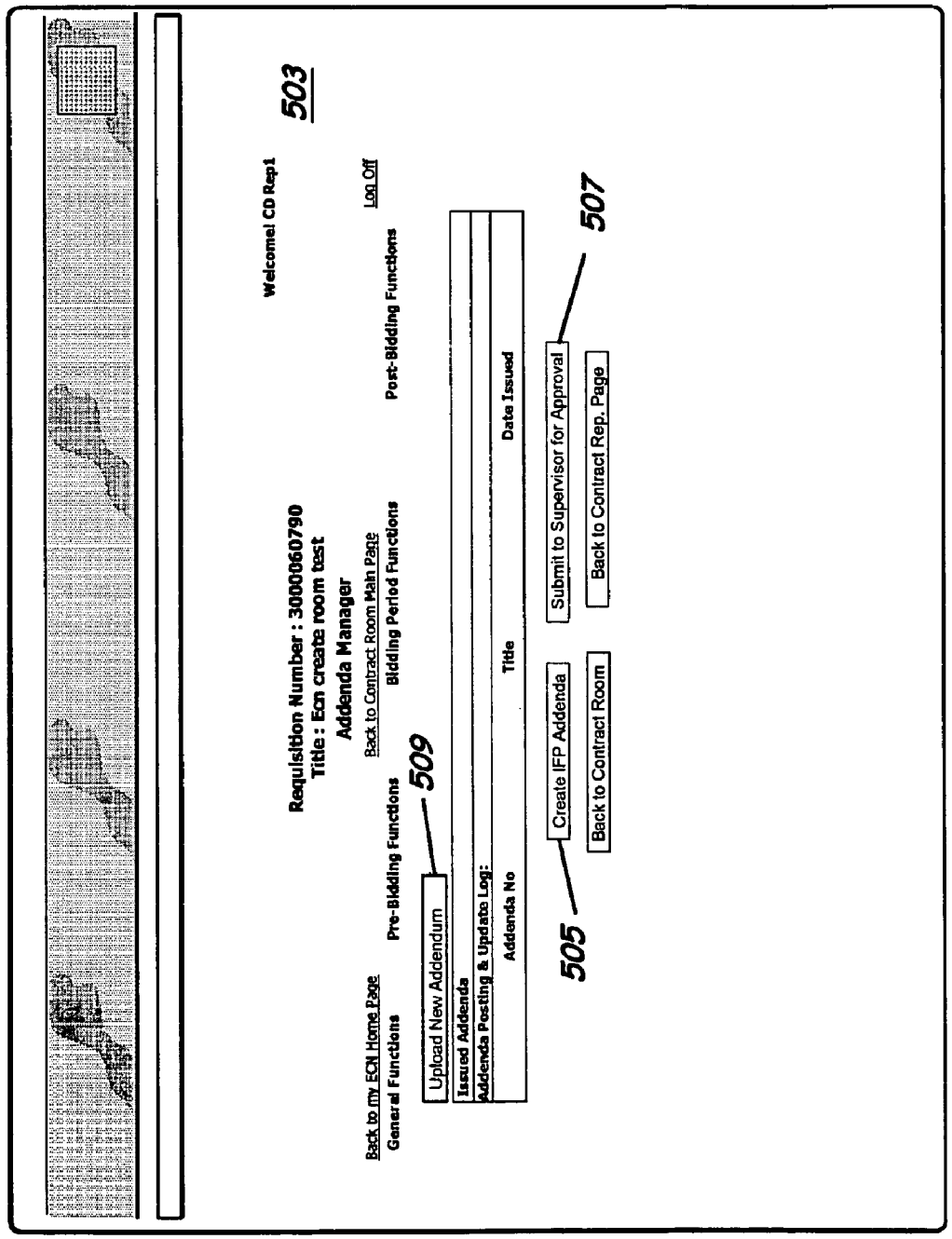
FIG. 34 is a schematic diagram of an invitation for proposal addenda web page used to facilitate contract procurement and contract management over a computer network according to an embodiment of the present invention.

As shown in FIG. 3B, the electronic contracting program product 71 can also include an invitation for proposal addenda manager 501, which, e.g., during the bidding period, manages the process of issuing addenda to invitation for proposal documents. The invitation for proposal addenda manager 501 can preferably be accessed by the contracting representative through selection of the "addenda" field of the bidding period functions drop-down menu in the main toolbar 157 (see FIG. 10D). Similar to the invitation for proposal manager 421, this function can allow either template or free-form drafting of addenda document. The invitation for proposal addenda manager 501 provides an invitation for proposal addenda web page 503 (FIG. 34) including an input field such as, for example, the "create IFP addenda" button 505, to form such invitation for proposal addenda. The contracting representative can also attach other supporting documents, if applicable. The contracting representative can also select the "submit to supervisor for approval" button 507 which, according to an embodiment of the system 30, can command or otherwise initiate the invitation for proposal addenda manager 501 to forward to the respective contracting representative's supervisor a task to approve the addendum.

The supervisor can be provided an entry field to make comments and to return access to the addendum to the contracting representative either approved or unapproved. If approved, the invitation for proposal addenda manager 501 can either automatically send or cause to be sent an alert, e.g., email, fax, and SMS message, to all bidders on the approved bid slate alerting them to the issuance of the addendum; or to send online notice to the contracting representative who, preferably through selection of the "upload new addendum" button 509, can then cause the addenda to be sent. Each bidder, by accessing the contract room and then the "addenda" field of the bidding period functions drop-down menu in the main toolbar 157 (see FIG. 10H), can view and/or download that addendum.

According to an embodiment of the system 30, similar to an embodiment described with respect to the invitation for proposal manager 421, the invitation for proposal addenda manager 501 can be linked to the functional review manager 417 such that when the draft addendum is electronically functionally reviewed then initially approved by the contracting representatives supervisor, a link to the addendum document is automatically created and listed by addenda number in a drop-down menu. Upon selecting the desired addendum number, a link or links to the related addendum document(s) that were approved in the functional review manager process can be displayed on computer display screen 53. After attaching any supporting documents, as described above, the contracting representative can then submit the proposed addenda to the supervisor for approval and issuance to the bidders on the bid slate.

Embodiments of the system 30 can also include various functions related to post-bidding functions. Post-bidding functions are generally those that occur after the designated bid closing date and prior to signing and final processing of the contract. As shown in FIG. 3B, the electronic contracting program product 71 can include a bid opening request manager 521 which manages the bid opening process, allowing the contracting representative to submit an online request to bid room personnel to open the bids after the bid closing date. According to an embodiment of the system 30, the "bid room" is generally a physical room in which bids submitted, typically in sealed envelopes, are opened by assigned individuals such as, for example, a bid room custodian. The bid room members preferably include: a bid room custodian, i.e., a contracting entity employee permanently assigned by the contracting entity to coordinate bid room activities; a contracting representative who is preferably randomly selected on a daily basis; and a finance representative who also preferably changes on a daily basis.

Figure 10E:
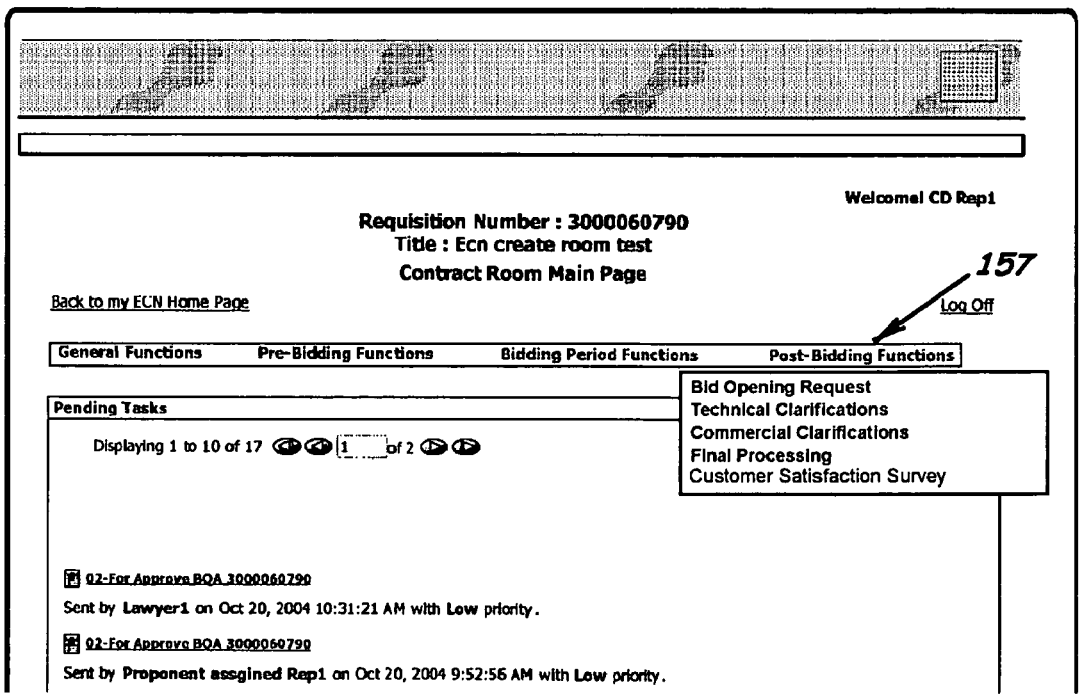

The bid opening request manager 521 can provide a bid opening request web page 523 (FIGS. 35A-B) which can preferably be accessed by the contracting representative through selection of the "bid opening request" field of the post-bidding functions drop-down menu in the main toolbar 157 (see FIG. 10E). The bid opening request web page 523 can include: a details section 525; requested action section 527; estimated hypothetical quantities section 529; contracting representative remarks section 531; list of bidders section 533; company estimate section 535; and approvals section 537. The details section 525 can include fields such as, for example, a user selectable take action date, requisition number and title of the affected contract, and procurement method, which allows the contracting representative to provide detailed information about the requisition under which bid reopening is being requested. The details section 525 can also include a related requisitions input box and selector button to indicate requisitions related to the requisition under consideration.

The requested action section 527 can include input fields, e.g., checkboxes, to indicate various actions including: forwarding estimated quantities; forwarding technical proposals; forwarding commercial proposals either as listed or according to some other specified criteria such as, for example, the ten lowest bidders; and an expected contract action amount, e.g., $300,000 or less, or over $300,000. The estimated hypothetical quantities section 529 can include input fields, e.g., checkboxes, which can be used to indicate whether or not hypothetical quantities have been approved, not yet approved, or not required. The contracting representative remarks section 531 preferably includes a free-form text input field, which can include reasons for opening the bidding along with a listing of commercial proposals.

The list of bidders section 533 can include a table of the entry fields having attributes including: number; vendor number; contractor name; commercial registration number; warnings; financial qualification; whether to open/not open bidding for the respective contractor; and remarks. The number column can indicate the number on the list. The vendor number can be the number assigned by SAP, if so configured. The contractor name can be the name, e.g., as shown in the contractor profile section and/or one of the contact names. The warnings can include those warnings that may exist on any of the bidders and can be proactively presented rather than requiring active selection by the contracting representative to request such information. Advantageously, this ensures that the contracting representative and the contracting representative's supervisor or other authorized contracting entity participants are made aware of any negative developments on any of the bidders prior to proceeding with requesting bid opening. The financial qualification is the qualification, for example, as listed in the contractor profile. The open/not open column can include either a text entry field or, more preferably, a drop-down menu which allows the contracting representative to indicate either "open bid" or "do not open bid" for the respective bidder. The remarks in the table can be remarks that affect the individual listed bidder rather than remarks affecting the entire request.

The company estimate section 535 can include input fields, e.g., checkboxes, which indicate whether a company estimate is required, not required, or waived. The waiver option preferably cannot be selected if no waiver is has been previously uploaded. The approvals section 537 can include attributes such as, for example, reviewer name, reviewer role, date received, date finished, action taken, and comments.

The bid opening request web page form 523 can also include an entry field, e.g., "submit" link 539, or other type of user-selectable field, which can initiate through, for example, the bid opening request manager 521, a workflow that obtains the contracting representative's supervisor's approval and then forwards the request to the bid room custodian. In addition, the bid opening request manager 521 can automatically forward the request to a higher level of approval prior to forwarding it to the bid room custodian, responsive to any of the bidders having certain preselected types of warnings that are considered the most serious. The results of such workflow can be displayed in the approvals section 537. According to the illustrated embodiment of the system 30, when the bid room personnel complete the bid opening process, the bid room custodian enters on a bid opening processing web page (not shown) the status of each bid as to whether it was received and opened. Each of the bid room personnel electronically sign the status summary by entering a respective user id and password.

As shown in FIG. 3B, the electronic contracting program product 71 can include a technical clarifications manager 541, which manages processing technical clarification questions. This function can advantageously be used during the process of evaluating bidder technical proposals by enabling each contracting entity member of a technical evaluation team to prepare a technical clarification question (TCQ), attach illustrations and other documents, if necessary, and select which bidder or bidders should receive the technical clarification question using a technical clarification web page form (not shown) available to the technical clarification team members. The team member who drafted the question can either choose to save the question and return to completing it later, or submit the question to the contracting representative for review and release to one or more of the bidders.

According to an embodiment of the system 30, if saved as a draft, the technical clarification question can be categorized as "draft technical clarification questions." These questions are preferably displayed on a technical clarification questions web page 543 (see FIG. 36) in a draft questions section 544 preferably having a tabular form and having: bidder; TCQ title; attachment; and date and time columns, respectively. The "TCQ title" preferably includes an associated link to open the technical clarification.

If submitted to the contracting representative, the technical clarification question can be listed in or moved to a pending questions section 545 also preferably having a tabular form and including the same or similar columns as that of the draft questions section 544. Further, once submitted to the contracting representative, the technical clarifications manager 541 can provide, and the contracting representative can receive, a task generally including an associated link, to review the proposed technical clarification question. The contracting representative can decide to either issue the technical clarification question, as is, modify and then issue the technical clarification question, or reject the proposed technical clarification question. If selected to issue, the technical clarifications manager 541 can move the technical clarification question to an issued questions section 546. If rejected, the technical clarifications manager 541 can move the technical clarification question to the rejected questions section 547.

The issued questions section 546 can be provided in tabular form and can include: bidder; TCQ number; TCQ title; attachment; and date and time columns, with the TCQ title providing a link to view the issued question. The technical clarifications manager 541 can assign each issued question a unique technical clarification question serial number, which is then listed under the TCQ number column. According to the illustrated embodiment of the system 30, a unique serial number can include: the associated requisition number; TCQ; bidder name abbreviation; and question sequence number. The technical clarifications manager 541 can also send or cause to be sent an alert, e.g., email, fax, and/or SMS message, to the bidder or bidders to whom the technical clarification question was addressed. The receiving bidder or bidders can enter their response online, attach documents, if necessary, and submit their answer back to the contracting entity.

Upon receipt of the bidder's submission, the technical clarifications manager 541 will automatically initiate an online notification, e.g., e-mail, to each member on the technical evaluation team, such as, for example, those listed as such through the contracting entity participant manager 251. The email can provide each member with a link that will enable the respective member to view the technical clarification question and the bidder's answer. The technical clarifications manager 541 can also move or cause the answered question to appear within the answered technical clarification questions section 548.

The contracting representative can review each stage of the processing of the technical clarification questions by viewing the technical clarification questions web page 543, which can, for example, be accessed by the contracting representative through selection of the "technical clarifications" field of the post-bidding functions drop-down menu in the main toolbar 157 (see FIG. 10E), and directly through a link provided in an online notification, if so provided.

As shown in FIG. 3B, the electronic contracting program product 71 can include a commercial clarifications manager 551, which manages processing commercial clarification questions. Similar to the technical clarifications manager 541, this function can advantageously be used during the process of evaluating bidder commercial proposals by enabling each contracting entity member of a commercial evaluation team to prepare a commercial clarification question (CCQ), attach illustrations and other documents, if necessary, and select which bidder or bidders should receive the commercial clarification question using a commercial clarification web page form (not shown) available to the commercial clarification team members. The team member who drafted the question can either choose to save the commercial clarification question and return to completing it later, or submit the commercial clarification question to the contracting representative for review and release to one or more of the bidders.

According to an embodiment of the system 30, if saved as a draft, the commercial clarification question can be categorized as "draft commercial clarification questions." These questions are preferably displayed on a commercial clarification questions web page 553 (see FIG. 37) in a draft questions section 555 preferably has a tabular form and has: bidder; CCQ title; attachment; and date and time columns, respectively. The "CCQ title" preferably includes an associated link to open the commercial clarification question. If submitted to the contracting representative, the commercial clarification question can be listed in or moved to a pending questions section 557 also, for example, having a tabular form and including the same or similar columns as that of the draft questions section 555. Further, once submitted to the contracting representative, the commercial clarifications manager 551 can provide, and the contracting representative can receive, a task generally including an associated link, to review the proposed commercial clarification question. The contracting representative can decide to either issue the commercial qualification question, as is, modify and then issue the commercial clarification question, or reject the proposed commercial clarification question. If selected to issue, the commercial clarifications manager 551 can move or cause the commercial clarification question to be moved to an issued questions section 559. If rejected, the commercial clarifications manager 551 can move or cause the commercial clarification question to be moved to a rejected questions section 561.

The issued questions section 559 is preferably provided in tabular form and includes: bidder; CCQ number; CCQ title; attachment; and date and time columns, with the CCQ title providing a link to view the issued question. The commercial clarifications manager 551 can assign each issued question a unique commercial clarification question serial number which is then listed under the CCQ number column. According to the preferred embodiment of the system 30, a unique serial number includes: the associated requisition number; CCQ; bidder name abbreviation; and question sequence number. The commercial clarifications manager 551 also can send or cause to be sent an alert, e.g., email, fax, and SMS message, to the bidder or bidders to whom the commercial clarification question was addressed. The receiving bidder or bidders can enter their response online, attach documents, if necessary, and submit their answer back to the contracting entity.

Upon receipt of the bidder's submission, the commercial clarifications manager 551 will automatically initiate an online notification, e.g., e-mail, to each member on the commercial evaluation team listed as such through the contracting entity participant manager 251. The email will preferably provide each member with a link that can enable the respective member to view the commercial clarification question and the bidder's answer. The commercial clarifications manager 551 can also move the answered question to appear within the answered commercial clarification questions section 563. The contracting representative can review each stage of the processing of the commercial clarification questions by viewing the commercial clarification questions web page 553, which can preferably be accessed by the contracting representative through selection of the "commercial clarifications" field of the post-bidding functions drop-down menu in the main toolbar 157 (see FIG. 10E), and directly through a link provided in an online notification, if so provided.

As shown in FIG. 3B, the electronic contracting program product 71 can include a final processing manager 571, which manages necessary workflow associated with those procedures generally required after completing the contract procurement process, signing the contract by all parties, and releasing the contract in SAP, if applicable. The final processing manager 571 can provide a final processing web page 573 (see FIG. 38), which can preferably be accessed by the contracting representative through selection of the "final processing" field of the post-bidding functions drop-down menu in the main toolbar 157 (see FIG. 10E), and which can include: a contract release section 575; an upload signed contract section 577; a notification to unsuccessful bidders section 579; a "DZIT" section 581; and a final processing checklist section 583.

The contract release section 575 can include fields including contract number, cost center, release status, name of releaser, and date of release. The upload signed contract section 577 can include fields including an assigned contract number text input field or drop-down menu 583 to identify the contract being uploaded and can include a checkbox 585 allowing the contracting representative to indicate whether it is a modification. The contracting representative can upload a scanned, preferably PDF version of the contract signed by all parties, which, after final processing is approved by the contracting representatives supervisor (described below), is automatically made available in a central (common) location to all authorized contracting entity users to view during administration of the contract. The notification to unsuccessful bidders section 579 preferably has fields including a drop-down menu 587, which enables the contracting representative to indicate which of the bidders was successful in obtaining award of the contract.

After final processing is approved by the contracting representative's supervisor, the final processing manager 571 can initiate sending, for example, a standard template message notifying the unsuccessful bidders of the contract award. Similar to the mechanism provided for creating and editing the solicitation of interest and invitation for proposal letters, an input field, such as, for example, the "create notification to unsuccessful bidders" button 589, can allow the contracting representative to access and modify the standard template, as desired. The DZIT section 581 can include a link 591 to upload a DZIT form and a link 593 to download a DZIT form.

The final processing checklist section 583 can include input fields having attributes including: checklist name; checklist status; date of submission by the contracting representative; and a date of approval by the contracting representative's supervisor. The checklist name can provide a user selectable link 597 to the final processing checklist form (not shown). Once the contracting representative completes each of the above final processing items, if applicable, the contracting representative can request a final processing approval through use of an input field such as, for example, the "request supervise the final processing approval" button 595. According to the preferred embodiment of the system 30, once approved by the supervisor, the final processing manager 571 can: make the signed contract available to all authorized users; send the notifications to the unsuccessful bidders; and close the contract room so that no more activities can take place within the contract room without an authorized person retrieving and reopening the contract room. Note, according to an embodiment of the system 30, the contract room will remain viewable in the contracting entity's active contract rooms listing for 30 days, thereafter, to allow the various documents associated with the procurement to be accessed and/or re-referenced as necessary in order to perform/administer the procured contract.

According to an embodiment of the system 30, as part of final processing, a customer satisfaction survey can be provided so that the proponent contracting representative (contracting department customer) can provide feedback on the service provided by the contracting department and the contracting representative in particular relative to the subject contract room 153. The survey (not shown) can include multiple-choice questions plus a comments section. The survey results can be tabulated into various results screens that analyze the proponent contracting representative satisfaction. The customer satisfaction survey can be accessed by the proponent contracting representative through, e.g., selection of the "customer satisfaction survey" field of the post-bidding functions drop-down menu in the main toolbar 157 (see FIG. 10E) or through a link provided in a final processing e-mail notification.

Figure 40B:
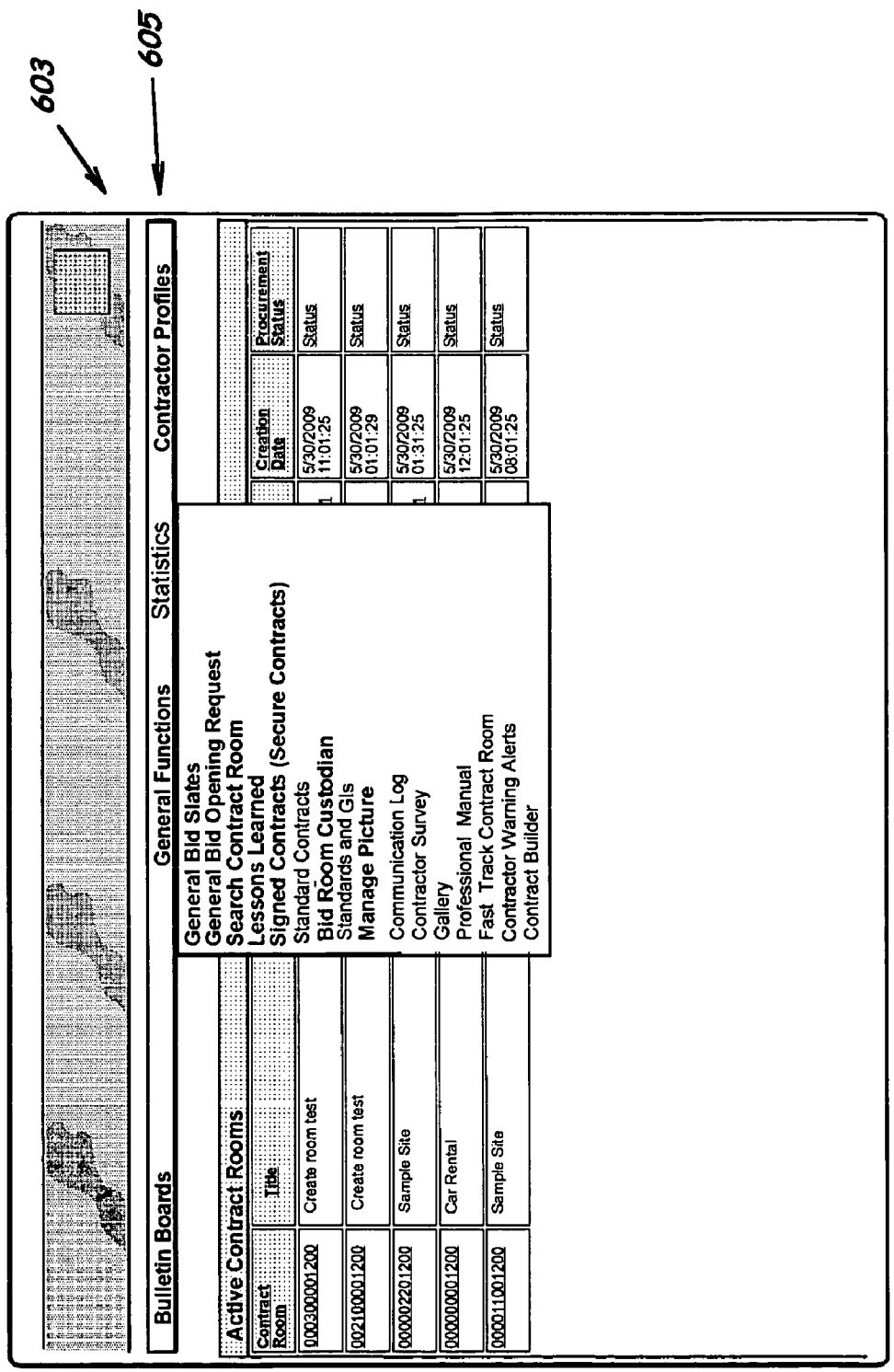
Figure 40C:
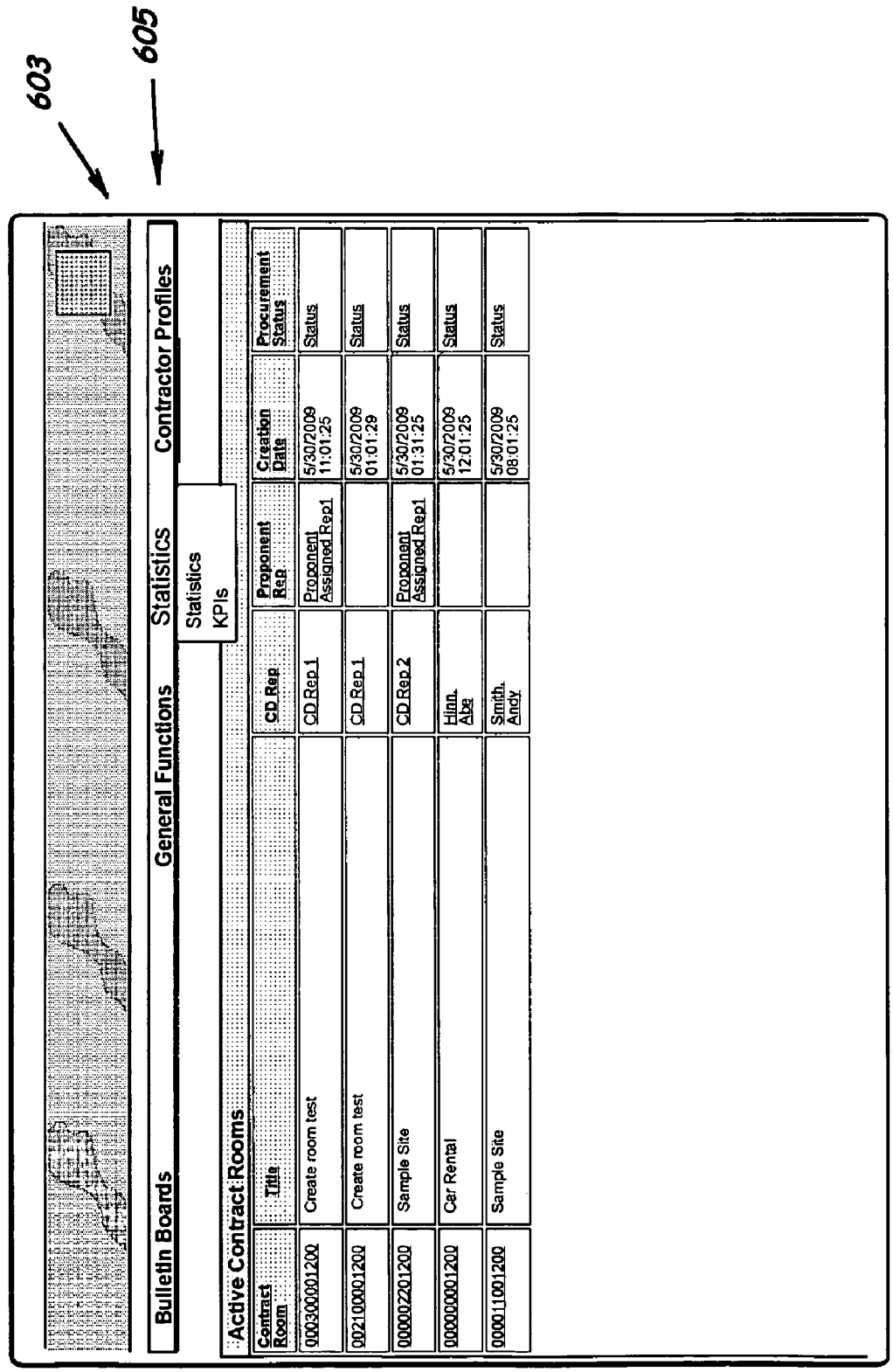
Figure 41:
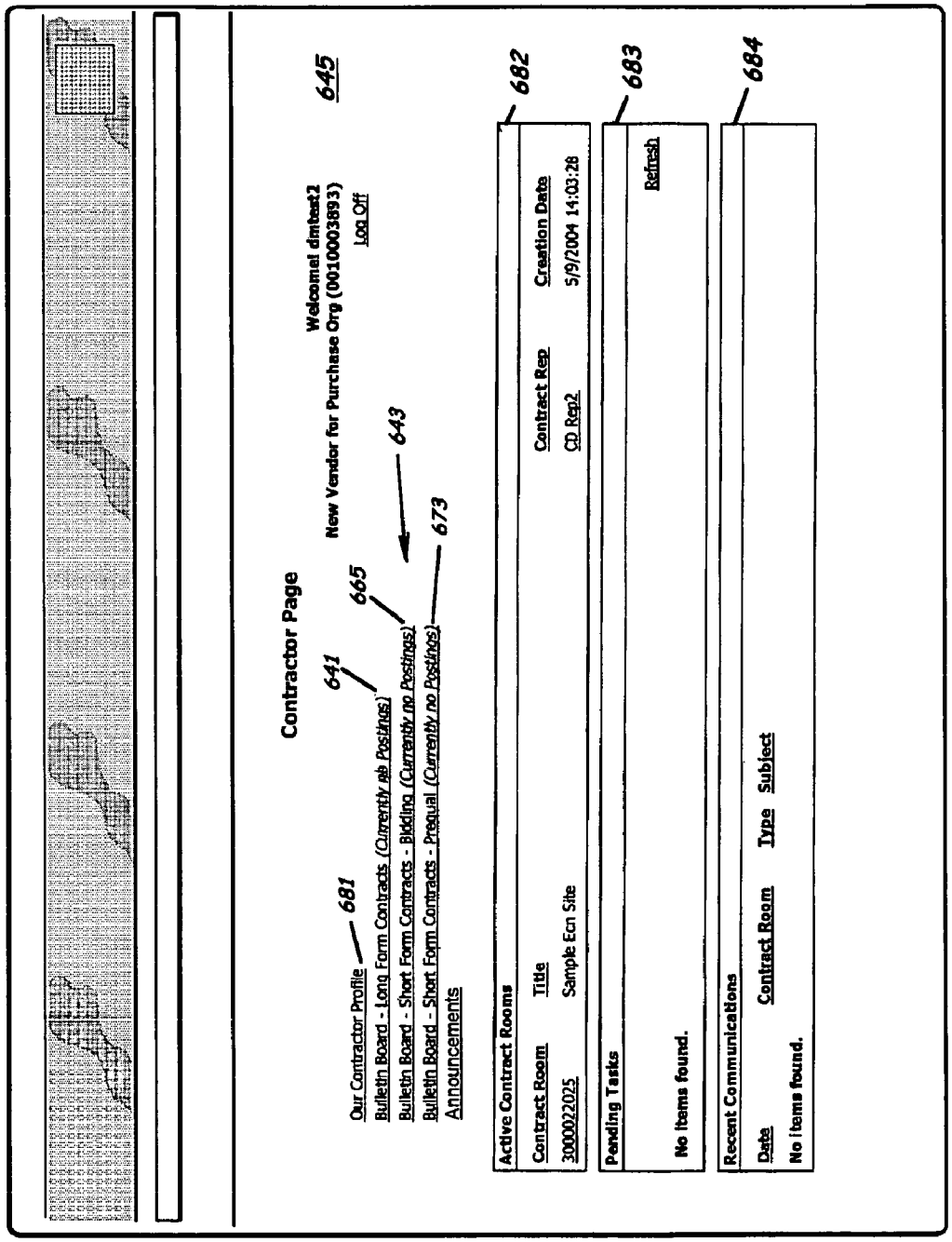
FIG. 41 is a schematic diagram of a contractor entity member home web page used to facilitate contract procurement and contract management over a computer network according to an embodiment of the present invention.
Figure 42:
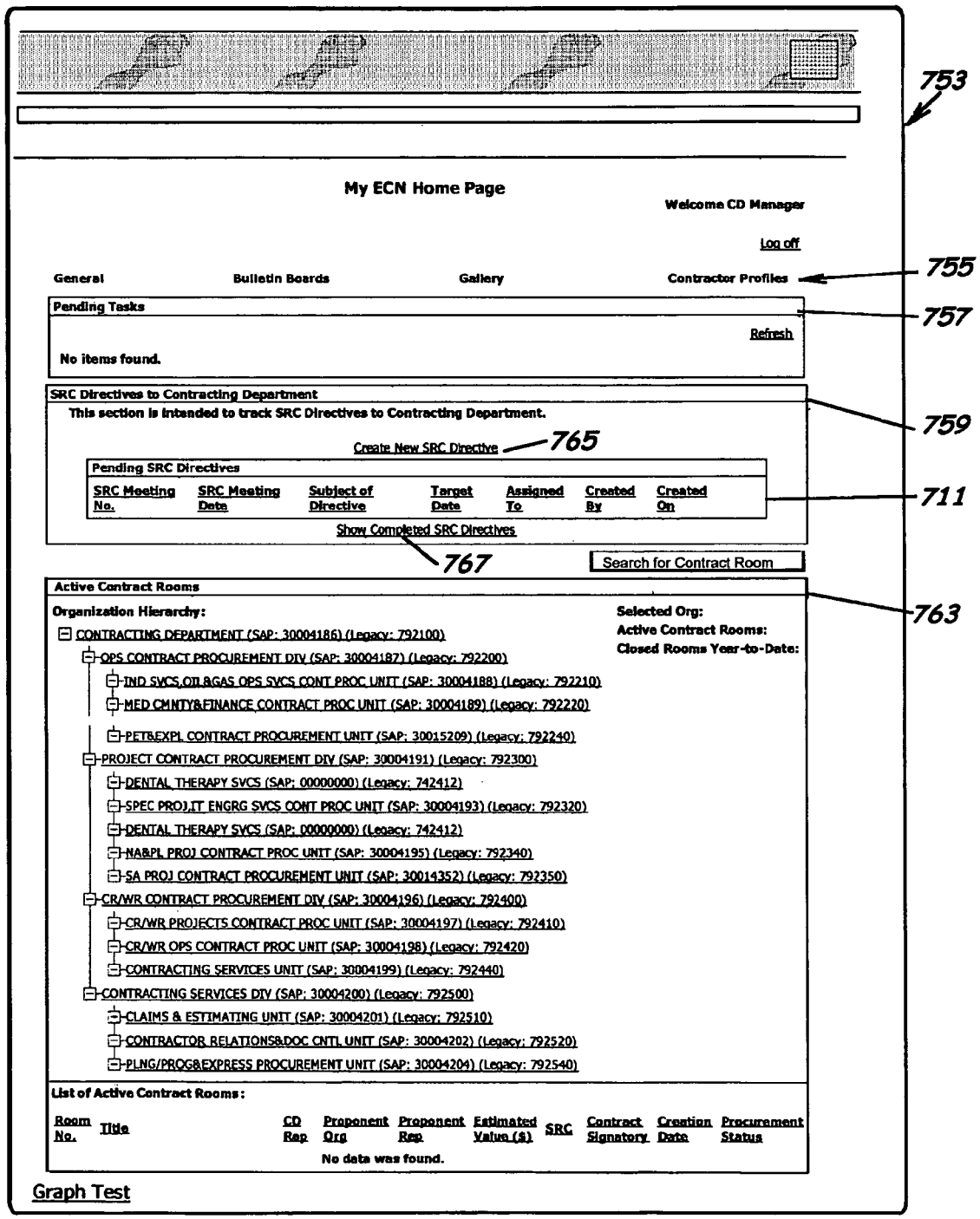
FIG. 42 is a schematic diagram of a contracting entity manager home web page used to facilitate contract procurement and contract management over a computer network according to an embodiment of the present invention.

As perhaps best shown in FIGS. 39-43B, the electronic contracting program product 71 can provide personalized homepages for each authorized contracting entity contracting representative (see FIG. 39), contracting entity contracting department managers (see FIG. 42), and each authorized contractor member user (see FIG. 41). Note, because the contracting representative generally has the most number of functions, the following description will focus on the contracting representative.

Figure 39:
FIG. 39 is a schematic diagram of a contracting entity member home web page used to facilitate contract procurement and contract management over a computer network according to an embodiment of the present invention.

As shown in FIG. 39, illustrating a contracting representative home web page 603, the personalized home pages for selected contracting entity members can include a toolbar such as, for example, toolbar 605, which can include various general functions, described later, preferably categorized, via a drop-down menu, as bulletin boards, general functions, statistics, and contractor profiles, which provide access to a subset of the various functions that differ from the other contracting entity members homepages depending upon the respective user's role authorizations. Also, each personalized contracting representative home page 603 can include an active contract rooms section 607, a pending tasks section 609, and a recent communications section 611. The active contract rooms section 607, displayed, for example, in tabular form, can include a list of active contract rooms 153 to which the user has access.

According to the illustrated embodiment of the system 30, the table 607 includes the following columns: contract room number; title; contracting representative; proponent representative; contract rooms creation date; and procurement status. The contract room number can be a purchase requisition number such as, for example, the assigned in SAP, if so configured, and can act as a link to the contract room, itself. The contract room creation date can be the date the purchase requisition was approved by both the contracting representative and the proponent representative. The names of the contracting and proponent representatives are preferably also links to a screen that displays the respective representatives picture (photograph) along with basic personnel information such as, for example, job title, office address, and telephone number.

Note, according to the preferred embodiment of the system 30, the proponent representative column is not displayed on the designated contractor member user personalized homepages because, according to the exemplary embodiment, the contracting representative is the primary point of communication between the contracting entity and the contractors under consideration. That is, direct contact during the procurement action with contracting entity members, other than the contracting representative assigned to a particular procurement action, is not promoted. The procurement status, described later, provides real-time summary data about the contract procurement status of the respective procurement action.

The pending tasks section 609 provides links to the respective user's currently pending tasks from all associated contract rooms and general functions in which the user is involved. Note, this is in contrast to the pending tasks section 159 inside each contract room which preferably provides only those user-associated tasks related to the respective contract room 153. Advantageously, this consolidated pending tasks section 609 allows the respective user to decide which of specific user's contract rooms and other general activities require immediate attention and allow for self-prioritization of the individual users workload.

The recent communications section 611 can provide links to all inbound and outbound communications that took place in each associated contract room and general functions in which the user is involved. This recent communications section 611, in contrast to the recent communications 161 inside each contract room, allows the user to monitor the contract rooms and general activities in which the user is involved without having to access each such contract room and activity.

As stated above and as shown in, for example, FIG. 39 illustrating a contracting representative home page 603, the personalized contracting representative home page 603 can include a toolbar 605 which can provide access to various general functions supported by the electronic contracting program product 71, available depending upon each user's role authorizations, with the contracting representative normally given access to the highest number of functions. For example, as shown in FIGS. 3C and 39, the electronic contracting program product 71 can include a bulletin board manager 620 which can provide access to various types of bulletin boards including those related to long form contracts, short form contracts for prequalification, and short form contracts for direct bidding. Long form contracts are generally classified as contracts whose estimated value exceeds a preselected threshold and meet other conditions set by the contracting entity. Short form contracts are generally classified as small value contracts that do not meet such preselected conditions. An advantage of separating long form contracts from short form contracts is that the contracting entity may have a large number of a short form contracts under procurement at any given point of time that do not require significant management attention. Therefore, including both types in the same bulletin board tends to unnecessarily clutter the board and can cause a reduction in management focus on the more economically significant contracts. Note, according to an embodiment of the present invention, the bulletin board manager 620 can include or otherwise encompass a long form contracts manager 621, a short form contracts for bidding manager 622, a short form contracts for prequalification manager 623, and a bulletin board communications manager 626.

The long form contracts, short form contracts for bidding, and short form contracts for prequalification, and bulletin board communications (announcements) functions 621, 622, 623, 626, are preferably accessible through selection of the "long form contracts," "short form contract-bidding," "short form contract-prequal," and "announcements" fields of the bulletin boards drop-down menu in the toolbar 605 (see FIG. 40A), respectively. Announcements can also be accessible through a marquee (not shown) that displays recent announcements.

Figure 44:
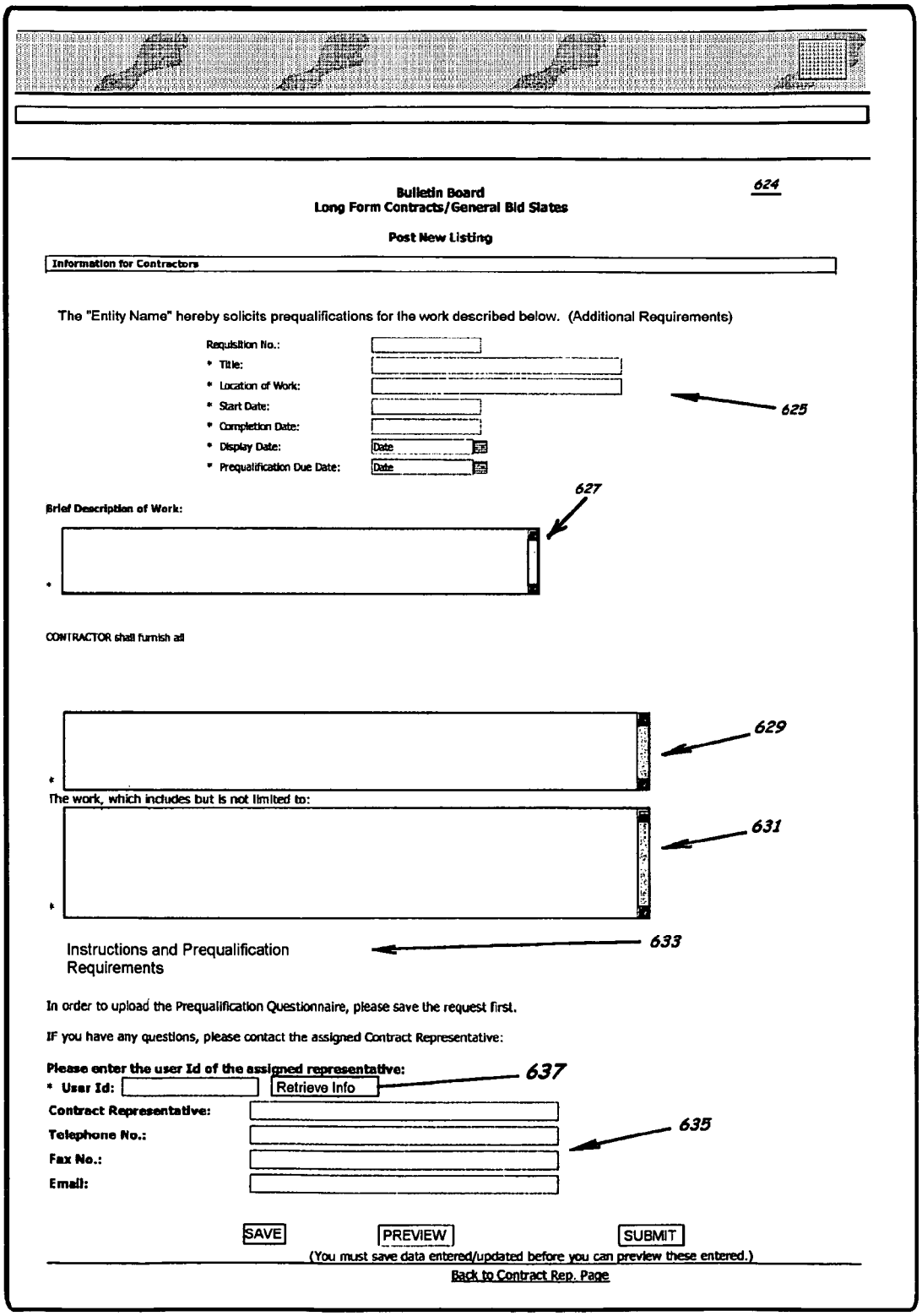
FIG. 44 is a schematic diagram of a long form contracts listing web page form used to facilitate contract procurement and contract management over a computer network according to an embodiment of the present invention.

Although the contractor profile searcher 131 can enable the contracting representative to identify potentially qualified contractors for specific contracts, a specific contract procurement action may be enhanced by gathering additional information through use of the long-form contracts function 621. This long form contracts function 621 automates the use of bulletin boards for certain types of preselected contract procurement actions, preferably providing a long-form contracts listing web page form 624 (FIG. 44), allowing a contracting representative to post open solicitations of interests and requests for prequalification information.

The long form contracts listing web page form 624 can include: an identification section 625; a work description section 627; a contractor requirements section 629; a specific work requirements section 631; a prequalification requirements section 633; and a contracting representative contact information section 635, most of which are fully editable by the contracting representative. The identification section 625 can provide an identification of the procurement action including: a requisition number, a title, a location of work, a start date, a completion date, a display date, and a prequalification due date, each preferably in the form of a text input field and/or drop-down menu item. The work description section 627 can include a text input field to provide a brief description of the work to be performed by the awarded contractor. The contractor requirements and specific work requirements sections 629, 631, can include text input fields to provide such requirements. The prequalification requirements section 633 can include prequalification requirements generic to most long-form contract bulletin board procurement actions. The contracting representative contact information section 635 can include information such as, for example, the contracting representative's name, telephone number, fax number, and e-mail, and can, for example, be entered through use of a "user id" text box and corresponding "retrieve info" button 637, which can automatically fill the respective fields.

Upon saving, uploading, and submitting the form 624 (prequalification questionnaire), the bulletin board manager 620 can forward a task to the contracting representative's supervisor who can review and approve/reject the proposed new listing. If approved, the bulletin board manager 620 can immediately post the listing. Correspondingly, the bulletin board manager 620 can automatically remove the listing at the end of the specified prequalification submission due date.

Figure 45:
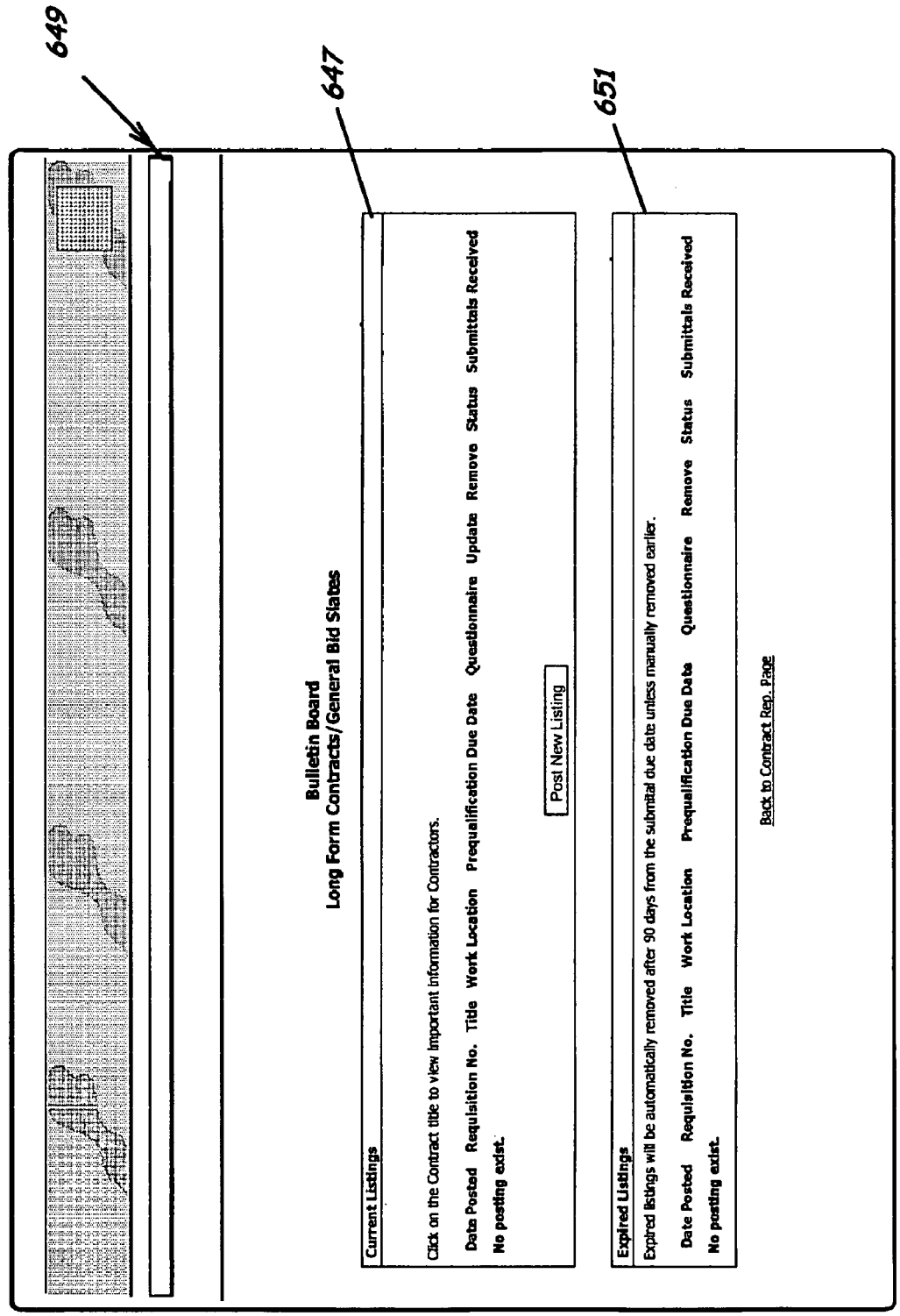
FIG. 45 is a schematic diagram of a long form contracts listing web page used to facilitate contract procurement and contract management over a computer network according to an embodiment of the present invention.

While the listing is posted, registered contractors, by, for example, accessing a hyperlink 641 associated with a bulletin boards section 643 of a respective contractor member home web page 645 (FIG. 41), can view each open listing, download the respective prequalification questionnaire, upload their completed prequalification document, and submit the document online to the contracting entity. According to the preferred embodiment of the system 30, when a registered contractor submits the prequalification document, the bulletin board manager 620 can cause the document to be stored in or otherwise be linked with the respective contractors profile and can provide a link to it in the related bulletin board listing, i.e., preferably in a current listing section 647 of a long form contracts/general bid slates web page 649 (FIG. 45), which is selectable to allow either download or online review. This link, along with additional attribute data including, e.g., the date posted, requisition number, title, work location, prequalification due date, questionnaire, status, number of submittals received, and update and remove fields, are preferably only displayed to the contracting entity's authorized users.

At the end of the prequalification submission due date or other preselected time, the long form contracts manager 621 can automatically move the listings from the current listings section 647 to an expired listings section 651 having similar attributes; where it can remain for a preselected time period, e.g., 90 days. After the preselected time period has expired, the listing can then be removed from the long form contracts/general bid slates web page 649 and archived. Note, although the prequalification submittal (listing) is typically prepared for the purpose of pre-qualifying potential contractors for one specific contract, the long form contracts function 621 can cause the received data to be stored in the respective contractor's profile to allow future contracting entity member users to benefit from this information.

The short form contracts for bidding function 622 is similar to the long form contracts function 621 except that it is used for openly solicit bids from registered contractors for short form contracts and can be used directly by the contracting entity's contracting proponent representatives with no need for contracting representative involvement given due to, for example, their low economic value. Using a short form contracts listing for bidding web page form 653 (see FIG. 46) a new listing can be proposed by a proponent representative, approved by the representative's superior, and then uploaded.

Similar to the long form contracts web page 624, the short form contracts listing for bidding web page form 653 can include: an identification section 655; work description section 657; a job explanation meeting section 659; and a contracting representative contact information section 661. The identification section 655 can provide an identification of the procurement action including: the requisition number; title; location of work; start date; completion date; display date; and bid closing date, each preferably in the form of a text input field and/or drop-down menu item. The work description section 657 can include text input field to provide a brief description of the work to be performed by the awarded contractor. The job explanation section 659 can include entry fields for a job explanation meeting date, meeting time, and meeting location. The contracting representative contact information section 661 can include information such as, for example, the contracting representative's name, telephone number, fax number, and e-mail, and can be entered through use of a "user id" text box and corresponding "retrieve info" button 663 which can automatically fill the respective fields.

Also similar to the long form contracts function 621, upon saving, uploading, and submitting the form 653, the short form contracts for bidding manager 622 can forward a task to the proponent representative's supervisor who can review and approve/reject the proposed new listing. If approved, the short form contracts for bidding manager 622 can immediately post the listing. Correspondingly, the short form contracts for bidding manager 622 can automatically remove or cause to be removed the listing at the end of the specified prequalification submission due date. While the listing is posted, registered contractors, by, for example, first accessing a hyperlink 665 associated with the bulletin boards section 643 of a respective contractor member home web page 645 (FIG. 41), can access the respective bulletin board to view each open listing, download any associated documents, and submit their bid online to the contracting entity.

Figure 47:
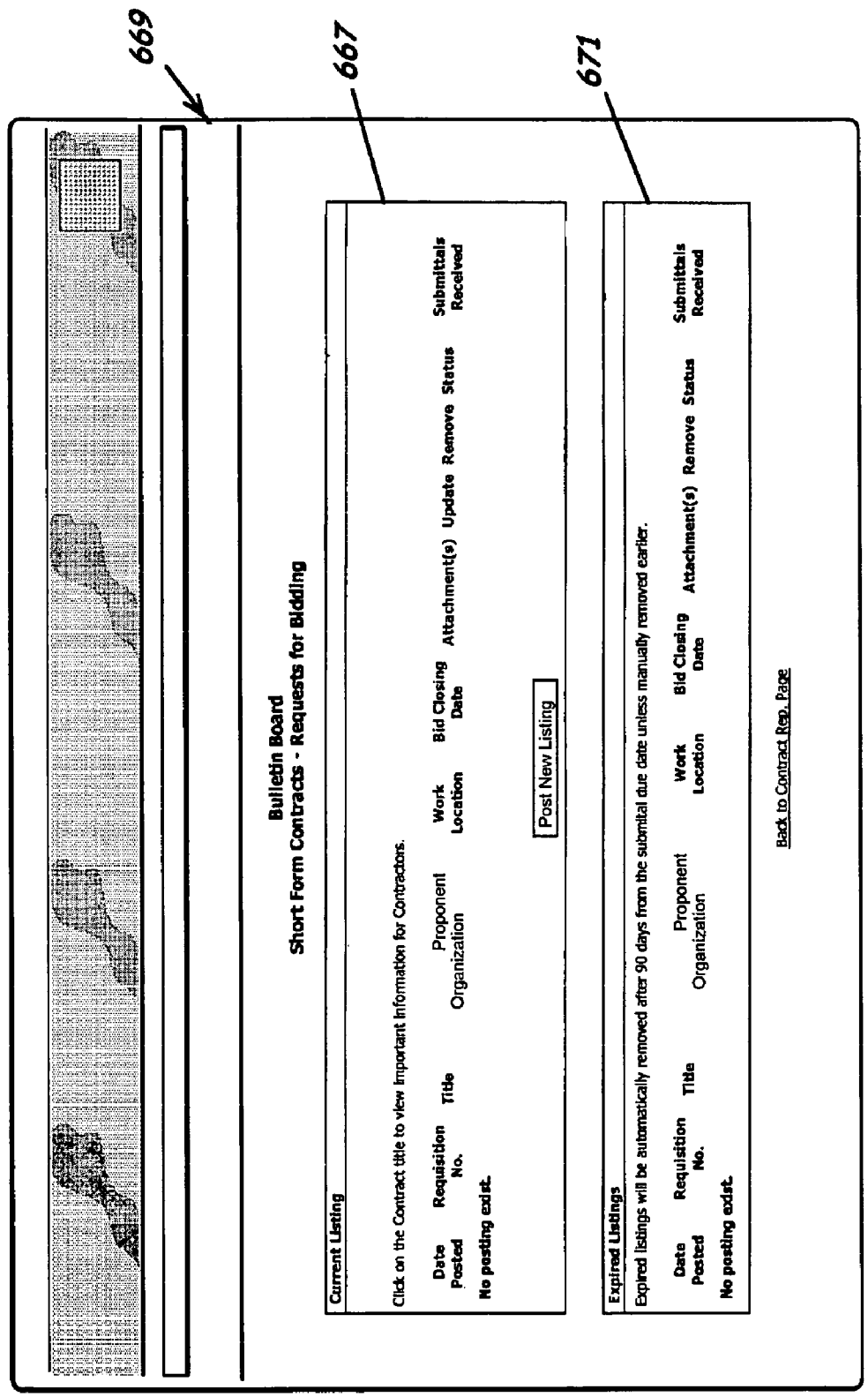
FIG. 47 is a schematic diagram of a short form contracts/ requests for bidding web page used to facilitate contract procurement and contract management over a computer network according to an embodiment of the present invention.

According to an embodiment of the system 30, when a registered contractor submits the online bid, the short form contracts for bidding manager 622 can store and provide a link to the bid in a related bulletin board listing, i.e., preferably in a current listing section 667 of a short form contracts/requests for bidding web page 669 (FIG. 47), which is selectable to allow either download or provide an online review. This link, along with additional attribute data preferably include: the date posted; requisition number; title; work location; bid closing date; attachment(s); status; number of submittals received; and update and remove fields, are preferably displayed to the proponent representative and selected other contracting entity users. At the end of the bid closing date or other preselected time, the short form contracts for bidding manager 622 can automatically move the listings from the current listings section 667 to an expired listings section 671 having similar attributes; where it can remain for a preselected time period, e.g., 90 days. After the preselected time period has expired, the listing can then be removed and archived.

The short form contracts for prequalification function 623 is similar to the short term contracts for bidding function 622, except it is used for prequalification rather than direct bidding, and thus, does not include a bid closing date in the identification section of the short form contracts listing for prequalification web page form (not shown), but instead can provide a prequalification due date. Also, rather than upload a pro form a contract and instructions to bidders, prequalification questionnaires are uploaded and associated with the bulletin board. Further, while the listing is posted, registered contractors can access the of short form contracts prequalification bulletin board via a hyperlink 673 associated with the bulletin boards section 643 of the respective contractor member home web page 645 (FIG. 41), and can view each open listing, download any associated documents, and submit their prequalification questionnaire online to the contracting entity.

The communications/announcements function 626, accessible, for example, through the "announcements" field of the bulletin boards drop-down menu in the toolbar 605 (see FIG. 40A) allows contracting entity users to manage and retain important communications and internal/external instructions. It can also allow for categorizing announcements and specifying the authorized viewer of each announcement. Additionally, it can provide a user-friendly interface for searching announcements and other bulletin board related communications.

According to an embodiment of the system 30, in order to ensure registered contractors are made aware of the availability of new listings and latest announcements thereto, the contractor member's (representative's) home web page 645 (FIG. 41) can include the bulletin boards section 643 having hyperlinks 641, 665, 673, which include the name of the bulletin board and an indication of the number of new postings associated therewith, either as part of each respective hyperlink 641, 665, 673, or adjacent to the hyperlinks. For example, links 641, 665, 673, can be displayed as: Bulletin Board—Long/Short Form Contracts (# postings, Last modified on "Date") or Bulletin Board—Long/Short Form Contracts (Currently no postings). The bulletin boards section 643 of the contractor member's/representative's home web pages 645 can also include a hyperlink 674 to bulletin board-related announcements. Further, as shown in FIG. 41, the contract representatives can be provided in their respective a homepages: a link such as, for example, link 681, to the respective contractor's profile; a listing section of active contract rooms 682 associated with the respective contracting representative to allow enhanced access; a listing section of pending tasks 683 to help the respective contractor maintain contract rooms related deadlines established by the contracting entity; and a listing section of recent communications 684 to provide the respective contractor representative ready access to import communications between the contracting entity and the contractor.

As shown in FIG. 40B, the toolbar 605 can include a "general functions" drop-down menu which can provide access to various functions, for example, shown in FIG. 3C including a general bid slate former 681, a general bid opening request manager 685, the contract room profile searcher 221, the lessons learned searcher 191, a signed contracts searcher 686, a standard contract manager 687, a bid processing manager (bid room custodian) 688, a standard and general instructions manager 689, a picture manager 690, communications monitor (log) 691, contractor survey manager 692, gallery displayer 693, online course displayer 694, fast-track contract room template displayer 695, contractor warning alerts manager 124, and contract builder 697.

The general bid slate former 681, accessible through, e.g., the "general bid slates" field of the other general functions drop-down menu in the toolbar 605 (see FIG. 40B), allows a contracting representative assigned to develop a general bid slate to select a plurality of contractors to be included in the general bid slate by entering data, such as their vendor number, or by searching for potential contractors based on any one or more properties using, for example, the contractor profile searcher 131. The contractor profile searcher 131 is accessible through, for example: the contractor profiles drop-down menu on toolbar 605 of the contracting representative's home page (FIG. 39-40D); the bidders list web page 273 (FIG. 19); and a general bid slate web page (not shown) having, for example, a layout similar to the layout of the contractor profile search web page 133 (FIGS. 8A-C), but including input fields for the contracting representative to describe the applicability of the new general bid slate, attach supporting documents, select or designate applicable reviewers and approvers of the general bid slate, and to submit the general bid slate for review and approval.

The general bid slate former 681, responsive to the submission, can route the general bid slate through a workflow for review and approval amongst the selected reviewer's and approvers. Once fully approved, according to an embodiment of the system 30, a senior member of the contracting department approves the posting of the general bid slate. Once posted, the general bid slate is made available through, e.g., the general functions drop-down menu of the toolbar 605 of the contracting representative's home page 603, and is available for import into the contract rooms through, e.g., the bidders list web page 273 (FIG. 9), as described previously.

The general bid opening request manager 685, accessible through selection of the "general bid opening requested" field of the general functions drop-down menu in the toolbar 605 (see FIG. 40B), is similar to the bid opening request function provided by the bid opening request manager 521 and can be accessed through the "bid opening request" field of the post-dating functions drop-down menu in the toolbar 157 within each contract room 153, except the general bid opening request can be used to request bid opening for actions that do not have an associated contract room, such as, for example, contract change orders or contracts done outside the electronic contracting procurement system 30.

The contract room profile searcher 221, accessible through, for example, selection of the "search contract room" field of the general functions drop-down menu in the toolbar 605 (see FIG. 40B), can allow the user to search for contract rooms that are either active or closed, as described previously. The lessons learned searcher 191, accessible through, for example, selection of the "lessons learned" field of the general functions drop-down menu in the toolbar 605 (see FIG. 40B) and through the general functions drop-down menu in the main toolbar 157 within each contract room (see FIG. 10B), has also been described previously.

The signed contracts searcher 686, accessible through selection of the "signed contracts" field of the general functions drop-down menu in the toolbar 605 (see FIG. 40B), provides authorized users throughout the contracting entity an ability to view a digital version, e.g., a PDF, of the final signed contracts. According to the exemplary embodiment of the system 30, however, the signed contracts searcher 686 includes or interfaces with filters so that each user will be authorized to view only those signed contracts that belong to the contracting entity department or departments for which the respective user is assigned to support. When the user selects this function, the user can look up the signed contract the user wishes to view by specifying various search criteria. Upon specifying such search criteria, the signed contracts searcher 686 can provide the user with a list 700 (FIG. 49) of each signed contract that meets the search criteria. As shown, for example, in FIG. 49, the list can contain: the contract number; contract title; contractor name; requisition number; and proponent organization code. Advantageously, the user can then click on a provided link that will open the selected signed contract for viewing.

The search criteria as shown in table/form 701 (FIG. 48) can include: the contract number; requisition number; proponent organization code; contract title; contractor vendor number; and contractor name. For each contract number, there is a corresponding requisition number preferably generated in SAP that can be used throughout the contract procurement. When the contract is finalized, the contract is preferably assigned a different contract number. The proponent organization code allows the search to retrieve a list of all signed contracts belonging to a specific department or organization within the contracting entity. The contract title-based search can enable the user to enter any part of a contract title to retrieve a list of all signed contracts that contain the specific words. The search applied to the vendor number can retrieve all signed contracts signed by a specific contractor. Regarding the contractor name, the user can specify any part of the contractor name. A name search can retrieve all signed contracts for which the awarded contractor's name includes the specified words.

The standard contract manager 687, accessible through selection of the "standard contracts" field of the general functions drop-down menu in the toolbar 605 (see FIG. 40B), can provide the standard contract templates used by different contracting entity departments. According to an embodiment of the system 30, modification of these templates is performed by authorized contracting entity users and approved through a workflow routed to the desired contracting entity department.

The bid processing manager 688, accessible through selection of the "bid room custodian" field of the general functions drop-down menu in the toolbar 605 (see FIG. 40B), can provide automation to process the various bids by the bid room custodian and bid opening team. According to an embodiment of the system 30, the contracting department has a physical bid box in which contractors invited to bid (bidders) drop sealed envelopes containing technical or commercial proposals. These bids are opened in the bid room by a bid opening team that typically includes: a bid room custodian who is preferably a contracting department employee assigned to coordinate the bid opening process and support the bid room equipment and supplies; a preferably randomly selected contracting representative who changes periodically, e.g., every day; and a preferably randomly selected finance representative who also changes periodically, e.g., every day. This variation in personnel can help enhance the appearance of fairness.

Figure 50:
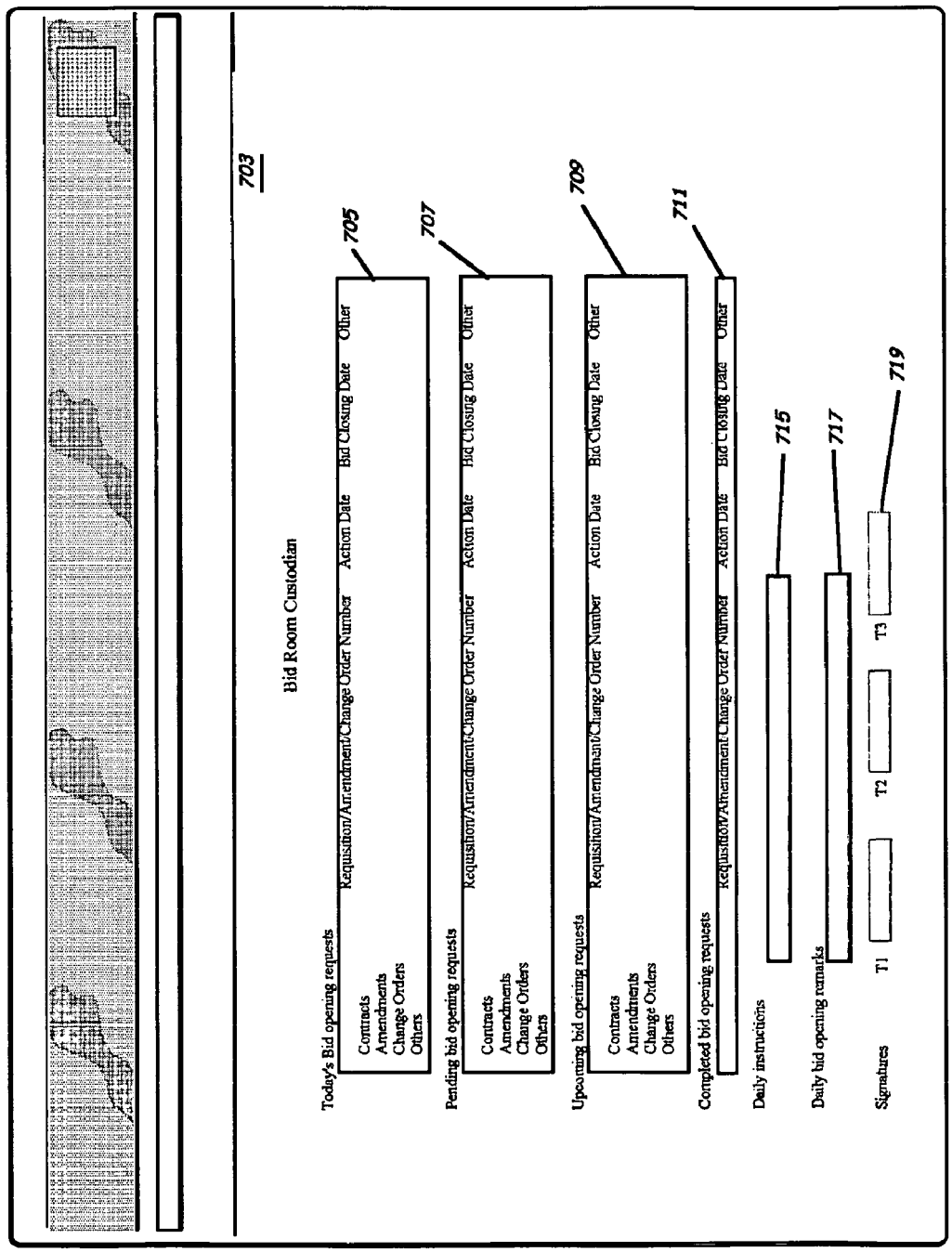
FIG. 50 is a schematic diagram of a bid room custodian web page form used to facilitate contract procurement and contract management over a computer network according to an embodiment of the present invention.

According to such an embodiment of the system 30, at the beginning of each workday, the bid room custodian can open this function on the bid room custodian web page screen 703 (see FIG. 50). The web page 703 provides a "today's" bid opening requests section 705, which can list all bid opening requests due to be opened on the same day; a pending bid opening requests section 707, which can list all bid opening requests due to be opened on a previous day and that was not completed on the requested date; an upcoming bid opening requests section 709, which preferably lists bid opening requests that have already been submitted but that have bid opening due dates in the future; and a completed bid opening requests section 711, which displays bid opening requests that were already fully processed in the past. A bid searcher 713 (FIG. 3C) accessible through a bid search web page form (not shown) can allow authorized users to search completed bid opening requests using one or more of the following criteria: requisition number; amendment number; change order number; action date, e.g., the date on which the bid opening took place; bid closing date; and other.

The bid opening team can advantageously select an action they want to begin by, e.g., "clicking" a related link in one of the lists, typically the requisition, amendment, or change order number serves as such a link. The bid processing manager 688 can open the bid opening request for that action. According to an embodiment of the system 30, the bid opening team can be provided instructions in a daily instructions section 715 as to what bids to open, can indicate whether they found each requested bid or bids in the bid box, and can enter the bid opening team's bid opening remarks in a daily bid opening remarks section 717. Each of the, e.g., three-team members can also electronically sign at the bottom of the request on the same screen by, for example, entering their respective user id and system password in a bid team signatures section 719. According to an embodiment of the system 30, upon completing the bid opening for that request, entering the bid opening findings in the bid opening request, and electronically signing at the bottom of the request, the bid opening team can place the opened bids in a sealed envelop and deliver it to the contracting representative responsible for that action.

The standard and general instructions manager 689, accessible through selection of the "Standard & GI's" field of the general functions drop-down menu in the toolbar 605 (see FIG. 40B), can allow contracting entity authorized users to manage and retain standards and general instructions that are applicable to items such as contract language or contractor instructions.

Figure 51:
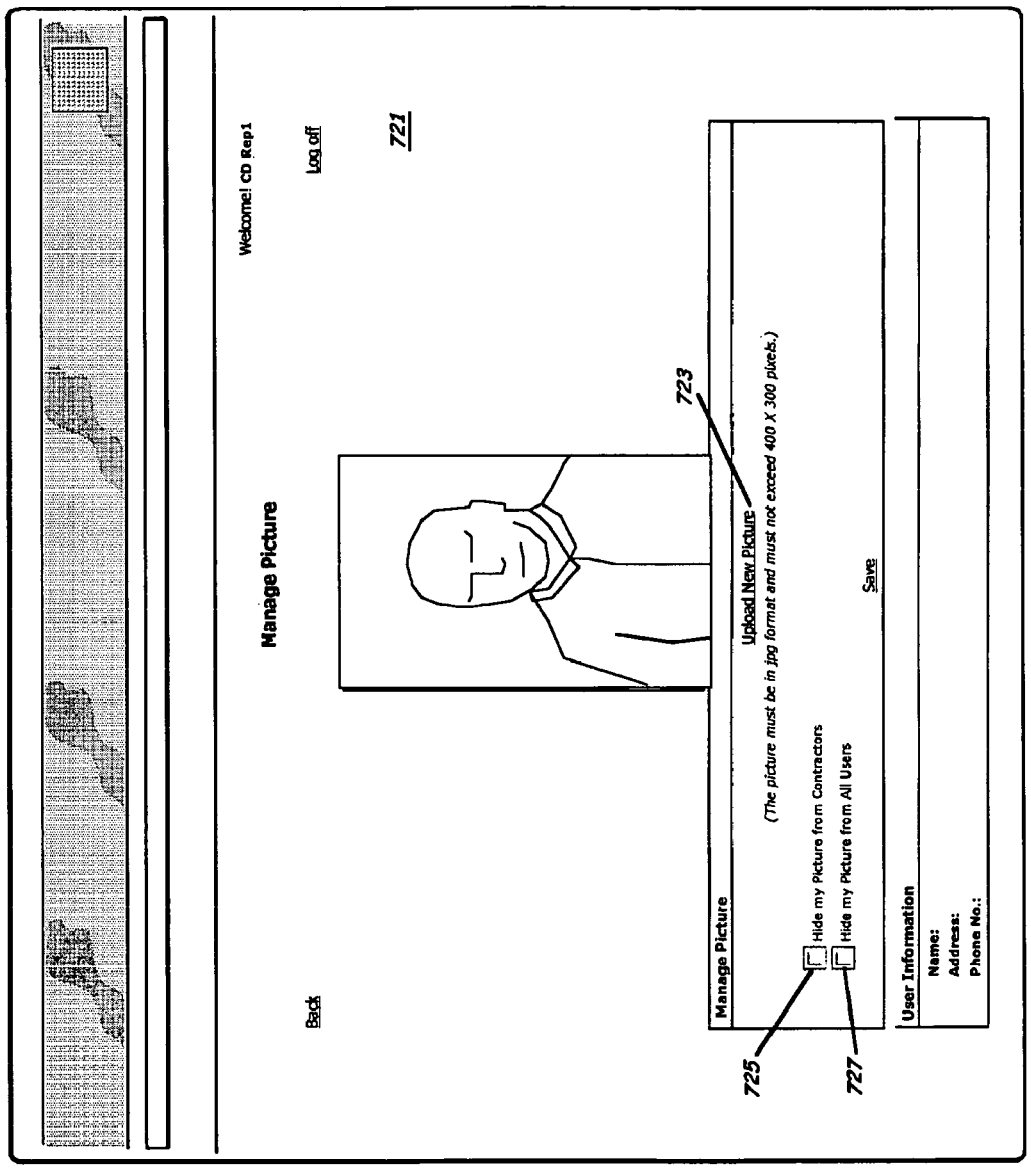
FIG. 51 is a schematic diagram of a manage picture web page form used to facilitate contract procurement and contract management over a computer network according to an embodiment of the present invention.

The picture manager 690, accessible through selection of the "manage picture" field of the general functions drop-down menu in the toolbar 605 (see FIG. 40B), can allow each contracting entity member user to upload/remove/replace/hide a photograph or other digital image in real-time. The picture manager 690 can also provide a manage picture web page 721 (FIG. 51), which can include input fields such as, for example, upload hyperlink 723, and check boxes 725, 727, that enable the user to upload and view the respective picture, hide the picture from contractors, and/or hide the picture from other users. According to the preferred embodiment of the system 30, in order to minimize storage requirements and improve image of storage efficiency, the picture manager 690 can require and provide instructions to the user on the web page 721 that the picture be uploaded in a standard format, e.g., JPEG, and instructions that the picture does not exceed a preselected size, preferably specified in pixels. If the picture does not meet these requirements, the picture manager 690 can provide or otherwise cause the user to receive an error message. Note, database 41 can include an image database accessible through an image server included as, for example, part of an electronic contracting network server farm. Advantageously, use of pictures has been found to encourage interpersonal relationships between the users and helps prevent automation from dehumanizing the process. When a user selects a communication, if the picture is enabled, rather than merely display the name or contact information of the originator of the communication, the uploaded picture can also be displayed along with such communication.

The communications monitor (log) 691, accessible through selection of the "communications log" field of the general functions drop-down menu in the toolbar 605 (see FIG. 40B), can allow the system administrator to monitor all electronic contracting communications such as email, fax, and SMS messages. For any failed email, fax, or SMS message, the system administrator or the contracting entity member who triggered or otherwise initiated the message can change the fax or SMS message number or email address and/or attempt to resend of the message.

The contractor survey manager 692, accessible through selection of the "contractor survey" field of the general functions drop-down menu in the toolbar 605 (see FIG. 40B), can allow the contractor entity representative to provide his/her feedback relative to electronic contracting. The surveys can be systematically accessed, evaluated, and presented in a report available to contracting entity management to assist in or enhance future contract procurement management decisions.

The gallery displayer 693, accessible through selection of the "gallery" field of the general functions drop-down menu in the toolbar 605 (see FIG. 40B), can allow access and display images of contract ceremonies or functions to thereby enhance personalization of the process.

The online course displayer 694, accessible through selection of the "professional development manual" field of the general functions drop-down menu in the toolbar 605 (see FIG. 40B), can provide links to online courses that can assist in shortening the learning curve of electronic contract related activities.

The fast-track contract room template displayer 695, accessible through selection of the "fast track contract room" field of the general functions drop-down menu in the toolbar 605 (see FIG. 40B), can allow a contracting entity member user to select a contract room template that can, by default, enable/disable specific contract room sections to enhance efficient creation of a contract room, especially for routine contracting projects or events.

The contractor warning (alerts) manager 124, accessible through selection of the "contractor warning alerts" field of the general functions drop-down menu in the toolbar 605 (see FIG. 40B), not only provide automated display of warnings and alerts affecting decisions, described previously, but can allow retrieval, for review, warnings applicable to a specific contractor relative to missing or expired information and can allow for proactively sending alerts to the contractor requesting an update. Once the update is completed, the contractor warning manager 124 can include functionality such that the warning or alerts are automatically removed.

The contract builder 697, accessible through selection of the "contract builder" field of the general functions drop-down menu in the toolbar 605 (see FIG. 40B), can allow a contracting entity member user to create the initial documents for the "Invitation for Proposal" using an intelligent component. This component can allow the retrieval of selected standard and non-standard paragraphs and perform a classification, e.g., standard or non-standard, through indexing, which can further allow document reviewers to classify standard and non-standard language within each section of the document. This function can also allow the contracting representative to import a built contract into a specific contract room. The corresponding are documents linked with the process functions of the functional review manager 417.

As shown in FIG. 40C, the toolbar 605 can include a "statistics" drop-down menu which can provide access to various functions including a statistics analyzer 698 and a performance indices analyzer 699 (FIG. 3C). The statistical analyzer 698, accessible through selection of the "statistics" field of the "statistics" drop-down menu in the toolbar 605 (see FIG. 40C), can provide a group of functions intended to provide to contracting entity member users and members of management with various real-time statistics related to the contracting entity's contracting activities. Advantageously, such statistics can be displayed both numerically and graphically in the form of reports, without the respective member user having to request such statistics. Further, advantageously, as with other features of the system 30, the type of statistics each user can view can be set to depend upon the particular member user's role authorizations to provide information of the type of most necessary to the particular member user.

The performance indices analyzer 699 can provide key performance indices (KPIs), up-to-date measurement of the performance of each main contracting entity organization or department involved in the contract procurement process, i.e., Contracting Department, Proponent departments, Law, and Finance. An example of a KPI is "Processing Time," meaning the time it takes from initiating the contract procurement to signing the contract. The KPIs can be linked to various functions within the electronic contracting system and can be calculated systematically.

As stated previously, the majority of the above description focused on the contracting representative because the contracting representative generally has the most number of functions. As perhaps best shown in FIG. 42, the contracting entity contracting department managers are provided a subset of the features provided the contracting representative along with additional features not provided such representative. For example, a contracting entity managers personalized web page 753 can include a toolbar such as, for example, toolbar 755, which includes various functions preferably categorized, via a drop-down menu, as: general; bulletin boards; gallery; and contractor profiles, which, advantageously, can differ from that of other managers within the contracting entity depending upon their respective assigned role authorizations.

Figure 43A:
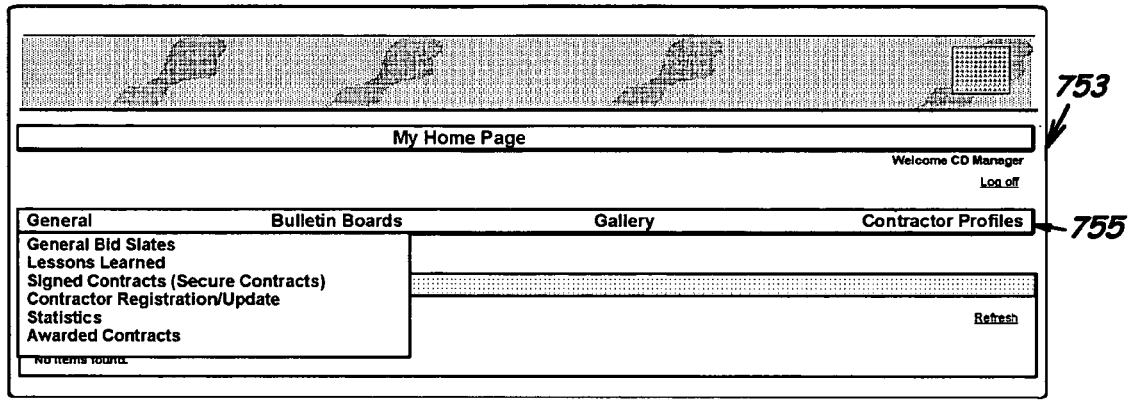
FIGS. 43A-B is a schematic diagram of a contracting entity manager home web page used to facilitate contract procurement and contract management over a computer network according to an embodiment of the present invention.
Figure 43B:
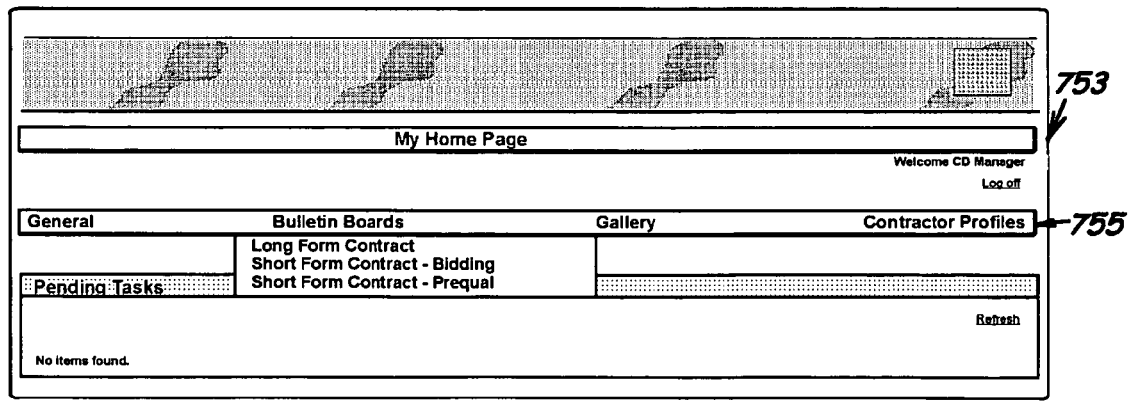

As shown in FIGS. 43A-B, the toolbar 755 can preferably include drop-down menu items to provide access to various functions including, for example, the bid processing manager 688; lessons learned manager 181; signed contracts searcher 686 and awarded contracts viewer; registrar 73; contractor registration statistical analyzer 698; bulletin board manager 620; and contractor profile searcher 131. Also, each personalized contracting department manager home page can also include: a pending tasks section 757, similar to that described with respect to the contracting representative; a senior registration coordinator (SRC) directives to contracting department section 759; a pending SRC section 761; and an active contract rooms section 763.

The SRC directives to contracting department section 759 preferably includes a link, such as, for example, link 765, to create new SRC directives and a link such as link 767 to cause the display of completed SRC directives. The pending SRC directives section 761 can be displayed in tabular form and can include the following columns: SRC meeting number; SRC meeting date; subject of directives; target date; assigned to; created by; and created on.

The active contract rooms section 763, through use of an interface such as, for example, a SAP, advantageously can provide access to active contract rooms through links coinciding with the organization of the contracting. The section 763 can also include a list of active contract rooms, preferably in tabular form, including the following columns: contract room number; contract title; contracting representative; proponent organization; proponent representative; estimated value; SRC; contract signatory; creation date; and procurement status.

As shown in FIG. 3C, to further provide management information needed to manage each contract procurement transaction within the managers organizational hierarchy, the electronic contracting program product 71 can include a contracting manager report generator 771 positioned, responsive to a preselected time attribute, to periodically access contract data records 43 to provide contracting entity member user managers periodic status reports including data advantageously tailored to each respective manager's role authorizations, to thereby enhance contract procurement management. Similarly, the electronic contracting program product 71 can include a contractor manager report generator 773 positioned, responsive to a preselected time attribute, to access contract data records 43 for each respective contractor, to periodically display to a respective contractor manager, e.g., senior officer or main contact, for each contractor's recent contractor member user transactions associated with the respective contractor, to thereby enhance contractor member user supervision.

Figure 55A:
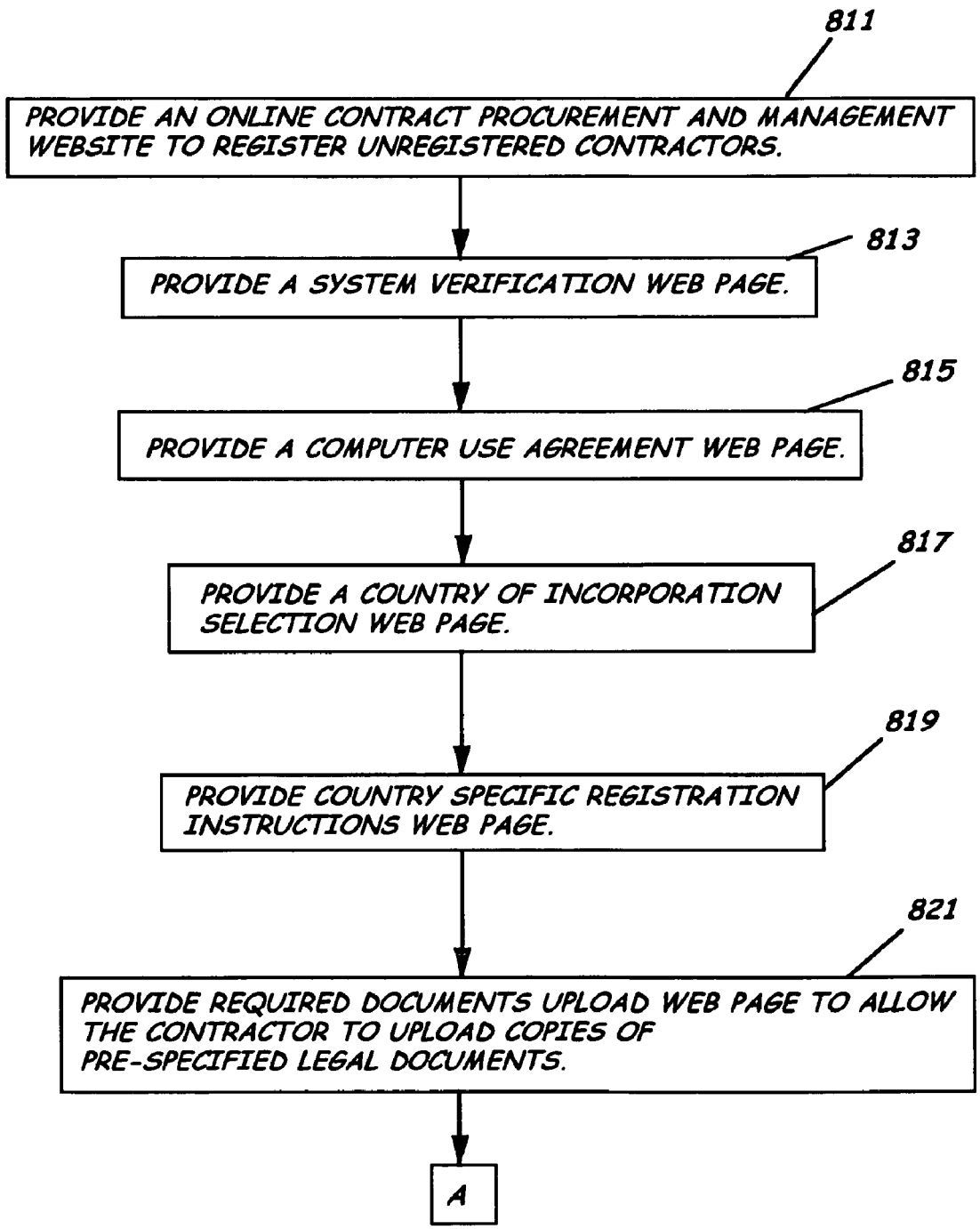
FIGS. 55A-B is a schematic flow diagram of a method of facilitating contract procurement and contract management over a computer network according to an embodiment of the present invention.
Figure 55B:
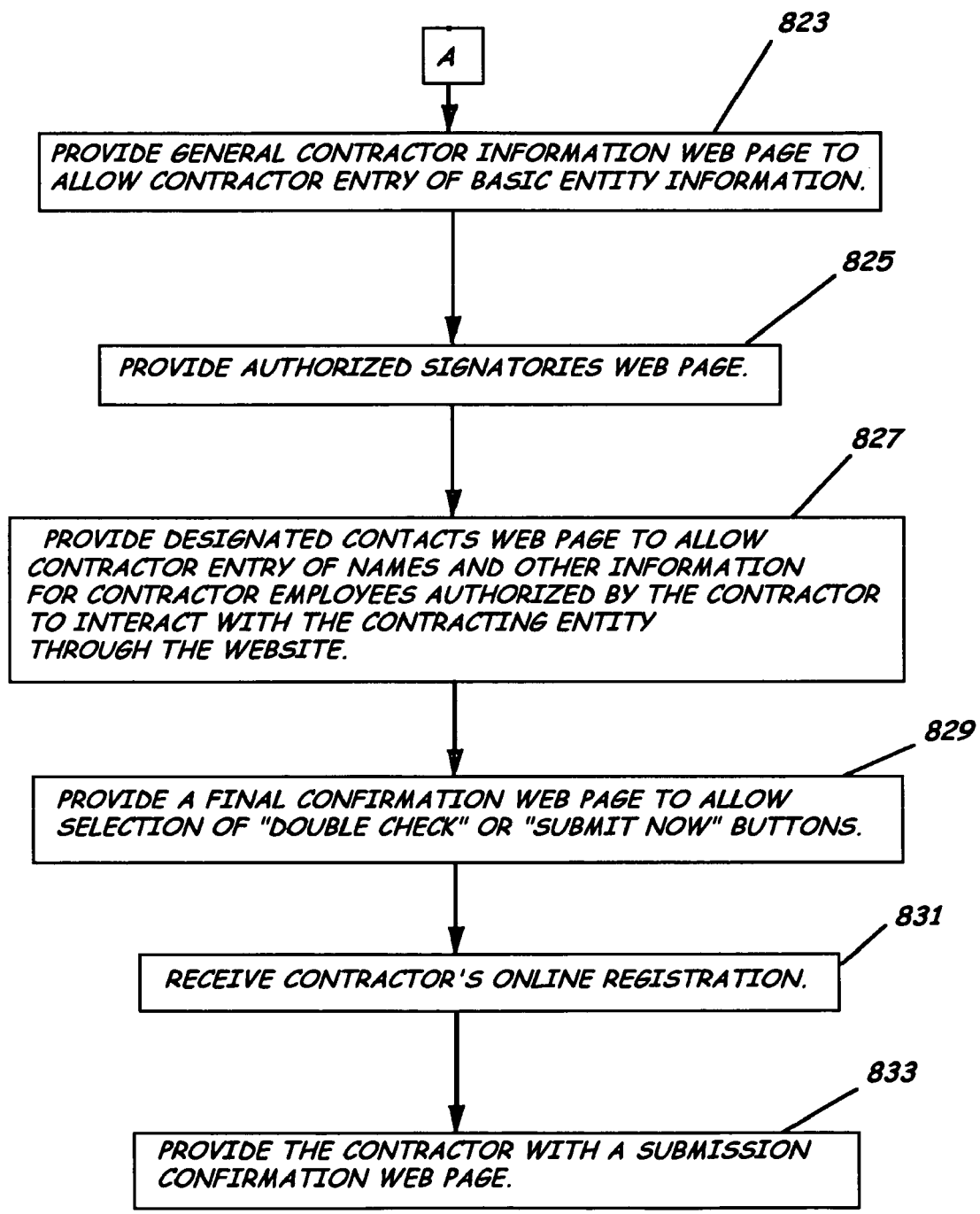

As shown in FIGS. 1-75, embodiments of the present invention also include methods of facilitating contract procurement and contract management through an online contract procurement and management website over a computer network, e.g., network 33, between a contracting entity and a plurality of potential contractors. For example, as perhaps best shown in FIGS. 55A-B, a method of registering an unregistered contractor is provided to request prequalification data for multiple contract procurement transactions, to thereby facilitate contract procurement and contract management.

A contracting entity can provide a link for registering unregistered potential contractors preferably on a main web page of the contracting entity's online contract procurement and management website (block 811). The unregistered contractor visits the main web page and selects or clicks on the link, whereby the contractor is transferred or otherwise provided access to an electronic contracting network system such as, for example, system 30 (see FIGS. 1-2). The system 30 can first present a system verification web page screen (not shown) in which the contractor is to type the same characters, which appear on the web page screen in a scrambled manner (block 813). Advantageously, this prevents the website from being inundated with registrations from automated registering systems.

According to an embodiment of the present invention, the contractor can be presented with an online computer use agreement web page screen (block 815), which the contractor must accept prior to proceeding further. This agreement includes various legal conditions related to the contractor's interaction with the contracting entity's systems and is a prerequisite to the contractor proceeding further. According to another embodiment of the present invention, such computer use agreement information can be made available for review either online or off-line but is not overtly presented.

After successful contractor verification, the contractor is presented a web page screen 75 (see FIG. 4A) in which the contractor can specify their country of incorporation (block 817). The instructions and screens that follow thereafter generally depend on which contracting entity subsidiary, if so organized, is designated to interact with that contractor's country of incorporation. The registration will, however, generally follow, as described below.

After specifying the contractor's country of incorporation, the contractor is presented with a web page screen that includes registration instructions (block 819), followed by a web page screen which allows the contractor to upload copies of various a preselected legal documents (block 821), some of which may be required to be first authenticated and stamped by an applicable third party, such as, for example, the Chamber of Commerce in which the contractor is registered. Such documents can include a scanned copy of an authenticated "Authorize Signatories and Designated Contacts" form document. Next, the contractor can be provided a web page screen including a section 77 having fields for entering general contractor information (see FIG. 4B) about their company or entity such as, for example, legal name, commercial registration information, address information, and other (block 823).

Upon satisfying all mandatory fields, the contractor can then be provided a web page screen for entering the names of authorized signatories for the contractor (block 825) followed by a web page screen for entering the names of personnel selected as designated contacts with the contracting entity (block 827). In the authorized signatories screen (see, e.g., FIG. 4D), the contractor can provide names and other information for the officers in their company who are authorized by the contractor to sign contracts, amendments, bids, and generally act on their behalf. In the designated contacts screen 79 (see, e.g., FIG. 4C), the contractor can provide names and other information on, for example, up to, e.g., four or so contractor employees who are authorized by the contractor to interact with the contracting entity through the contract procurement and management website. These four or so contractor employees generally include a senior officer, a main contact, and two additional contacts having less authority than the senior officer or the main contact. These individuals can be the same individuals named as authorized signatories; however, the contractor is able to name others.

As stated above, depending upon whether or not electronic signatures are deemed adequate, one of the documents which the contractor may be required to upload is a copy of a document called "Authorized Signatories and Designated Contacts." In this document, the contractor can enter the same data provided in the authorized signatories web page screen and the designated contacts web page screen. Due to the special sensitivity of the delegations of authority provided in these two screens, in some locations/jurisdictions, the contractor is required to also provide this information in a hard-copy letter that is to be authenticated by an appropriate third party such as Chamber of Commerce. Upon authenticating this letter, the contractor can upload a scanned copy of the document in their online registration application.

The contractor can then be provided a final confirmation web page 776 (see FIG. 4E) including a "double check" button and a "submit" button and can include instructions advising the contractor that all requirements for online registration are completed, a statement encouraging the contractor to double check the registration information prior to submitting the information, and a statement confirming that all information being submitted is accurate (block 829). If the contractor selects the "double check" button 777, the contractor can be transferred to the web page screen where they uploaded required documents. The contractor can verify the correct documents were uploaded and, by selecting, for example, a "next" button located at the bottom of each web page screen, can verify the data entered on each following screen until all registration web pages have been reviewed. This can be indicated by again reaching a final confirmation web page screen. When the contractor selects the "submit now" button 779, the contractor's online registration application will be submitted to and received by the contracting entity for consideration (block 831), and the contractor can be provided with a submission confirmation web page screen (block 833) which notifies the contractor that their application has been submitted and provides the contractor with other related instructions. Further, the registration application is added to a list of pending registrations viewable by a registration coordinator via a registration coordinator homepage 783 (see FIG. 53), described later.

Alternatively, the contractor can also select a "submit later" button 781 which can allow the contractor to save the information and return latter using a unique reference key provided during the initial portion of the registration, thus allowing the contractor to confirm the accuracy of information that may require offline research. Note, the unique reference key is generally given to a new contractor at the time of filling-out their application, e.g., immediately after uploading the required documents and before filling-in the data screens. The unique reference key can allow a new contractor who is in the process of filling-in a new registration application to break the session, e.g., after uploading the required documents, and return to fill-in the data fields later. It also can enable a new contractor who has already submitted their application to re-access their application and make modifications in case the contracting entity indicates to the contractor that such entity has reservations on the information provided.

Note also, according to an embodiment of the method, the instructions, provided in the final web page 776, can include a requirement for the contractor to physically present to the contracting entity the originals of the legally sensitive documents, which were required in the required documents web page screen. This requirement is a special case where certain entities have special legal and procedural requirements such as, for example, requiring original signatures of documents and/or person-to-person submittal. According to such an embodiment of the system 30, when the contractor visits the contracting entity for such purpose, a registration coordinator, whether or not assigned to the respective contractor's registration application, can view the original documents and compare them with the scanned copies, which the contractor uploaded in their online registration application. For each such document, the registration coordinator can indicate on an associated web page screen having, for example, checkboxes adjacent an identification of the documents, that the copy matches the original. Performing this verification of the hardcopies of selected documents is preferably the only major task any registration coordinator can perform in a registration application assigned to another registration coordinator. This exception methodology can be instituted because a contractor representative may visit the contracting entity for this purpose at a time at which the assigned registration coordinator might not be available.

The contracting entity members/staff who handle contractor registrations include "registration coordinators" and their supervisors "contractor relations supervisors." Advantageously, each such members can have substantially identical home (main) web page screens 783 (see FIG. 53), which can include links to display in a display field 784 having a plurality, e.g., four, primary types of requests or sections. According to an embodiment of the system 30, the four primary sections which can include: a new registrations section (not shown); an update requests section (not shown); an extension requests section (not shown); and a registration by contracting entity/department section or web page 793 (FIG. 54), are separately viewable in or through the registration coordinator web page 783 by selecting text entry fields such as, for example, a new registration requests link 785, an update requests link 786, an extension requests link 787, and a registration by the contracting department link 791, respectively, along with an "all" link 789. A rollout existing contractors section (not shown) accessible through link 790 can also be provided.

Each of the first three primary sections can include four subsections that group each required activity/task based on its respective current processing stage. These subsections can include: not yet assigned 794; assigned and pending registration coordination review 795; reviewed by registration coordinator and pending supervisor approval 797; and recently completed requests 799, e.g., completed within the past 60 days. The new registration requests section allows processing new registration requests submitted by not-yet registered contractors. The update requests section allows processing of update requests submitted by currently registered contractors. The extensions requests section allows contractors registered with one subsidiary of the contracting entity to do business with another subsidiary.

The registration by contracting department web page 793 can provide the contracting entity an ability to fully register a contractor without the contractor submitting an online application. This section is provided mainly to register two types of contractors. The first type of contractor is an individual such as, for example, freelance consultants. That is, according to an embodiment of the method, especially if the contracting entity is a large or well-known contracting entity, individuals should not be provided the opportunity to register online in order to keep incoming registration applications at a manageable and economically desirable level. For example, allowing online application for individuals who, e.g., view themselves as freelance consultant candidates, can potentially result in the contracting entity receiving millions of online applications from individuals all around the world. The second type of contractor are organizations with unique situations such as companies who do not have, for example, a government commercial registration or other type of registration required by the sovereign, but that might have received a special authorization to do business for a specific period of time.

Figure 56:
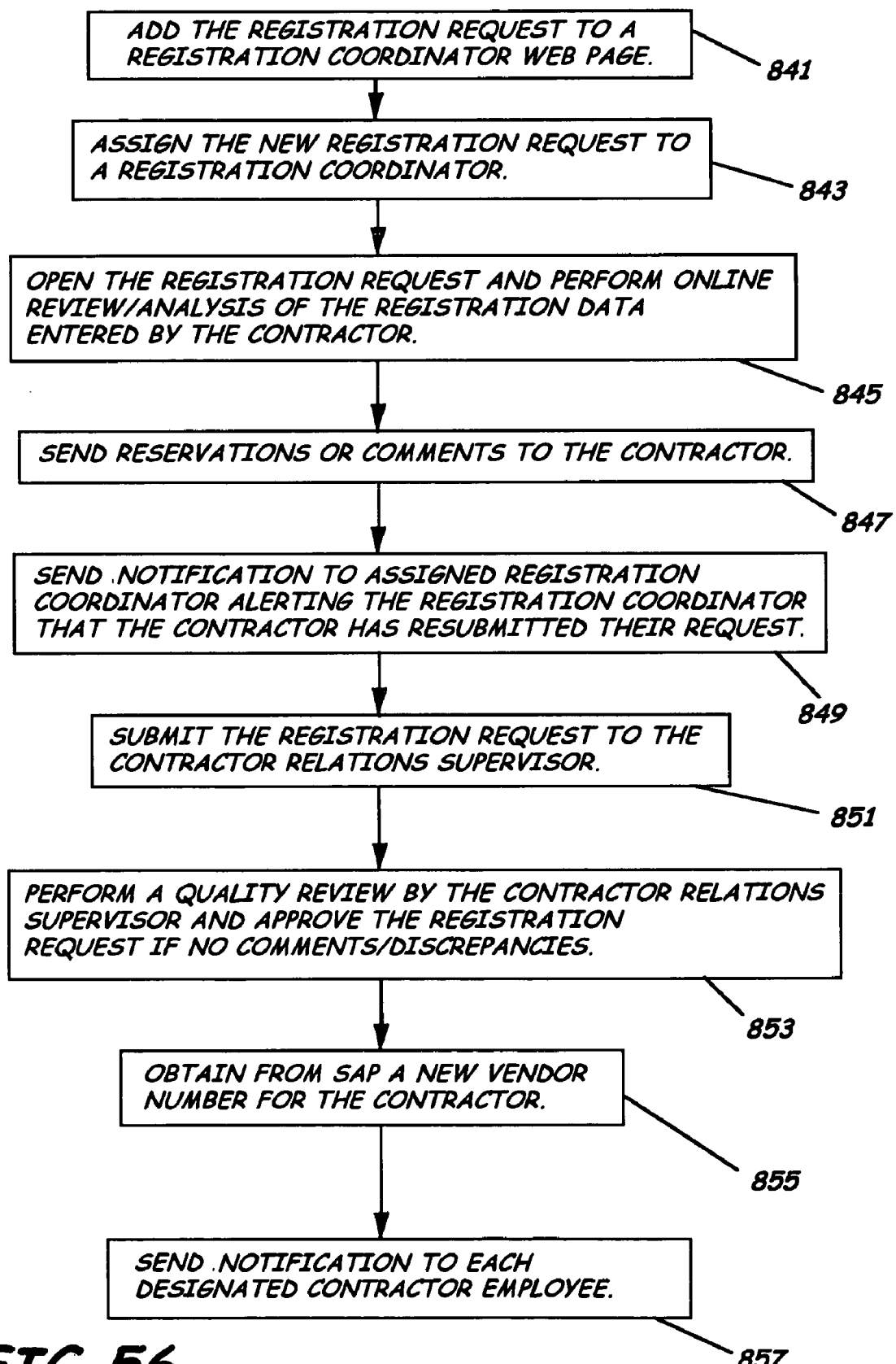
FIG. 56 is a schematic flow diagram of a method of facilitating contract procurement and contract management over a computer network according to an embodiment of the present invention.

As perhaps best shown in FIG. 56, a method of processing new registration requests is provided to register potential contractors, to thereby facilitate contract procurement and contract management. As stated above, upon submittal of the registration application, whether for a new registration or to update an existing registration, the registration application can be added to a list of pending registrations, and in particular, to a not yet assigned section 794 of the registration coordinator homepage 783 (block 841). The not yet assigned section 794 is preferably presented in tabular form having the following columns: date received; days pending; vendor name; type; status; document verification (verified/not verified); and an assignment link. The vendor name can be in the form of a hyperlink selectable to retrieve the registration data entered by the contractor. The document verification is preferably displayed in the form of a "not verified" hyperlink such that selecting the hyperlink allows the registration coordinator to enter verification data, which can then automatically result in removal of the "not verified" hyperlink. The assignment hyperlink is a link that can open a web page, allowing a contractor relations supervisor to assign a selected registration coordinator and/or alternates to a particular contractor.

A contractor relations supervisor can open the registration request and assign it one of the registration coordinators (block 843). At that point, the system 30 can move the request from not yet assigned section 794 to appear under the assigned and pending registration coordinator review section 795 and can display the name of the assigned registration coordinator therewith. The assigned and pending registration coordinator review section 795, along with the reviewed by registration coordinator and pending supervisor approval section 797 and recently completed requests section 799, also can include a "last action date" and "an assigned to registration coordinator" column. Advantageously, according to an embodiment of the present invention, each registration coordinator can be provided the same lists (tables) on the registration coordinators' respective homepage. Such list (table) can be provided so that the registration coordinators can conveniently determine online if they are responsible for opening and processing the respective registration request, without the need for direct contact with the registration coordinator supervisor.

Advantageously, each registration coordinator can be enabled to view the same list so that each registration coordinator is aware of all pending actions in case of any contractor or management follow-up requirements. When a registration coordinator opens a request, the registration coordinator can review any required documents uploaded by the contractor and check their integrity and appropriateness (block 845). The registration coordinator can also review the data inputted by the contractor in each web page screen or screens and compare it with the corresponding required documents, placing a check in a checkbox adjacent each required document.

According to an embodiment of the method, if the registration coordinator has reservations or comments, the registration coordinator can enter them in a special comments section (not shown) that can include separate comment text boxes that correspond with each registration section, such as, for example: general comments; required documents; general company information; ownership (for certain types of contractors); designated contacts; and authorized signatories. Upon selection of an input field such as, for example, a "send" button (not shown), the system 30 can send these comments to the contractor (block 847) using the contact information in the registration so that the contractor can reassess their application.

New contractors can access the system 30 using the unique reference key provided during registration. Prior registered contractors can use their provided system user id and selected password. Note, the contractor can then make the necessary corrections and resubmit the application. This time, different from the new contractor registration, the request need not require the contractor relations supervisor to assign it. Instead, the system 30 can send an email or other form of notification to the assigned registration coordinator to alert the registration coordinator that the contractor has resubmitted their request (block 849), and can display the status of the registration request as "resubmitted by contractor" under the status column. Note, if the contractor does not resubmit the requested information, the system 30 can automatically delete the registration request after a preselected time period, e.g., 10 days.

If the registration coordinator has no reservations and the contractor has presented the originals of the legally sensitive documents for verification, the registration coordinator can complete the review and submit the request back to the contractor relations supervisor (block 851). The system 30 can then move the listing from under the assigned and pending registration coordinator review section 795 to under the reviewed by registration coordinator and pending supervisor approval section 797. The contractor relations supervisor can perform a quality check and approve the request if such supervisor has no comments or reservations (block 853). Once the contractor relations supervisor approves a new contractor registration request, the system 30 moves the request from the reviewed by registration coordinator and pending supervisor approval section 797 to the completed requests section 799. The registration request can be displayed for a preselected time period, e.g. 60 days, then automatically removed.

According to an embodiment of the method, the system 30, if including a SAP interface, can systematically communicate with SAP to export the new contractor registration information and obtain from SAP a new vendor number for this contractor (block 855). Alternatively, if not so equipped, the system 30 assigns such vendor number according to various methods known to those skilled in the art. The system 30 can also automatically provide (send) an email or other electronic notification to each contractor employee selected by the contractor under designated contacts (block 857), advising them of the contracting entity's approval of the registration request, providing them with the assigned vendor number, and providing each designated contact with a user id and temporary password. When each designated contractor contact first accesses the system 30 using the provided user id and temporary password, the system 30 can require the designated contractor contact to change the password, and request the designated contractor contact to electronically sign an online usage/computer use agreement. In response to signing/accepting the agreement, the designated contractor contact can be provided access to the system 30 as a registered contractor, generally concluding the new contractor registration process.

Note, as described below, registered contractors who wish to update their registration information can do so by submitting a contractor update request. Note also, as described above, according to an embodiment of the method, only the registration information section 87 requires registration coordinator approval. The other sections can instead advantageously show indicia that they have been changed, but need not otherwise require such approval process.

Figure 57:
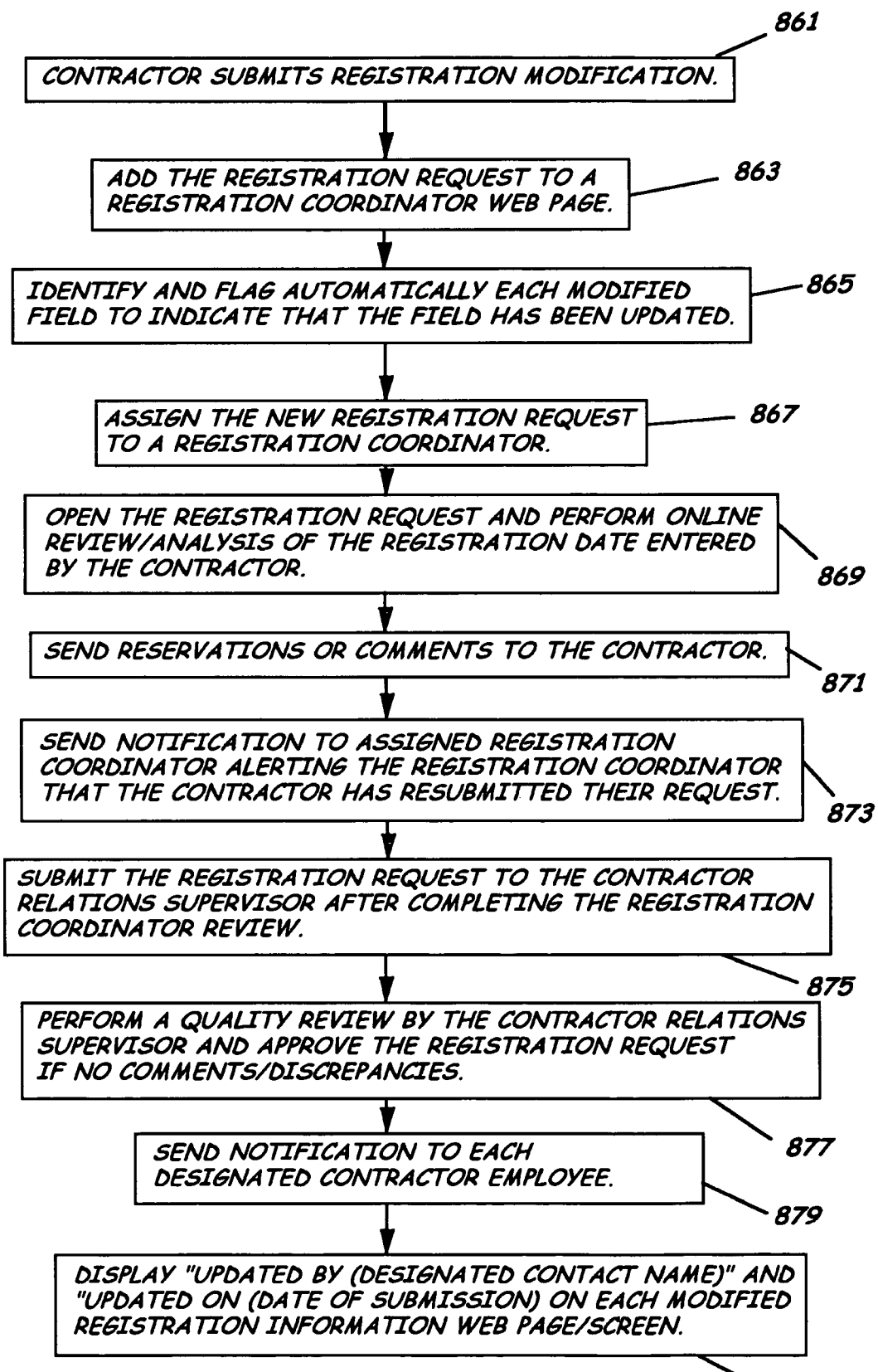
FIG. 57 is a schematic flow diagram of a method of facilitating contract procurement and contract management over a computer network according to an embodiment of the present invention.

As perhaps best shown in FIG. 57, a method of processing update registration requests is provided to update registrations for potential contractors, to thereby facilitate contract procurement and contract management. The process can begin by an authorized designated contractor contact accessing the respective contractor profile web page form 85 (FIG. 6A) through a respective contractor member home web page 645 (FIG. 41) using the assigned user id and selected password; making the desired modifications to the registration information section 87 of the contractor profile; and submitting the modification request to the contracting entity (block 861). The subsequent steps by the contracting entity (blocks 863-879) are similar to the new contractor registration process, described above, except that in the registration coordinator home page 783 (FIG. 53), the update registration listing can be added and displayed under the update requests section rather than the new registrations section (block 863). The system 30, advantageously, can automatically identify and flag each modified field to indicate that the field has been updated (block 865). For example, in the details of the update request, the registration coordinator can be presented the word "Modified" in red appearing next to each modified field to simplify the review.

Also, upon approval by the contractor relations supervisor, the system 30, if so configured, can export to SAP the updated information, but need not obtain a new vendor number from SAP because the number already exists. Further, although the contractor is notified of the contracting entity's approval of the update request via, e.g., email, fax, and SMS message, sent to each of the contractor's designated contacts (block 879), the designated contractor contacts need not be provided a new user id and password nor be required to re-accept the online legal agreement. Additionally, the system 30 can display, e.g., on the top of each registration information screen that was modified, the name of the contractor employee who made the modifications and submitted the update request to the contracting entity as, for example, "Updated by 'designated contact name'" and "Updated on 'date of submission'" (block 881). Advantageously, this can help contractor owners, officers, or executives easily identify which of their employees made the latest changes to their profile and can help prevent a potential misunderstanding and can help prevent potential contractor employee fraud on the contractor.

Figure 58:
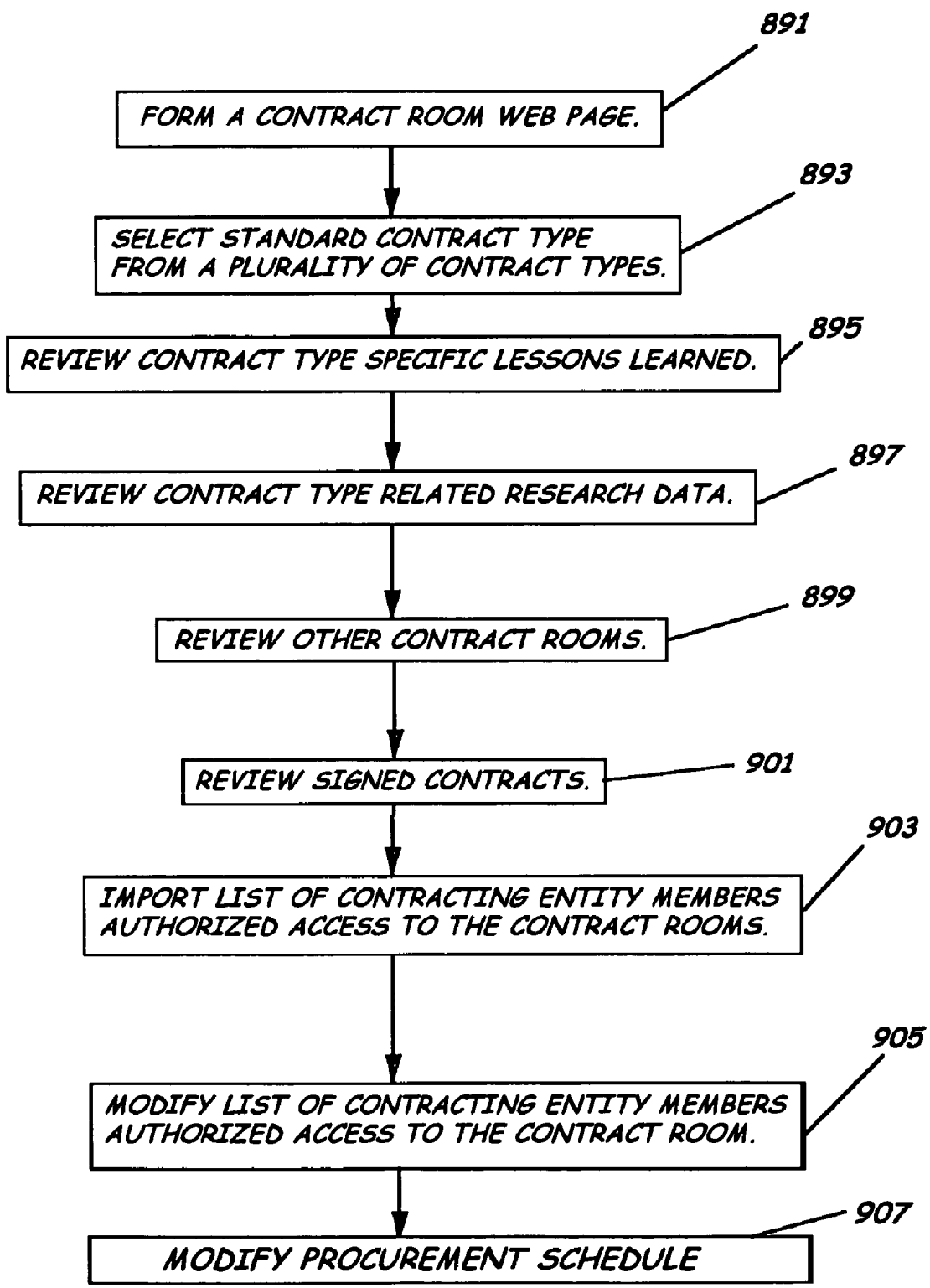
FIG. 58 is a schematic flow diagram of a method of facilitating contract procurement and contract management over a computer network according to an embodiment of the present invention.

As perhaps best shown in FIG. 58, a method of forming a virtual contract room is provided to request prequalification data for multiple contract procurement transactions, to thereby facilitate contract procurement and contract management. A contract room web page, such as, for example, main contract room web page 153 (FIG. 10A) can be first formed (block 891). The main contract room web page 153 can be created automatically in response to approval of a contract procurement transaction for the preselected pending contract by both a contracting entity contract room representative and a contracting entity contract proponent representative. The main contract room web page 153 can include: an introduction section 155; a main toolbar 157; a secondary toolbar 158; a pending tasks section or table 159; and a recent communications section or table 161, as described previously.

The main participant of the each virtual contract room is, for example, a preselected contracting representative who is the custodian of the respective contract room and chairman of the associated procurement process. The contracting representative can select a standard contract type from a plurality of contract templates best approximating attributes of the contract procurement transaction (block 893). Such templates can be displayed to a contracting representative's web browser on a web page 173 (FIG. 11). The contracting representative can access the web page 173 through, for example, a "set standard contract type" field of the general functions drop-down menu in the main toolbar 157 of the main contract room web page 153. Advantageously, specifying a standard contract type enhances automated linking of such contract room to other contract type-dependent functions such as, for example, lessons learned functions.

Note, the contracting representative can also subordinate the contract room to another contract room to form a master procurement contract room, to thereby provide simultaneous contract room updating for a plurality of contract rooms. Correspondingly, in response to subordinating the contract room, a plurality of functions within the subordinated contract room are disabled, and reference instructions to access the master procurement contract room to perform the disabled functions are provided.

The contracting representative can also, as a minimum, review (and post) lessons learned applicable to the respective contract room (block 895). Advantageously, lessons learned are provided to capture the various experiences gained during the contract procurement or contract administration process. A user can access the lessons learned through, for example, a general functions drop-down menu in the main toolbar 157 to access a lessons learned web page 183 (see FIG. 12) to view lessons learned specifically related to the respective contract room or view lessons learned specifically related to the requisition (procurement), and to search a lessons learned database. The contracting representative can be provided a lessons learned profile search web page form 193 (see FIG. 13) having a plurality of entry fields adapted to receive user input data indicating selected lessons learned attributes for historic lessons learned to allow searching and to display to the contracting representative's web browser a listing of lessons learned having attributes matching one or more entered lessons learned attributes. Advantageously, this can enhance contract procurement management by allowing the user to search for lessons learned using search criteria entered by the user to gain insight into previously documented potential pitfalls and/or improved procedures.

The contracting representative can further review data related to developing the pending contract resulting from multiple searches performed automatically in response to creation of the contract room (block 897). That is, according to the exemplary embodiment of the method, when a contract room is automatically created, e.g., upon the contracting and proponent representatives approving the Purchase Requisition Supplement in SAP, the contract title, e.g., as defined in the SAP Purchase Requisition and Purchase Requisition Supplement, or other user defined search criteria, can be systematically entered into a word search field of a contract procurement research data search engine, which then perform multiple searches for on-demand display. The multiple searches can include a contract search, a contractor profile search, an intranet search, and an intranet search, such as, for example, that performed by the contract procurement research data searcher 201, described previously. Advantageously, the multiple searches are performed without the need for a contracting entity member user to request such search to thereby proactively instill in the contracting representative the idea of researching information related to the respective contract procurement from as many sources as possible.

The contracting representative can also individually perform a contract room search using, for example, a search engine such as the contract room profile searcher 221, described previously, which allows the contracting representative to perform a detailed search of active or closed contract rooms (block 899). Advantageously, the search can include the specific contracting representative's closed rooms or those active rooms the contracting representative is authorized to view. The "closed rooms" criterion can be set to limit the search to the respective user's closed rooms. The authorized active rooms criteria allows for the display of those contract rooms that belong to other contracting representatives in which, for example, the selected contracting representative was granted permission by the respective responsible contracting representative to enter and view. The search can also focus on various attributes including, for example, requisition number; contract title; responsible contracting representative; proponent organization code; proponent name; contract signatory name; creation date; and/or contractor.

Further, the contracting representative can also perform a signed contracts search (block 901) using search criteria such as that shown in table 701 (see FIG. 48), which can include: the contract number; requisition number; proponent organization code; contract title; contractor vendor number; and contractor name. Advantageously, such data improves the contracting representative's ability to apply lessons learned and to develop an optimal contract room.

The contracting representative can import a list of contracting entity members authorized to access the respective contract room (block 903). According to an embodiment of the method, the contracting representative is provided a contracting entity participant web page 253 (FIG. 17) which lists contracting entity personnel (participants) who will be authorized to access and/or perform functions within the respective contract room. Responsive to related functions in SAP Finance and SAP Human Resource Modules, if the system 30 is so configured, or a contracting entity developed list of contracting entity personnel having preselected permissions, most of the names of the participants can be automatically set or otherwise provided as a default contracting entity participant proposed list. By accessing this web page 253, the contracting representative can readily determine the names of each contracting entity participant and their affiliated organizations, along with their assigned roles for the respective contract room. Further, the contracting representative can modify the other users, as necessary, to account for availability issues (block 905), such as, for example, when one or more may be unavailable for a short or long period of time. Similarly, the contracting representative's supervisor can modify the contracting representative assigned to the respective contract room.

The contracting representative can also establish and/or modify a procurement schedule (block 907). A procurement schedule web page 263 (FIG. 18) can be provided to display online to each contractor under consideration for the contract procurement transaction a schedule of procurement activities. According to an embodiment of the method, the web page 263 can include an invitation for proposal date, bid closing date, and other related data, providing a single consolidated location to receive schedule information. Further, advantageously, in response to modification or updating of the schedule of any one of the procurement activities by the contracting representative, all contractors under consideration can be provided automated notification over redundant media, e.g., both fax and e-mail, of a requirement to review the schedule changes. As the procurement schedule preferably feeds into other functions within the contract room, advantageously, providing such centralized dissemination can help ensure that only one consistent schedule is posted and consistently viewed by all contractors under consideration and bidders, preventing inadvertent dissemination and/or viewing of an outdated schedule.

Advantageously, throughout the procurement transaction, the contracting representative and other interested contracting entity users can view from inside the contract room and from a link provided in the users homepage (see, e.g., FIG. 39), e.g., within an active contract, for enlisting real-time summary data about the contract procurement status including procurement schedule compliance. According to an embodiment of the system 30, provided is a procurement status web page 733 (FIG. 52), described previously, which can display data grouped into, e.g., basic information; procurement status; turnover notes; and Gantt chart sections. The link within the individual user's homepage enables such users, especially management, to quickly and conveniently view the procurement status of each action without having to first access the related contract room.

Data provided in the basic information section 735 can include basic data about the contract procurement such as, for example, estimated value, target start date, pricing method, and others. Data provided in the procurement status section 737 can include comments entered by the contracting representative. Data provided in the turnover notes section 739, preferably only viewable by designated contracting entity contracting department members, can allow an incumbent contracting representative to leave notes viewable by a successor/substitute contracting representative. The data provided in the Gantt chart section 741 can include a graphical chart which can be systematically created and updated to display how the procurement time is expended, typically up to the date that the chart is accessed. Advantageously, this provides a ready picture of the progress of the procurement transaction.

Figure 59A:
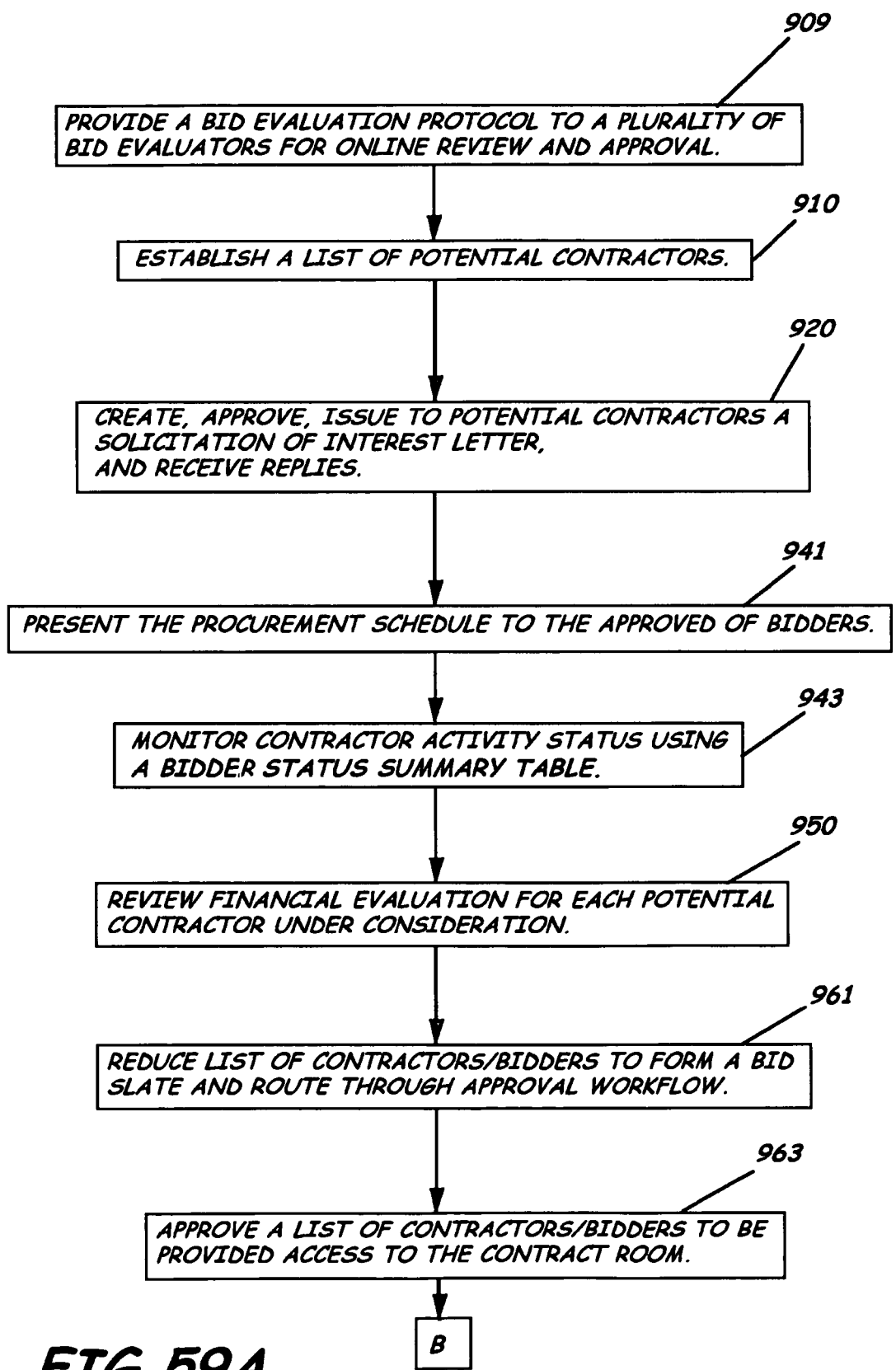
FIGS. 59A-B is a schematic flow diagram of a method of facilitating contract procurement and contract management over a computer network according to an embodiment of the present invention.
Figure 59B:
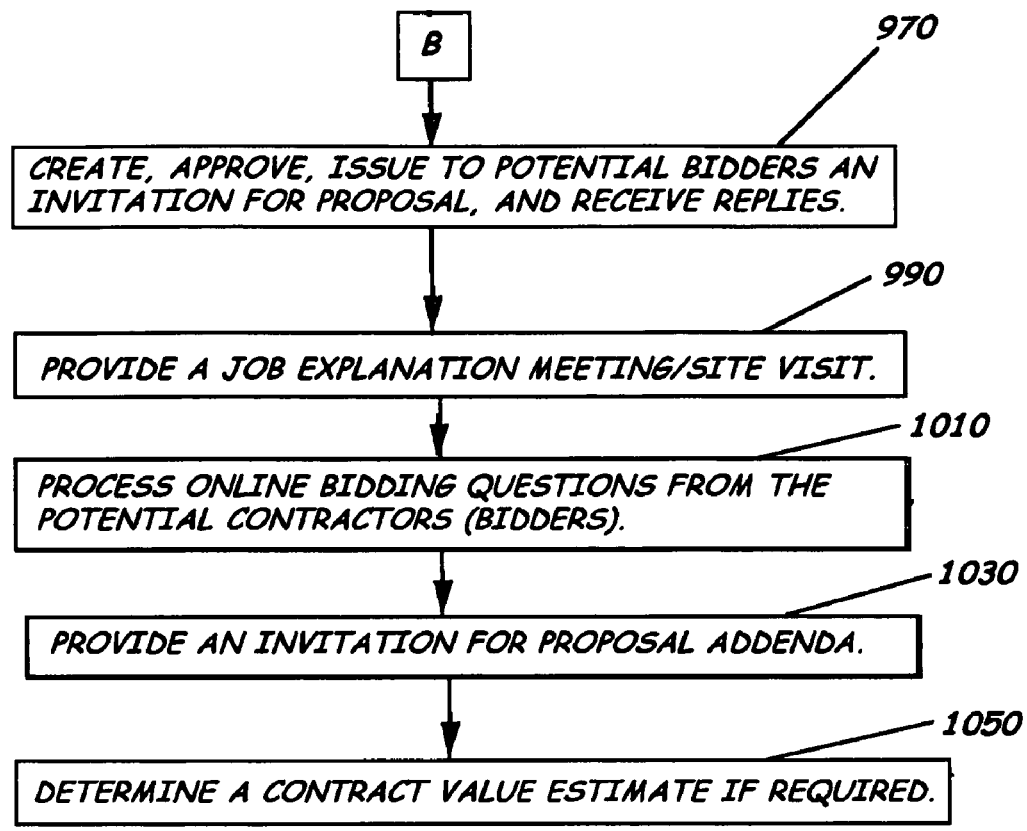

As perhaps best shown in FIGS. 59A-B, advantageously, embodiments of the present invention provide methods of preparing for, and inviting, bids from a plurality of potential contractors, to thereby facilitate contract procurement and contract management. A method, for example, can include the contracting representative establishing or otherwise providing and uploading a bid evaluation methodology/protocol for online review and approval to a plurality of designated contracting entity bid evaluators who will be involved in the bid evaluation (block 909). Advantageously, such routing can be accomplished according to an approval workflow having specific additional approval requirements for special cases in accordance with the contracting entity's business procedures. The workflow can also include requesting technical and commercial evaluation team members to sign confidentiality statements and can include providing automated alerts to those designated technical and commercial evaluation team members having not yet signed a confidentiality statement with respect to the contract procurement action associated with the respective contract room.

The contracting representative can form an extended list of potential contractors (bidders) from various sources such as, for example, the search results list of contractors resulting from: a prequalification search utilizing an advanced search such as, e.g., the previously described contractor profile searcher 131; general bid slates; previously created bidders lists from other contract rooms; previously approved final bid slates; or other such lists of potential contractors (block 910). This list of potential contractors can be used to feed a number of other functions in the contract room and can be used to enable those listed to access the contract room to perform certain functions according to the phase of the contract procurement.

Figure 60:
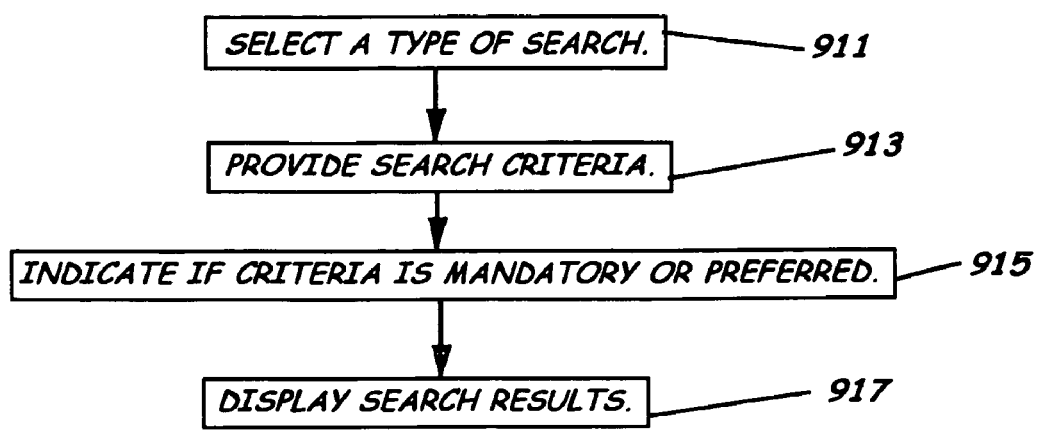
FIG. 60 is a schematic flow diagram of a method of facilitating contract procurement and contract management over a computer network according to an embodiment of the present invention.

As shown in FIG. 60, using a search tool such as the contractor profile searcher 131, the contracting representative can either select to perform a simple online contractor search using a single attribute such as, for example, an assigned vendor number, entered in, e.g., a contractor profile search web page 133 (see FIG. 7), or perform an advanced online search by entering criteria for a plurality of attributes displayed in, e.g., a contractor profile search web page 135 (see FIGS. 8A-C) having entry fields adapted to receive user input data (block 911). The entry fields advantageously can coincide with those categories and attributes associated with the various contractor profiles, such as: contractor introduction; human resources; warnings and remarks; and others, and the specific attributes therein. The contracting representative can enter or is otherwise provided search criteria for one or more entry fields (block 913), which advantageously can match those in the contractor profiles; and can select or otherwise indicate if such criteria is, e.g., either mandatory or preferable (block 915). The search results can then be displayed (block 917) to list those contractors who meet, e.g., all mandatory criteria, and can list such contractors in the order of the highest number of preferable criteria met by each contractor (see FIG. 9). The results can also include other basic information and allow the user to access the profile of each contractor appearing on the results table by, e.g., "clicking" on that contractor's name or vendor number.

As described previously, according to the exemplary configuration, the results can include the columns listed below: sequence number ("No."); vendor/contractor numbers as issued to the respective contractors through the SAP interface, if so configured; vendor/contractor names; and the number of preferable criteria met, i.e., number of attributes indicated as "preferable" in the entry fields of the contractor profile search web page 135 and matched with the respective contractor. By default, the contractors listed in the results can be ordered such that the contractors meeting the highest number of "preferable" criteria are shown at the top of the list and those with the lowest number or meeting none of the "preferable" criteria are shown at the bottom of the list. The user can sort the results by, e.g., "clicking" on the header of the desired column.

The results can also include indicia of contracting entity experience preferably indicated as, for example, either "yes" or "no" depending upon whether a particular contractor has performed or is currently performing work with the contracting entity. The results can further include: the number of active contracts currently being performed by the contractor and meeting a certain minimum value (long form contracts); the number of active contracts currently being performed by the contractor and not meeting such certain minimum value; and the number of pending contracts/requisitions under procurement for which the contractor is currently included in an approved bid slate (described later). The search results can also include remarks and warnings as appearing in the respective contractor's contractor profile. Additionally, each result can have a checkbox associated therewith that will allow contracting entity users to generate an executive report for each selected contractor.

The following is one example of possible criteria applied in one search:

| Contracting entity Name: | XYZ | Mandatory |
|---|---|---|
| Pricing Method | Lump Sum | Preferable |
| Value: | $10000000 | Mandatory |
| Human Resources category: | Process Engineer | Mandatory |
| Average Years of Experience with the Company: | 3 years | Preferable |
| Average Years of Experience Overall: | 10 years | Preferable |
| Quantity: | 5 | Mandatory |

The above search criteria will result in a list of only those contractors: who are affiliated with a contracting entity with a name that includes "XYZ"; for whom the contractor performed a contract of not less than $10000000 in value; and who have at least five process engineers. The list should not include any contractors who do not satisfy any one of the mandatory criteria requirements. In listing such contractors, those who satisfy the highest number of preferable criteria can, by default, appear on top. The list can also include contractors who do not meet any one of the preferable criteria.

Further, using the contractor profile searcher 131, the contracting representative can perform a search utilizing multiple and different search criteria to apply to the same field and in the same search, such as through use of an add criteria button 143, which can be associated with each separate category or section of the contractor profile search web page 135. The following is an example:

| Contracting entity Name: | XYZ | Mandatory |
|---|---|---|
| Pricing Method: | Lump Sum | Preferable |
| Value: | $10000000 | Mandatory |
| Contracting entity Name: | ABC | Mandatory |
| Pricing Method: | Time Unit Rate | Preferable |
| Value: | $2000000 | Preferable |
| Human Resources category: | Process Engineer | Mandatory |
| Average Years of Experience with the Company: | 3 years | Preferable |
| Average Years of Experience Overall: | 10 years | Preferable |
| Quantity: | 5 | Mandatory |

As shown in the above example, the same search will look for contractors who are affiliated with a contracting entity that includes "XYZ" in their name and a contracting entity that includes "ABC" in their name, along with the other criteria.

Note, the general bid slates can also be an advantageous source of potential contractors/bidders. According to an embodiment of the method, a contracting representative can be assigned to develop a general bid slate having selected contractors and a description of the applicability of the general bid slate. Upon forming such general bid slate, the system 30 can manage a workflow that routes the general bid slate among selected reviewers and approvers. Further, due to the importance of having an accurately developed array of general bid slates, to provide "off-the-shelf" selection of contractors, the newly developed general bid slate can be routed through higher level managers such as, for example, the division head for the contracting entity's contracting department, prior to posting the general bid slate for use by other contracting representatives.

Figure 61:
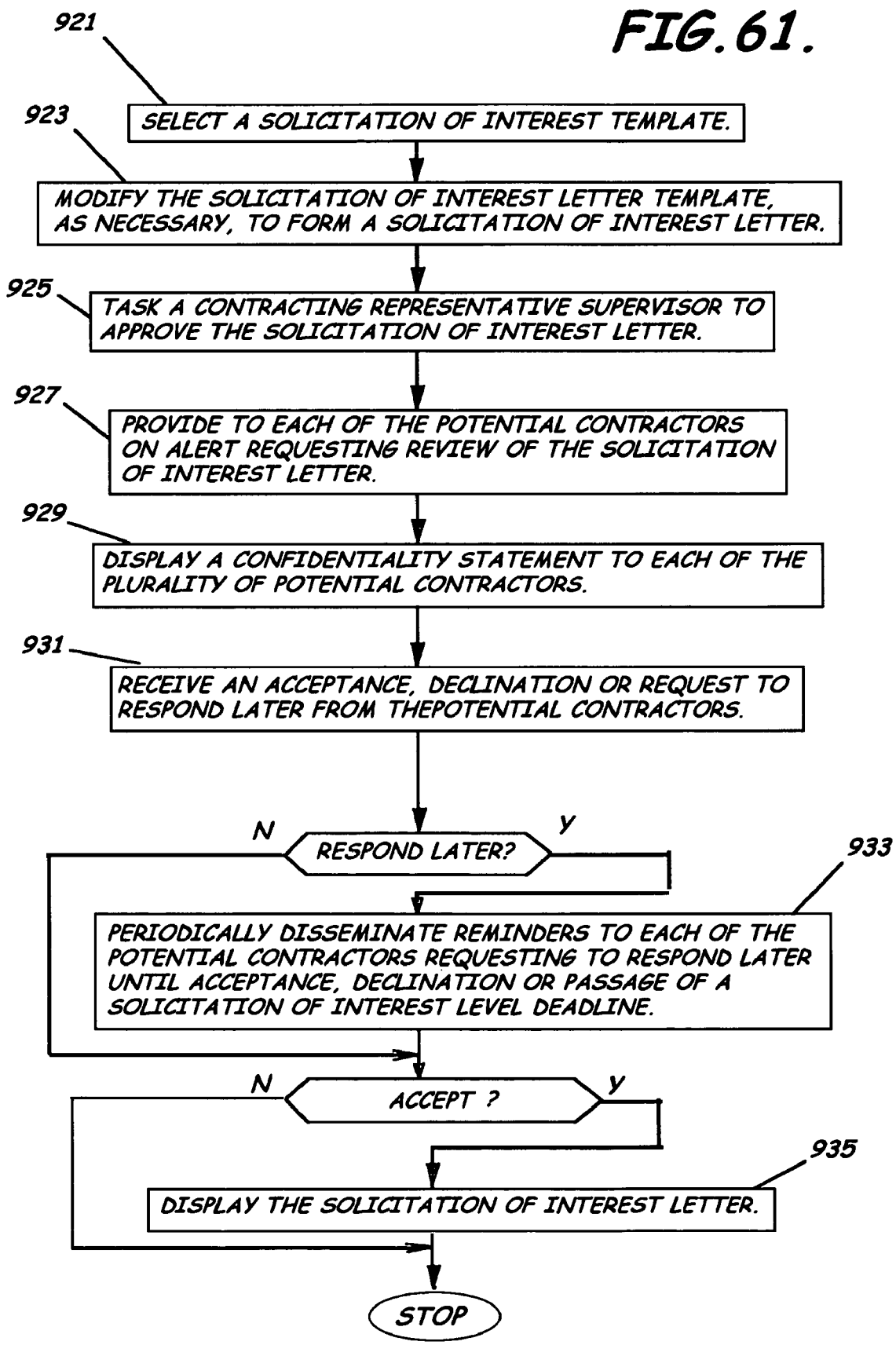
FIG. 61 is a schematic flow diagram of a method of facilitating contract procurement and contract management over a computer network according to an embodiment of the present invention.

As also shown in FIGS. 59A and 61, the method can include the contracting representative creating, approving, and issuing for online viewing a solicitation of interest letter to contractors under consideration along with managing the process of receiving those contractors' replies (block 920).

The contracting representative can select a solicitation of interest letter template from a plurality of standard templates (block 921), and can modify the selected solicitation of interest letter template (block 923). Such modifications can be applied to all solicitation of interest letters that will be issued to potential contractors/bidders. Advantageously, the contracting representative can customize different letters to the different prospective contractors by making the necessary changes and applying such changes to a separate letter for each specific contractor. In response to submitting the solicitation of interest letter or letters, a preselected contract representative supervisor can be tasked to approve the solicitation of interest letter or letters (block 925).

Each potential contractor under consideration can be provided and receive, e.g., via both e-mail, fax, and SMS message, or through other alternative outlets, an automated alert requesting each of the potential contractors under consideration to review the either standard or customize solicitation of interest letter (block 927). In response to each respective potential contractor under consideration attempting to view the contractor's solicitation of interest letter, the contractor is displayed or otherwise provided an online confidentiality statement (block 929). According to the preferred embodiment of the method, acceptance by the contractor of such confidentiality statement is a prerequisite for viewing the contractor's solicitation of interest letter. Each respective contractor can provide and the system 30 can receive an acceptance, declination, or request to respond later (block 931). If the respective contractor selects to respond later, the system 30 can periodically disseminate reminders to the potential contractor requesting to respond later until acceptance, declination, or until passage of a solicitation of interest letter deadline (block 933). If accepted, the accepting potential contractor is provided the solicitation of interest letter for online viewing (block 935).

As shown in FIG. 59A, the contracting representative, through the virtual contract room, can provide each contractor the procurement schedule (block 941) along with any updates thereafter. Advantageously, the procurement schedule can provide the invitation for proposal date, bid closing date, and other related data, in a single consolidated location, thereby improving schedule compliance. The contracting representative can also monitor contractor activity status using a bidder status summary (block 943), such as, for example, table 315 shown in FIG. 21. Advantageously, such table can be automatically updated by the system 30 to show where each contractor stands with regard to specific basis and activities in the procurement cycle.

Figure 62:
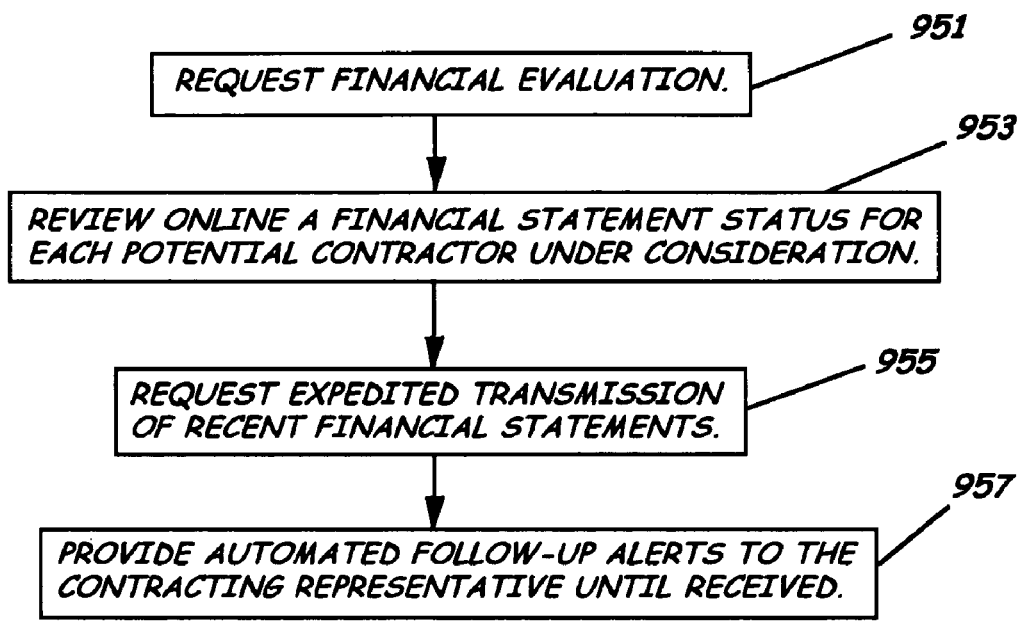
FIG. 62 is a schematic flow diagram of a method of facilitating contract procurement and contract management over a computer network according to an embodiment of the present invention.

As shown in FIGS. 59A and 62, the method can include the contracting representative reviewing a financial evaluation on each potential contractor to evaluate contractor eligibility for bidding on the pending contract (block 950). If not already updated, the contracting representative can request such an evaluation be performed (block 951). Advantageously, the system 30 can pre-populate an online treasury evaluation form such as, for example, web page form 405 (see FIG. 29), with most of the required financial data. This status can be updated by the financial organization directly into each contractor profile (see FIG. 6A), e.g., under "Financial Information," upon receiving the respective contractor's latest financial statements. At such time, contracting entity financial department can also specify the validity date of such statements beyond which those financial statements can no longer be used. The financial statements status can be, for example, any one of the following possibilities: not on file; on file; or expired. The "not on file" indication is preferably the default status until the financial statements are received by the financial department. The "on file" status indicates that the financial department has current financial statements that have not reached their validity end date. The "expired" indication indicates that any financial statements received have reached their validity end date as defined by the contracting entity financial department.

Once evaluation is complete, the contracting representative can review online the financial statement status for each of the potential contractors under consideration to determine contractor financial status for each of the contractors (block 953). If the financial information is not complete for one or more of the contractors under consideration, the contracting representative can request, preferably via a single input to an input device, e.g., single "click" of a mouse or other similar input device, expedited transmission of recent financial statements for that contractor (block 955). The system 30 can automatically provide follow-up alerts until the financial statement status indicates such financial statements are received (block 957). When the financial department is ready to submit the results of the respective contractor financial evaluation of each of the potential contractors back to the contracting representative, the financial evaluators can find a workflow to route the results for internal financial department approval, and once approved, post them in the contract room.

According to an embodiment of the method, the qualification indicia can include one of the following: unconditionally qualified; conditionally qualified; not qualified due to contractor's current financial position; not qualified due to contractor's current financial capacity; and not evaluated. If the evaluator selected "conditionally qualified," the evaluator is provided a text entry field or drop-down menu selection to specify a reason for the conditional qualification such as, for example, that the contractor has indicated the existence of a bank guarantee or a parent company guarantee. If indicating a bank guarantee, the evaluator can be required to specify the amount of the bank guarantee required. If indicating a parent company guarantee, the evaluator can be required to specify the name of the contractor's parent company from which the guarantee is to be provided.

If the conditional qualification indicates "not otherwise awarded requisition," the evaluator can be required to specify the number of other requisitions for the same contracting entity on which the contractor has been invited to bid and which requisitions, if awarded to such contractor, should result in the contractor not being awarded the contract related to the pending procurement action. Such selection can be due to, for example, contractor limitations such as, e.g., limitations in the contractor's financial capacity. Advantageously, such requirement can protect not only the contracting entity, but also the contractor from overextending.

As shown in FIG. 59A, after reviewing the responses to the invitations for proposal and financial status of the potential contractors/bidders, the contracting representative can reduce the list of potential contractors/bidders to a short list defining a proposed bid slate having attributes compatible with the procurement transaction, and route this proposed bid slate through an approval workflow (block 961). According to the preferred embodiment of the method, the bid slate can include a justification for the proposed list presented along with warnings applicable to each potential bidder. Once the bid slate is approved (block 963), the system 30 can lock the bidders list to those approved bidders so that only those approved will be able to access the respective contract room and perform the related functions.

Figure 63A:
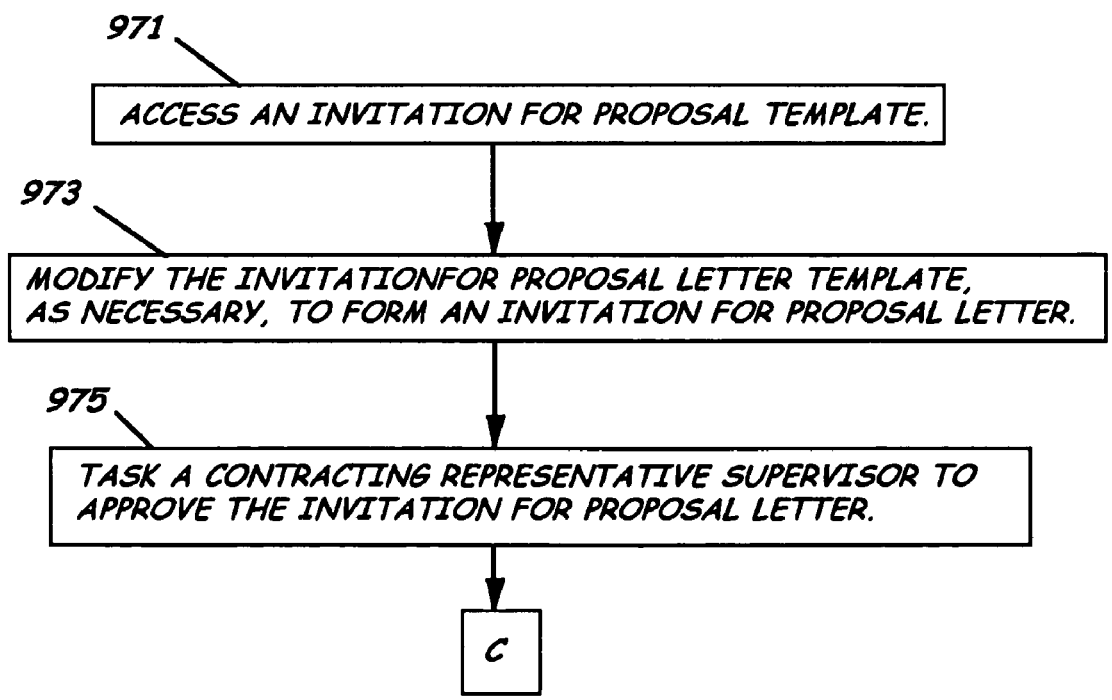
FIGS. 63A-B is a schematic flow diagram of a method of facilitating contract procurement and contract management over a computer network according to an embodiment of the present invention.
Figure 63B:
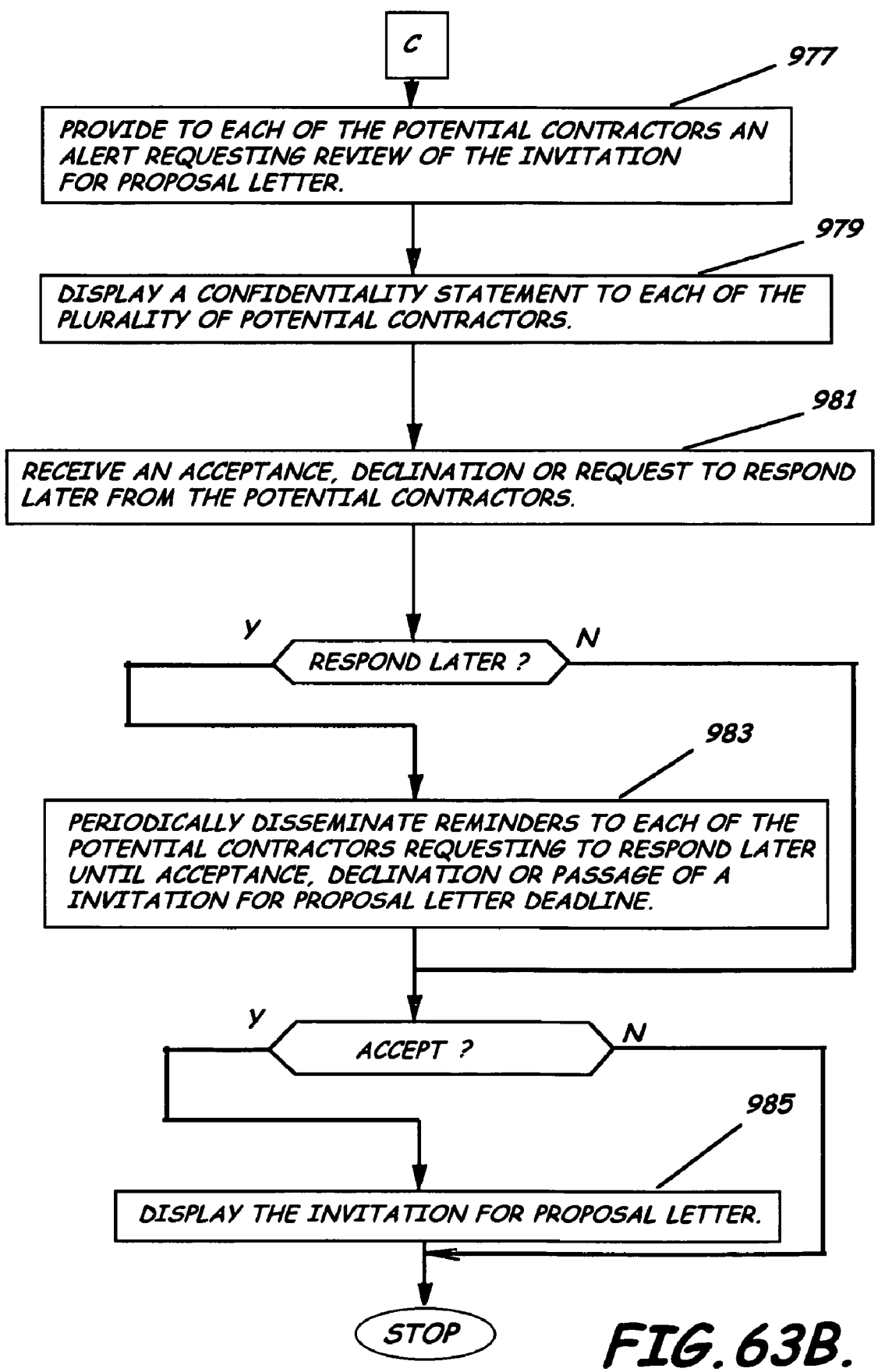

As shown in FIGS. 59B and 63A-B, the method can include the contracting representative creating, approving, and issuing for online viewing an invitation for proposal letter and related documents to contractors on the approved bid slate, along with managing the process of receiving those contractors' replies (block 970). As described previously, the invitation for proposal letter is the formal invitation by the contracting entity to each contractor, normally on the approved bid slate, to bid on the specific contract procurement at hand. As the invitation for proposal letter should only be issued after approval of the bid slate, according to the exemplary embodiment of the method, the system 30 can be programmed to prevent the issuance of invitations for proposal before bid slate approval.

As also shown in FIGS. 63A-B, the contracting representative can select an invitation for proposal letter template from a plurality of standard templates (block 971), and modify the selected invitation for proposal letter template (block 973). Such modifications can be applied to all invitation for proposal letter's that will be issued to potential contractors/bidders or the contracting representative can customize different letters to the different prospective contractors by making the necessary changes and applying such changes to a separate letter for each specific contractor. In response to submitting the invitation for proposal letter or letters, a preselected contract representative supervisor can be tasked to approve the invitation for proposal letter or letters (block 975). Advantageously, approval results in an automated creation of a link to the respective invitation for proposal documents rather than requiring the contracting representative to transfer files.

Each potential contractor on the bid slate can be provided and receive via, e.g., both e-mail, fax, and SMS message, or through other alternative outlets, an automated alert requesting each of the potential contractors to review the standard or customized invitation for proposal letter (block 977) along with other invitation for proposal documents, which can include: instructions to bidders; a pro form a contract; a pricing form; and other documents. Similar to the procedures involved with the solicitation of interest letter, in response to each respective potential contractor attempting to view the contractor's invitation for proposal letter, the contractor can be displayed or otherwise provided an online confidentiality statement (block 979).

According to the exemplary embodiment of the method, acceptance by the contractor of such confidentiality statement can be a prerequisite for viewing the contractor's invitation for proposal letter. Each respective contractor can provide and the system 30 can receive an acceptance, declination, or request to respond later (block 981). If the respective contractor selects to respond later, the system 30 can periodically disseminate reminders to the potential contractor requesting to respond later until acceptance, declination, or until passage of a respective invitation for proposal letter deadline (block 983). If accepted, the accepting potential contractor is provided the invitation for proposal letter and other documents for online viewing (block 985).

Figure 64:
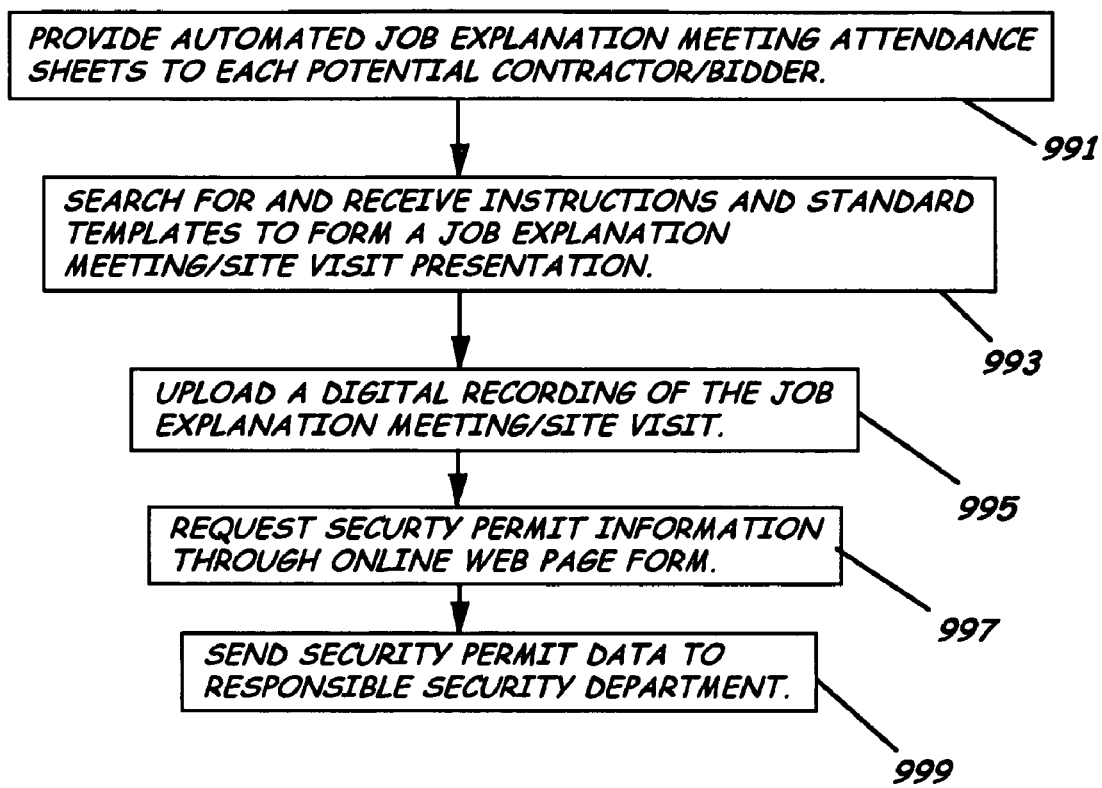
FIG. 64 is a schematic flow diagram of a method of facilitating contract procurement and contract management over a computer network according to an embodiment of the present invention.

As shown in FIGS. 59B and 64, the method can include various steps that provide the potential contractors an ability to properly evaluate the requirements of the pending contract in order to formulate their bid. For example, the method can include the contracting representative providing a job explanation meeting and preferably in coordination with the proponent representative, providing a site visit to each of the contractors (block 990).

According to the exemplary embodiment of the method, the system 30 can automatically generate and provide job explanation attendance sheets based, e.g., on the approved bid slate for distribution by the contracting representative to each contractor on the approved bid slate (block 991). Further, the system 30 can allow the contracting representative to search for and receive instructions and standard templates to thereby form a job explanation meeting/site visit presentation (block 993). At the beginning of the bidding period, in a job explanation meeting, the contracting and/or proponent representatives provide the approved bidders a presentation about the required contract services along with bidding instructions and other information. In order to improve the quality of the job explanation meeting, as well as ensure that certain standard information that is important to the contracting entity is effectively communicated, type-dependent contract templates for job explanation meeting presentations can be selected by the contracting representative. During the meeting, the contracting representative or other contracting entity member can record the meeting and can upload/associate a digital recording of the meeting and/or site visit with the contract room (block 995).

If a site visit is required and a site requires a security permit, the contracting representative can initiate an automated process that requests security permit information (block 997). Advantageously, the system 30 can send alerts, preferably by fax, e-mail, and or SMS messaging to the contractors requesting them to provide required information by completing an applicable section of an online form including provisions for providing names and data of their representatives for the site visit along with identification data such as, for example, government identification cards. Further, bidders who do not immediately complete the requirement can be provided automated reminders until the due date transpires. According to the exemplary embodiment of the method, the proponent representative is provided online access to the required bidders' information accumulated in a single table along with the identification data attached to each corresponding listing. After the due date, the proponent representative can send the security permit data to the responsible security department and can establish a workflow to obtain approval for any required security passes (block 999).

Figure 65A:
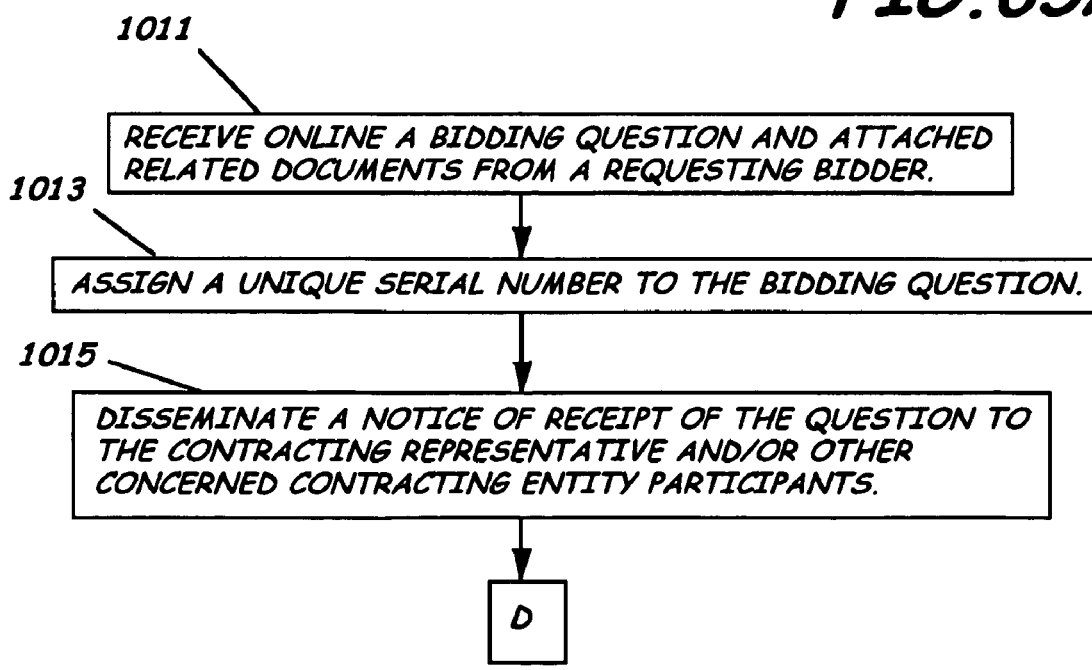
FIGS. 65A-B is a schematic flow diagram of a method of facilitating contract procurement and contract management over a computer network according to an embodiment of the present invention.
Figure 65B:
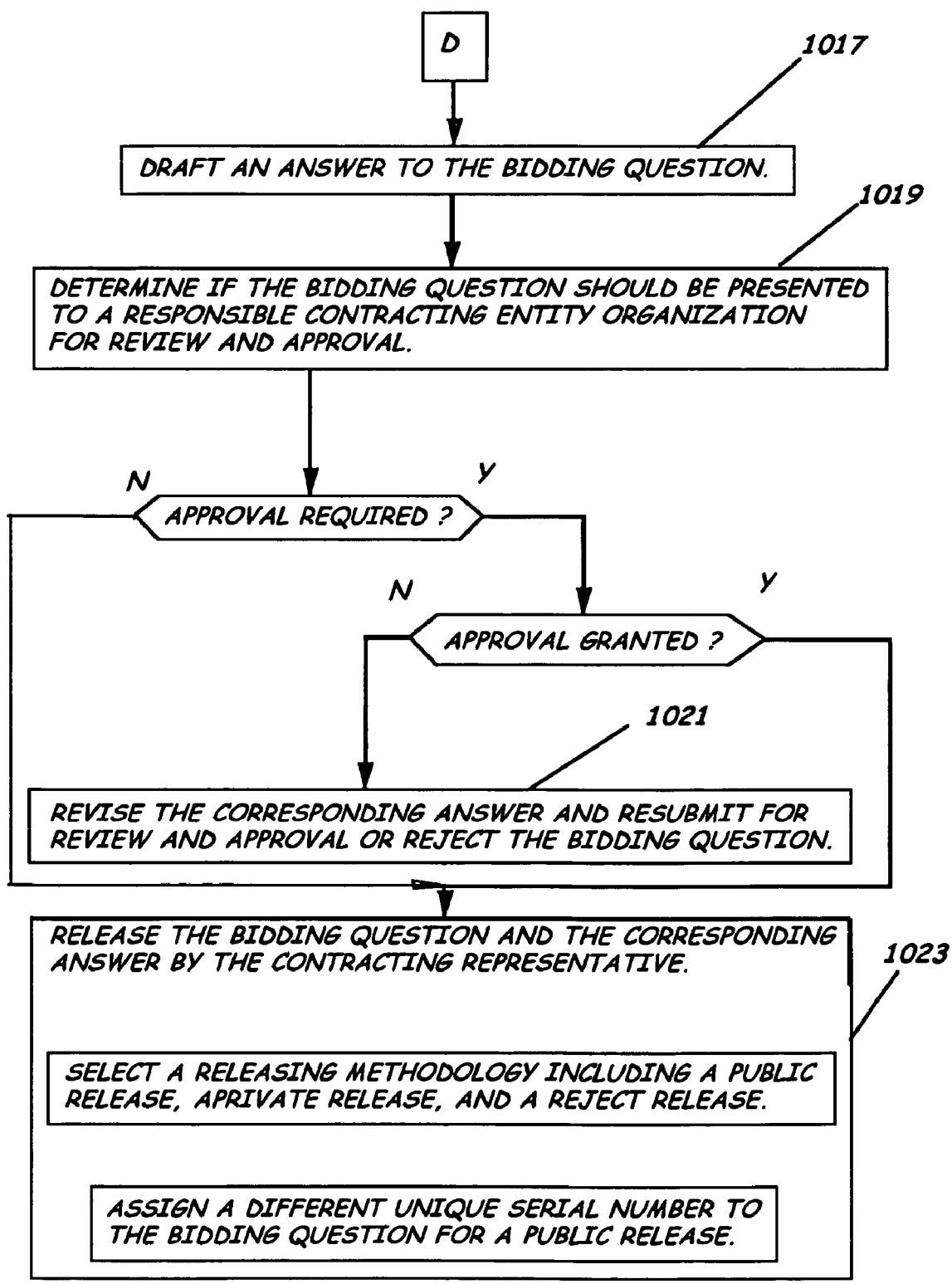

As shown in FIGS. 59B and 65A-B, the contractors can submit and the contracting representative can process questions related to bidding (block 1010). The system 30 can receive an online bidding question and any attached related documents from a requesting bidder (block 1011). Upon receipt, the system 30 can assign the question a unique serial number which preferably identifies the type of question (block 1013), i.e., bidding question, the originating organization, and the number of questions received from the requesting bidder. The system can automatically disseminate a notice of receipt of the question to the contracting representative and/or other concerned contracting entity participants (block 1015). Either the contracting representative or one of the concerned contracting entity participants can draft an answer to the bidding question (block 1017). The contracting representative, however, analyzes the bidding question and corresponding answer to determine if the bidding question should be presented to a responsible contracting entity organization such as, for example, the contracting entity's finance or law departments, for review and approval (block 1019). If approval is required and the responsible department does not approve the question-answer, the contracting representative can either revise the corresponding answer and resubmit for review and approval or reject the bidding question (block 1021).

If no approval is required or if approval is granted, the contracting representative can release the bidding question and the corresponding answer (block 1023). As part of the step of releasing the bidding question, the contracting representative can select a releasing methodology including a public release, a private release, and a reject release, described previously. When a public release is selected, the system 30 can assign a different unique/sanitized serial number to the bidding question that can allow the other potential contractors to access to question without knowing which contractor posed the question. Further, the system 30 can allow the contracting representative to ask a question and post the question and answer as though one of the contractors posed the question. Advantageously, this allows the contracting representative to clarify a requirement or draw the bidders' attention to certain information or requirements using a question and answer format and/or allows the contracting representative to provide additional information to the contractors without the need for providing an invitation for proposal addenda, described below.

Figure 66:
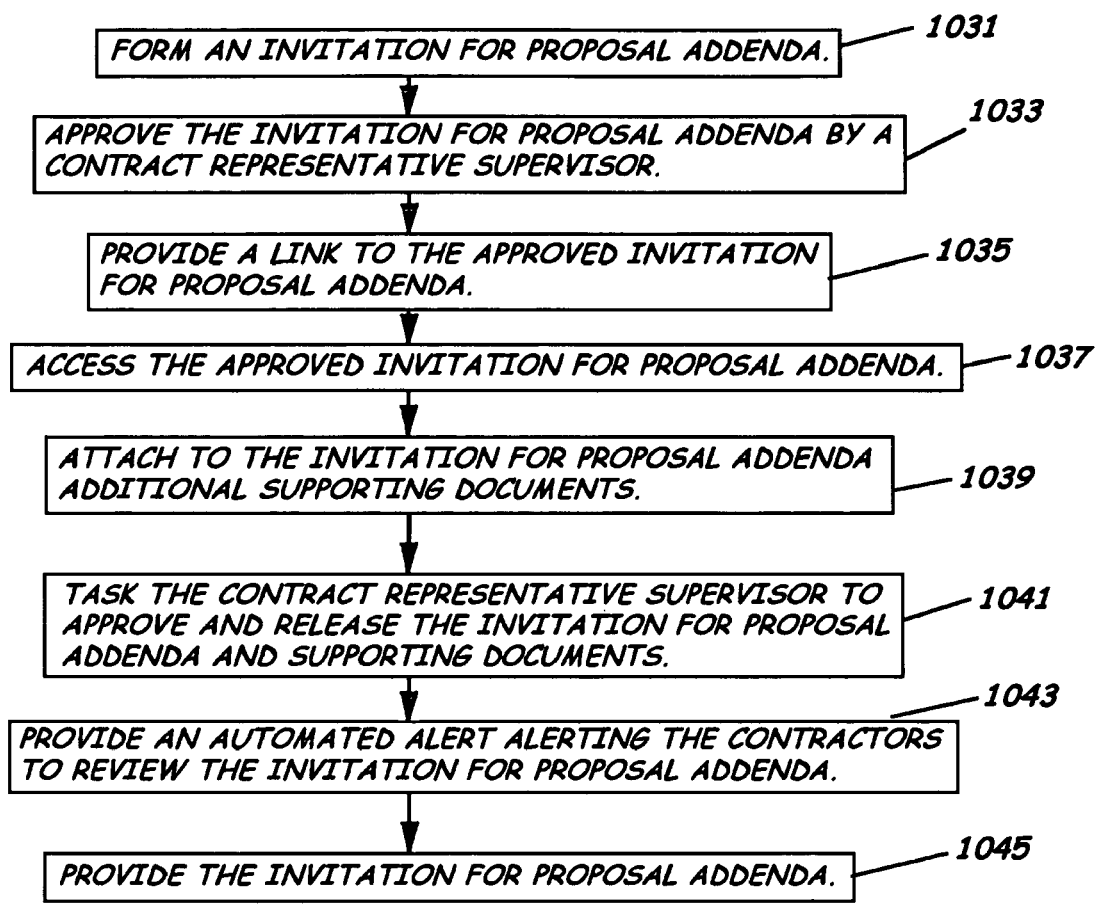
FIG. 66 is a schematic flow diagram of a method of facilitating contract procurement and contract management over a computer network according to an embodiment of the present invention.

As shown in FIGS. 59B and 66, the method can also include the contracting representative providing addenda for one or more of the invitation for proposal documents during the bidding period (block 1030). According to an embodiment of the method, when a draft addendum is formed (block 1031) and electronically functionally reviewed and approved by the contracting representatives supervisor (block 1033), a link to the addendum document can be automatically created (block 1035). According to embodiment of the system 30, the contracting representative can be provided and can access addenda approved and listed in a drop down menu listed by addendum number (block 1037). Upon selecting the desired addendum number, a link to each related addendum document is displayed on the computer display 53.

If the system 30 is not interfaced with an external document processing package, this initial approval step may not be required. Regardless of how the addenda or addendum was created, the contracting representative can upload or otherwise attach supporting documents, if applicable, to the addenda (block 1039) and submit the addenda to the contracting representative supervisor for review and release. Upon selecting an input such as, for example, the "submit to supervisor for review and release" button 507 (FIG. 34), the system 30 can provide a tasking to the contracting representative supervisor to approve and release the invitation for proposal addenda and supporting documents (block 1041). The supervisor can make comments and return the addendum to the contracting representative unapproved or can approve the addendum. If approved, the system 30 can send an email and/or fax or an SMS message to all bidders on the approved bid slate alerting them to the issuance of the addendum (block 1043). Each bidder can then access the contract room and view and/or download that addendum (block 1045).

Figure 67:
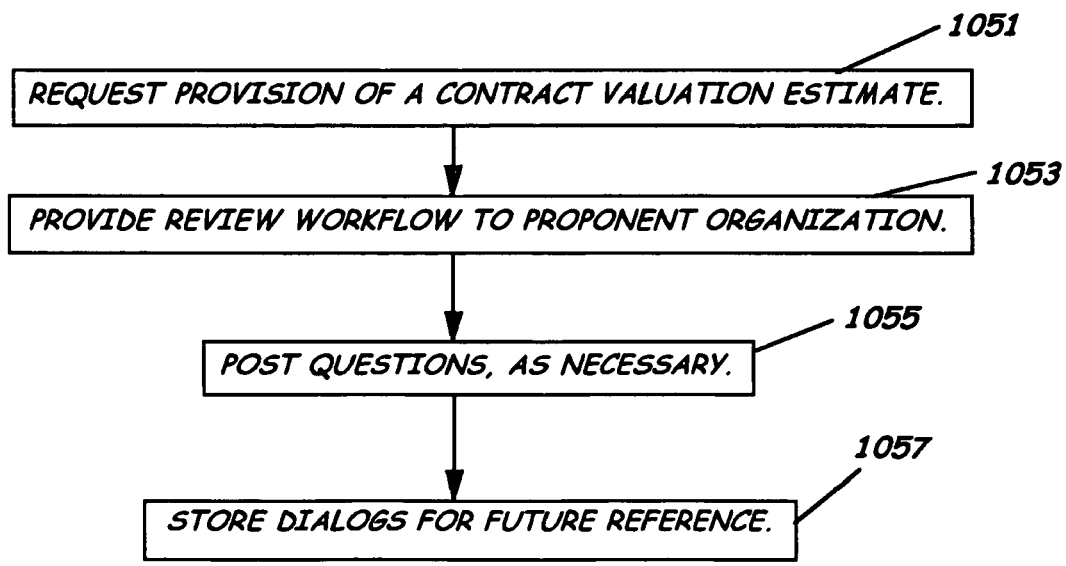
FIG. 67 is a schematic flow diagram of a method of facilitating contract procurement and contract management over a computer network according to an embodiment of the present invention.

As shown in FIGS. 59B and 67, the method can also include the contracting entity determining a contract value estimate for the pending contract (block 1050). According to the preferred embodiment of the method, whenever there are less than, e.g., three bidders, an in-house contract valuation estimate of the value should be requested and developed (block 1051). Most contracting entities have one or more departments capable of developing estimates used to assess the reasonableness of bidder rates. Advantageously, the system 30 can provide a follow-up workflow between estimators and the proponent representative (block 1053), enables the assigned estimator to post questions to the concerned technical staff and receive their replies (block 1055), can save such dialogues for future reference and for audit trail purposes (block 1057).

Figure 68:
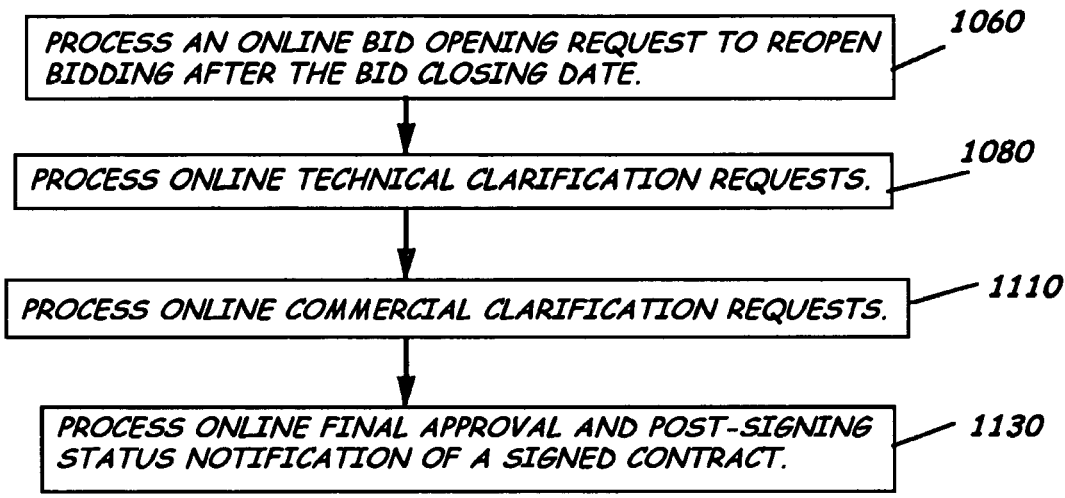
FIG. 68 is a schematic flow diagram of a method of facilitating contract procurement and contract management over a computer network according to an embodiment of the present invention.
Figure 69:
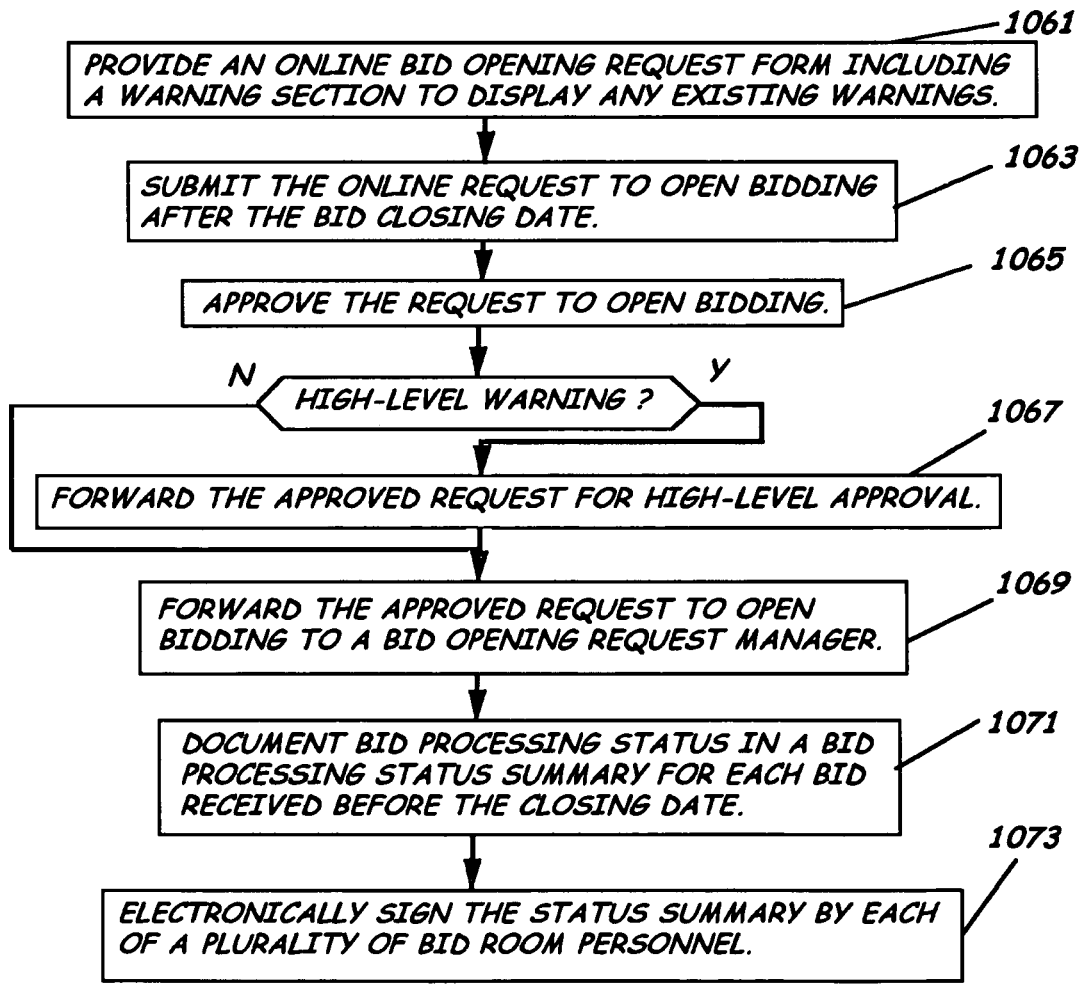
FIG. 69 is a schematic flow diagram of a method of facilitating contract procurement and contract management over a computer network according to an embodiment of the present invention.

As shown in FIG. 68, advantageously, according to embodiments of the present invention, provided are methods of developing and processing bids from a plurality of potential contractors, to thereby facilitate contract procurement and contract management. As perhaps best shown in FIGS. 68 and

69, a method can include processing an online bid opening request to reopen bidding after the bid closing date (block 1060). The contracting representative can access an online bid opening request form, such as, for example, web page 523 (FIGS. 35A-B), which can include a column that presents warnings that may exist on any of the bidders, advantageously, without waiting for the contracting representative to request such information. Such warnings can ensure that the contracting representative and the contracting representative's supervisor are made aware of any negative developments on any of the bidders prior to proceeding with requesting bid opening.

Upon submission of the online request to open bidding after the bid closing date (block 1063), the system 30, according to a predetermined workflow obtains the contracting representative's supervisor's approval (block 1065) then forwards the request to the bid room custodian/manager (block 1069). In addition, the workflow automatically forwards the request to a higher level of approval (block 1067) prior to forwarding it to the bid room custodian/manager (block 1069) if any of the bidders has certain types of warnings such as, for example, those considered the most serious by the contracting entity. When the bid room personnel complete the bid opening process, the bid room custodian or other assigned member can enter on a bid processing status summary the status of each bid as to whether it was received and opened (block 1071). Each of the bid room personnel can then electronically sign the status summary by, e.g., entering a respective user id and password (block 1073).

Figure 36:
FIG. 36 is a schematic diagram of a technical clarification questions web page used to facilitate contract procurement and contract management over a computer network according to an embodiment of the present invention.
Figure 70:
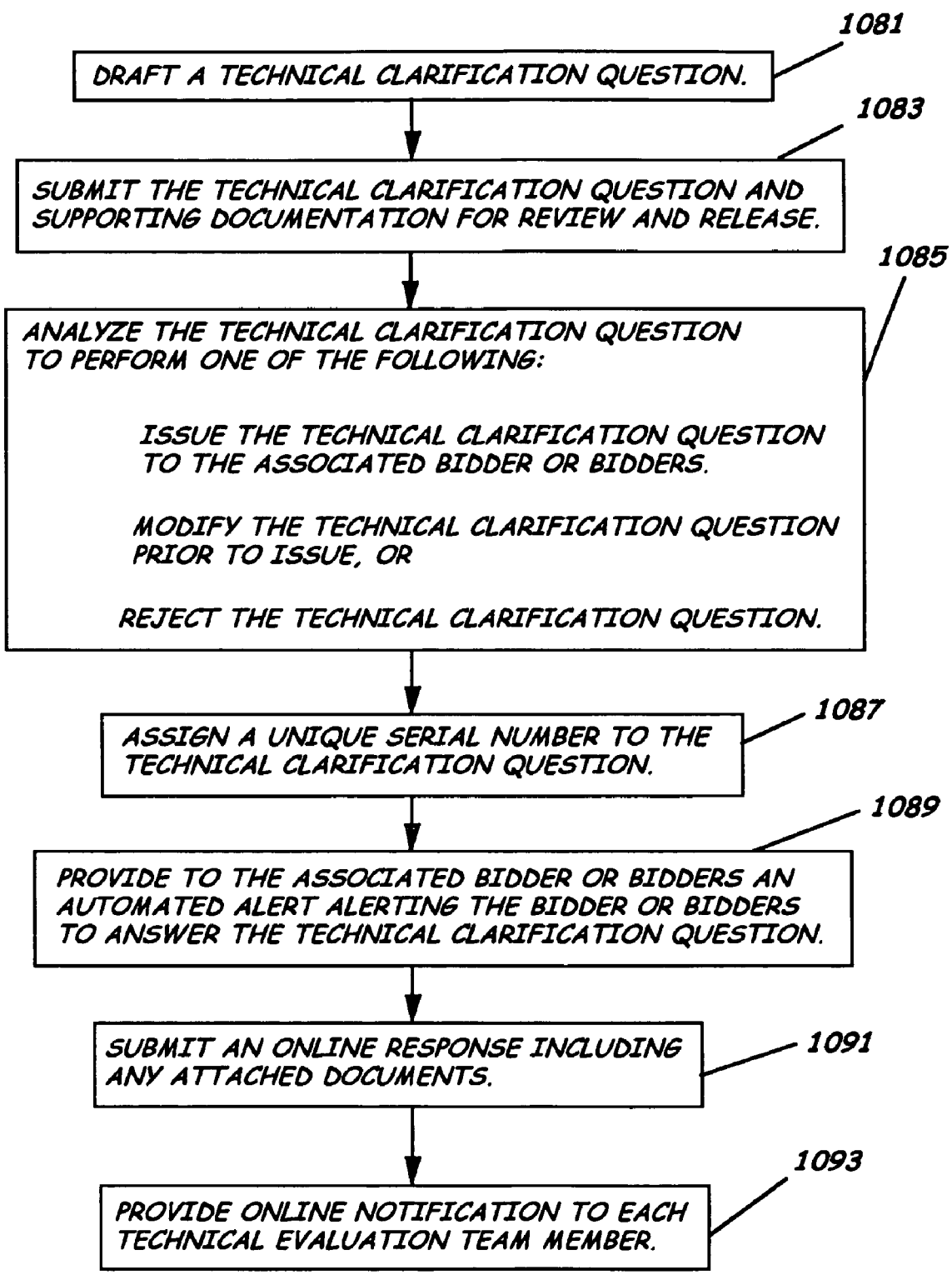
FIG. 70 is a schematic flow diagram of a method of facilitating contract procurement and contract management over a computer network according to an embodiment of the present invention.

As shown in FIGS. 68 and 70, the method can also include processing online technical clarification requests to thereby enhance bidder technical proposal evaluation (block 1080). Advantageously, each member of the technical evaluation team can prepare or draft a technical clarification question, attach illustration documents, if necessary, and select which bidder or bidders should receive the technical clarification question (block 1081). The team member who drafted the question can also choose to save it and return to completing it later. In such case, such question can be maintained in the system 30 and displayed in, for example, a draft questions section 544 of a technical clarification questions web page 543 (FIG. 36). When complete, the team member who drafted the question can submit the question and any supporting documentation to the contracting representative for review and release to one or more bidders (block 1083).

According to the preferred embodiment of the method, the contracting representative is provided a task by the system 30 to review and/or analyze the proposed technical clarification question (block 1085). As a result of the analysis, the contracting representative can decide whether to issue the proposed question without modification, modify and then issue the proposed question, or reject the proposed question. Once a technical clarification question is issued, the system 30 can re-categorize the question as "issued" and can assign it a unique serial number (block 1087). The serial number can include: the procurement requisition number; indicia that the question is a technical clarification question, e.g., "TCQ"; and indicia of the requester, e.g., an abbreviation of the receiving bidders name which differs from one bidder to the other. Advantageously, such unique serial number alone can provide summary data to the team members without the need to display the actual question and/or answer. The system 30 can automatically send an alert, preferably by both email, fax, and SMS message, to the bidder or bidders to whom the technical clarification question is addressed (block 1089), alerting them to the requirement to answer the technical clarification question.

Advantageously, the bidder or bidders can enter their response online, attach documents, if necessary, and submit their answer back to the contracting entity (block 1091). In response to such submission, an email or other online notification is automatically sent or otherwise provided to the members on the technical evaluation team, e.g., those listed as such in the contracting entity participants function for the respective contract room (block 1093). Advantageously, such online notification can provide each member with a link that can enable the respective team member to directly view the technical clarification question and the bidder's answer without the need to first access the contract room. The system 30 can also classify the question as an "answered" technical clarification question.

Figure 71:
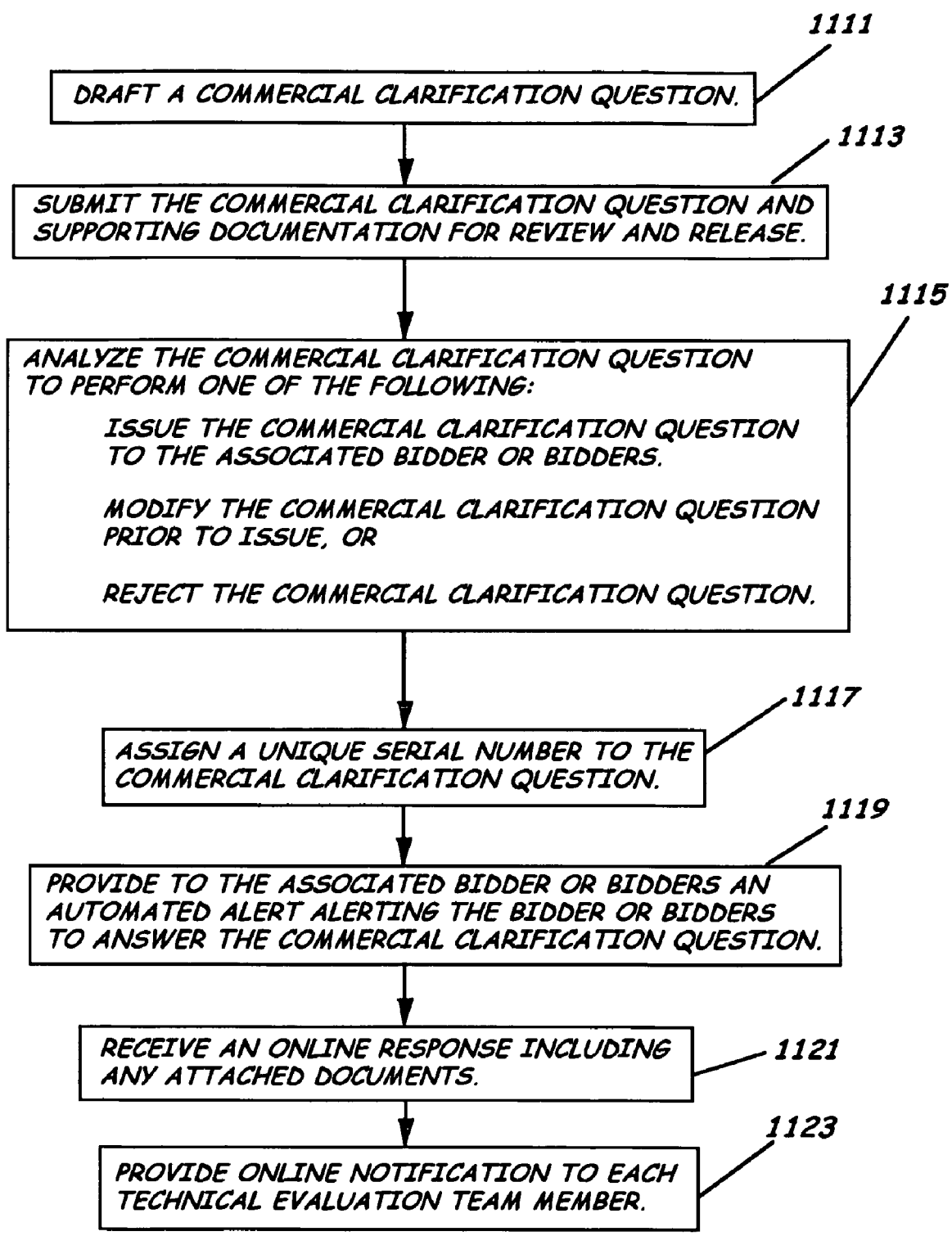
FIG. 71 is a schematic flow diagram of a method of facilitating contract procurement and contract management over a computer network according to an embodiment of the present invention.

As shown in FIGS. 68 and 71, similar to the steps of processing technical clarification requests, the method can also include processing online commercial clarification requests to thereby enhance bidder commercial proposal evaluation (block 1110). Each member of the commercial evaluation team can prepare or draft a commercial clarification question, attach illustration documents, if necessary, and select which bidder or bidders should receive the commercial clarification question (block 1111). The team member who drafted the question can also choose to save it and return to completing it later. In such case, such question can be maintained in the system 30 and displayed in, for example, a draft questions section 555 of a commercial clarification questions web page 553 (FIG. 37). When complete, the team member that drafted the question can submit the question and any supporting documentation to the contracting representative for review and release to one or more bidders (block 1113).

The contracting representative can then be provided a task by the system 30 to review and/or analyze the proposed commercial clarification question (block 1115). As a result of the analysis, the contracting representative can decide whether to issue the proposed question without modification, modify and then issue the proposed question, or reject the proposed question. Once a commercial clarification question is issued, the system 30 can re-categorize the question as "issued" and can assign it a unique serial number (block 1117). The serial number can include: the procurement requisition number; indicia that the question is a commercial clarification question, e.g., "CCQ"; and indicia of the requester, e.g., an abbreviation of the receiving bidders name which differs from one bidder to the other. The system 30 can automatically send an alert via, e.g., an email, fax, and SMS message, to the bidder or bidders to whom the commercial clarification question is addressed (block 1119), alerting them to the requirement to answer the commercial clarification question.

The bidder or bidders can enter their response online, attach documents, if necessary, and submit their answer back to the contracting entity (block 1121). In response to such submission, an email or other online notification can be automatically sent or otherwise provided to the members on the commercial evaluation team, e.g., those listed as such in the contracting entity participants function for the respective contract room (block 1123). Advantageously, such online notification can provide each member with a link that can enable the respective team member to directly view the commercial clarification question and the bidder's answer. The system 30 can further classify the question as an "answered" commercial clarification question.

Figure 72:
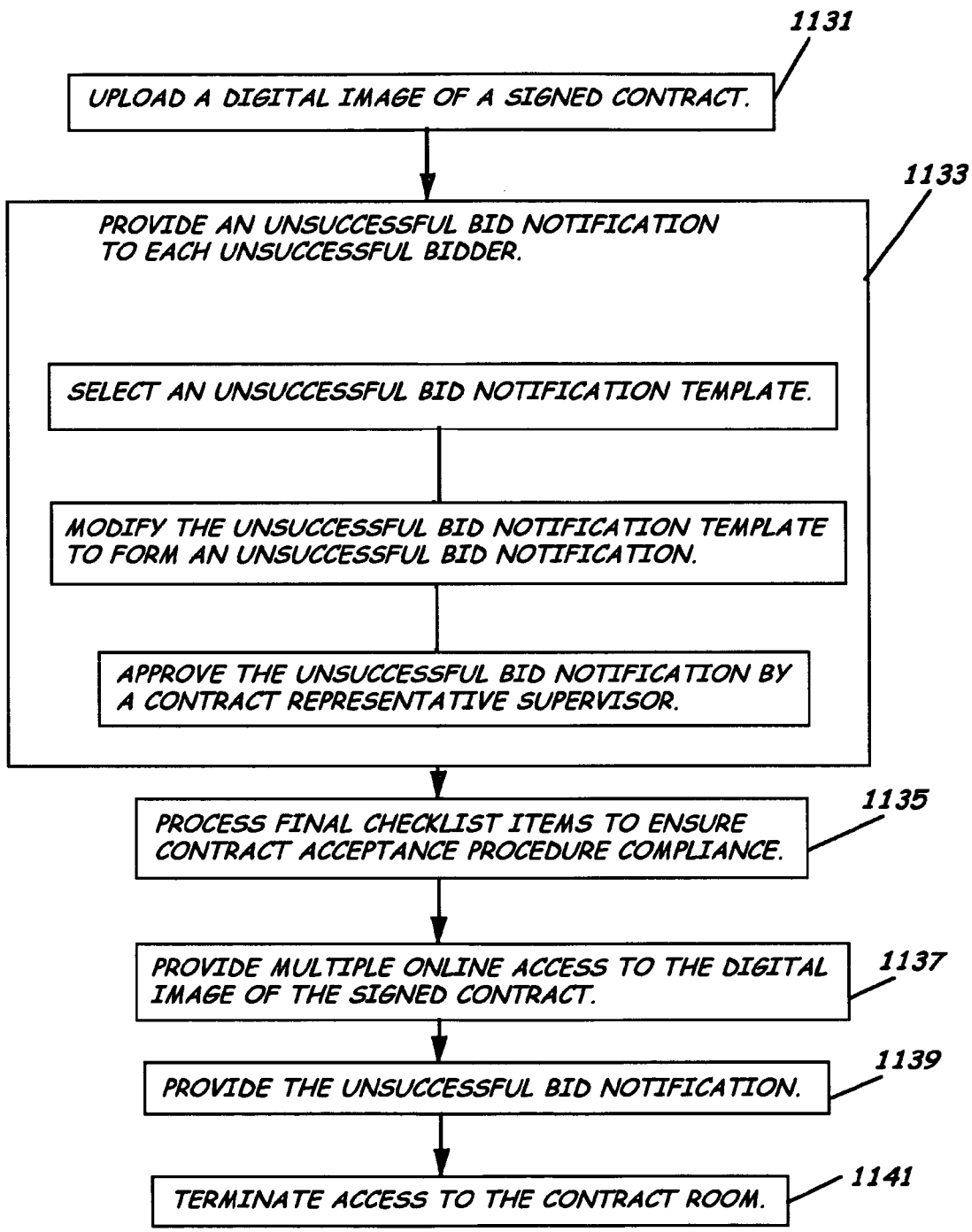
FIG. 72 is a schematic flow diagram of a method of facilitating contract procurement and contract management over a computer network according to an embodiment of the present invention.

As shown in FIGS. 68 and 72, the method can include online final approval and post-signing status notification of a signed contract. The contracting representative can upload a scanned or otherwise digitized version of the contract when signed by all parties (block 1131), to thereby make the signed contract available in a common place for all authorized contracting entity users to view during contract administration. The contracting representative can provide or otherwise process a notification to the unsuccessful bidders (block 1133). Advantageously, the contracting representative can select a standard template without modification or can modify the standard template to form either a custom global or individually tailored unsuccessful bid notification, using a mechanism similar to that provided for creating and editing the solicitation of interest and invitation for proposal letters. The contracting representative can also identify which approved bidder was the successful bidder, i.e., awarded the contract, to thereby inform the system 30 of which bidders were the unsuccessful bidders.

The contracting representative can further complete other final checklist items on a final processing checklist and can submit the checklist to the contracting representative's supervisor who can review and approve the work (block 1135). Upon the contracting representative supervisor's approval, the system 30 can automatically provide the online access to the digital image of the signed contract (block 1137); provide the unsuccessful bid notification (block 1139); and close or otherwise terminate access to the contract room (block 1141), so that no more activities can take place within the contract room without an authorized person retrieving and reopening the contract room. Note, according to an embodiment of the method, only the functions of the contract room are disabled. The contract room can remain viewable for a predetermined time period such as, for example, 30 days.

Advantageously, according to an embodiment of the present invention, provided are methods of using electronic bulletin boards (bulletin board web pages) to openly solicit contractor interest to either prequalify or bid for a preselected contract or contracts, to thereby facilitate contract procurement and contract management. According to one embodiment of the system 30, three types of bulletin boards are used: long form contracts 649 (FIG. 45); short form contracts for prequalification 669 (FIG. 47); and short form contracts for bidding (not shown).

As described previously, long form contracts are contracts whose estimated value exceeds a preselected threshold and meet other conditions set by the contracting entity. Long form contracts bulletin boards 649 are typically used to identify potentially qualified contractors for a specific contract. The long form contracts allows the contracting representative to receive special contractor information on contractors that is not typically included in their contractor profiles and/or to obtain information when the contracting representative is not sure which contractors to begin with, i.e., does not have a starting point to form and bidders list. The short form contracts are small value contracts that do not meet those same conditions.

An advantage of separating long form contracts from short form contracts is that the contracting entity, particularly large entities, may have a large number of short form contracts under procurement at any given point of time and thereby may wish to separate contracts deemed less important from those deemed important. Further, including both types in the same bulletin board would unnecessarily clutter the board.

Figure 73:
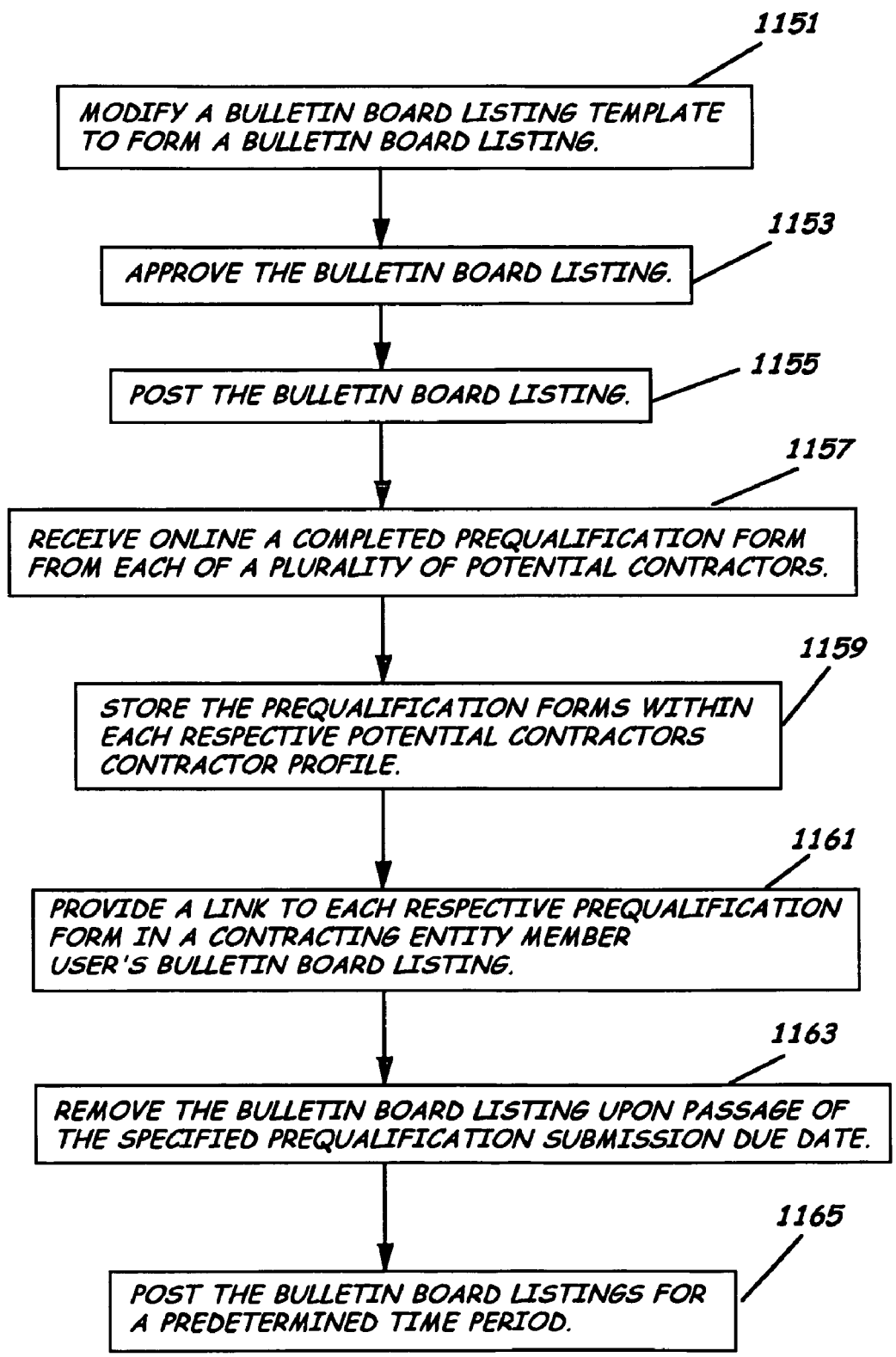
FIG. 73 is a schematic flow diagram of a method of facilitating contract procurement and contract management over a computer network according to an embodiment of the present invention.

As perhaps best shown in FIG. 73, the method can include posting a new listing. For example, using a long form contracts for administrative purposes, the contracting representative can fill in or otherwise modify information in a bulletin board listing/template to form a new bulletin board listing (block 1151), upload a prequalification questionnaire, and submit. The system 30 can then forward a task to the contracting representative's supervisor who can review and approve/or reject the proposed new listing. If approved (block 1153), the system 30 can automatically post the new bulletin board listing (block 1155) on a respective long form contracts bulletin board 649 (see, e.g., FIG. 45).

While the listing is posted, registered contractors can view the listing, download a prequalification questionnaire, upload their completed prequalification document, and submit it online to the contracting entity. When a registered contractor submits their prequalification document, the system 30 can receive (block 1157) and store the prequalification document within that contractor's contractor profile (block 1159) and provide a link to it in the related bulletin board listing (block 1161). This link preferably is only provided or otherwise made available to the contracting entity's authorized users as with indicia of the number of prequalification submittals received on their view of the bulletin board. The authorized users can download each submittal or review it online. Although the prequalification submittal is normally prepared for the purpose of pre-qualifying contractors for one specific contract, the system 30 advantageously can store it in the contractor profile to allow future contracting entity users to benefit from this information. At the end of the prequalification submission due date, the system 30 can automatically move the listings and/or otherwise categorize the listing as "expired" where it can remain for a preselected time period, e.g., 90 days, and then be archived (block 1165). Such "expired" data can be made viewable by authorized contracting entity users only and not by contractors.

Advantageously, the short form contracts bulletin board listings used for prequalification, due to their small value, can be used directly by the contracting entity's contract proponents with little or no need for the contracting representative's involvement. A new listing can be proposed by a proponent representative, approved by the proponent representative's supervisor, and uploaded into the respective short form bulletin board. The short form contracts listings used for bidding, also due to their small value, can be used by contracting entity contract proponents to openly solicit bids from registered contractors for short form contracts.

According to the preferred embodiment of the method, posting new listings on the short form contracts for bidding bulletin board is similar to that for prequalification except, instead of uploading prequalification questionnaires, the contract proponent can upload a pro form a contract and related instructions to bidders. According to an embodiment of the method, the contractors are then required to deposit their bids in physical bid boxes. According to an alternative embodiment, an electronic repository, accessible through the bulletin board, is provided to receive electronic copies of such bids.

Advantageously, to ensure that registered contractors are aware of the availability of the new listings, three separate links to the respective three bulletin boards are provided on, e.g., the top, of each contractor representative's personal homepage (see, e.g., FIG. 41), followed by an indication of the number of new postings and the last day modified. For example, such information can be presented in various forms as shown in the table below:

---

Bulletin Board - Lone Form Contracts (3 postings,
Last modified on "Date")
Bulletin Board - Short Form Contracts - Bidding (Currently no postings)
Bulletin Board - Short Form Contracts - Bidding (Currently no postings)

---

According to an embodiment of the present invention, provided are methods of providing and reviewing lessons learned which can allow the contracting representative and other contracting entity and contractor users to capture the various experiences that are gained during, for example, a contract procurement or administration process. Advantageously, not only contracting entity members, but also contractor representatives, can be provided an ability to enter lessons learned because the contractors may perceive difficulties, and thus, recognize potential improvements not necessarily recognized by contracting entity members.

Figure 74:
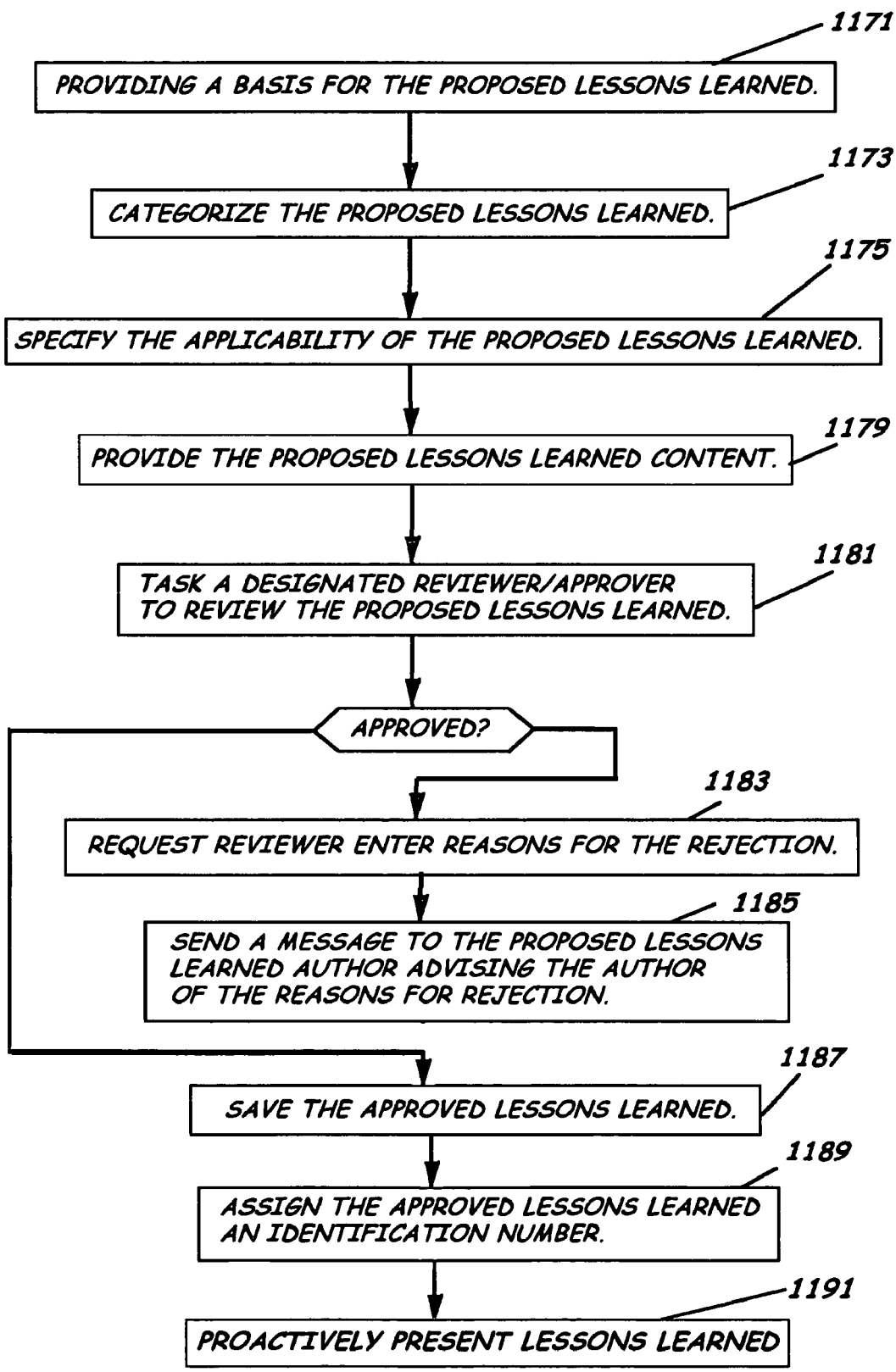
FIG. 74 is a schematic flow diagram of a method of facilitating contract procurement and contract management over a computer network according to an embodiment of the present invention.

As perhaps best shown in FIG. 74, according to an embodiment of a method of providing lessons learned, a contracting entity member or designated contractor representative having recognized a lessons learned can document the lessons learned and request their approval for viewing by others performing similar contract-related functions. Advantageously, processing of the lessons learned can be accomplished through the use of the lessons learned manager 181, described previously. The method can include the author of the lessons learned selecting or otherwise assigning the lessons learned a basis to which it was generated from, such as, for example, "contract procurement" or "contract administration" (block 1171). The lessons learned author can also categorize or otherwise define the general category under which the proposed lessons learned can be best identified (block 1173). For example, the lessons learned can relate to the categories of: contract language; technical specifications; and bid slate development, just to name a few.

The lessons learned author can also specify the attributes of the new contract procurement or contract administration to which the proposed lessons learned would be applicable (block 1175). For example, the lessons learned author can propose the applicability to be only to the re-bidding of the contract from which the lessons learned was generated, or to contracts that have specific attributes in terms of contract types, proponents, locations, or others. Advantageously, according to an embodiment of the method, if the lessons learned author's proposed lessons learned applicability is approved, the lessons learned can be provided to and/or displayed automatically in each contract room 153 that have the same attributes set in the approved lessons learned applicability.

After the lessons learned author enters and submits the content of the lessons learned along with any supporting documents (block 1179), the system 30 can provide or form a task to a designated reviewer/approver, typically in the contracting entity contracting department, to review and either approve or reject the proposed lessons learned (block 1181). If the designated reviewer rejects the proposed lessons learned, the system 30 can request the reviewer to enter reasons (block 1183), and upon submission, the system 30 can send a message to the lessons learned author advising the author of the contracting department's position and the reasons for rejection (block 1185). If the designated reviewer approves the proposed lessons learned, the system 30 can save the lessons learned (block 1187), assign it an identification number (block 1189), and then proactively present it to future contract procurements that share similar attributes to the approved lessons learned (block 1191).

Advantageously, the system 30 can also maintain an association between author and the approved lessons learned such that, as described previously, the author can search the lessons learned database to separately display those approved lessons learned submitted by the author. Advantageously, such lessons learned can also be searched according to the various other search criteria known to those skilled in the art.

It is important to note that while embodiments of the present invention have been described in the context of a fully functional system those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs) CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. Such media can include both operating instructions and instructions related to the electronic contracting product 71 and much of the method steps described above.

For example, embodiments of the present invention include a computer readable medium that is readable by a computer, e.g., server 35, contract entity member computer 47, and/or potential contractor computer 61, to facilitate contract procurement and contract management over a computer network, e.g., network 33, as described above and as shown in FIGS. 1-75, particularly with respect to the program product and the computer executable method steps, described above. For example, according to an embodiment of the present invention, a computer readable medium can include a set of instructions that, when executed by a computer, cause the computer to perform the operation of forming a contractor registration form, such as form 75 (see FIGS. 4A-D) including a company registration data field, a company free-form data field to allow contractor personalized input, a company experience list data field, a company human resource data field, a company equipment data field, a company certificate data field, a company distribution data field, and a company affiliation data field. The contractor registration form 75 can be presented to an unregistered contractor representative's web browser over the computer network 33. Upon receiving the completed the contractor registration form 75, the operation of registering a potential contractor is performed. Subsequently, an online contractor profile form such as form 85 (see FIGS. 6A-L) can be presented to the respective registered contractor representative's web browser over the computer network 33 to receive contractor pre-qualification data from the registered contractors. Advantageously, such form 85 provides a means of obtaining data in a uniform manner which can reduce repetitive requests for contractor prequalification data and reduce associated processing delays for each of a plurality of procurement transactions/pending contracts.

Corresponding, according to an embodiment of the present invention, a computer readable medium can include a set of instructions that, when executed by a computer, cause the computer to perform the operation of forming a database 41 of contractor records 45 (see FIG. 1) including a plurality of contractor pre-qualification data fields for a plurality of contractors to thereby reduce such repetitive requests for contractor prequalification data and reduce associated processing delays for each respective one of a plurality of procurement transactions. The instructions can also include those to perform the operation of providing a contractor profile search web page form 133, 135 (see FIGS. 7 and 8A-C) having one or more prequalification criteria entry fields adapted to receive contracting entity representative (member user) input data indicating desired contractor prequalification attributes for the preselected pending contract. The attributes can be indicated by the user to be either mandatory or preferred.

The instructions can also include those to perform the operation of receiving the completed contractor profile search web page form 133, 135, including user entered search criteria, and providing a contractor profile search results web page, such as web page 137 (see FIG. 9), in response to the search criteria entered in the contractor profile search form 133, 135. The contractor profile search results web page 137 can include a table 141 of registered contractors having attributes matching the entered contractor prequalification attributes to thereby enhance and improve selection of a potential contractor by the contracting entity representative to thereby perform the preselected pending contract. The table 141 can include a plurality of registered contractors having all attributes indicated as mandatory and ordered by registered contractor satisfying a preselected attribute preference for attributes indicated as preferred. By default those contractors with the largest number of preferred criteria can be displayed first. The table 141 can also include a "report" link selectable to generate a report on a selected contractor. Advantageously, the instructions can also include those to perform the operations of separately searching each of the plurality of contractor prequalification data fields for each search iteration using search criteria entered in corresponding prequalification criteria entry fields. Advantageously, multiple criteria for each separate search field can also be entered.

According to an embodiment of the present invention, a computer readable medium can include a set of instructions that, when executed by a computer, cause the computer to perform the operation of assigning a separate main web page 153 (see FIGS. 10A-E and 10F-H), defining a virtual contract room, to each of a respective plurality of contract procurement transactions to provide multiple user access for requesting and receiving contract bids. Each virtual contract room, normally managed by a primary contracting entity representative, can include a toolbar 157 to select a plurality of contract procurement functions, a pending tasks section 159 providing access to a separate link to each currently pending task associated with the respective user and associated with the respective contract room filtered from pending tasks of other users, and a recent communications section 161 providing access to a separate link to each of a plurality of inbound and outbound communications for the contract room.

As noted previously, advantageously the virtual contract room can, for example, be created in response to approval of a contract procurement transaction in SAP. After being assigned to the virtual contract room, the primary contracting entity representative performs various duties including reviewing research data, reviewing other contract rooms, and reviewing lessons learned in order to prepare for management of the contracting transaction.

The instructions can include those to perform the operation of forming for each virtual contract room a contract procurement research search results web page such as, for example, web page 205 (see FIG. 14) including a listing of media satisfying preselected search criteria, in response to, for example, contracting entity approval of the respective contract procurement transaction for each associated preselected pending contract. Advantageously, such search results web page 205 provides the assigned contracting entity representative research data relating to contract procurement from multiple sources. Such resources can include but are not limited to other active contract rooms, active contracts, expired contracts, contractor profiles, intranet, and a focused selection of Internet sources. Advantageously, such functionality can enhance development of each virtual contract room.

The instructions can include those to perform operations that allow the user to perform a more detailed search for active or closed contract rooms. For example, the instructions can include those to perform the operation of providing a contract room profile search web page form 223 (see FIG. 15) which can include links to search various contract room categories such as, for example, closed rooms associated with the viewing user, any contract rooms the user is authorized to view, requisition number, contract room title, assigned contracting representative name, proponent organization code, proponent representative name, contract signatory name, contract room creation date, and contractor name.

That is, according to an embodiment of the computer readable medium, the instructions can include those to perform the operation of limiting the search to: the user's closed contract rooms; those contract rooms that belong to other contracting representatives in which the user was granted permission to enter and view; a specific requisition number or portion of the number; part or all of a contract room title; those that are or were handled by a specific contracting representative; contracting entity proponent organization code or part of the code; contracting entity proponent organization name or portion thereof; contract signatory name or portion thereof; creation date or period; and contractor name or portion thereof of contractors that are or were included as approved or potential bidders.

The instructions can also include those to perform the operations of providing a contract room profile search results web page 245 (see FIG. 16) including a table that lists the contract rooms which the user is authorized to view based on the user's permissions and that meet the user's search criteria. The table can include or otherwise provide a link to each such contract room, preferably along with some basic information about each listed contract room.

The instructions can include those to perform the operation of providing an online lessons learned profile search web page form such as, for example, web page form 193 (see FIG. 13) to a contracting entity member through the respective contracting entity representative's web browser. The lessons learned profile search web page form 193 can have a plurality of entry fields adapted to receive user input data indicating selected lessons learned attributes for the historic lessons learned. The instructions can further include those to perform the operations of receiving search criteria including a plurality of lessons learned attributes from the contracting entity member user, and providing a listing of lessons learned having attributes matching one or more entered lessons learned attributes, to thereby enhance contract procurement management.

According to an embodiment of the computer readable medium, the instructions can include those to perform the operations of subordinating the contract room to another contract room to form a master procurement contract room to thereby provide simultaneous contract room updating for a plurality of contract rooms, disabling a plurality of functions within the subordinated contract room in response to subordinating the contract room, and providing reference instructions to a user to access the master procurement contract room to perform the disabled functions on the subordinated contract.

Advantageously, the computer readable medium can include instructions that are executable by a computer to perform various ancillary functions typically previously accomplished manually. For example, according to an embodiment of the present invention, with respect to the contractor view of the procurement transaction, the instructions can include those to perform the operation of periodically iteratively alerting each contractor representative having an outstanding task of such outstanding task to thereby enhance potential contractor deadline compliance. Such alert can be provided over redundant channels, e.g., both email, fax, and SMS message, to ensure receipt, and can be provided periodically in response to a preselected time attribute until the outstanding task is completed or passage of an associated task deadline.

Also for example, the instructions can include those to perform the operation of providing a contractor management user online access to view and monitor substantially all decisions and communications made on behalf of the respective contractor entity and decisions and communications issued by the contracting entity to each contractor representative associated with each of the plurality of virtual contract rooms associated with the contractor manager. Such functionality can help ensure that contractor managers and officers are able to properly supervise their employees assigned to communicate with the contracting entity, at least with respect to communications with the contracting entity. Correspondingly, the instructions can also include those to perform the operation of logging the name of each contractor representative performing a transaction related to one of the of virtual contract rooms associated with the contractor representative and a transaction date and time of the transaction, to thereby provide contractor representative accountability to contractor management. Note, a similar logging function can be applied to the contracting entity representatives.

The instructions can also include those to perform the operation of providing over the network 33 a contract procurement status web page such as, for example, web page 733 (FIG. 52) to a contracting entity manager's web browser. Such contract procurement status web page 733 can include sub-organizational based data summarizing interactions between contractor representatives and contracting entity representatives. In response to user selection of a contracting entity sub-organization, a listing of contract procurement actions for the sub-organization can be provided. Each contract procurement action listing can be linked to a respective procurement action status screen, which can include status comments entered by a contracting entity representative and data illustrating a respective contract procurement schedule.

The instructions can further include those to perform the operations of assigning one of the potential contractors generally associated with one or more of the virtual contract rooms a contracting entity-imposed contractor limitation including a contracting entity managerial decision affecting the potential contractor in response to receiving such decision, and providing a link to the assigned limitation in each of a plurality of virtual contract room related web pages having a contracting entity representative contractor decision entry fields. Advantageously, such functionality can automatically warn the assigned contracting entity representative of the contracting entity-imposed contractor limitation without the need to separately seek to determine if such a limitation exists. Such automated warning can help prevent an inadvertent contracting entity policy deviation by the respective contracting entity representative.

According to another embodiment of the present invention, a computer readable medium can include a set of instructions that, when executed by a computer, cause the computer to perform operations related to forming and developing a virtual contract room tailored to the assigned contracting entity representative. Specifically, the instructions can include those to perform the operation of forming a main contract room web page such as, for example, web page 153 (see FIG. 10A) to define a virtual contract room associated with a contract procurement transaction for a pending contract to thereby provide multiple user access to manage a contract procurement transaction. This initial step can, for example, be accomplished by the system 30 in response to approval of the respective procurement transaction. The instructions can also include those to perform the operations of presenting a selection of contract types from a plurality of contract type templates best approximating attributes of the contract procurement transaction to define various preselected contract room functions, providing input fields such as, for example, those provided in a contracting entity participant's assignment web page 253 (see FIG. 17) to allow assignment and modification of a list of contracting entity participants authorized to access the virtual contract room, and assigning to the contracting entity participants such contract room access authorization to perform the preselected contract room functions. Advantageously, such web page 253 can provide a unified location where the contracting entity representative can assign contracting entity participants to the virtual contract room who are authorized to view and access the virtual contract room.

Figure 12:
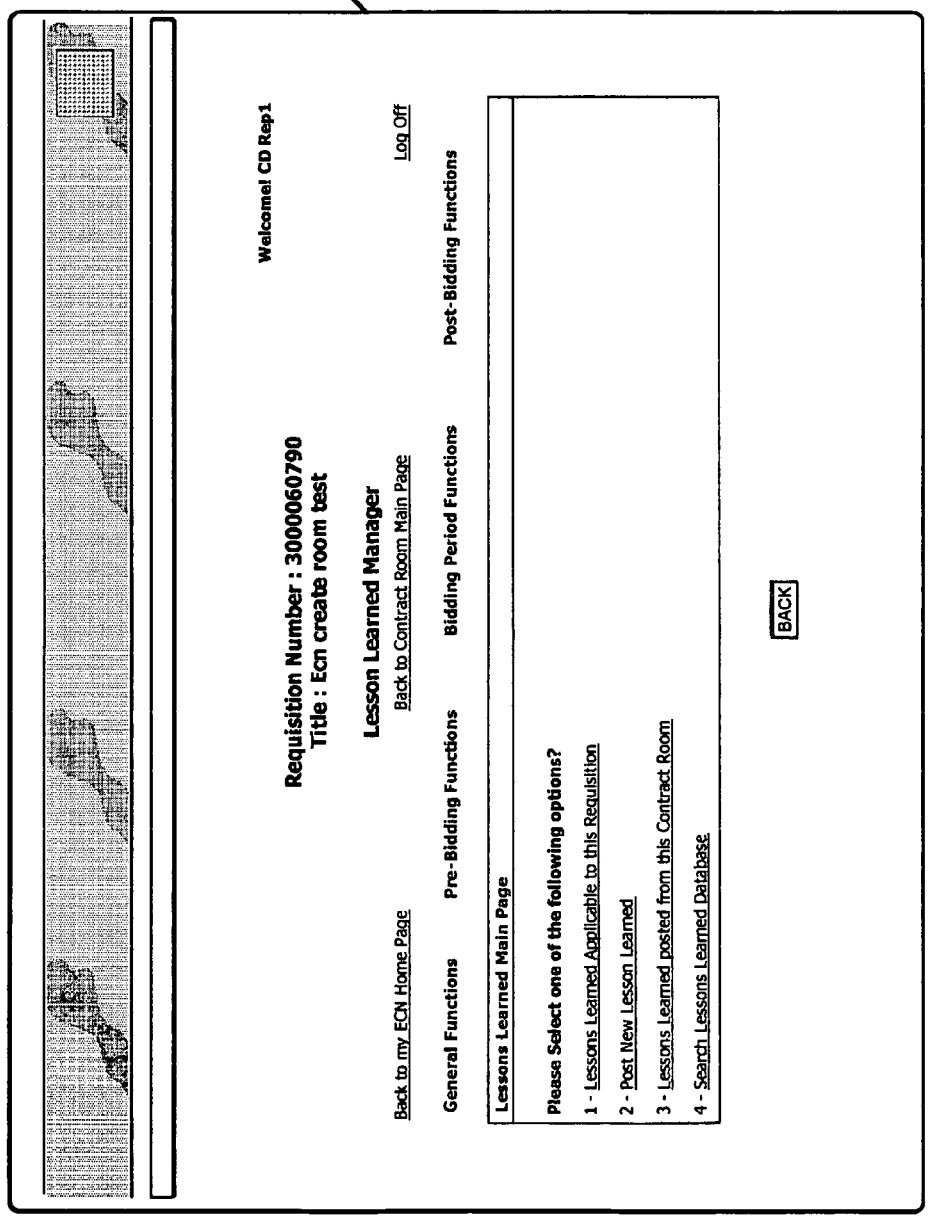
FIG. 12 is a schematic diagram of a lessons learned management web page used to facilitate contract procurement and contract management over a computer network according to an embodiment of the present invention.

The instructions can include those to perform the operation of providing the virtual contract room 153 a lessons learned web page such as, for example, web page 183 (see FIG. 12). Such lessons learned web page can include a first link to historic lessons learned associated with the selected contract type produced in response to the selected contract type, a second link to historic lessons learned associated with other contract types, a third link to a new lessons learned web page to associate with the selected contract type new lessons learned resulting from experience with the contract procurement transaction, and a fourth link to lessons learned posted from the respective virtual contract room. Advantageously, such lessons learned can help the contracting representative prepare for and streamline the contract procurement transaction process. In response to selection of the new lessons learned, the operations performed can include tasking a designated reviewer to review a proposed new lessons learned, saving the new lessons learned in a database of lessons learned records 805 (FIG. 75) in responsive to reviewer approval of the lessons learned, and providing access to the lessons learned through each of a plurality of virtual contract rooms associated with the procurement transactions having an attribute substantially similar to the selected attribute.

According to an embodiment of the present invention, a computer readable medium can include a set of instructions that, when executed by a computer, cause the computer to perform operations related to developing a virtual contract room 153. For example, the instructions can include those to perform the operations of forming a database 41 of contractor records 45 including contractor pre-qualification data for a plurality of contractors, performing a contractor prequalification criteria field search on the database 45 to form a list of potential contractors having attributes compatible with a selected of one of the plurality of procurement transaction to define a bidders list, and adding to the bidders list contractors listed in various other sources such as, for example, a general bid slate which is a predetermined list of contractors pre-associated with a selected contract category, and a pre-approved bidders list associated with another contract procurement transaction.

In order to help manage the selected contractors, the instructions can also include those to perform operations related to providing and monitoring a procurement schedule and providing and monitoring status of the contractors selected as bidders. That is, the instructions can include those to perform the operation of providing access to a procurement schedule for online viewing to each of the potential contractors in the bidders list. Advantageously, the procurement schedule can be positioned at a unitary location accessible via a respective potential contractor representative's web browser for each respective potential contractor in the bidders list to thereby prevent inadvertent viewing of an outdated version of the procurement schedule resulting in missed deadlines or improper preparation. The instructions can include those to perform the operation of providing automated notification of an update to the procurement schedule to each of the potential contractors in the bidders list, responsive to modification of the procurement schedule, to thereby ensure dissemination of the update. Still further, the instructions can include those to perform the operation of providing a bidder status summary table, e.g., table 315, to the contracting representative which can be automatically updated in response to contractor activity within the contract room to thereby provide the contracting representative for the contract room an updated contractor activity status for each of the contractors in the bidders list.

According to an embodiment of the present invention, a computer readable medium can include a set of instructions that, when executed by a computer, cause the computer to perform the operation of providing online access to a solicitation of interest letter to each potential contractor provided online to enhance the process of determining interest the pending contract related to the procurement transaction, and in response to an indication of such interest, providing online access to an invitation for proposal to thereby invite each of the interested contractors to bid on the pending contract. Advantageously, providing the invitation for proposal online can enhance procurement schedule timetable compliance.

Those instructions directed to providing access to the solicitation of interest letter can include those to perform the operations of providing a solicitation of interest letter template from a plurality of standard templates, modifying in response to a user input one of the plurality of solicitation of interest letter templates to form a solicitation of interest letter, tasking another contracting department representative such as, for example, the contract entity representative's supervisor, to approve the solicitation of interest letter, providing to the potential contractors an automated alert requesting each respective contractor to review the solicitation of interest letter, and providing an online confidentiality statement to each respective contractor in response to an attempted viewing of the solicitation of interest letter, acceptance thereof a prerequisite for viewing the solicitation of interest letter. The instructions can also include those to perform the operation of receiving an acceptance, declination, or request to respond later from each of the contractors. Those accepting are provided the solicitation of interest letter. Those requesting to respond later, can be periodically provided reminders until the eventual acceptance, declination, or until passage of a solicitation of interest letter deadline.

Similarly, those instructions directed to providing access to the invitation for proposal can include those to perform the operations of accessing online an invitation for proposal letter template, modifying the invitation for proposal letter template to form an online invitation for proposal letter, tasking the contract representative's supervisor or other selected approver to approve the invitation for proposal letter, providing an automated alert to each selected contractor to review the invitation for proposal letter, and providing an online confidentiality statement to each of the selected contractors in response to the attempted viewing of the invitation for proposal letter, acceptance thereof a prerequisite for viewing/ receiving online the invitation for proposal letter. Those accepting are provided the invitation for proposal letter. Those requesting to respond later, can be periodically provided reminders until the eventual acceptance, declination, or until passage of the invitation for proposal letter deadline.

Invitations for proposal frequently require modification. Correspondingly, the instructions can further include those to perform the operations of forming an invitation for proposal addenda in response to contracting entity representative input, providing an online link to the invitation for proposal addenda to allow the contracting entity representative to access the invitation for proposal addenda, tasking the contracting entity representative's supervisor or other approver to approve and release the invitation for proposal addenda, providing an automated alert to each of the selected contractors alerting each to review online the invitation for proposal addenda, and providing the invitation for proposal addenda over the network 33 to each of the selected contractors in response to selection of the invitation for proposal addenda by each respective contractor.

According to an embodiment of the present invention, a computer readable medium can include a set of instructions that, when executed by a computer, cause the computer to perform the operation of processing bidding questions. Specifically, the instructions can include those to perform the operations of receiving an online bidding question and any attached related documents from one of the potential contractors defining a requesting bidder, assigning a unique serial number to the bidding question including indicia identifying the originating contractor, and disseminating a notice of receipt of the question to the contracting entity representative for the respective contract room and/or one or more associated contracting entity participants in response to receipt of the bidding question, to thereby allow processing of a corresponding answer.

The instructions can also include those to perform the operations of releasing the bidding question and the corresponding answer according to a selected contracting entity representative selected release methodology in response to approval of the bidding question and the corresponding answer. The release methodology can include one of the following: a public release, a private release, and a reject release. The public release provides each selected contractor access to the question and the corresponding answer without any data identifying the requesting bidder. The private release provides access to the question and the corresponding answer by the requesting bidder and not the other of the contractors. A reject release provides notification to the requesting bidder that the question has been rejected and can provide either a preformatted or individually tailored explanation for the rejection.

According to an embodiment of the present invention, a computer readable medium can include a set of instructions that, when executed by a computer cause the computer to perform the operations of forming and assigning personalized homepages to contracting entity representatives and registered contractor representatives. Specifically, the instructions can include those to perform the operations of assigning a personalized contracting member user home web page such as, for example, home web page 603 (see FIG. 39) to each contracting entity representative associated with the contracting department of the contracting entity, and presenting each respective personalized contracting member user home page 603 to each contracting entity representative to thereby provide centralized access to perform contract procurement functions for each of the plurality of virtual contract rooms. Each personalized contracting member user home web page 603 can include a toolbar 605 having a plurality of user selectable contract procurement functions, an active contract room section 607 providing a separate link to each of a plurality of contract rooms associated with the respective contracting entity representative, a pending tasks section 609 providing a separate link to the pending tasks from each of the plurality of contract rooms associated with the respective contracting representative, and a recent communications section 611 providing the contracting entity representative a separate link to inbound and outbound communications for each of the contract rooms associated with the contracting representative. Advantageously, such web page 603 provides consolidated contract room access and consolidated contract room task and communication review for each contracting entity representative. Note, a similar personalized web page 753 (see FIG. 42) can be provided for contracting department managers which can include a toolbar 755, pending tasks section 757, directives section 759, and active contract room section 763 which can be viewed according to organization hierarchy.

The instructions can also include those to perform the operations of assigning a personalized contractor member user home web page, such as, for example, home web page 645 (see FIG. 41) to each of a plurality of contractor representatives associated with a separate one of a plurality of potential registered contractors, and presenting each respective personalized contractor representative's home page 645 to each respective contractor representative to thereby provide centralized access to perform contract procurement transaction functions for the contract rooms associated with the respective potential contractor. Each personalized potential contractor member user home web page 645 can include an active contract room section 682 providing a separate link to one or more contract rooms associated with the respective potential contractor, a pending tasks section 683 providing a separate link to pending tasks from the associated contract rooms, and a recent communications section 684 providing a separate link to inbound and outbound communications for the associated contract rooms.

Advantageously, such web page 645 can provide each assigned contractor representative consolidated contract room access for those contract rooms associated with the contractor representative, along with consolidated contract room task and communication review for such associated contract rooms. Although such personalized homepages 645 provide such ready access to outstanding tasks and ongoing communications, advantageously, as noted above, the instructions can also include those to perform the operation of periodically iteratively alerting over redundant channels each of the plurality of potential contractors having an outstanding task of such outstanding task until the outstanding task is completed or passage of an associated task deadline responsive to a preselected time attribute to thereby enhance potential contractor deadline compliance.

According to an embodiment of the present invention, a computer readable medium can include a set of instructions that, when executed by a computer, cause the computer to perform the operation of forming and providing electronic bulletin boards (bulletin board web pages) to openly solicit contractor interest to either prequalify or to bid for a preselected contract or contracts, not available or not provided within the contractor profiles, described previously. For example, the instructions can include those to perform the operations of providing a personal web page such as, for example, web page 645 (see FIG. 41) for each of a plurality of registered contractor representatives, and forming a plurality of bulletin board listing web pages defining a plurality of bulletin boards to provide enhanced data procurement and dissemination.

According to this embodiment of the computer readable medium, the plurality of bulletin boards can include a long-form contracts bulletin board such as, for example, web page 649 (see FIG. 45) including links to long-form contract listings (see, e.g., FIG. 44) structured to request special prequalification contractor data not normally included in the each respective contractor profile for a pending contract having a value exceeding a preselected value such as, for example, $300,000. A short form contracts bulletin board such as, for example, web page 669 (see FIG. 47) can be provided that includes links to short-form contract listings (see, e.g., FIG. 46) structured to provide bidding information for a pro form a contract having a value less than a preselected value, such as, for example, $25,000, to provide a request for bids for the pro form a contract, and to provide instructions related thereto. Provided also is a short-form contracts bulletin board (not shown) structured to request prequalification data for a pending contract having a value less than, e.g., the preselected $300,000 value.

The instructions can also include those to perform the operation of providing a link to each of the plurality of bulletin boards in each potential contractor personal web page 645 (FIG. 41) such as, for example, hyperlinks 641, 673, to thereby request special prequalification contractor data, and hyperlink 665 to thereby request bidding on a pro form a contract.

The instructions can also include those to perform the operation of providing and modifying a bulletin board listing template, e.g., long-form contracts listing web page form 624 (FIG. 44) and short form contracts listing for bidding web page form 653 (see FIG. 46), to thereby form a bulletin board listing including an attached prequalification questionnaire and a specified prequalification submission due date. Alternatively, the instructions can include those to form a bulletin board listing including an attached pro form a contract and a bid closing date. The instructions can include those to perform the operations of posting the bulletin board listing for viewing by the registered potential contractors, receiving online the completed prequalification form, and associating the respective prequalification form with a corresponding pre-established contractor profile for each respective responding potential contractor. The instructions can also include those to perform the operations of providing a link to each respective prequalification form in the respective bulletin board listing, and restricting viewing/access of the link through the respective user web browser to a plurality of preselected authorized users, such authorization, for example, based on and indicated by category of the user.

Embodiments of the present invention also advantageously provide a computer memory element, as perhaps best shown in FIG. 75, containing, stored in signal bearing media, a database 41. The database 41 can include data in computer readable format indicating contract data for a plurality of virtual contract rooms defining a plurality of contract data records 43. The database 41 can also contain data indicating contractor prequalification attributes for a plurality of contractors defining contractor data records 45. The contractor data records can include, for example, registration information, a contractor introduction, certificates, an experience list, human resources, equipment, facilities, financial information, parent company, affiliates, subsidiaries, sole agency agreements, and bulletin board submittals. The database 41 can also include data indicating a plurality of tasks each associated with one of the virtual contract rooms and assigned to one of a plurality of contracting entity representatives or one of a plurality of contractors defining a plurality of user task records 801. The database 41 can also include data indicating a plurality of communications each associated with one of the virtual contract rooms and assigned to one of a plurality of contracting entity representatives and/or one of a plurality of contractors defining a plurality of user communication records 803. The database 41 can also contain data indicating a plurality of contract procurement/administration lessons learned each generally associated with at least one of the virtual contract rooms, at least one contract type attribute, and a lessons learned originator, defining lessons learned records 805. The database 41 can further include other data records such as, for example, those including fields related to signed contracts, contracting entity member attributes, contracting entity organization, bidders lists, general and specific bid slates, contract procurement processing checklists, externally created documents, various solicitation of interest, invitation for proposal, and invitation for proposal addenda letters and templates, contracting entity directives, job explanation meeting presentations, site visit forms, bulletin board listings, prequalification forms, pro form a contracts, bidder questions and answers, technical clarification questions and answers, commercial clarification questions and answers, contract procurement statistics, and system access records, just to name a few.

This application is related to U.S. Provisional Application No. 60/699,582, filed on Jul. 15, 2005, incorporated herein by reference in its entirety.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

That claimed is:

1. A system to facilitate contract procurement and contract management through an online contract procurement and management website over a computer network, the system comprising:

at least one host computer hosting the online contract procurement and management website accessible to the computer network to define an electronic contracting network server, the electronic contracting network server having a processor and memory coupled to the processor to store operating instructions therein;

a database accessible to the processor of the electronic contracting network server and having a plurality of data records relating to contracts to define contract data records and a plurality of data records relating to contractor entities to define contractor data records;

electronic contracting program product stored in the memory of the electronic contracting network server to facilitate contract procurement and contract management over the computer network through online potential contractor registration and online virtual contract room creation and management, the electronic contracting program product including:

a registrar positioned to access the contractor data records in the database, and positioned to provide a registration web page form to each of a plurality of potential contract member user web browsers to separately register and associate each of a plurality of potential contractors with the online contract procurement and management website, a contractor profile former positioned to access the contractor data records and to display to each of the plurality of potential contractor member user web browsers an online contractor profile web page form having a plurality of entry fields adapted to receive user input data indicating potential contractor attributes for each respective one of the plurality of potential contractors to thereby assemble potential contractor pre-qualification data, a contractor profile searcher positioned to display to at least one contracting entity member user web browser a contractor profile search web page form having a plurality of entry fields adapted to receive user input data indicating desired contractor prequalification attributes for a preselected pending contract associated with a contract procurement transaction and positioned to access the contractor data records to display to the at least one contracting entity member user web browser a contractor profile search results web page including a table of registered contractors having attributes matching the entered contractor prequalification attributes to thereby enhance potential contractor selection, a contract room former positioned to form a virtual contract room for the contract procurement transaction and responsive to approval by the at least one contracting entity member user of the contract procurement transaction for the preselected pending contract to thereby provide enhanced data procurement and dissemination, a contract template selector positioned to display to the at least one contracting entity member user web browser a plurality of contract templates to thereby allow contracting entity member user selection of a contract template best approximating attributes of the contract procurement transaction, a contract builder positioned to access standard and nonstandard paragraphs to create initial documents for an invitation for proposal and positioned to perform an indexing classification to classify standard and nonstandard language within each section of the document to thereby enhance contracting entity document review, a contract room master positioned to subordinate to one of a plurality of selected contract rooms each other of the plurality of selected contract rooms to form a master procurement contract room responsive to contracting entity member user input to thereby provide simultaneous contract room updating for the plurality of contract rooms, positioned to disable a plurality of functions within the subordinated contract rooms responsive to forming the master procurement contract room, and positioned to display reference instructions for accessing the master procurement contract room responsive to forming the master procurement contract room to thereby perform the disabled functions, a contract room profile searcher positioned to display to the at least one contracting entity member user web browser a contract room profile search web page form having a plurality of entry fields or links thereto adapted to receive user input data indicating desired contract room attributes for a previously formed contract room and positioned to access the contract data records to display to the at least one contracting entity member user web browser a contract room profile search results web page displaying a table of contract rooms having attributes matching one or more entered contract room attributes, to thereby enhance contract room formation, a contracting entity participant manager positioned to provide a default proposed list of potential contracting entity member users requiring access to the virtual contract room to perform preselected procurement functions, and to receive list modifications from the at least one contracting entity member user including supervisor assignment modifications to the supervisor assigned to the at least one contracting entity member user, to thereby enhance contracting entity member user management, a warning manager positioned responsive to at least one preassigned contracting entity-imposed contractor limitation, to link the at least one preassigned limitation to each of a plurality of web pages accessible by the at least one contracting entity member user and having at least one data field providing entry of a decision affecting a respective at least one of the plurality of potential contractors, to warn the at least one contracting entity member user of a contracting entity-imposed contractor limitation, to thereby prevent an inadvertent contracting entity policy deviation by the at least one contracting entity member user, a solicitation of interest manager positioned to access a plurality of solicitation of interest letter templates and to provide contracting entity member user selection and modification of one of the plurality of solicitation of interest letter templates responsive to contracting entity member user input to thereby form a solicitation of interest letter, positioned to provide to a subset of the plurality of potential contractors defining a plurality of contractors under consideration an automated alert requesting each of the plurality of potential contractors under consideration to review the solicitation of interest letter responsive to solicitation of interest letter formation, positioned to separately display to each respective potential contractor member user web browser a confidentiality agreement web page form responsive to an attempted viewing of the solicitation of interest letter by a respective potential contractor member user for each respective one of the potential contractors under consideration, acceptance thereof a prerequisite for viewing the solicitation of interest letter, and positioned to display the solicitation of interest letter to each respective potential contractor member user of the plurality of potential contractors accepting the confidentiality statement responsive to the acceptance, a financial evaluation manager positioned to display for each of the plurality of contractors under consideration a plurality of financial statement status indications responsive to contracting entity member user input to thereby allow the at least one contracting entity member user online contractor financial status review, and positioned to provide over redundant channels preformatted requests requesting expedited transmission of recent financial statements for at least one of the plurality of contractors under consideration when the financial statement status displayed during the online review indicates such requirement, and to provide follow-up alerts to the at least one potential contractor under consideration until the financial statement status indicates such financial statements are received or a preselected deadline has passed, an invitation for proposal manager positioned to access an invitation for proposal letter template and to provide user selection and modification of the invitation for proposal letter template responsive to contracting entity member user input to thereby form an invitation for proposal letter, positioned to provide to a subset of the potential contractors under consideration defining a bid slate an automated alert requesting each of the plurality of potential contractors in the bid slate to review the invitation for proposal letter responsive to invitation for proposal letter formation, positioned to display a confidentiality agreement web page form thereto responsive to an attempted online viewing of the invitation for proposal letter by a respective contractor member user for each respective one of the plurality of potential contractors in the bid slate, acceptance thereof a prerequisite for viewing the invitation for proposal letter, and positioned to display the invitation for proposed letter to the respective contract member user for each of the plurality of potential contractors accepting the confidentiality statement web page form responsive to receipt of the acceptance, a bidders list former positioned to form a list of potential contractors to define a current bidder's list responsive to the at least one contract member user selecting potential contractors from at least one of the following lists: a search results list of a search of prequalification criteria fields for a plurality of registered contractors, a general bid slate including a predetermined list of contractors pre-associated with a different category of contract, and a bidders list copied from a previously created bidder's list from another one of a plurality of contract rooms, to thereby enhance bidding management, a bid slate manager positioned to route to each of a plurality of bid reviewer-evaluators a subset of the potential contractors on the current bidders list defining a proposed bid slate to review and approve each potential contractor included in the proposed bid slate responsive to forming the current bidders list to thereby form an approved list of bidders to be provided access to the contract room, a bidder status monitor positioned to monitor contractor transactions within the virtual contract room and to provide a bidder status summary table to thereby provide the at least one contracting entity member user real-time potential contractor activity status updates for potential contractors assigned to the current bidders list, a bid evaluation manager positioned to form and to provide a plurality of bid evaluators access to a bid evaluation protocol responsive to contracting entity member user input to thereby enhance bid evaluation methodology approval by the plurality of bid evaluators, a procurement schedule manager positioned to schedule and display a schedule of procurement activities for the contract procurement transaction to each of the plurality of potential contractors responsive to contract entity member user input to thereby prevent inadvertent viewing of an outdated schedule, and positioned to provide schedule update notification to each of the plurality of potential contractors responsive to modification of the schedule of procurement activities, a contract procurement research data searcher positioned to form a contract procurement research search results web page including a listing of media satisfying preselected search criteria responsive to approval by a contracting entity proponent member user of the contract procurement transaction for the preselected pending contract to thereby provide the at least one contracting entity member user research data relating to contract procurement from multiple sources, a procurement status provider positioned to display to the at least one contracting entity member user web browser real-time generated and system summarized statistical data of the contract procurement transaction to thereby enable enhanced monitoring of the contract procurement transaction, and an outstanding task alert manager positioned to periodically iteratively alert over redundant channels each of the plurality of potential contractors having an outstanding task of such outstanding task and responsive to a preselected time attribute to thereby enhance deadline compliance; and the online contract procurement and management website further including:

a separate plurality of web pages assigned to each of a respective plurality of contract procurement transactions to provide multiple user access for requesting and receiving contract bids to define a corresponding plurality of contract rooms, each contract room including a tool bar having a plurality of user selectable contract procurement phase categories for selecting a corresponding plurality of contract procurement functions, a pending tasks section providing a separate link to each currently pending task within the respective contract room associated with the respective user filtered by an automated process from that of other users, and a recent communications section providing a separate link to each of a plurality of inbound and outbound communication for the contract room, the contract procurement functions including general functions, pre-bidding functions, bidding period functions, and post bidding functions, a plurality of web pages each separately assigned to a separate one of a plurality of contracting entity member users to define a corresponding plurality of personalized contracting entity member user home web pages providing centralized access to perform contract procurement functions and providing centralized access to the plurality of contract rooms, each personalized contracting entity member user home web page including a toolbar having a plurality of user selectable contract procurement functions, an active contract room section providing a separate link to each of a plurality of contract rooms associated with the respective contracting entity member user, a pending tasks section providing a separate link to contracting entity member user pending tasks from each of the plurality of contract rooms associated with the respective contracting entity member user, and a recent communications section providing a separate link to contracting entity member user inbound and outbound communications for each of the plurality of contract rooms associated with the respective contracting entity member user, to thereby provide consolidated contract room access and consolidated contract room task and communication review, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user, and a plurality of web pages each assigned to a separate one of the plurality of potential contractor member users to define a corresponding plurality of personalized potential contractor member user home web pages providing centralized access to perform contract procurement functions including centralized access to at least one of the plurality of contract rooms associated with the respective potential contractor, each personalized potential contractor member user home web page including an active contract room section providing a separate link to the at least one of the plurality of contract rooms associated with the respective potential contractor, a pending tasks section providing a separate link to contractor member user pending tasks from the at least one of the plurality of contract rooms associated with the respective potential contractor, and a recent communications section providing a separate link to contractor member user inbound and outbound communications for the at least one of the plurality of contract rooms associated with the respective potential contractor, to thereby provide consolidated contract room access and consolidated contract room task and communication review.

2. A system as defined in claim 1, wherein the electronic contracting program product further comprises:

a data location selector positioned to receive documents uploaded by the at least one contracting entity member user, positioned to access the contract data records to associate the uploaded documents with associated contract data, and positioned to store the uploaded documents in a system-selected location in the database to thereby enhance document storage and retrieval;

a lessons learned manager positioned to provide a link to historic lessons learned associated with the preselected pending contract and to provide a link to post lessons learned entered by the at least one contracting entity member user indicating experience gained from the contract procurement transaction and responsive to a contracting entity member user selected contract category; and a communications monitor positioned to display to a system administrator each e-mail and fax communication between contracting entity member users and contractor members to thereby provide enhanced monitoring of communications with contractor members.

3. A system as defined in claim 1, wherein the electronic contracting program product further comprises:

a bid evaluation manager positioned to form and to provide a plurality of bid evaluators access to a bid evaluation protocol responsive to contracting entity member user input to thereby enhance bid evaluation methodology approval by the plurality of bid evaluators; and a contract value estimator positioned to process a pending contract valuation request form when the bid slate includes less than a preselected number of potential contractors to thereby provide to an estimate of the contract valuation to compare with bids submitted by the potential contractors included in the bid slate.

4. A system as defined in claim 1, wherein the electronic contracting program product further comprises:
- a job explanation meeting manager positioned to form a preformatted meeting attendance sheet responsive to contracting entity member user input, positioned to display a plurality of standard job explanation meeting presentation templates and to provide contracting entity member user selection and modification of at least one of the plurality of standard job explanation meeting presentation templates responsive to contracting entity member user input to thereby form a job explanation meeting presentation, and positioned to receive a digital recording of the job explanation meeting, to associate the digital recording with the contract room and to store the digital recording in the database responsive to contracting entity member user input to thereby enhance job explanation meeting documentation;
- a site security manager positioned to provide to a subset of the potential contractors defining a bid slate an automated alert requesting each of the plurality of potential contractors in the bid slate to access the contract room to access a preselected function in the contract room, and positioned to provide requested security-related data responsive to indicia of a security permit requirement to thereby provide preapproved security authorization for each respective potential contractor to physically visit an associated customer entity site related to the pending contract, and positioned to provide to a contracting proponent member user a table displaying accumulated data provided by the potential contractors in the bid slate;
- a bidder question and answer manager positioned to receive an online bidding question and attached related documents from at least one of the plurality of potential contractors defining a requesting bidder, positioned to disseminate a notice of receipt of the question to the at least one contracting entity member user and an additional contracting entity member to define a contracting entity member participant responsive to receipt of the bidding question from the requesting bidder to thereby allow drafting of a corresponding answer by either the at least one contracting entity member user or the contracting entity member participant, and positioned to release the bidding question and the corresponding answer according to a selected contracting entity member user release methodology responsive to approval of the bidding question and the corresponding answer by the at least one contracting entity member user; and
- an invitation for proposal addenda manager positioned to form an invitation for proposal addenda responsive to contracting entity member user input, positioned to notify a contracting entity member user supervisor to approve the invitation for proposal addenda responsive to invitation for proposal addenda formation, positioned to provide to the plurality of potential contractors in the bid slate an automated redundant channel alert notifying each of the plurality of potential contractors in the bid slate that the invitation for proposal addenda has been issued responsive to approval of the invitation for proposal addenda, and positioned to display the invitation for proposal addenda responsive to selection of the invitation for proposal addenda.

5. A system as defined in claim 1, wherein a subset of the potential contractors defines a bid slate, and wherein the electronic contracting program product further comprises:
- a bid opening request manager positioned to present an online post-bid closing date bid opening request faun including a warnings section to display each of a plurality of warnings associated with each one of the plurality of potential contractors when so existing responsive to contracting entity member user input, the warnings displayed to ensure that the contracting entity member user is made aware of negative developments associated with any one of the plurality of potential contractors prior to submitting the online post-bid closing date bid opening request form, positioned to notify a preselected contracting entity member user supervisor of a requirement to approve the bid opening request responsive to the post-bid closing date bid opening request form formation, positioned to provide the approved bid opening request to a bid room custodian responsive to approval of the bid opening request, positioned to receive a status of each received bid responsive to bid room custodian input to thereby form a bid status summary;
- a technical clarifications manager positioned to receive online technical clarification requests and supporting documentation for release to one of the plurality of potential contractors in the bid slate, positioned to provide to the one of the plurality of potential contractors in the bid slate an automated alert alerting the one of the plurality of potential contractors in the bid slate to answer the technical clarification question, and positioned to receive and store in the database a response and to provide each of a plurality of contracting, technical evaluation team member users an electronic message including a link to view online the technical clarification question and associated response responsive to submission of the online response from the one of the plurality of potential contractors in the bid slate to thereby enhance bidder technical proposal evaluation;
- a commercial clarifications manager positioned to receive online commercial clarification requests and supporting documentation for release to the one of the plurality of potential contractors in the bid slate, positioned to provide to the one of the plurality of potential contractors in the bid slate an automated alert alerting the one of the plurality of potential contractors in the bid slate to answer the commercial clarification question, and positioned to receive and store in the database a response and to provide each of a plurality of contracting commercial evaluation team member users an electronic message including a link to view online the commercial clarification question and associated response responsive to submission of an online response from the one of the plurality of potential contractors in the bid slate to thereby enhance bidder commercial proposal evaluation;
- a final processing manager positioned to receive and post online a digital image of a signed contract responsive to contracting entity member user input to thereby provide for online multiple-contracting entity member user viewing, positioned to form a template message responsive to contracting entity member user identification of the one of the plurality of potential contractors awarded the contract to notify the other ones of the plurality of potential contractors in the bid slate defining unsuccessful bidders of the contract award, and positioned to send the template message to the unsuccessful bidders and to terminate unsuccessful bidder access to the contract room responsive to final processing approval by the preselected contracting entity member users supervisor to thereby prevent initiating unauthorized activities within the contract room;
- a checklist menu provider positioned to provide a plurality of links to a corresponding plurality of contracting entity member user checklists to thereby enhance contracting entity member checklist compliance; and an external document processor positioned to receive and to store in the database a digital copy of each of a plurality of original contractor submitted external documents to thereby allow discarding the original contractor submitted external documents.

6. A system as defined in claim 1, wherein the electronic contracting program product further comprises:

a fast-track contract room template displayer positioned to retrieve a contract room template and positioned to receive user input to enable and disable specific contract room sections to thereby enhance development of a contract room with frequently used contract room functions;

a lessons learned searcher positioned to display to the at least one contracting entity member user web browser a lessons learned profile search web page form having a plurality of entry fields adapted to receive user input data indicating selected lessons learned attributes for the historic lessons learned to display to the at least one contracting entity member user web browser a listing of lessons learned having attributes matching one or more entered lessons learned attributes, to thereby enhance contract procurement management; and a signed contracts searcher positioned to display to the at least one contracting entity member user web browser a signed contracts profile search web page foam having a plurality of entry fields adapted to receive user input data indicating selected signed contracts attributes for previously signed contracts to display to the at least one contracting entity member user web browser a listing of attributes matching one or more entered signed contracts attributes, to thereby enhance contract procurement management.

7. A system as defined in claim 1, wherein the electronic contracting program product further comprises:

a bulletin board manager positioned to provide a solicitation using one of a plurality of bulletin boards, to thereby solicit contractor interest from a plurality of potential contractors to prequalify or to bid for a plurality of contracts, the plurality of bulletin boards including a long-form contracts bulletin board positioned to display a request for and to receive prequalification contractor data not included in the online contractor profile web page form, a first short-form contracts bulletin board positioned to display a request for prequalification data for a preselected pending contract and to receive the prequalification data, and a second short form contracts bulletin board positioned to display a pro form a contract and to display a request for bids for the pro form a contract and to receive bids for the pro form a contract;

a bulletin board communications manager positioned to manage, categorize, and store bulletin board announcements and corresponding internal and external instructions;

a contracting manager report generator positioned to periodically access contract data records responsive to a first preselected time attribute to provide a plurality of contracting entity member user managers periodic status reports including data tailored to each respective manager's role authorizations to thereby enhance contract procurement management; and a contractor manager report generator positioned to access contract data records for each of the plurality of potential contractors responsive to a preselected second time attribute to periodically display to a respective contractor manager for each of the plurality of potential contractors recent contractor member user transactions associated with the respective potential contractor to thereby enhance contractor member user supervision.

8. A system to facilitate contract procurement and contract management over a computer network, the system comprising:

at least one computer accessible to the computer network to define an electronic contracting network server, the electronic contracting network server having a processor and memory coupled to the processor to store operating instructions therein;

electronic contracting program product stored in the memory of the electronic contracting network server to facilitate contract procurement and contract management over the computer network through online contractor registration and online virtual contract room creation and management, the electronic contracting program product including instructions that when executed by the electronic contracting network server perform the operations of:

forming a main contract room web page to define a virtual contract room to provide enhanced contractor data procurement and contract procurement transaction data dissemination for a preselected pending contract associated with a contract procurement transaction responsive to approval by at least one of a plurality of contracting entity member users of the contract procurement transaction, providing a respective personalized contract room web page screen for the virtual contract room to each contracting entity member user web browser for a plurality of contracting entity member users and each contractor member user web browser for a plurality of contractor member users, each personalized contract room web page screen providing access to a plurality of hyperlinks to the respective users pending tasks associated with the virtual contract filtered by an automated process from those pending tasks of other respective users and providing access to a plurality of hyperlinks to recent communications associated with the virtual contract room, assigning a personalized contracting entity member user home web page to each of the plurality of contracting entity member users, each personalized contracting entity member user home web page having a plurality of user selectable contract procurement functions, an active contract room section providing a separate link to each of a plurality of active contract rooms associated with the respective contracting entity member user, a pending tasks section providing a separate link to contracting entity member user pending tasks for each of the plurality of contract rooms associated with the respective contracting entity member user, and a recent communications section providing the respective contracting entity member user a separate link to communications for each of the plurality of contract rooms associated with the respective contracting entity member user to thereby provide consolidated contract room access and consolidated contract room task and communication review for each of the plurality of contract rooms associated with the respective contracting entity member user, and presenting each respective personalized contracting entity member user home page to the respective associated one of the plurality of contracting entity member users to thereby provide centralized access to perform contract procurement functions for each of the plurality of contract rooms associated with the respective contracting entity member user, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user.

9. A system as defined in claim 8, wherein the electronic contracting program product further includes instructions that when executed by the electronic contracting network server perform the operations of:

displaying a contractor profile search web page form having a plurality of entry fields adapted to receive contracting entity member user input data indicating desired contractor prequalification attributes for the preselected pending contract; and displaying a contractor profile search results web page including a table of registered contractors having attributes matching the entered contractor prequalification attributes to thereby enhance contracting entity member user selection of a potential contractor to perform the preselected pending contract, the attributes indicated as mandatory or preferred, the table including a plurality of registered contractors having all attributes indicated as mandatory and ordered by registered contractor satisfying a preselected attribute preference for attributes indicated as preferred.

10. A system as defined in claim 8, wherein the electronic contracting program product further includes instructions that when executed by the electronic contracting network server perform the operations of:

providing a link to a web page displaying historic lessons learned pre-associated with the preselected pending contract, the historic lessons learned pre-associated with the virtual contract room for the preselected pending contract responsive to a contracting entity member user assigning a contract category to the preselected pending contract;

providing a link to a web page to receive and post lessons learned entered by the contracting entity member user indicating experience gained from the contract procurement transaction by the contracting entity member user; and providing a link to a web page to display key performance indices indicating performance of each main contracting entity organization or department involved in the contract procurement process.

11. A system as defined in claim 8, wherein the electronic contracting program product further includes instructions that when executed by the electronic contracting network server perform the operations of:

assigning one of a plurality of potential contractors associated with the virtual contract room a contracting entity-imposed contractor limitation including a contracting entity managerial decision affecting the one of the plurality of potential contractors;

providing a link to the assigned limitation in each of a plurality of web pages associated with the virtual contract room having contracting entity member user contractor decision entry fields responsive to the assigned contracting entity-imposed contractor limitation to warn the at least one contracting entity member user of the contracting entity-imposed contractor limitation to thereby prevent an inadvertent contracting entity policy deviation by the at least one contracting entity member user.

12. A system as defined in claim 8, wherein the electronic contracting program product further includes instructions that when executed by the electronic contracting network server perform the operation of periodically iteratively alerting over redundant channels each of a plurality of potential contractors having an outstanding task of such outstanding task until the outstanding task is completed or passage of an associated task deadline responsive to a preselected time attribute to thereby enhance potential contractor deadline compliance.

13. A system as defined in claim 8, wherein the electronic contracting program product further includes instructions that when executed by the electronic contracting network server perform the operations of:

assigning a personalized contractor member user home web page to each separate one of the plurality of contractor member users, each personalized potential contractor member user home web page including an active contract room section providing a separate link to each of at least one of a plurality of contract rooms associated with the respective potential contractor, a pending tasks section providing a separate link to contractor member user pending tasks from each of the at least one of the plurality of contract rooms associated with the respective potential contractor, and a recent communications section providing a separate link to contractor member user inbound and outbound communications for each of the at least one of the plurality of contract rooms associated with the respective potential contractor, to thereby provide consolidated contract room access and consolidated contract room task and communication review for each of the at least one of the plurality of contract rooms associated with the respective contractor member user; and presenting each respective personalized contractor member user home page to the respective associated one of the plurality of the plurality of contractor member users to thereby provide centralized access to perform contract procurement functions for each of the at least one of the plurality of contract rooms associated with the respective contractor member user, under an automated process, each personalized contractor member user home web page presenting the respective contractor member user with links to each of the at least one of the plurality of active contract rooms associated with the respective contractor member user, that user's pending tasks for each of the at least one of the plurality of active contract rooms, and recent communications for each of the at least one of the plurality of active contract rooms associated with the respective contractor member user.

14. A system as defined in claim 8, wherein the electronic contracting program product further includes instructions that when executed by the electronic contracting network server perform the operation of assigning a separate main web page to each of a respective plurality of contract procurement transactions to provide multiple user access for requesting and receiving contract bids to define a corresponding plurality of contract rooms, each contract room including a tool bar to select plurality of contract procurement functions, a pending tasks section providing access to a separate link to each currently pending task associated with the respective user and associated with the respective contract room filtered by an automated process from pending tasks of other users, and a recent communications section providing access to separate link to each of a plurality of inbound and outbound communication for the contract room.

15. A system as defined in claim 8, wherein the electronic contracting program product further includes instructions that when executed by the electronic contracting network server perform the operation of forming a contract procurement research search results web page including a listing of media satisfying preselected search criteria responsive to contracting entity approval of the contract procurement transaction for the preselected pending contract, to thereby provide at least one contracting entity member user research data relating to contract procurement from multiple sources including at least two of the following: other active contract rooms, active contracts, expired contracts, contractor profiles, intranet, and a focused selection of Internet sources.

16. A system as defined in claim 8, wherein the electronic contracting program product further includes instructions that when executed by the electronic contracting network server perform the operations of:
   receiving an online bidding question and attached related documents from at least one of the plurality of potential contractors defining a requesting bidder;
   assigning a unique serial number to the bidding question including indicia identifying the originating contractor;
   disseminating a notice of receipt of the question to at least one contracting entity member user responsive to receipt of the bidding question from the requesting bidder to thereby allow processing of a corresponding answer;
   releasing the bidding question and the corresponding answer according to a selected contracting entity member user release methodology responsive to approval of the bidding question and the corresponding answer by the at least one contracting entity member user, the release methodology including one of the following: a public release, a private release, and a reject release, the public release providing each of the plurality of potential contractors access to the question and the corresponding answer and not providing data identifying the requesting bidder, the private release providing access to the question and the corresponding answer by the requesting bidder and not the other of the plurality of potential contractors, and the reject release providing notification to the requesting bidder that the question has been rejected and a corresponding explanation for the rejection.

17. A system as defined in claim 8, wherein the electronic contracting program product further includes instructions that when executed by the electronic contracting network server perform the operations of:
   displaying an online lessons learned profile search web page form to at least one contracting entity member through a respective contracting entity member user web browser, the lessons learned profile search web page form having a plurality of entry fields adapted to receive user input data indicating selected lessons learned attributes for the historic lessons learned;
   receiving search criteria including a plurality of lessons learned attributes from the at least one contracting entity member user; and
   displaying a listing of lessons learned having attributes matching one or more entered lessons learned attributes, to thereby enhance contract procurement management.

18. A system as defined in claim 8,
   wherein the electronic contracting network server is positioned to host the online contract procurement and management website accessible to the computer network;
   wherein the system further comprises a database accessible to the processor of the electronic contracting network server and having a plurality of data records relating to contracts to define contract data records and a plurality of data records relating to contractor entities to define contractor data records;
   wherein the electronic contracting program product further includes:
      a registrar positioned to access the contractor data records in the database, and positioned to provide a registration web page form to each of the plurality of potential contract member user web browsers to separately, register and associate each of the plurality of potential contractors with the online contract procurement and management website,
      a contractor profile former positioned to access the contractor data records and to display to each of the plurality of potential contractor member user web browsers an online contractor profile web page form having a plurality of entry fields adapted to receive user input data indicating potential contractor attributes for each respective one of the plurality of potential contractors to thereby assemble potential contractor pre-qualification data,
      a contractor profile searcher positioned to display to at least one contracting entity member user web browser a contractor profile search web page form having a plurality of entry fields adapted to receive user input data indicating desired contractor prequalification attributes for a preselected pending contract associated with a contract procurement transaction and positioned to access the contractor data records to display to the at least one contracting entity member user web browser a contractor profile search results web page including a table of registered contractors having attributes matching the entered contractor prequalification attributes to thereby enhance potential contractor selection,
      a contract room former positioned to form a virtual contract room for the contract procurement transaction and responsive to approval by the at least one contracting entity member user of the contract procurement transaction for the preselected pending contract to thereby provide enhanced data procurement and dissemination, and
      a warning manager positioned responsive to at least one preassigned contracting entity-imposed contractor limitation, to link the at least one preassigned limitation to each of a plurality of web pages accessible by the at least one contracting entity member user and having at least one data field providing entry of a decision affecting a respective at least one of the plurality of potential contractors, to warn the at least one contracting entity member user of a contracting entity-imposed contractor limitation to thereby prevent an inadvertent contracting entity policy deviation by the at least one contracting entity member user.

19. A system as defined in claim 8, wherein the online contract procurement and management website further includes:
   a separate plurality of web pages assigned to each of a respective plurality of contract procurement transactions to provide multiple user access for requesting and receiving contract bids to define a corresponding plurality of contract rooms, each contract room including a tool bar having a plurality of user selectable contract procurement phase categories for selecting a corresponding plurality of contract procurement functions, a pending tasks section providing a separate link to each currently pending task within the respective contract room associated with the respective user filtered from that of other users, and a recent communications section providing a separate link to each of a plurality of inbound and outbound communication for the contract room filtered by an automated process from those recent communications associated with one or more other contract rooms, the contract procurement functions including general functions, pre-bidding functions, bidding period functions, and post bidding functions.

20. A system as defined in claim 8, wherein the electronic contracting program product further includes:

an outstanding task alert manager positioned to periodically iteratively alert over redundant channels each of the plurality of potential contractors having an outstanding task of such outstanding task and responsive to a preselected time attribute to thereby enhance deadline compliance.

21. A system as defined in claim 8, wherein the electronic contracting program product further includes:

a contract template selector positioned to display to the at least one contracting entity member user web browser a plurality of contract templates to thereby allow contracting entity member user selection of a contract template best approximating attributes of the contract procurement transaction;

a contract builder positioned to access standard and non-standard paragraphs to create initial documents for an invitation for proposal and positioned to perform an indexing classification to classify standard and non-standard language within each section of the document to thereby enhance contracting entity document review;

a contracting entity participant manager positioned to provide a default proposed list of potential contracting entity member users requiring access to the virtual contract room to perform preselected procurement functions, and to receive list modifications from the at least one contracting entity member user including supervisor assignment modifications to the supervisor assigned to the at least one contracting entity member user, to thereby enhance contracting entity member user management;

a procurement schedule manager positioned to schedule and display a schedule of procurement activities for the contract procurement transaction to each of the plurality of potential contractors responsive to contract entity member user input to thereby prevent inadvertent viewing of an outdated schedule, and positioned to provide schedule update notification to each of the plurality of potential contractors responsive to modification of the schedule of procurement activities;

contract procurement research data searcher positioned to form a contract procurement research search results web page including a listing of media satisfying preselected search criteria responsive to approval by a contracting entity proponent member user of the contract procurement transaction for the preselected pending contract to thereby provide the at least one contracting entity member user research data relating to contract procurement from multiple sources; and a procurement status provider positioned to display to the at least one contracting entity member user web browser real-time generated and system summarized statistical data of the contract procurement transaction to thereby enable enhanced monitoring of the contract procurement transaction.

22. A system as defined in any of claim 8, wherein the electronic contracting program product further includes:

a bidders list former positioned to form a list of potential contractors to define a current bidder's list responsive to the at least one contract member user selecting potential contractors from at least one of the following lists: a search results list of a search of prequalification criteria fields for a plurality of registered contractors, a general bid slate including a predetermined list of contractors pre-associated with a different category of contract, and a bidders list copied from a previously created bidder's list from another one of a plurality of contract rooms, to thereby enhance bidding management;

a bid slate manager positioned to route to each of a plurality of bid reviewer-evaluators a subset of the potential contractors on the current bidders list defining a proposed bid slate to review and approve each potential contractor included in the proposed bid slate responsive to forming the current bidders list to thereby form an approved list of bidders to be provided access to the contract room;

a bidder status monitor positioned to monitor contractor transactions within the virtual contract room and to provide a bidder status summary table to thereby provide the at least one contracting entity member user real-time potential contractor activity status updates for potential contractors assigned to the current bidders list;

a bid evaluation manager positioned to form and to provide a plurality of bid evaluators access to a bid evaluation protocol responsive to contracting entity member user input to thereby enhance bid evaluation methodology approval by the plurality of bid evaluators; and a contract value estimator positioned to process a pending contract valuation request form when the bid slate includes less than a preselected number of potential contractors to thereby provide to an estimate of the contract valuation to compare with bids submitted by the potential contractors included in the bid slate.

23. A system as defined in claim 8, wherein the electronic contracting program product further includes:

a solicitation of interest manager positioned to access a plurality of solicitation of interest letter templates and to provide contracting entity member user selection and modification of one of the plurality of solicitation of interest letter templates responsive to contracting entity member user input to thereby form a solicitation of interest letter, positioned to provide to a subset of the plurality of potential contractors defining a plurality of contractors under consideration an automated alert requesting each of the plurality of potential contractors under consideration to review the solicitation of interest letter responsive to solicitation of interest letter formation, positioned to separately display to each respective potential contractor member user web browser a confidentiality agreement web page form responsive to an attempted viewing of the solicitation of interest letter by a respective potential contractor member user for each respective one of the potential contractors under consideration, acceptance thereof a prerequisite for viewing the solicitation of interest letter, and positioned to display the solicitation of interest letter to each respective potential contractor member user of the plurality of potential contractors accepting the confidentiality statement responsive to the acceptance.

24. A system as defined in claim 8, wherein the electronic contracting program product further includes:
a financial evaluation manager positioned to display for each of the plurality of contractors under consideration a plurality of financial statement status indications responsive to contracting entity member user input to thereby allow the at least one contracting entity member user online contractor financial status review, and positioned to provide over redundant channels preformatted requests requesting expedited transmission of recent financial statements for at least one of the plurality of contractors under consideration when the financial statement status displayed during the online review indicates such requirement, and to provide follow-up alerts to the at least one potential contractor under consideration until the financial statement status indicates such financial statements are received or a preselected deadline has passed.

25. A system as defined in claim 8, wherein the electronic contracting program product further includes:
an invitation for proposal manager positioned to access an invitation for proposal letter template and to provide user selection and modification of the invitation for proposal letter template responsive to contracting entity member user input to thereby form an invitation for proposal letter, positioned to provide to a subset of the potential contractors under consideration defining a bid slate an automated alert requesting each of the plurality of potential contractors in the bid slate to review the invitation for proposal letter responsive to invitation for proposal letter formation, positioned to display a confidentiality agreement web page form thereto responsive to an attempted online viewing of the invitation for proposal letter by a respective contractor member user for each respective one of the plurality of potential contractors in the bid slate, acceptance thereof a prerequisite for viewing the invitation for proposal letter, and positioned to display the invitation for proposed letter to the respective contract member user for each of the plurality of potential contractors accepting the confidentiality statement web page form responsive to receipt of the acceptance.

26. A system as defined in claim 8, wherein the electronic contracting program product further includes:
a contract room master positioned to subordinate to one of a plurality of selected contract rooms each other of the plurality of selected contract rooms to form a master procurement contract room responsive to contracting entity member user input to thereby provide simultaneous contract room updating for the plurality of contract rooms, positioned to disable a plurality of functions within the subordinated contract rooms responsive to forming the master procurement contract room, and positioned to display reference instructions for accessing the master procurement contract room responsive to forming the master procurement contract room to thereby perform the disabled functions.

27. A system as defined in claim 8, wherein the system further comprises:
a plurality of electronic contracting entity member user computers each positioned remote from the electronic contracting network server and accessible to the computer network and having a processor, memory coupled to the processor to store operating instructions therein and to receive data records, a display in communication with the processor to display data records using an associated contracting entity member user web browser, and a user interface in communication with the processor, to provide each of a corresponding plurality of contracting entity member users with access over the computer network to the electronic contracting network server to thereby facilitate contract procurement; and
a plurality of potential contractor member user computers each positioned at a separate potential contractor site remote from the electronic contracting network server and accessible to the computer network and having a processor and memory coupled to the processor to store operating instructions therein and to receive data records, a display in communication with the processor to display data records using an associated potential contractor member user web browser stored in the memory, and a user interface in communication with the processor to provide each of a corresponding plurality of potential contractor member users with access over the computer network to the electronic contracting network server to thereby view and edit contractor data and to thereby assess and bid for a plurality of pending contracts.

28. A tangible computer readable medium that is readable by a computer to facilitate contract procurement and contract management over a computer network, the computer readable medium comprising a set of instructions that, when executed by the computer, cause the computer to perform the following operations:
providing a personalized contracting entity member user home web page to each separate one of a plurality of contracting entity member users, each personalized contracting entity member user home web page configured to provide centralized access to perform contract procurement functions for each of a plurality of active contract rooms associated with the respective contracting entity member user, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user,
forming a database of contractor records including a plurality of contractor pre-qualification data fields for a plurality of contractors to thereby reduce repetitive requests for contractor prequalification data and reduce associated processing delays for each respective one of a plurality of procurement transactions;
providing a contractor profile search web page form having a plurality of prequalification criteria entry fields adapted to receive contracting entity member user input data indicating desired contractor prequalification attributes for the preselected pending contract, the attributes indicated as mandatory or preferred;
receiving a completed contractor profile search web page form including user entered search criteria; and
providing a contractor profile search results web page responsive to search criteria entered in the contractor profile search form, the contractor profile search results web page including a table of registered contractors having attributes matching the entered contractor prequalification attributes to thereby enhance contracting entity member user selection of a potential contractor to perform the preselected pending contract, the table including a plurality of registered contractors having all attributes indicated as mandatory and ordered by registered contractor satisfying a preselected attribute preference for attributes indicated as preferred.

29. A tangible computer readable medium as defined in claim 28, wherein the plurality of prequalification criteria entry fields correspond to the plurality of contractor prequalification data fields, and wherein the computer readable medium further comprises a set of instructions that, when executed by the computer, cause the computer to perform the operation of separately searching each of the plurality of contractor prequalification data fields for each search iteration using search criteria entered in the corresponding plurality of prequalification criteria entry fields.

30. A tangible computer readable medium that is readable by a computer to facilitate contract procurement and contract management over a computer network, the computer readable medium comprising a set of instructions that, when executed by the computer, cause the computer to perform the operation of:

assigning a separate main web page to each of a respective plurality of contract procurement transactions to provide multiple user access for requesting and receiving contract bids to define a corresponding plurality of virtual contract rooms, each virtual contract room managed by a respective at least one of a plurality of contracting entity member users and including a plurality of contract procurement functions, a pending tasks section providing access to a separate link to each currently pending task associated with the respective user and associated with the respective contract room filtered by an automated process from pending tasks of other users, and a recent communications section providing access to a separate link to each of a plurality of inbound and outbound communications for the contract room; and assigning a personalized contracting entity member user home web page to each separate one of the plurality of contracting entity member users, each personalized contracting entity member user home web page configured to provide centralized access to perform contract procurement functions for each of a plurality of active contract rooms associated with the respective contracting entity member user, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user.

31. A tangible computer readable medium as defined in claim 30, further comprising a set of instructions that, when executed by the computer, cause the computer to perform the operation of forming for each of the plurality of virtual contract rooms a contract procurement research search results web page including a listing of media satisfying preselected search criteria responsive to contracting entity approval of the respective contract procurement transaction for each associated preselected pending contract to provide the assigned contracting entity member user research data relating to contract procurement from multiple sources including at least two of the following: other active contract rooms, active contracts, expired contracts, contractor profiles, intranet, and a focused selection of Internet sources to thereby enhance development of each respective one of the plurality of virtual contract rooms.

32. A tangible computer readable medium as defined in claim 30, further comprising a set of instructions that, when executed by the computer, cause the computer to perform the following operations:

providing an online contract room profile search web page form to a contracting entity member user through a respective contracting entity member user web browser, the contract room profile search web page form having a plurality of entry fields adapted to receive user input data indicating selected contract room attributes including at least three of the following: closed virtual contract rooms associated with the viewing contracting entity member user, any contract rooms the contracting entity member user is authorized to view, contract procurement requisition number, contract room title, assigned contracting entity member user name, contracting entity proponent organization code, contracting entity proponent representative name, contract signatory name, contract room creation date, and contractor name;

receiving search criteria including one or more attributes from the contracting entity member user; and providing a listing of virtual contract rooms having attributes matching one or more entered virtual contract room attributes to thereby enhance contract procurement management, the listing limited to those contract rooms authorized to be viewed by the contracting entity member user based on pre-established user permissions.

33. A computer readable medium as defined in claim 30, further comprising a set of instructions that, when executed by the computer, cause the computer to perform the following operations:

providing an online lessons learned profile search web page form to a contracting entity member through a respective contracting entity member user web browser, the lessons learned profile search web page form having a plurality of entry fields adapted to receive user input data indicating selected lessons learned attributes for the historic lessons learned;

receiving search criteria including a plurality of lessons learned attributes from the contracting entity member user; and providing a listing of lessons learned having attributes matching one or more entered lessons learned attributes to thereby enhance contract procurement management.

34. A tangible computer readable medium as defined in claim 30, further comprising a set of instructions that, when executed by the computer, cause the computer to perform the operation of periodically iteratively alerting over redundant channels each of a plurality of contractor member users having an outstanding task of such outstanding task responsive to a preselected time attribute, the alert provided until the outstanding task is completed or passage of an associated task deadline to thereby enhance potential contractor deadline compliance.

35. A computer readable medium as defined in claim 30, further comprising a set of instructions that, when executed by the computer, cause the computer to perform the operation of providing a contractor management user online access to view and monitor decisions and communications made on behalf of the respective contractor entity and decisions and communications issued by the contracting entity to each contractor member user associated with each of the plurality of virtual contract rooms associated with the contractor management user.

36. A tangible computer readable medium as defined in claim 30, further comprising a set of instructions that, when executed by the computer, cause the computer to perform the following operations:
   providing a contract procurement status web page over the computer network to a contracting entity management user web browser, the contract procurement status web page including sub-organizational based data summarizing interactions between contractor member users and contracting entity member users;
   providing a listing of contract procurement actions for a contracting entity sub-organization responsive to user selection of the contracting entity sub-organization, each contract procurement action listing linked to a respective procurement action status screen including status comments entered by a contracting entity member user and data illustrating a respective contract procurement schedule; and
   providing one of the procurement action status screens.

37. A tangible computer readable medium as defined in claim 30, further comprising a set of instructions that, when executed by the computer, cause the computer to perform the following operations:
   assigning one of a plurality of potential contractors associated with one of the plurality of virtual contract rooms a contracting entity-imposed contractor limitation including a contracting entity managerial decision affecting the one of the plurality of potential contractors responsive to contracting entity managerial member input; and
   providing a link to the assigned limitation in each of a plurality of web pages associated with the one of the plurality of virtual contract rooms having contracting entity member user contractor decision entry fields responsive to the assigned contracting entity-imposed contractor limitation to warn an assigned contracting entity member user of the contracting entity-imposed contractor limitation to thereby prevent an inadvertent contracting entity policy deviation by the at least one contracting entity member user.

38. A computer readable medium as defined in claim 30, further comprising a set of instructions that, when executed by the computer, cause the computer to perform the operation of logging the name of each contractor member user performing a transaction related to one of the plurality of virtual contract rooms associated with the contractor member user and a transaction date and time of the transaction to thereby provide contractor member user accountability to contractor management for each of a plurality of potential contractors.

39. A tangible computer readable medium that is readable by a computer to facilitate contract procurement and contract management over a computer network, the computer readable medium comprising a set of instructions that, when executed by the computer, cause the computer to perform the following operations:
   assigning a personalized contracting entity member user home web page to each of a plurality of contracting entity member users associated with a contracting entity, each personalized contracting entity member user home web page including a toolbar having a plurality of user selectable contract procurement functions, an active contract room section providing a separate link to each of a plurality of contract rooms associated with the respective contracting entity member user, a pending tasks section providing a separate link to contracting entity member user pending tasks from each of the plurality of contract rooms associated with the respective contracting entity member user, and a recent communications section providing the respective contracting entity member user a separate link to inbound and outbound communications for each of the plurality of contract rooms associated with the respective contracting entity member user, to thereby provide consolidated contract room access and consolidated contract room task and communication review for each of the plurality of contract rooms associated with the respective contracting entity member user;
   presenting each respective personalized contracting entity member user home page to the respective one of the plurality of contracting entity member users associated therewith to thereby provide centralized access to perform contract procurement functions for each of the plurality of contract rooms associated with the respective contracting entity member user, under an automated process, each personalized contracting entity member user home web page presenting the respective contracting entity member user with links to each of the plurality of contract rooms associated with the respective contracting entity member user, that user's pending tasks for each of the plurality of contract rooms, and recent communications for each of the plurality of contract rooms associated with the respective contracting entity member user;
   assigning a personalized contractor member user home web page to each of a plurality of contractor member users associated with a separate one of a plurality of potential contractors, each personalized potential contractor member user home web page including an active contract room section providing a separate link to the at least one of the plurality of contract rooms associated with the respective potential contractor, a pending tasks section providing a separate link to contractor member user pending tasks from the at least one of the plurality of contract rooms associated with the respective potential contractor, and a recent communications section providing a separate link to contractor member user inbound and outbound communications for the at least one of the plurality of contract rooms associated with the respective contractor member user, to thereby provide consolidated contract room access and consolidated contract room task and communication review for each of the at least one of the plurality of contract rooms associated with the respective contractor member user; and
   presenting each respective personalized contractor member user home page to the respective one of the plurality of the plurality of contractor member users associated therewith to thereby provide centralized access to perform contract procurement functions for at least one of the plurality of contract rooms associated with the respective contractor member user, under an automated process, each personalized contractor member user home web page presenting the respective contractor member user with links to each of the at least one of the plurality of contract rooms associated with the respective contractor member user, that user's pending tasks for each of the at least one of the plurality of contract rooms, and recent communications for each of the at least one of the plurality of contract rooms associated with the respective contractor member user.

40. A tangible computer readable medium as defined in claim 39, further comprising a set of instructions that, when executed by the computer, cause the computer to perform the operation of periodically iteratively alerting over redundant channels each of the plurality of potential contractors having an outstanding task of such outstanding task until the outstanding task is completed or passage of an associated task deadline responsive to a preselected time attribute to thereby enhance potential contractor deadline compliance.

41. A tangible computer readable medium that is readable by a computer to facilitate contract procurement and contract management over a computer network, the computer readable medium comprising a set of instructions that, when executed by the computer, cause the computer to perform the following operations:
- assigning a personalized contracting entity member user home web page to each separate one of a plurality of contracting entity member users, each personalized contracting entity member user home web page configured to provide centralized access to perform contract procurement functions for each of a plurality of active contract rooms associated with the respective contracting entity member user, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user,
- forming a database of contractor records including contractor pre-qualification data for a plurality of contractors to thereby reduce repetitive requests for contractor prequalification data and reduce associated processing delays for each respective one of a plurality of procurement transactions;
- performing a contractor prequalification criteria field search on the database to form a list of potential contractors having attributes compatible with a selected of one of the plurality of procurement transaction to define a bidders list; and
- adding to the bidders list at least one of the following: contractors listed in a general bid slate including a predetermined list of contractors pre-associated with a selected contract category and contractors listed in a pre-approved bidders list associated with another one of the plurality of procurement transactions.

42. A tangible computer readable medium as defined in claim 41, further comprising a set of instructions that, when executed by the computer, cause the computer to perform the following operations:
- providing access to a procurement schedule for online viewing to each of the plurality of potential contractors in the bidders list, the procurement schedule positioned at a unitary location accessible via a respective potential contractor member user web browser for each respective potential contractor in the bidders list to thereby prevent viewing of an outdated version of the procurement schedule; and
- providing automated notification of an update to the procurement schedule to each of the plurality of potential contractors in the bidders list responsive to modification of the procurement schedule to thereby ensure dissemination of the update.

43. A tangible computer readable medium as defined in claim 41, further comprising a set of instructions that, when executed by the computer, cause the computer to perform the operation of providing a bidder status summary table to the contracting entity member user responsive to contractor activity within the contract room to thereby provide the contracting entity member user updated contractor activity status for each of the plurality of potential contractors in the bidders list.

44. A tangible computer readable medium that is readable by a computer to facilitate contract procurement and contract management over a computer network, the computer readable medium comprising a set of instructions that, when executed by the computer, cause the computer to perform the following operations:
- assigning a personalized contracting entity member user home web page to each separate one of a plurality of contracting entity member users, each personalized contracting entity member user home web page configured to provide centralized access to perform contract procurement functions for each of a plurality of active contract rooms associated with the respective contracting entity member user, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user,
- forming a main contract room web page to define a virtual contract room associated with a contract procurement transaction for a pending contract to provide multiple user access to manage a contract procurement transaction to thereby provide enhanced data procurement and dissemination;
- subordinating the contract room to another contract room to form a master procurement contract room to thereby provide simultaneous contract room updating for a plurality of contract rooms;
- disabling a plurality of functions within the subordinated contract room responsive to subordinating the contract room; and
- providing reference instructions to a user to access the master procurement contract room to perform the disabled functions on the subordinated contract.

45. A tangible computer readable medium that is readable by a computer to facilitate contract procurement and contract management over a computer network, the computer readable medium comprising a set of instructions that, when executed by the computer, cause the computer to perform the following operations:
- assigning a personalized contracting entity member user home web page to each separate one of a plurality of contracting entity member users, each personalized contracting entity member user home web page configured to provide centralized access to perform contract procurement functions for each of a plurality of active contract rooms associated with the respective contracting entity member user, under an automated process, each personalized contracting entity member user home web page presenting the respective contracting entity member user with links to each of the plurality of active contract rooms associated with the respective contracting entity member user, that user's pending tasks for each of the plurality of active contract rooms, and recent communications for each of the plurality of active contract rooms associated with the respective contracting entity member user,
- forming a main contract room web page to define a virtual contract room associated with a contract procurement transaction for a pending contract to provide multiple user access to manage a contract procurement transaction to thereby provide enhanced data procurement and dissemination;

providing online access to a solicitation of interest letter to each of the plurality of potential contractors to determine contractor interest in the procurement transaction for each of the plurality of potential contractors, the solicitation of interest letter provided online to enhance the processing of an indication of interest from each respective one of the plurality of contractors; and providing online access to an invitation for proposal to each of the plurality of potential contractors responsive to the indication of interest from each respective one of the plurality of contractors to thereby invite each of the plurality of contractors providing such indication of interest to bid on the pending contract, the invitation for proposal provided online to enhance procurement schedule timetable compliance.

46. A tangible computer readable medium as defined in claim 45, wherein the instructions that, when executed by the computer, cause the computer to provide online access to a solicitation of interest letter further cause the computer to perform the following operations:

providing a solicitation of interest letter template from a plurality of standard templates;

modifying one of the plurality of solicitation of interest letter templates to faun a solicitation of interest letter;

tasking a preselected contract representative supervisor to approve the solicitation of interest letter;

providing to the plurality of potential contractors an automated alert requesting each of the plurality of potential contractors to review the solicitation of interest letter;

providing an online confidentiality statement to the plurality of potential contractors responsive to an attempted viewing of the solicitation of interest letter by each respective one of the plurality of potential contractors, acceptance thereof a prerequisite for viewing the solicitation of interest letter;

receiving an acceptance, declination, or request to respond later from each of the plurality of potential contractors, periodically disseminating reminders to each of the plurality of potential contractors requesting to respond later until acceptance, declination, or until passage of a solicitation of interest letter deadline; and providing online the solicitation of interest letter to each of the plurality of potential contractors responsive to receiving the acceptance from each respective potential contractor.

47. A tangible computer readable medium as defined in claim 45, wherein the instructions that, when executed by the computer, cause the computer to provide online access to an invitation for proposal, further cause the computer to perform the following operations:

accessing online an invitation for proposal letter template;

modifying the invitation for proposal letter template to form an online invitation for proposal letter;

tasking a preselected contract representative supervisor to approve the invitation for proposal letter;

providing an automated alert to each of the plurality of potential contractors alerting each of the plurality of potential contractors to review the invitation for proposal letter;

providing an online confidentiality statement to each of the plurality of potential contractors responsive to the attempted viewing online of the invitation for proposal letter by each respective one of the plurality of potential contractors, acceptance thereof a prerequisite for viewing the invitation for proposal letter;

receiving an acceptance, declination, or request to respond later from each of the plurality of potential contractors, periodically disseminating reminders to each of the plurality of potential contractors requesting to respond later until acceptance, declination, or until passage of an invitation for proposal letter deadline; and providing online the invitation for proposal letter to each of the plurality of potential contractors responsive to receiving the acceptance from each respective potential contractor.

48. A computer readable medium as defined in claim 45, further comprising a set of instructions that, when executed by the computer, cause the computer to perform the following operations:

forming an invitation for proposal addenda by a contracting entity member user;

providing an online link to the invitation for proposal addenda to thereby allow the contracting entity member user access to the invitation for proposal addenda;

tasking a preselected contracting entity member user supervisor by the contracting entity member user to approve and release the invitation for proposal addenda;

providing an automated alert to each of the plurality of potential contractors alerting each of the plurality of potential contractors to review online the invitation for proposal addenda; and providing the invitation for proposal addenda over the network to each of the plurality of potential contractors responsive to potential contractor selection of the invitation for proposal addenda.

\* \* \* \* \*

UNITED STATES PATENT AND TRADEMARK OFFICE
CERTIFICATE OF CORRECTION

PATENT NO.          : 7,853,472 B2
APPLICATION NO.     : 11/485622
DATED               : December 14, 2010
INVENTOR(S)         : Hisham Ali Al-Abdulqader et al.

It is certified that error appears in the above-identified patent and that said Letters Patent is hereby corrected as shown below:

In the claims:

On Column 103, line 66, claim 5, delete "faun" and after "request" insert --form--;

On Column 104, line 26, claim 5, delete "," after "contracting";

On Column 105, line 27, claim 6, delete "foam" and after "page" insert --form-- and in claim 7, on line 49, delete "form a" and after "pro" insert --forma-- and on line 50, delete "form a" and after "pro" insert --forma-- and on line 51, delete "form a" and after "pro" insert --forma--;

On Column 110, line 13, claim 18, delete "," after "rately";

On Column 121, line 28, claim 46, delete "faun" and after "to" insert --form--.

Signed and Sealed this
Twenty-second Day of March, 2011

David J. Kappos
*Director of the United States Patent and Trademark Office*